US008752011B2

(12) United States Patent
Dewan et al.

(10) Patent No.: US 8,752,011 B2
(45) Date of Patent: Jun. 10, 2014

(54) METHODS, SYSTEMS, AND COMPUTER READABLE MEDIA FOR AUTOMATICALLY GENERATING CUSTOMIZABLE USER INTERFACES USING PROGRAMMING PATTERNS

(75) Inventors: Prasun Dewan, Chapel Hill, NC (US); Olufisayo Omojokun, Atlanta, GA (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 1293 days.

(21) Appl. No.: 12/532,327

(22) PCT Filed: Mar. 20, 2008

(86) PCT No.: PCT/US2008/003682
§ 371 (c)(1),
(2), (4) Date: Feb. 12, 2010

(87) PCT Pub. No.: WO2008/115553
PCT Pub. Date: Sep. 25, 2008

(65) Prior Publication Data
US 2010/0138778 A1    Jun. 3, 2010

Related U.S. Application Data

(60) Provisional application No. 60/919,077, filed on Mar. 20, 2007.

(51) Int. Cl.
*G06F 9/44*    (2006.01)
(52) U.S. Cl.
USPC ........... 717/113; 717/104; 717/105; 717/106; 717/108
(58) Field of Classification Search
None
See application file for complete search history.

(56) References Cited

U.S. PATENT DOCUMENTS

| 7,853,922 | B1* | 12/2010 | Szpak et al. | 717/105 |
| 2002/0184610 | A1 | 12/2002 | Chong et al. | |
| 2005/0138603 | A1* | 6/2005 | Cha et al. | 717/120 |
| 2006/0117271 | A1 | 6/2006 | Keim | |
| 2006/0271526 | A1 | 11/2006 | Charnock et al. | |

OTHER PUBLICATIONS

Ivar Jacobson, "Re-engineering of old systems to an object-oriented architecture", 1991, OOPSLA, pp. 340-350.*
Ettore Merlo, "Reengineering User Interfaces", 1995, IEEE.*
Vanderdonckt, "Automatic Generation of a User Interface for Highly Interactive Business-Oriented Applications," Readings in Intelligent User Interfaces, pp. 516-520 (1998).

(Continued)

*Primary Examiner* — Lewis A Bullock, Jr.
*Assistant Examiner* — Mark Gooray
(74) *Attorney, Agent, or Firm* — Jenkins, Wilson, Taylor & Hunt, P.A.

(57) ABSTRACT

Methods, systems and computer readable media for automatically generating customizable user interfaces using programming patterns are disclosed. According to one method, application objects of an application computer program are analyzed to identify programming patterns. Each programming pattern is a relationship among signatures of application methods in one of the application objects. The signatures of the application methods include public interfaces of the application methods. A user interface is automatically generated for the computer program. Automatically generating a user interface includes providing for at least one of a user and a programmer of the computer program to customize mappings between the application objects and user interface elements, where the user interface elements include at least one of user interface widgets and speech grammar rules.

36 Claims, 91 Drawing Sheets

(56) References Cited

OTHER PUBLICATIONS

Bass et al. "Incremental Development of User Interfaces," Proceedings of IFIP TC2/WG 2.7 Working Conference on Engineering for Human-Computer Interaction, pp. 155-175 (1990).
International Search Report for International Application No. PCT/US2008/003682 (Jun. 20, 2008).
"Main Page," Jini.org, pp. 1-3 (Downloaded from the Internet on Jul. 19, 2010).
"OmniRemote™ v1.171 Software," (Downloaded from the Internet on Jul. 19, 2010).
"The Service UI Project," Artima.com, (Downloaded from the Internet on Jul. 19, 2010).
"Cocoa Fundamentals Guilde," Apple, (May 26, 2010).
"Nevo for PDAs," Universal Electronic Incs, (Copyright 2002-2009).
Omojokun et al., "Automatic Generation of Device User Interfaces?" Pervasive Computing and Communications, 2007: PerCom'07, 5th Annual IEE International Conference, gps. 251-264 (Mar. 19-23, 2007).
Nichols et al., UNIFORM: Automatically Generating Consistent Remote Control User Interfaces, in Proceeding of CHI'2006, 10 pages (Apr. 2006).
Lemon et al., "DUDE: A Dialogue and Understanding Development Environment, Mapping Business Process Models to Information State Update Dialogue Systems," EACL (2006).
Nichols et al., "Huddle: Automatically Generating Interfaces for Systems of Multiple Connected Appliances," in Proceedsing UIST (2006).
Omojokun, "Interacting with Networked Devices," in Computer Sciences, University of North Carolina (2006).
Gajos et al., "Fast and Robust Interface Generation for Ubiquitous Applications," In Proceedings of Ubicomp 2005, Tokyo, Japan, 18 pages (2005).
Dewan, "Teaching Inter-Object Design Patterns to Freshmen," Technical Symposium on Computer Science Education; Proceedings of the 36th SIGC SE Technical Symposium on Computer Science Education, pp. 482-486 (2005).
"Making Cooltown Real," mpulse, (Copyright 2001-2005).
Gajos et al., "SUPPLE: Automatically Generating User Interfaces," International Conference on Intelligent User Interfaces: Proceedings of the 9th International Conference on Intelligent User Interfaces, gps. 93-100 (2004).
Reitter et al., "UI on the Fly: Generating a Multimodal User Interface," Proceedings in HLT/NAACL (2004).
Nylander et al., "The Ubiquitous Interactor—Device Independent Access to Mobile Services," Proceedings of HCII (Jun. 2003).
Madden et al., "The Design of an Acquisitional Query Processor for Sensor Networks," International Conference on Management of Data: Proceedings of the 2003 ACM SIGMOD International Conference on Management of Data, pp. 491-502 (2003).
Omojokun et al., "A High-Level and Flexible Framework for Dynamically Composing Networked Devices," Fifth IEEE Workshop on Mobile Computing Systems and Applications, ISBN: 0-7695-1995-4 (Oct. 2003).
Omojokun et al., "Experiments with Mobile Computing Middleware for Deploying Appliance UIs," ICDC SW: Proceedings of the 23rd Internatioanl Conference on Distributed Computing Systems, p. 375 (2003).
Quan et al., "Haystack: A Platform for Authoring End User Semantic Web Applications," The SemanticWeb—ISWC 2003, pp. 738-753 (2003).
Lin et al., "Damask: A Tool for Early-Stage Design and Prototyping of Multi-Device User Interfaces," In Proceedings fo the 8th International Conference on Distributed Multimedia Systems, pp. 573-580 (Sep. 26-28, 2002).
Edwards et al., "Challenge: Recombiant Mobile Computing and the Speakeasy Approach," International Conference on Mobile Computing and Networking: Proceedings of the 8th Annual International Conference on Mobile Computing and Networking, pp. 279-286 (2002).

Nichols et al., "Generating Remote Control Interfaces for Complex Appliances," Symposium on User Interface Software and Technology: Proceedings of the 15th Annual ACM Symposium on User Interface Software and Technology, pp. 161-170 (2002).
Nichols et al., "Requirement for Automatically Generating Multi-Modal Intefaces for Complex Appliances," International Conference on Multimodal Interfaces: Proceedings of the 4th IEEE International Conference on Multimodal Interfaces, p. 377 (2002).
Larsson et al., "menu2dialog," in IJCAI Workshop on Knowledge and Reasoning in Practical Dialogue Systems (2001).
Ponnekanti et al., "ICrafter: A Service Framework for Ubiquitous Computing Environments," Lecture Notes in Computer Science, vol. 2201, pp. 56-75 (2001).
Schlimmer, "ChangeDisc: 1 Sample Service Template for Universal Plug and Play Version 1.0" (Aug. 23, 2000).
Bonnet et al., "Querying the Physical World," IEEE Personal Communications (2000).
Han et al., "WebSplitter: A Unified XML Framework for Multi-Device Collaborative Web Browsing," in Proceedings of ACM Computer Supported Cooperative Work, 10 pages (2000).
Hodes et al., "Composable Ad Hoc Location-Based Services for Heterogeneous Mobile Clients," Wireless Networks, vol. 5, Issue 5, pp. 411-427 (Oct. 1999).
Guttman, "Service Location Protocol: Automatic Discovery of IP Network Services," Internet Computing, vol. 3, No. 4, pp. 71-80 (Jul./Aug. 1999).
Beck et al., "MOCA: A Service Framework for Mobile Computing Devices," International Workshop on Data Engineering for Wireless and Mobile Access: Proceedings of the 1st ACM International Workshop on Data Engineering for Wireless and Mobile Access, pp. 1-24 (1999).
Czerwinski et al., "An Architecture for a Secure Service Discovery Service," International Conference on Mobile Computing and Networks: Proceeding of the 5th Annual ACM/IEEE International Conference on Mobile Computer and Networks, pp. 24-36 (1999).
Larsson, "Universal Plug and Play Connects Smart Devices," Win Hec 99 White Paper.
Hodes et al., "Enabling "Smart Spaces:" Entity Description and User-Interface Generation for a Heterogeneous Component-based System," in DARPA/NIST Smart Spaces Workshop (Jul. 1998).
"JavaBeans Specification," Grahm Hamilton (ed.), Sun Microsystems, pp. 1-114 (Aug. 8, 1997).
Paterno et al., "ConcurTaskTrees: A Diagrammatic Notation for Specifying Task Models,"INTERACT (1997).
Engelson et al., "Automatic Generation of User Interfaces From Data Structure Specifications and Object-Oriented Application Models," Lecture Notes in Computer Science, vol. 1098, pp. 114-141 (Jul. 1996).
Myers et al., "Reusable Hierarchical Command Objects," Conference on Human Factors in Computing Systems, Proceedings of the SIGCHI Conference on Human Factors in Computing Systems, pp. 260-267 (1996).
Szekely, "Retrospective and Challenges for Model-Based Interface Development," Information Sciences Institute, University of Southern California, pp. 1-27 (1996).
Myers, "User Interface Software Tools," ACM Transactions on Computer-Human Interaction (TOCHI), vol. 2, Issue 1, pp. 64-103 (Aug. 1994).
Berlage, "A Selective Undo Mechanism for Graphical User Interfaces Based on Command Objects," ACM Transactions on Computer-Human Interaction (TOCHI), vol. 1, Issue 3, pp. 269-294 (Sep. 1994).
Sukaviriya et al., "A Second Generation user Interface Design Environment: The Model and Runtime Architecture," INTERCHI (Sep. 1992).
Szekely, "Beyond Interface Builders: Model-Based Interface Tools," Conference on Human Factors in Computing Systems; Proceedings of the INTERACT'93 and CHI'93 Conference on Human Factors in Computing Systems, pp. 383-390 (Apr. 1993).
Taylor et al., "Separations of Concerns in the Chiron-1 User Interface Development and Management System," Conference on Human Fac-

(56) References Cited

OTHER PUBLICATIONS tors in Computing Systems; Proceedings of the INTERACT'93 and CHI'93 Conference on Human Factors in Computing Systems, pp. 367-374 (Apr. 1993).

Myers, "Separating Application Code from Toolkits: Eliminating the Spaghetti of Call-Backs," Symposium on User Interface Software and Technology: Proceedings of the 4th Annual ACM Symposium on User Interface Software and Technology, pp. 211-220 (1991).

Dewan et al., "An Approach to Support Automatic Generation of User Interfaces," ACM Transactions on Programming Languages and Systems (TOPLAS), vol. 12, Issue 4, pp. 566-609 (Apr. 1988).

Dewan, "A Tour of the Suite User Interface Software," Symposium on User Interface Software and Technology: Proceedings of the 3rd Annual ACM SIGGRAPH Symposium on User Interface Software and Technology, pp. 57-65 (1990).

Linton et al., "Composing User Interfaces with InterViews," Computer, vol. 22, Issue 2, pp. 8-22 (Feb. 1989).

Myers et al., "Automatic Data Visualization for Novice Pascal Programmers," IEEE Workshop on Visual Languages, pp. 192-198 (Oct. 12, 1988).

Krasner et al., A Cookbook for Using the Model-View-controller User Interface Paradigm in Smalltalk-80, Journal of Object-Oriented Programming, vol. 1, No. 3, pp. 26-49 (Aug./Sep. 1988).

Fraser et al., "A High-Level Programming and Command Language," ACM SIGPLAN Notices, vol. 18, Issue 6, pp. 212-219 (Jun. 1983).

Olsen et al., "SYNGRAPH: A Graphical User Interface Generator," ACM SIGGRAPH Computer Graphics, vol. 17, Issue 3, pp. 43-50 (Jul. 1983).

Rowe et al., "A Form Application Development System," International Conference on Management of Data: Proceedings of the 1982 ACM SIGMOD International Conference on Management of Data, pp. 28-38 (1982).

Liskov et al., "Abstraction Mechanisms in the CLU," Communications of the ACM, vol. 20, Issue 8, pp. 564-576 (Aug. 1977).

Codd, "A Relational Model of Data for Large Shared Data Banks," Communications of the ACM, vol. 13, Issue 6, pp. 377-387 (Jun. 1970).

\* cited by examiner

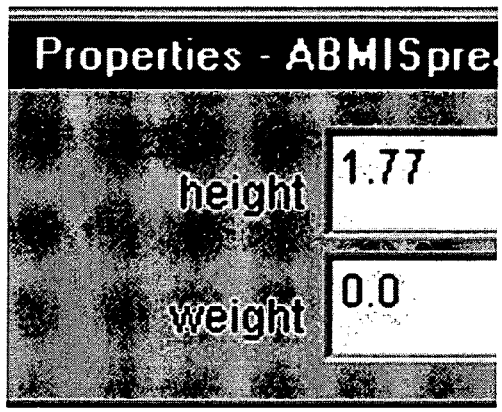

FIG. 1

```
public interface Shape {
    public int getX();
    public int getY();
    public int getWidth();
    public int getHeight();
    public Color getColor();
}
public class Line implements Shape {...}
public class Oval implements Shape {...}
public interface Turtle {
    //non read/write operations
    public void move ();
    public void rotate ();
    // Bean (primitive) properties
    public int getMoveDistance();
    public void setMoveDistance(int newVal);
    public boolean getPenDown ();
    public void setPenDown(boolean newVal);
    // programmer-defined extended-Bean properties
    public Oval getHead();
    public Oval getBody();
    // sequence pattern
    public int size();
    public Line lineAt(int i);
    public void addLine(Line line);
}
```
Figure 3 Record, Sequence, and Graphics Patterns

FIG. 2

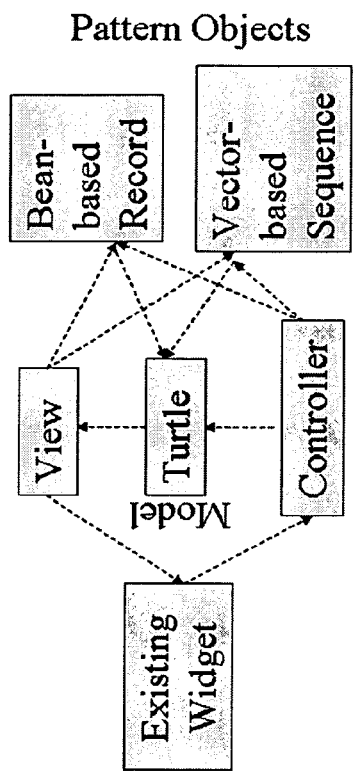

FIG. 3

```
public interface ConcreteType {            public void setModel(Object model);          public boolean
matchesPattern(Object model);
}
public interface Sequence extends ConcreteType {          public int size();          public Object elementAt(int pos);
    public void setElementAt(Object element, int pos);
    public void addElement(Object element);
    public void insertElement(Object element, int pos);
    public void removeElement(Object element, int pos);
    public Class elementType ();          public boolean hasSetElementAt();
    public boolean hasAddElement ();
    public boolean hasInsertElement();
    public boolean hasRemoveElement();
}
```

FIG. 4

Figure 5 Transforming a Pattern to an Interface

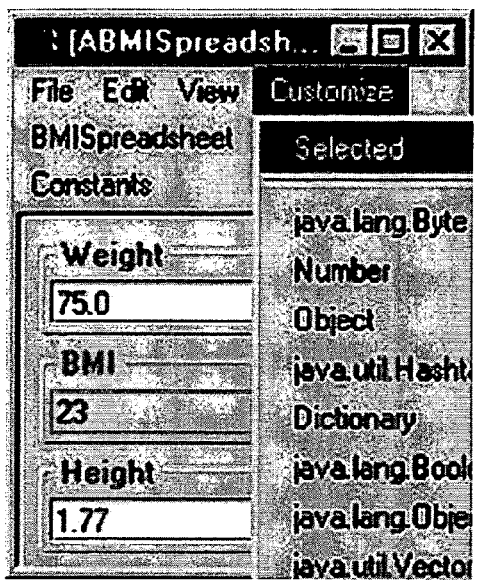
FIG. 28A
FIG. 28B
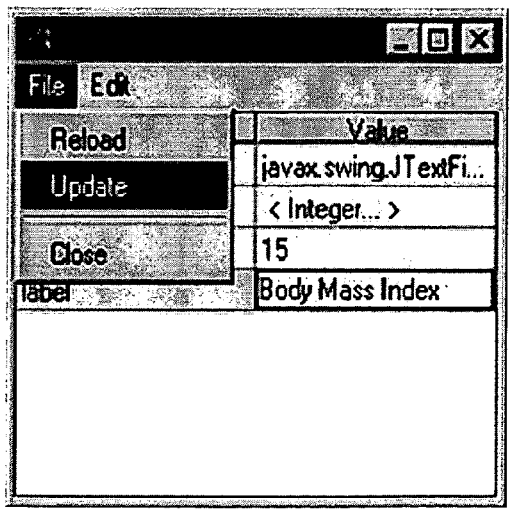
FIG. 28C
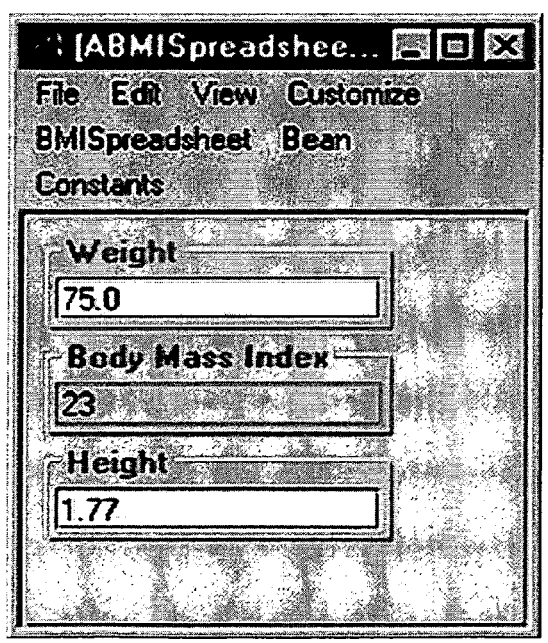
FIG. 28D

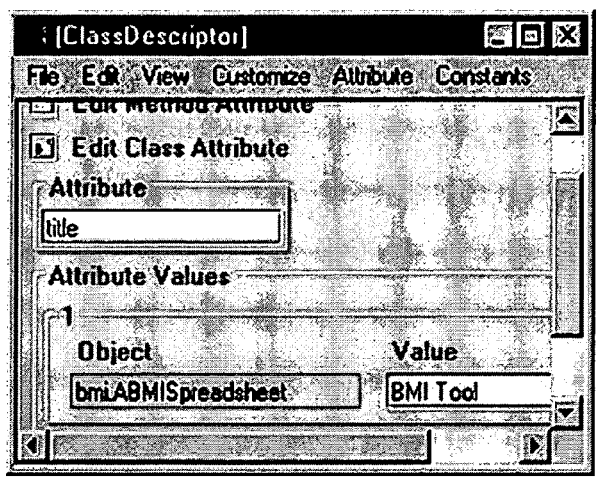 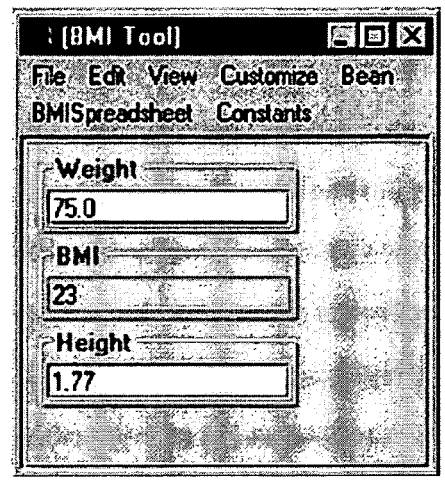
FIG. 36A  FIG. 36B
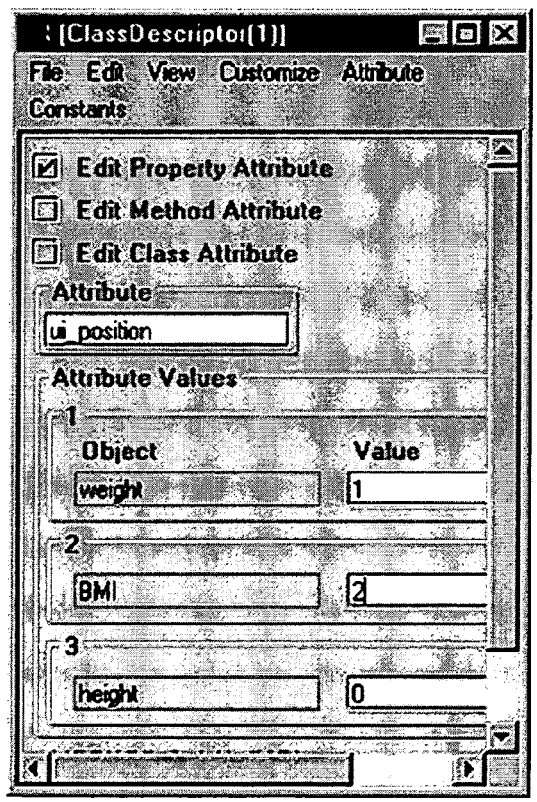 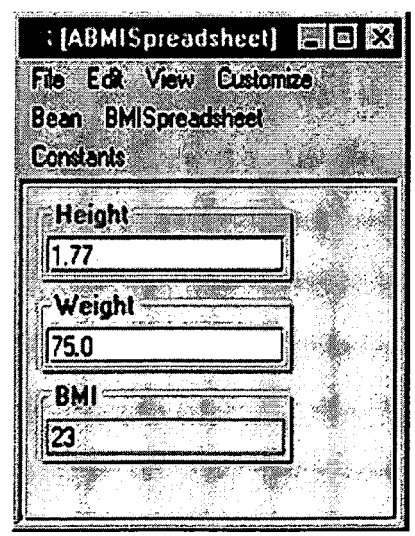
FIG. 37A  FIG. 37B

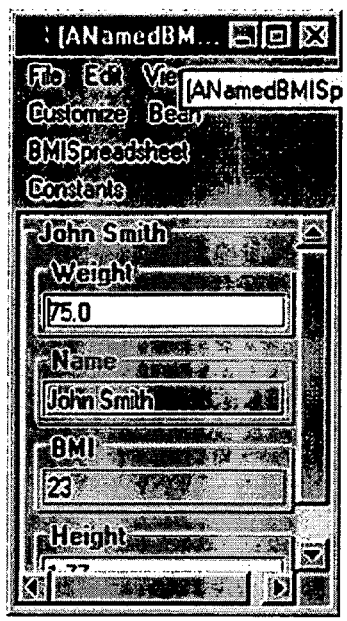
FIG. 61A
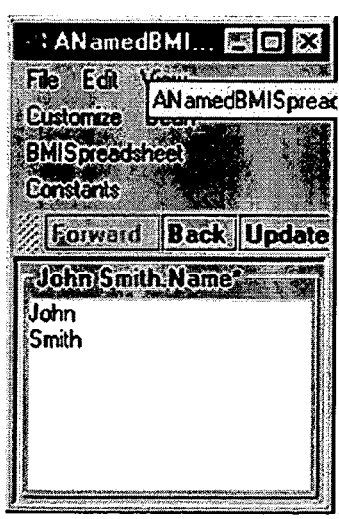 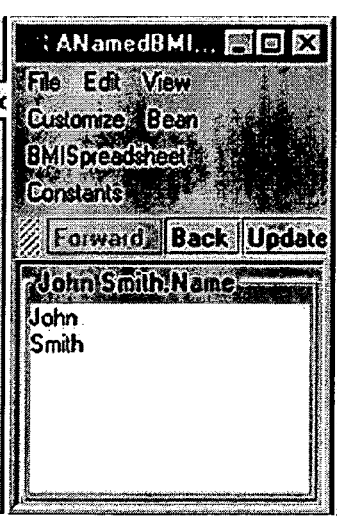 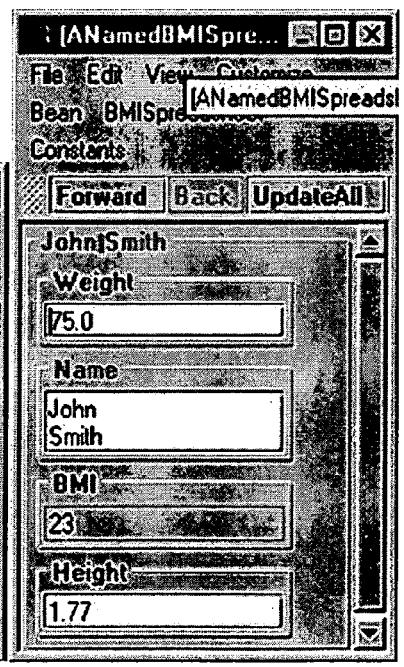
FIG. 61B  FIG. 61C  FIG. 61D

```
}
static void setModels() {
    // convert bmi property to the subrange 10..35
    // case of property name does not matter
    ObjectEditor.setMaxValue(bmiSpreadsheet, "bmi", 35);
    ObjectEditor.setMinValue(bmiSpreadsheet, "bmi", 10);
    String[] properties = {
        "name",
        "race",
        "height",
        "weight",
        "bmi",
        "bmi",
        "bmi",
        "hasPerfectBMI",
        "status",
        "description"
    };
    Component[] components = {
        nameComboBox,
        raceSpinner,
        heightTextField,
        weightTextField,
        bmiTextField,
        bmiSlider,
        bmiProgressBar,
        hasPerfectBMICheckBox,
        statusComboBox,
        descriptionTextArea
    };
    ModelBinder.setModels(bmiSpreadsheet, properties, components);
    ObjectEditor.bindMenuItemToMethod(bmiSpreadsheet, "addTenPounds", increaseWeightMenuItem);
    ObjectEditor.bindButtonToMethod(bmiSpreadsheet, "subtractTenPounds", decreaseWeightButton);

METHODS, SYSTEMS, AND COMPUTER READABLE MEDIA FOR AUTOMATICALLY GENERATING CUSTOMIZABLE USER INTERFACES USING PROGRAMMING PATTERNS

PRIORITY CLAIM

This application claims the benefit of U.S. Provisional Patent Application Ser. No. 60/919,077, filed Mar. 20, 2007, the disclosure of which is incorporated herein by reference in its entirety.

GOVERNMENT INTEREST

This work was supported at least in part by a grant from the National Science Foundation (Grant No. IIS 0312328). Thus, the U.S. Government may have certain rights in the presently disclosed subject matter.

TECHNICAL FIELD

The subject matter described herein relates to creating user interfaces for computer programs and device controlled by computer programs. More particularly, the subject matter described herein relates to methods, systems, and computer readable media for automatically generating customizable user-interfaces using programming patterns.

BACKGROUND

The Model-View-Controller (MVC) framework [1] allows the semantics and user-interface of application to be separated in different objects. As a result, the two components of the application can be created by developers with different skills. Moreover, the user-interface can be changed without changing the semantics. In multi-user interfaces, it allows (a) different users to see different views of the semantics and, (b) the code implementing the user interface of centralized semantic state to be placed on the computers of the local users. These properties have made it a fundamental software framework in interactive systems.

MVC was created without considering automation—the model, view and controller were expected to be implemented manually. Designers of recent commercial user-interface tools, such as Swing and Windows Forms, have shown that by making the tools directly aware of certain aspects of applications models such as their external structure, it is possible to increase automation. Awareness of model aspects is difficult when they are encapsulated. These tools have addressed this problem by being aware of only well-known models, that is, models whose types are defined by the tools. As a result, they provide limited abstraction flexibility. Various solutions to this problem have been proposed recently, but they compromise automation and user-interface flexibility. One contribution of the present subject matter is to show that this seeming contradiction between abstraction flexibility and the other two metrics—i.e., user automation and user interface flexibility, can be overcome by exploiting the following key observation: Just as there is uniformity in user-interfaces, there is also commonality in programming interfaces. In fact, the reason for both regularities is the same—to make it easy for users and programmers to understand and use these two kinds of interfaces. It has been found, somewhat surprisingly, that awareness of the conventions or patterns programmers follow to make their objects understandable to others can also be used to improve the tool in all three dimensions.

Motivating Pattern-Based UI Automation

Traditional user-interface tools have taken the approach of defining widgets such as text-fields and sliders without having any model of the higher-level application objects to which they are bound. Model-based systems [2, 3] take the converse approach of starting from semantic objects, and binding them to appropriate model-aware widgets—which are essentially views and controllers in the MVC terminology. These bindings can be programmer-defined or predefined. Several systems, including commercial ones such as Apple's Cocoa [4], Swing, and Windows Forms, provide a framework to register and lookup programmer-defined bindings. Automation of MVC, however, requires toolkit-supported bindings between a variety of toolkit-defined widgets and model objects.

Previous research has identified several useful bindings between widgets and semantic entities defined by traditional programming languages, such as the mapping between a menu (e.g. combo-box) and an enum [5], an editable customizable hierarchical form and a hierarchical record [6], and a button and a procedure [5]. Adapting this research to object-oriented languages, however, has proved to be difficult. The idea of model-aware widgets is fundamentally at odds with the notion of programmer-defined encapsulated objects. The former requires widgets to have some knowledge of the model such as its logical components, while the latter hides all details of the model from external objects except the set of methods that can be invoked on it.

One way to address this issue is to support only toolkit-defined models. This approach is supported by several commercial user-interface tools such as Swing, which supports tree, table, and combo-box widgets for models implementing programming interfaces defined by these widgets. The model-aware widgets augment rather than replace model-aware widgets, thereby increasing automation without reducing user-interface flexibility. Commercial toolkits have focused only on model substitutability—allowing the same widget to be used to interact with instances of different model classes that implement the same interface. They do not currently support widget substitutability—allowing the same model to be displayed using different model-aware widgets. Recent work [7] has shown that is possible for a toolkit to support both model and widget substitutability by defining a single model interface for a variety of structured widgets including trees, tables, tabbed composition of widgets, forms, and browsers. However, like the commercial tools, it supports encapsulated but not programmer-defined types. The dual of this idea, implemented in [8], is to support programmer-defined but not encapsulated model types, that is, require programmers to create public instance variables in the model classes they define. The two dual ideas essentially require that programmers do conventional programming using an object-oriented language.

One popular approach to address this problem is to require programmers to provide a special description of the encapsulated models they create [9, 10] in some model-description language, and manually map references to this description to the implementation of the model in the object-oriented language. For example, in [9, 11], the programmers are responsible for manually mapping between the implementation of an object in a standard programming language and a manually specified XML-based description of it understood by the tool. The cost of carrying out these tasks when a model is first created, and each time it is changed, can be significant, especially for complex model types. It is perhaps for this reason that these tools, to the best of our knowledge, support only one-level model structures, that is, restrict model components to be primitive types. As a result, they cannot be used, for example, to define the model of an arbitrarily nested tree-widget such as a folder.

As described above, each of the above approaches makes a significant compromise. The reason for making the compromise is not surprising—the UI automation offered by model-aware widgets can result in considerable productivity gains given the high cost of manually implementing user interfaces using model-unaware widgets [12], which involves translating between potentially complex model and widget structures. These compromises result from the fundamental tension between model-awareness and encapsulation, which prevents toolkits from understanding arbitrary objects.

As described below, programming patterns have been used earlier in other contexts. One contribution of the present subject matter is the application of programming partners in implementation of user-interfaces of encapsulated models. In the next section, previous work to motivate the general idea of using programming patterns in a user-interface tool is surveyed. Next, the idea is developed by discussing a variety of new ways in which programming patterns can be used, along with associated architectures. The discussion of automatic generation of user interfaces by extending the MVC architecture ends by outlining a Java-based implementation of these concepts and experiences with it, and giving conclusions and directions for future work.

Accordingly, there exists a need for methods, systems, and computer readable media for automatically generating user interfaces using programming patterns.

SUMMARY

Methods, systems and computer readable media for automatically generating customizable user interfaces using programming patterns are disclosed. According to one method, application objects of an application computer program are analyzed to identify programming patterns. Each programming pattern is a relationship among signatures of application methods in one of the application objects. The signatures of the application methods include public interfaces of the application methods. A user interface is automatically generated for the computer program. Automatically generating a user interface includes providing for at least one of a user and a programmer of the computer program to customize mappings between the application objects and user interface elements, where the user interface elements include at least one of user interface widgets and speech grammar rules.

According to another exemplary method, a computer program is analyzed to identify programming patterns. Each programming pattern uses a relationship among methods in an object in a computer program based on signatures of the method to yield properties about the application object needed to generate the user interface. The identified programming patterns include predefined programming patterns provided by the system and programmer defined patterns specified by application programmers The signatures of the methods comprise public interfaces of the methods. The method further includes automatically generating, based on the identified programming patterns, a user interface for the computer program.

As used herein, a predefined or programmer defined programming pattern is embodied by a pattern object that uses the relationship among method signatures of an application or model object to provide a well-defined programming interface used for user-interface generation. One example of such an interface is the universal toolkit model described here. This is a particularly useful programming interface because we have shown it is sufficient to support many popular user-interface widgets such as browsers, forms, tables and trees. Another example of a pattern object is the Vector-based pattern object described in detail here, which is useful for a special pattern based on the Vector class provided by the Java system.

The subject matter described herein for automatically generating customizable user interfaces using programming patterns may be implemented using a computer readable medium having stored thereon computer instructions that when executed by a processor of a computer implement the steps desired herein. Exemplary computer readable media suitable for implementing the subject matter described herein includes disk memory devices, programmable logic devices, and application specific integrated circuits. In one implementation, the computer readable medium may include a memory accessible by a processor. The memory may include instructions executable by the processor for implementing any of the methods for automatically generating user-interfaces using programming patterns described herein. In addition, a computer readable medium that implements the subject matter described herein may be distributed across multiple physical devices and/or computing platforms.

BRIEF DESCRIPTION OF THE DRAWINGS

The subject matter described herein will now be explained with reference to the accompanying drawings of which:

FIG. 1 is a computer screen shot of a user interface generated by bean builder where the user interface includes text boxes corresponding to editable elements of an object;

FIG. 2 is a source code listing for an object that manipulates a shape for which the subject matter described herein maybe be used to automatically generate a user interface according to an embodiment of the subject matter described herein;

FIG. 3 is a block diagram illustrating a model view controller architecture and pattern based widgets according to an embodiment of the subject matter described herein;

FIG. 4 is a code listing illustrating a pattern object that indicates whether or not it matches a model;

FIG. 14(a) illustrates the source code. FIG. 14(d) illustrates the customization code. FIGS. 14(b) and 14(c) respectively illustrate the customized and default user interfaces for the device.

FIG. 22 is a computer screen shot illustrating examples of automatically generated table and form displays according to embodiments of the subject matter described herein;

FIGS. 23(a) and 23(b) are computer screen shots illustrating examples of automatically generated nested form and tabbed panes according to embodiments of the subject matter described herein;

FIGS. 28(a)-28(d) are computer screen shots illustrating examples of instance-specific customization according to an embodiment of the subject matter described herein;

FIGS. 35(a)-35(e) are computer screen shots illustrating examples of using object context to override attribute values according to an embodiment of the subject matter described herein;

FIGS. 36(a) and 36(b) are computer screen shots illustrating examples of the setting of the frame title attribute of ABMIspreadsheet objects according to an embodiment of the subject matter described herein;

FIGS. 37(a) and 37(b) are computer screen shots illustrating examples of the setting of the position attribute of the ABMIspreadsheet object according to an embodiment of the subject matter described herein;

FIG. 58(a) illustrates the saved object, FIG. 58(b) illustrated the editing of the saved objects, and FIG. 58(c) illustrates the loading of the saved state according to an embodiment of the subject matter described herein;

FIGS. 60(a) and 60(b) are computer screen shots illustrating examples of the updating of multiple objects with one command according to an embodiment of the subject matter described herein;

FIGS. 61(a)-61(d) are computer screen shots illustrating examples of double clicking string, inserting Enter, updating the screen, and calling the back command according to an embodiment of the subject matter described herein;

FIG. 78 is a computer screen shot illustrating relevant source code and binding according to an embodiment of the subject matter described herein;

FIGS. 80(a)-80(j) show many ways of instantiating a class involving the activating of a menu item, editing or choosing from a combobox, and double clicking on an intern in a tree view of a folder that shows the description of a selected class.

DETAILED DESCRIPTION

Figure 5A:
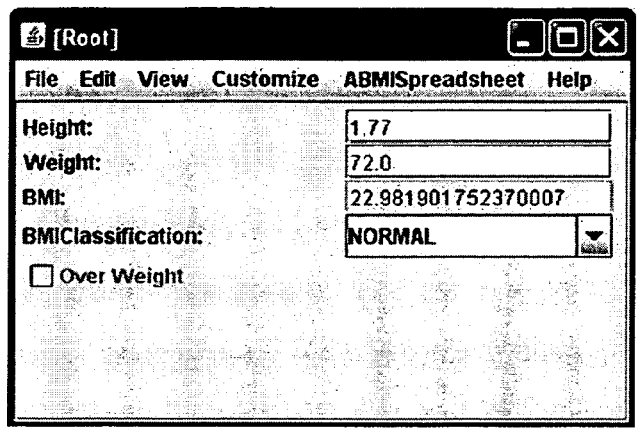
FIGS. 5(a)-5(e) are computer screen shots illustrating the operation of automatically generated undo and redo tools according to embodiments of the subject matter described herein.

One aspect of the subject matter described herein relies on the fact that people do not create arbitrary objects, just as they do not create arbitrary user-interfaces. One idea embodied by the subject matter described herein is that by relating the regularities in user and programming interfaces, it is possible to increase the abstraction flexibility of a tool without decreasing its automation and user-interface flexibility. In fact, as described herein, it is possible to use programming patterns to improve a toolkit in all three dimensions.

This idea is inspired by previous work, not on UI tools, but on UI Builders—in particular the Java Bean Builder. The Bean Builder is based on the notion of named properties, which can be refined into read-only and editable properties. A class defines a named property P of primitive type T if it declares a getter method for reading the value of the property, that is, a method with the signature:

public T getP( )

If it also declares a setter method to change the property, that is, a method with the signature:

public void setP(T new P)

then the property is editable; otherwise it is read-only. While the Java Bean framework supports only primitive properties, the Bean conventions, as defined above, apply also to programmer-defined object properties. Programmer defined properties are referred to herein as extended-Bean properties. The class defined by the following source code illustrates Bean properties:

```
public class ABMISpreadsheet implements BMISpreadsheet {
    double height, weight;
    public double getHeight( ) {return height; }
    public void setHeight(double newHeight) {
        assert preSetHeight(newHeight);
        height = newHeight; }
    public double getWeight( ) {return weight; }
    public void setWeight(double newWeight) {
        assert preSetWeight(newWeight);
        weight = newWeight; }
    public int getBMI( ) {
        assert preGetBMI( );
        return (int) weight/(height*height);}
    public bool preGetBMI( ) {
        return height > 0 && weight > 0; }
    public bool preSetWeight(double newWeight) {
    return newWeight > 0; }
    public bool preSetHeight(double newHeight) {
        return newHeight > 0; }
}
```

It defines two editable properties, Weight and Height, and a read-only property, BMI. Given this class, the Bean Builder will display all the editable properties of an instance of the class (FIG. 2). That is, Bean Builder is only capable of generating user interfaces for the editable properties of the BMI class. If the user edits one of these properties, the Bean Builder will call the associated setter method. Thus, the BeanBuilder automatically generates a form user-interface for the programmer-defined type. Instead of being bound to a particular object class or interface, the "generation" algorithm used by the Bean Builder is bound to the relationships among the components of the external interface of an object—which are referred to herein as programming patterns. A programming pattern is more than a naming convention because it constrains the number and types of parameters and return values. It can have both fixed part (e.g. "get" & "set" above) and a variable part (e.g. property name P and type T above). Together, these parts imply certain object semantics that apply to an infinite family of programming interfaces. A tool such as Bean Builder works correctly only if the associated object semantics are supported by the programmer. This is analogous to an interface-based tool working correctly only if a model interface is implemented correctly. Bean patterns have been used in a variety of tools including Apple's Cocoa user-interface builder [4]. It is possible to use annotations to explicitly convey the information implicit in a programming pattern, but this approach has the problems mentioned earlier of an explicit model-description.

A programming pattern should be distinguished from a design pattern. A design pattern addresses the relationships among different objects in a program, while a programming pattern describes the relationships among the methods of a particular object. The MVC architecture is a design pattern, describing the relationship between the model, view, and controller. The JavaBean conventions for named properties describe a programming pattern that may be implemented by a model, view, controller, or any other object.

JavaBeans, and our own tool, supports programming patterns using reflection, that is, capabilities allowing the type and public methods of an object to be dynamically identified and accessed. JavaBeans requires all application programmers to use reflection to invoke methods matched by the Bean pattern. As will be described in detail below, the present tool requires the pattern-definer but not the pattern-user to do so.

As FIG. 2 shows, the Bean Builder does not show the read-only property, BMI. Moreover, it provides no way to define the order in which properties are entered, which is useful when there are dependencies among them. It also does not perform validation of input to prevent, for instance negative values for the weight or height. It also does not allow programmers or users to determine which properties are displayed and which widgets are used to display these properties. In particular, it does not allow a property to be bound to multiple widgets. It binds properties only to text widgets and these are collected into a panel. It does not map application methods to menus, buttons or other control widgets. It does not support a speech user interface to interact with the object. It does not draw graphical objects such as rectangles and ovals. As mentioned before, it only supports simple predefined properties. It does not recursively decompose the property of an object into smaller properties and bind each of them to widgets. The user-interface it creates is static and cannot change in response to user input. It does not provide undo/redo or help information. It has not been applied to teaching of programming or networked device. It supports a single fixed pattern and thus does not use programmer-defined patterns in user-interface generation.

These are limitations only if Bean Builder is regarded as a user-interface tool. As mentioned earlier, it is, in fact, an interactive user-interface builder. According to the JavaBeans Specification, 'properties are discrete, named attributes of a Java bean that can affect its appearance or its behavior'. The objects it displays are meant to be view objects, customized by programmers before the application is deployed, and not model objects manipulated by end-users—the Bean Builder is meant to allow a programmer to set a static set of primitive formatting properties.

While the Bean Builder is not a user-interface tool, it does show that programming patterns can be used to support simple forms. The next task is to determine how far the idea of programming patterns in a user-interface tool can usefully be carried. The goal is to not make it easy for developers to follow programming patterns but to use Bean and other programming patterns to automate MVC. The subsections below address this issue.

Binding Models to Widgets

To understand the role programming patterns can play in user-interface tools, it is important to realize that the Bean pattern essentially maps an abstract object to a record in a conventional programming language, with each object property corresponding to a record field. A record is an example of a concrete constructor, which is fundamentally different from a "constructor" or initializing method provided by an object-oriented language. To reduce confusion, a concrete constructor will be referred to herein as a concrete type, even though it is really a generator of types associated with a set of read and write operations defined by the constructor.

One of the key observations behind this work is that a conventional type is related to the notion of a model in the MVC framework. Like a concrete-type, a model is associated with separate write and read operations. The former are invoked by controllers to map user input to model changes, and the latter are invoked by views to make the displayed and model state consistent. Moreover, many popular models provide programmer-defined implementations of operations provided by concrete-types. For example the Java Vector and ArrayList classes provide alternative programmer-defined implementations of operations of the conventional sequence type.

Concrete-types, as described in the previous section, can be automatically mapped to user-interface widgets such as forms and trees. Thus, models can be automatically bound to widgets by first mapping them to concrete-types, and then the latter to widgets (FIG. 8(a)). To further increase abstraction flexibility, models can be allowed to adapt the operations provided by conventional types by (a) offering a subset of the operations defined by conventional types, (b) checking application-specific preconditions, and (c) triggering programmer-defined computations in response to these operations. The class for the ABMI spreadsheet set forth above illustrates all of these adaptations. Unlike a record type, it does not provide an operation to write the BMI field, and does not allocate memory to explicitly store its value. Moreover, it checks that preconditions of methods are satisfied. Furthermore, the operation to read the BMI value triggers a programmer-defined computation. As will be described below, (a) is relevant to connecting widgets to models; (b) is relevant for enabling widget components and validating user input; and (c) is important for refreshing the visualized state of a model.

Given the correspondence between Bean named properties and record fields, the user-interface provided by the Bean Builder follows from the previous work on binding records to form widgets. Similarly, Bean indexed properties correspond to (fixed-size) arrays and can be bound to any widget created for arrays (FIG. 7(a)).

Based on this insight, it is possible to define programming patterns for other concrete-types using name and type variables, which are enclosed in angle brackets in the descriptions below. To illustrate, consider a (variable-sized) indexed sequence. If a class provides the following two methods:

```
public int size( );
public<T><element>At(int index);
``` it is assumed that the class defines a sequence, <element>At (0) ... <elementAt>At (size ( )–1)), of elements of type <T>. Like the Bean getter methods, these are read methods called to display the object. Based on whether the following write methods are also defined:

```
public <AnyType> set<element>At(<T> element, int index);
public <AnyType> add<element> (<T> element);
public <AnyType> remove<element>(<T> element, int index);
public <AnyType> insert<element>(<T> element, int index);
``` the sequence is considered to have editable, addable, deleteable, and insertable elements, respectively. This information is used by the widget to determine which operations are valid on the model. In the above description, type variable <T> and name variable <element> must unify (in the Prolog sense) to the same value in all signatures, while <AnyType> can be assigned a different type each time. By assigning type <T>, Line, <AnyType>, void, and <element>, Line the methods in Turtle (FIG. 2) for accessing and adding Line objects can be obtained. By taking into account the type in sequence and other patterns, it is ensured that widgets have the information needed to do type checking—for example, ensuring that only Line objects get added into a Turtle object. This process is similar to the mechanisms of type parameters/inference in programming languages. There are however several differences. First, the pattern-based approach looks at complex type relationships such as the return type of a method being related to a parameter type of another method, which are not supported by type parameters/inference. Second, besides relationships among types, it also looks at relationships among the names of program elements. Finally, it adapts to the set of methods defined by an object rather than requiring it to define a prescribed set of methods. For example, the pattern above derives the kind of sequence defined by a class based on the presence of optional add, remove and insert methods.

It is possible to define more than one pattern for a type. The pattern given above for the sequence type generalizes the conventions of index-based methods of the Java class, Vector. It is possible to similarly define additional patterns based on iterator-based methods of Vector, and (the index- and iterator-based) methods of the Java interface, List, implemented by ArrayList and other classes.

The above discussion raises four issues related to implementation and extensibility.

Programmer-defined patterns: As there are many possible patterns for supporting a particular concrete type, how can (tool and application) programmers define their own patterns for the type?

Programmer-defined pattern-aware widgets: It is possible to define a variety of widgets for a type. For example, a variety of form widgets can be created for records that offer different layout and customization schemes. How can programmers add pattern-aware widgets to the user-interface tool?

Automation of pattern processing: Can programmers of widgets be relieved from the task of interpreting the relevant patterns?

Reusing existing widgets: How can existing widgets be reused in the implementation of pattern-based widgets?

FIG. 3 shows extensions to the MVC architecture to address these issues. The extended architecture assumes that a pattern-aware widget is decomposed into a view and controller. These two components can be layered on top of existing pattern-unaware widgets, which can be aware or unaware of the model. As in traditional MVC, they interact with the model. In addition, they interact with one or more pattern objects associated with the model, which reference the model.

A pattern object defines and interprets a pattern for a particular concrete-type by transforming the pattern into an interface associated with the type. As a result, the view and controller have to worry only about the abstract operations provided by the type, and not how these are mapped, via reflection-based pattern matching, to the corresponding methods in the model. As a model may implement several patterns, the view and controller can access multiple pattern objects. This is illustrated by FIG. 3. The Turtle interface of FIG. 2 implements both the Bean-based record pattern and the Vector-based sequence pattern. As a result, its view and controller have references to objects defining these two patterns.

FIG. 4 shows the interface defined for the sequence type, which is implemented by the Vector-based pattern object. It defines all read and write operations associated with the sequence type. As described above, each of the write operations is optional. Therefore, Boolean methods are provided to indicate which of these operations are actually implemented by a specific model. Another method returns the unified element type, which, as mentioned before, can be used to ensure users do not enter invalid elements. An implementation of this interface is done once for each pattern by the programmer implementing the associated pattern-object. All (views and controllers of) widgets that use the interface are independent of the pattern-classes (classes of pattern-objects) implementing the interface.

Figure 9:
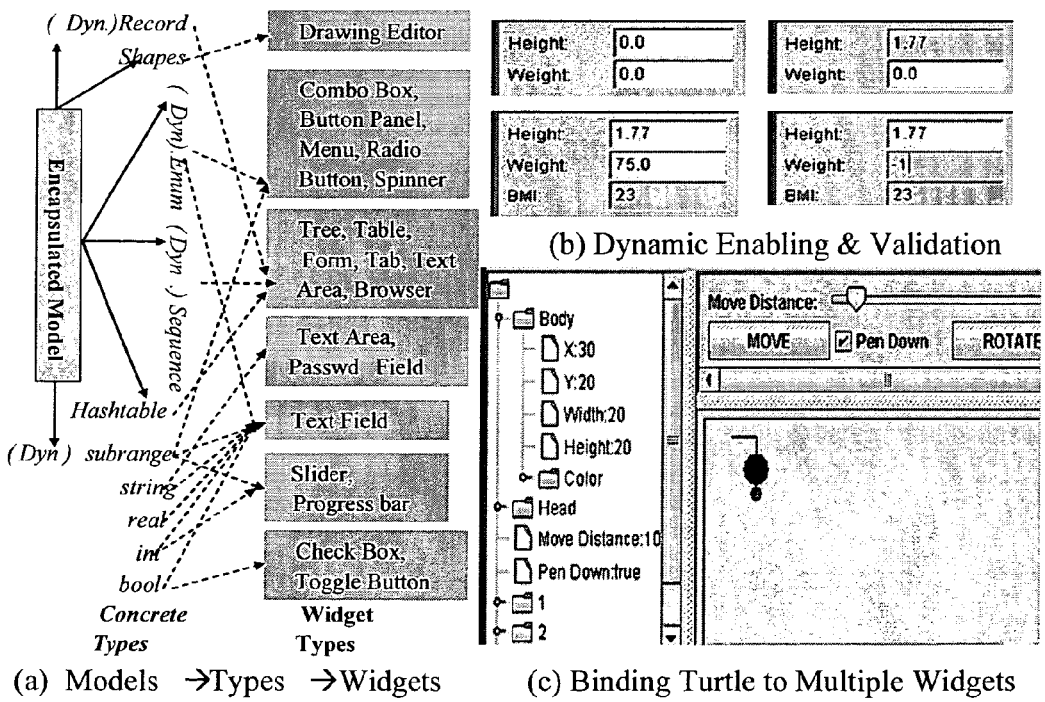
FIGS. 9(a)-9(c) illustrate examples of concrete types, dynamic enabling and validation, and binding of a pattern to multiple widgets according to an embodiment of the subject matter described herein.

As illustrated in FIG. 3, a view does not call read methods directly in the model. Instead it calls the abstract read operations defined by the pattern objects, which in turn call the read methods of the model. Similarly, a controller calls write methods in the model through the pattern objects. Not all methods in a model are read or write methods mapping to well-known concrete-types. The rotate( ) and move( ) operations of FIG. 2 are examples of such operations. Therefore, the controller also contains direct references to the model to invoke these methods (which are mapped to buttons and menu items in our implementation of the form widget, as shown in FIG. 9(c), top right window). Similarly, the model directly sends notifications to the view, as these are not subject to pattern analysis. FIG. 9(c), left window, shows a pattern-based widget displaying the turtle object as a tree based on the extended-Bean and sequence patterns defined by it.

How does a widget know which pattern-objects are relevant for the model to which it is bound? It could do the pattern-analysis to identify the appropriate objects, but that defeats the idea of capturing all pattern analysis in pattern objects. To address this issue, it can be required that (a) a method in a pattern-object that indicates if it matches a model (FIG. 5), and (b) a widget-independent pattern-matcher component in the user-interface tool that implements the following interface:

```
public interface PatternMatcher {
    public void register (TypeFactory patternClass);
    public ConcreteType [ ] match (Object model);
}
```

The interface provides a method to register a factory for a new class of pattern-objects. It also provides a method that returns a set of pattern-objects that match the model. For each registered factory, the method performs the following actions. It asks the factory to instantiate a new pattern-object. It then checks with the new instance whether it matches the model. In case of success, it adds the instance to the set of matching pattern-objects returned by it.

As mentioned in the implementation section, the above approach can be used to create pattern-objects for a variety of concrete-types provided by traditional programming languages. It can also be used to support graphics types. The implementation described above can also be used to teach introductory computer programming classes, which often require the construction of simple 2-D graphics user-interfaces. The implementation described above can also be used to automatically generate user interfaces for networked devices. For example, a networked device may be controlled by a computer program with a public interface. The public interface may be analyzed to identify programming patterns, as described above. A user interface may be automatically generated based on the programming patterns. Thus, the designer of the device can focus more on the device design and less on the user interface used to invoke functions of the device. Similarly, the implementation can be used to demonstrate research prototypes, again, allowing the focus to be on the functionality rather than the UI.

Patterns that generalize graphical classes defined in textbooks and libraries are identified above. Such patterns are layered on top of the Bean patterns. A class whose name contains the substring Point and defines the X and Y named int properties (using Bean conventions) is recognized as a point-class. A class whose name contains the substring "Line"/"Rectangle"/"Oval" and defines the X, Y, Width, and Height integer properties is recognized as a line/rectangle/oval class. These classes can define several additional optional properties such as Color that determine attributes of the shapes. The present subject matter has been used to automatically generate a graphical 2-D drawing-editor widget (FIG. 7(c), bottom right widget) that uses these patterns to draw a shape based on its kind (Point, Line, Oval, Rectangle) and location, size and other properties, and allows editing of these properties if the corresponding setter methods are defined.

As described above, the architecture of FIG. 3 allows a class or interface such as the Turtle interface to implement several patterns simultaneously. However, currently, it does not allow an object to implement multiple instances of the same pattern. For example, the Turtle instance cannot implement a sequence of Line elements and another sequence of Point elements. These sequences would have to be separate objects that are made properties of the Turtle object. This restriction is consistent, for example, with the Vector or ArrayList class implementing a single sequence.

As the above discussion shows, it is possible to override predefined programming patterns and their interpretation in a user-interface tool. The following subsections focus on predefined syntax and semantics when identifying additional kinds of patterns.

Undo Patterns

The patterns for concrete-types described above allow binding of model-aware widgets to encapsulated models. By identifying ways to read and write the state of an object, they can also allow undoing of write methods in the way databases allow abort of transactions. However, these patterns are not sufficient to support undo of operations other than the write methods defined by them, such as increment and decrement. An additional set of patterns to support more general but not arbitrary undo is described below. The undo framework assumed in the description of these patterns implements the undo/redo of an operation in a command object [13][14] associated with the operation. A discussion of how command objects (and other parts of the system involved in processing of I/O events) are integrated with the MVC event flow. A discussion of how predefined command objects can automatically undo/redo methods matching various undo patterns is also presented below.

The set-last undo pattern assumes that a set method with the signature:

AnyType setS(T1 p1, ... TN PN, T newVal)

can be reversed with the help of the get method:

T getS(T1 p1, T2 p2, ... Tn Pn).

Before invoking setS (p1, ... PN, newVal), the command object for this pattern executes:

T oldVal=getS(p1, ... Pn)

The set method is undone by executing setS (p1, ... Pn, oldVal), and redone by executing setS (p1, ... Pn, newVal). In this pattern, the value to be set is the last argument of the set method. In some classes, it is the first argument. Therefore a minor variation of the pattern, called set-first, allows:

AnyType setS(T newVal, T1 p1, T2 p2, ... Tn Pn)

to be similarly undone using:

T getS(T1 p1, T2 p2, ... Tn Pn)

These patterns can be used, for example, to undo the method setHeight(int newVal) using getHeight( ) setCell(int row, int col, Object newVal) using getCell(int row, int col), and setElementAt(Object newVal, int index) using getElementAt (int index).

Three additional undo patterns are based on the existence of the following function:

isAntonym(String W, String X)

for checking if X and W are antonyms such as "add" and "remove". This function adds/removes the well-known antonym prefixes "un", "im", "ir", "in", "dis", "a", & "de" to W (X) and checks if the resulting word is X (W). If not, it consults a dictionary of antonyms, to which programmers can add new pairs. In a production version of this approach, this dictionary could be a comprehensive dictionary such as Web-Net. Dictionaries have been use in the past for password breaking. Here this general idea is applied, more constructively, to undo.

In the examples below, a method name A is an antonym of a method name M, if M=PWS & A=PXS, where P, X, and S are substrings, and is Antonym(W, X). For example, if "pop" and "push" are considered antonym words, then pop and push, and pushElement & popElement are considered antonym method names. Thus, the function for finding antonym methods names is built on top of the function for finding antonym words to reduce the size of the antonym dictionary. In the pattern descriptions below, M and A will stand for a method name and its antonym, respectively.

Two of the undo patterns are based on the fact that some methods add objects to a collection while others, whose names are antonyms of the former, remove the added objects. Under the add-last pattern, if the add method has the signature:

AnyType M(T1 p1, T2 p2, ... Tn Pn, T newVal)

then the remove method is expected to have the signature:

T A (T1 p1, T2 p2, ... Tn Pn)

To undo M(p1, p2, ..., Pn, newVal), the associated command object simply invokes A(p1, p2, ..., Pn). To undo:

T oldVal=A(p1, p2, ..., Pn)

the command object invokes:

M(p1, p2, ..., Pn, oldVal).

As in the set case, a slight variation of this pattern, called add-first, assumes that the added object is the first argument, that is, the add method has the signature:

AnyType M(T newVal, T1 p1, T2 p2, ... Tn Pn)

These two patterns to can be used to undo, for instance, the Object push(Object newVal) and Object pop( )methods.

The final undo pattern, called symmetric, assumes methods with the same argument types but antonym names are inverses. That is, the methods AnyType M (T1 p1, T2 p2, ... Tn Pn)

and

AnyType A (T1 p1, T2 p2, ... Tn Pn)

are inverses. To invert M(p1, ... pn), the command object simply calls A(p1, ..., pn), and vice versa. This pattern can be used, for instance, to undo increment(int step) using decrement(int step) or channelUp( ) using channelDown( ).

Given the method to execute on an object, a command-creator component in the controller constructs the appropriate command-object based on other methods in the target object. For example, given that increment(int step), must be executed on object o, the command creator finds that this method and decrement(int step) of o follow the symmetric pattern, and thus returns the associated command object.

Using patterns to undo is also embodied in Apple's Cocoa system [4], which provides a module to undo and redo Bean setters. Such a module is not sufficient to support any of the examples presented above. Thus, our patterns undo a much larger variety of operations. However, they cannot undo arbitrary operations, a problem addressed by the architecture of FIG. 5 described below.

Figure 5B:
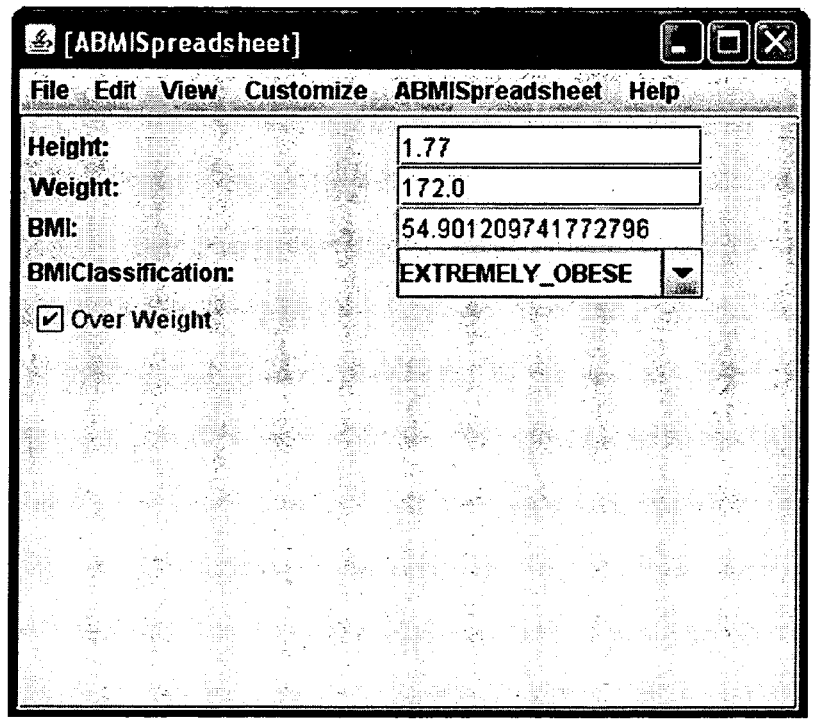
Figure 5C:
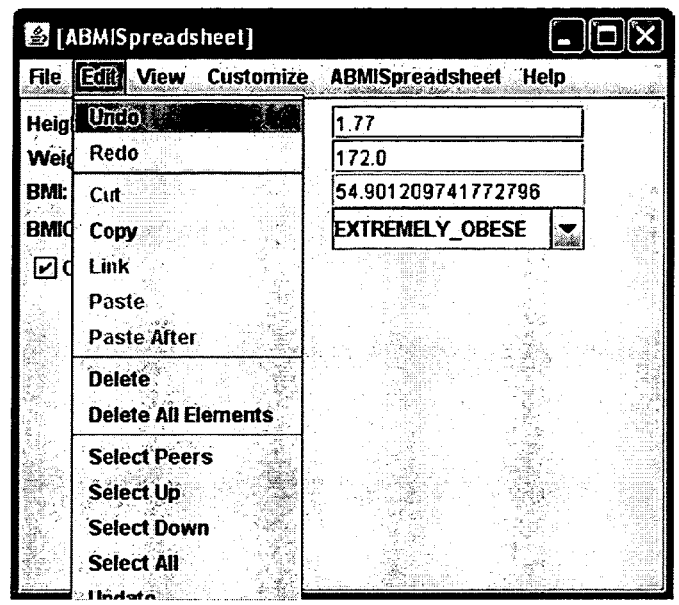
Figure 5D:
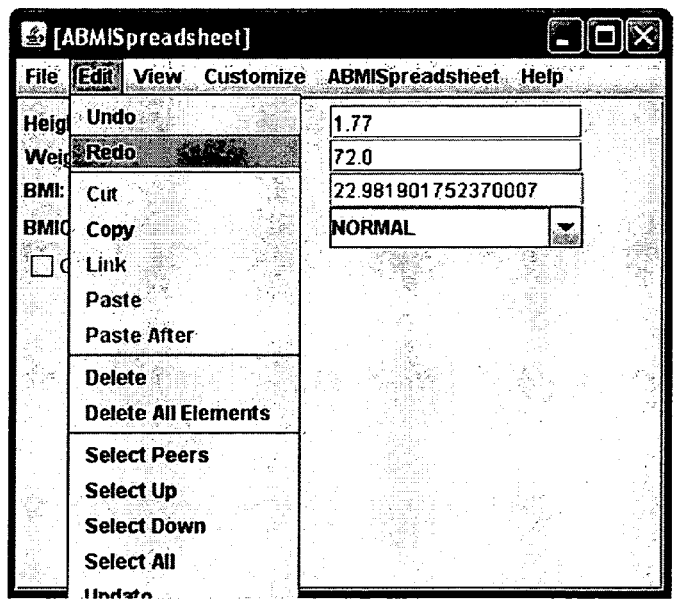
Figure 5E:
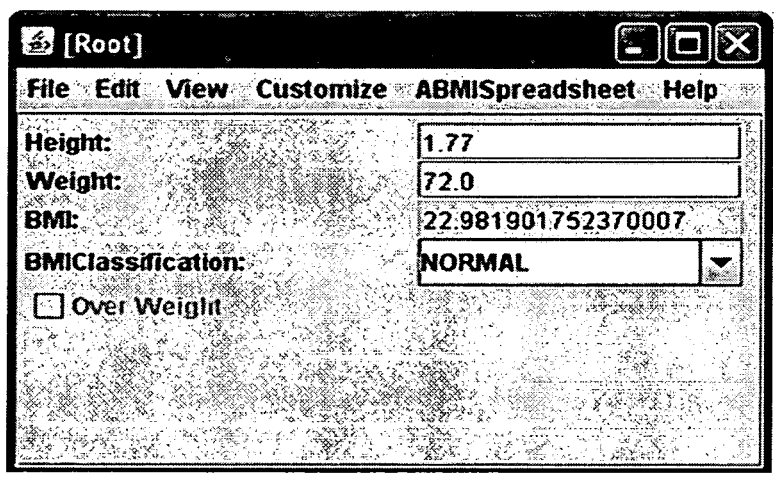

FIGS. 5(a)-5(e) illustrate exemplary automatically generated undo/redo tools according to embodiments of the subject matter described herein. FIG. 5(a) illustrates the initial display for the ABMI spreadsheet. FIG. 5(b) illustrates that the changing of the weight field changes the BMI, BMI classification, and overweight fields. In FIG. 5(c), the user invokes an undo command. In FIG. 5(d), the undo command restores the fields to their original values, as illustrated in FIG. 5(d). Also in FIG. 5(d), the user selects the redo command, which changes the values in the fields to the changed values, as illustrated in FIG. 5(e).

Generally, automatically creating a user interface tool that undoes or redoes an operation performed by an application method includes identifying an undo pattern for each application method. The undo pattern identifies, for each application method, a pattern-based executed-command-object that can undo/redo the method. The pattern-based executed-command-object is an executed-command object that uses at least one of: (a) relationships among the signatures of the application methods in and (b) antonym dictionaries to implement the undo and redo operations. The executed-command object is an object that provides operations to undo and redo each application method.

Precondition Patterns

Often a program needs to control at execution time (a) the sequence and nature of user input, and (b) whether an object component is enabled for reading and writing. For example, the BMI spreadsheet may not (a) allow the user to enter illegal values for the weight and height, and (b) display the BMI value if the weight and height values are illegal. Precondition patterns support these two user-interface features. They recognize two kinds of methods: enabling and validation methods.

Given a method with the following signature:
    AnyType M(T1 p1, T2 p2, . . . Tn Pn)
the method with the signature:
    bool preM(T1 p1, T2 p2, . . . Tn)
is considered its validation method, and the method with the signature:
    bool preMT1T2 . . . Tn( )
is considered its enabling method (a type specification such as "int[ ]" that cannot appear in a method name is transformed into one such as "intArray" that can). If the enabling method of a (a) read method of an object component is defined and returns false, then the component is not displayed (or grayed out, depending on a method parameter), and (b) write method of a component is defined and returns false, then the component is made read only. A write method that is passed some argument-list is not called if its validation method with the same argument list returns false. Not defining the enabling or validation method for a read or write method is equivalent to defining one that always returns true. The general notion of preconditions has been used in earlier UI tools [3] but not in this manner.

The ABMI source code above and FIG. 9(b) illustrate precondition patterns. Initially, the enabling method of getBMI[ ] returns false as the height and weight are both zero. Hence the BMI property is not displayed. When the user enters legal values for both height and weight, the BMI property is dynamically added to the display. Illegal values for these fields do not result in calls to the corresponding setters as the validation methods of these setters return false. A simple enabling method for getWeight( ) can be similarly defined to ensure that height is entered before weight. Thus, these precondition methods can be used to support program-controlled input.

Figure 6A:
FIGS. 6(a)-6(d) are computer screen shots illustrating exemplary user interfaces with automatically generated precondition patterns according to an embodiment of the subject matter described herein.
Figure 6B:
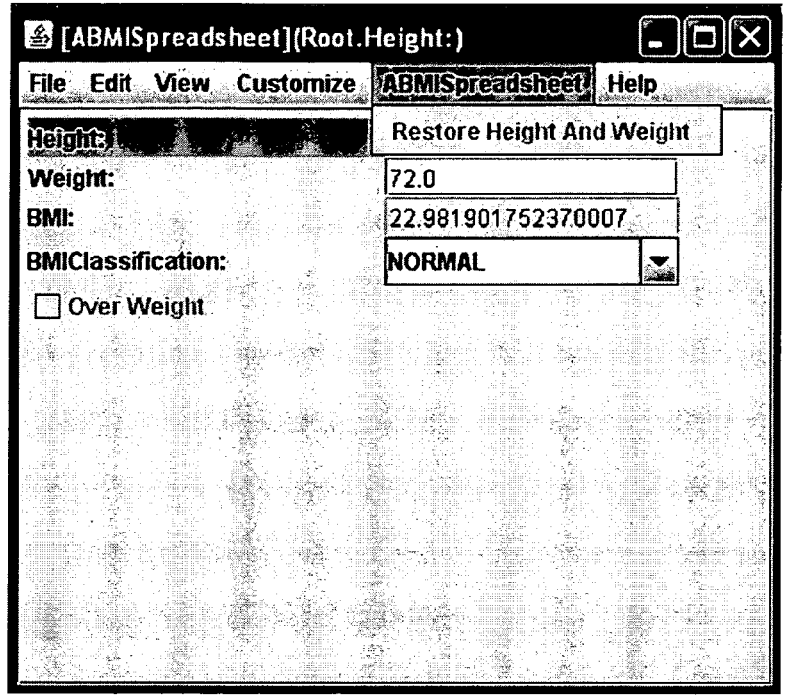

FIG. 6(a)-6(d) illustrate precondition patterns in more detail. More particularly, FIG. 6(a) illustrates an example of source code of various patterns and annotations. A structure pattern that determines that getBMIclassification( ) and setBMIclassification( ) are read and write methods of the logical component BMI classification of the enum type BMIclassification. A precondition pattern determines that the preGetBMIclassification( )method is the precondition method of getBMIclassification( ) A validation pattern determines that the preSetweight(double) is the validation method of setWeight (double). The annotations at the start are used in the help tools shown in FIG. 6(b).

Figure 6C:
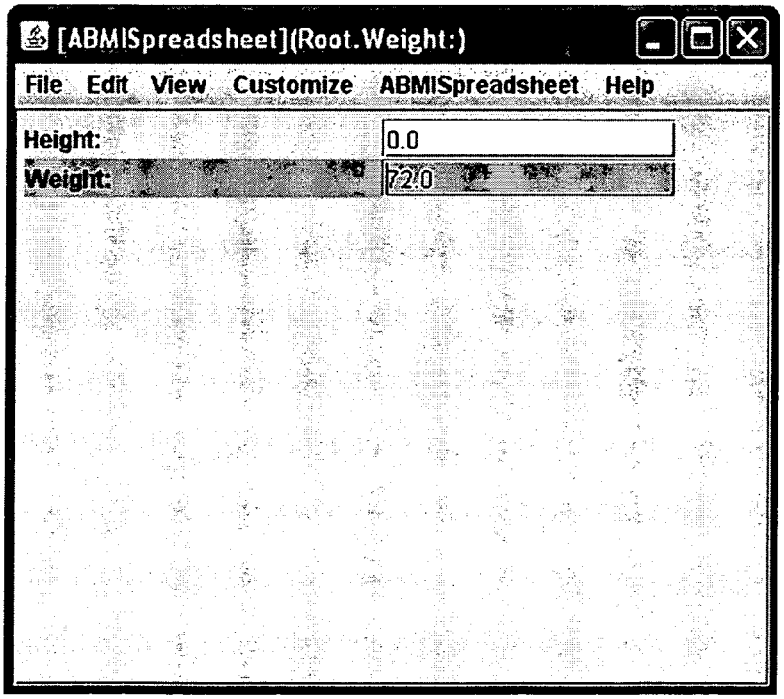
Figure 6D:
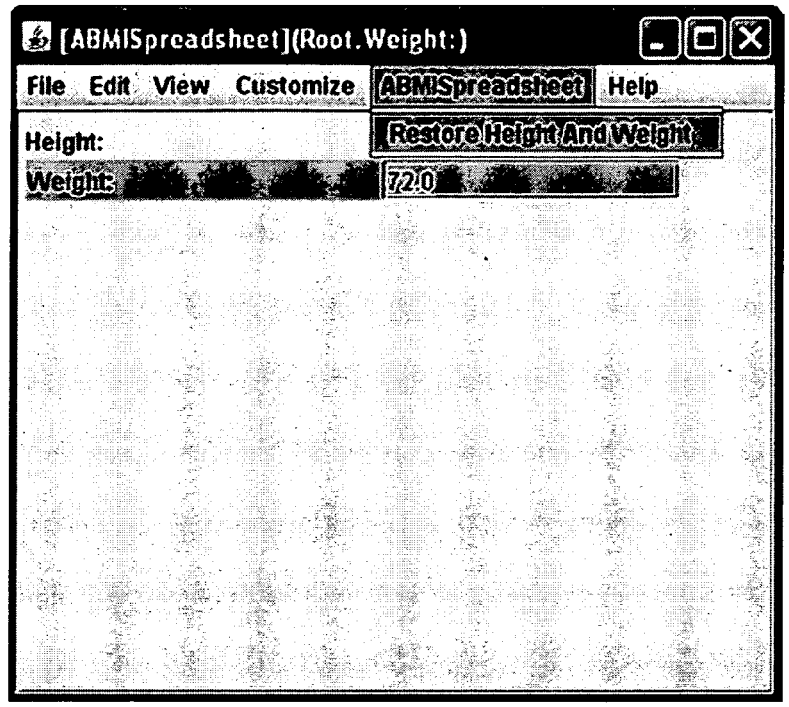

The precondition method of method restoreHeightandWeight returns false when height and weight have their initial values of 1.77 and 72, hence the menu item for the method is disabled. In FIG. 6(c), the height value is set to zero. The precondition method of the read method of the logical components, BMIclassification, BMI, and Overweight would turn false when height is zero, hence the widgets for these components are removed or disabled, as illustrated in FIG. 6(d). The precondition method of the method RestoreHeightandWeight returns true as the height does not have an initial value of 1.77, hence the menu item for this method is enabled.

Automatic Generation of Help Tools

According to yet another aspect, the subject matter described herein may automatically generate a help tool as part of a user interface. For example, ObjectEditor may be executed to identify programmer-defined patterns and automatically generate user interface widgets or elements corresponding to the patterns. In addition, ObjectEditor may generate a help tool, such a pull down help index or mouse over triggered help balloons, by identifying programmer comments associated with each identified programming pattern from the source code and displaying the comment text in the index or balloon associated with the user interface element generated for the programming pattern In one implementation creating help information for an application includes (a) for each method (logical component) mapped to a widget, showing (for instance in the tooltip) the explanation annotation associated with the method (read, write, add, remove methods of the logical component), (b) providing commands in the user-interface to display the documents specified by the URL annotations associated with the class and methods of the application, (c) creating a keyword index that shows a list of keywords, and for each keyword, the list of application classes associated with the keyword, and for each class, providing the user with facilities to display its annotations and create a user interface for an instance of the class.

The keywords can be programmer-defined keywords and predefined keywords.

The programmer-defined keywords may include the keywords mentioned in keyword annotations and these are associated with the classes mentioned in the keyword annotations.

The predefined keywords identify different kinds of programming patterns, widgets, and customization mechanisms.

The association between a programmer-defined keywords and classes are defined by keyword annotations in the code of the classes.

A predefined programming pattern keyword is associated with applications that implement the pattern.

A widget type keyword is associated with applications whose user-interfaces include the widget.

A customization mechanism is associated with classes that use the mechanism.

Figure 7A:
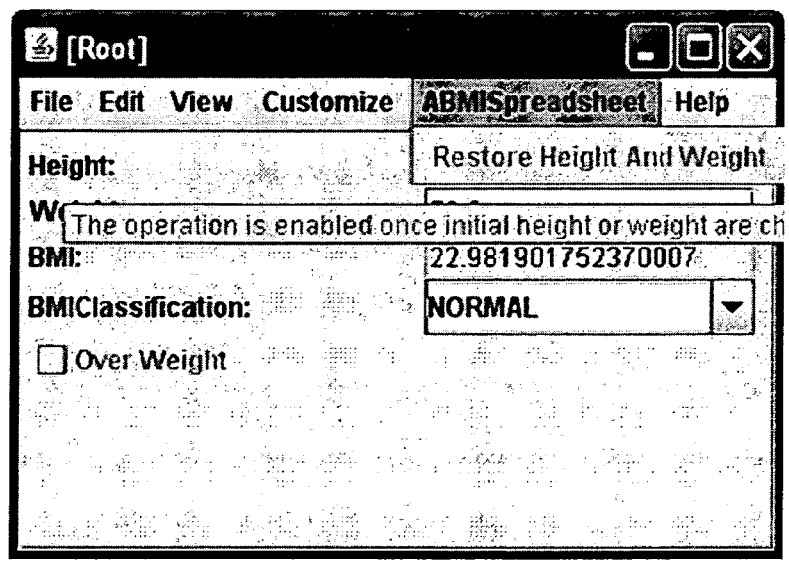
FIGS. 7(a)-7(j) illustrate automatically generated help tools according to an embodiment of the subject matter described herein.

FIG. 7(a)-7(j) illustrate user interfaces with automatically generated help information according to an embodiment of the subject matter described herein. More particularly, FIG. 7(a) illustrates the use of the explanation annotation in a method to generate an explanation of a control widget created for evocating the method. In FIG. 7(a), tool tip is created for the BMI method explaining how the method operates. The tool tip is generated from explanation annotation in the source code for the BMI method.

Figure 7B:
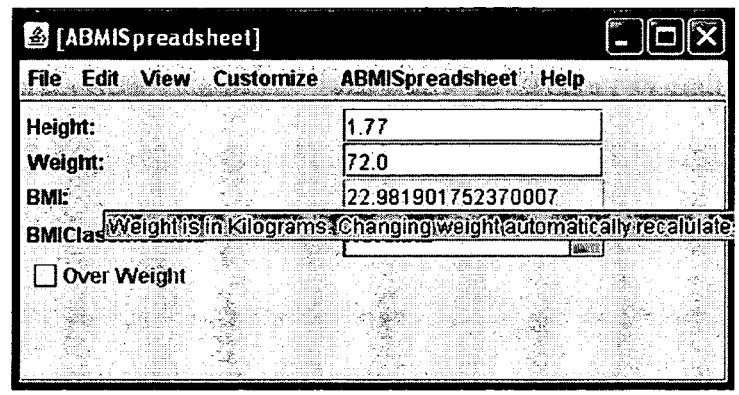

According to another aspect of the subject matter described herein, explanation annotation of read, write, add, and remove methods may be used to automatically generate help information in the user interface corresponding to these methods. In FIG. 7(b), the explanation annotation of the read, write, add, and remove methods of the logical component BMI classification are used to generate an explanation of the logical component state widget displaying the state widget.

Figure 7C:
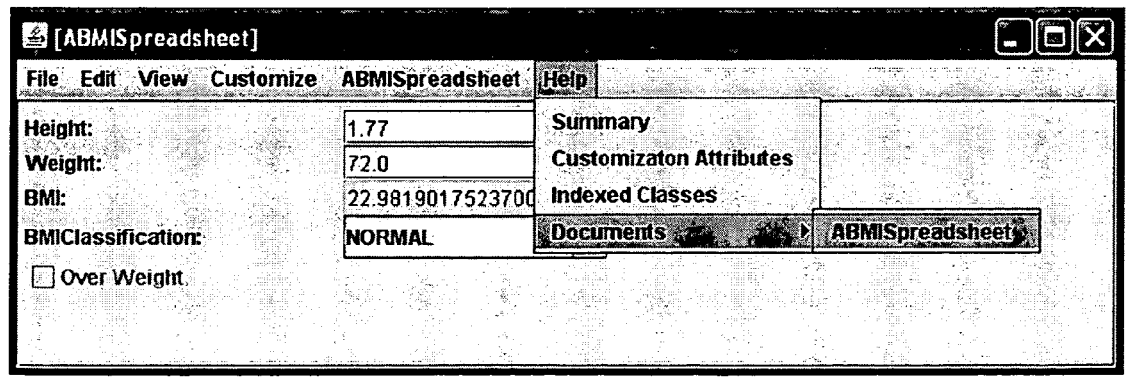
Figure 7D:
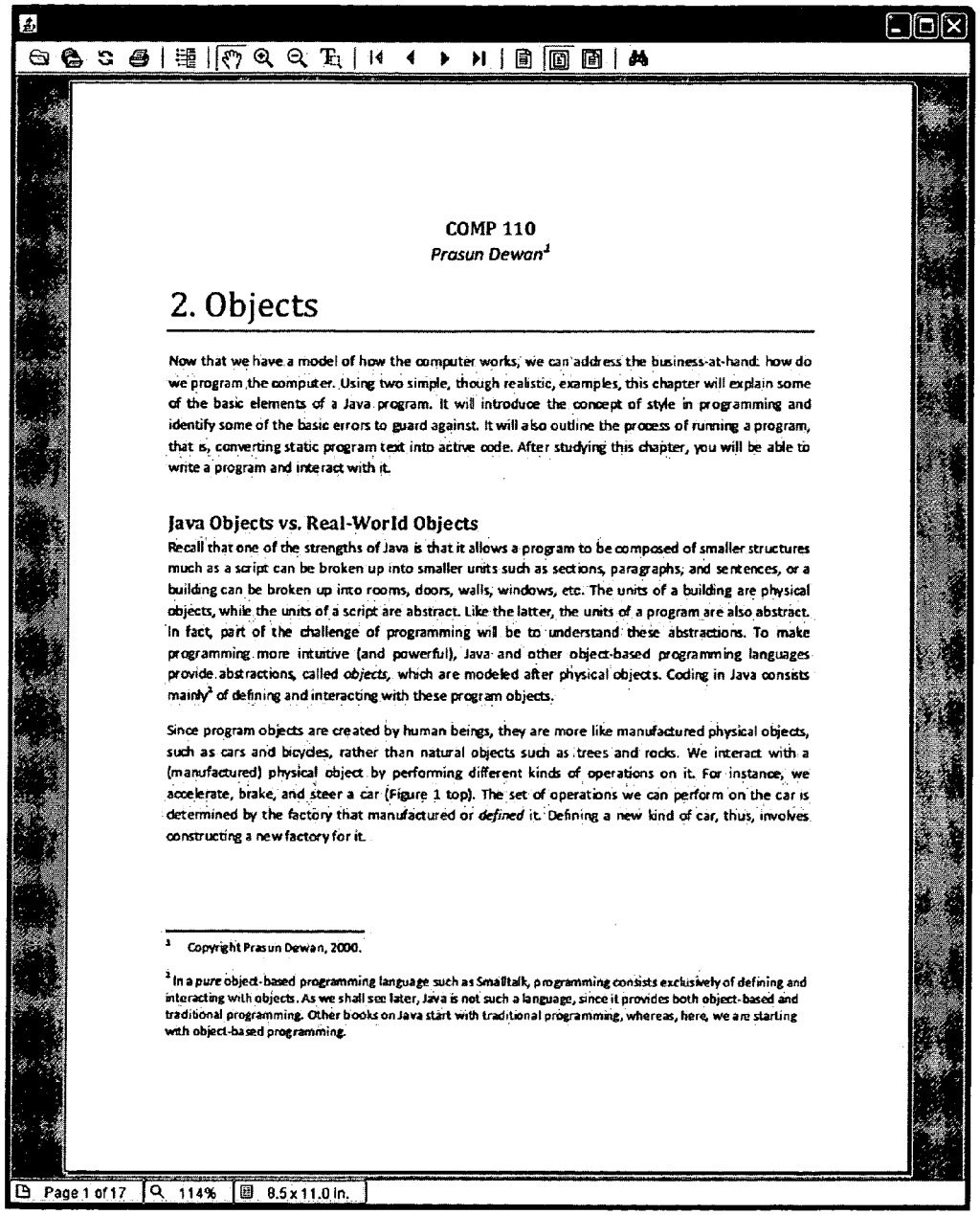

According to another aspect of the subject matter described herein, the help index showing URL's specified in the URL annotation of a class may be created. FIGS. 7(c) and 6(d) illustrate this aspect of the present subject matter. In FIG. 7(c), the help index references the ABMI spreadsheet document for which a URL is specified in the corresponding annotation for the ABMI spreadsheet class. FIG. 7(d) illustrates the document corresponding to the URL which can be accessed via the index illustrated in FIG. 7(c).

Figure 7E:
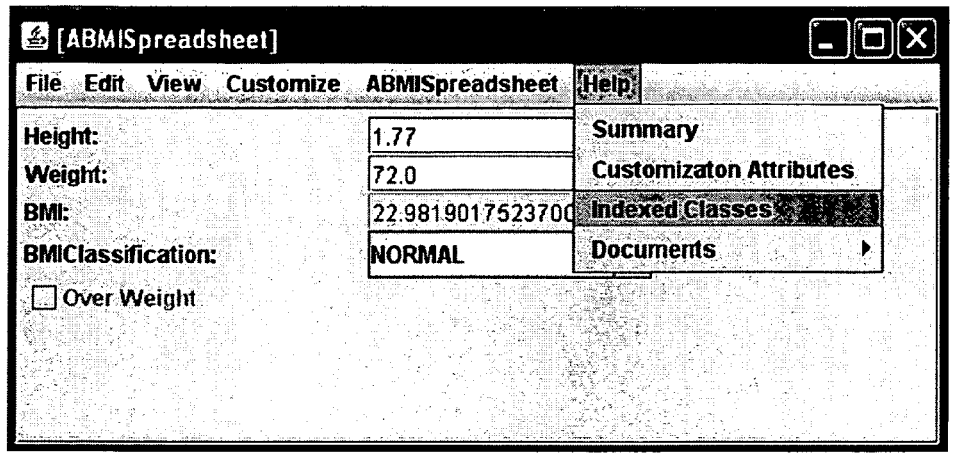
Figure 7F:
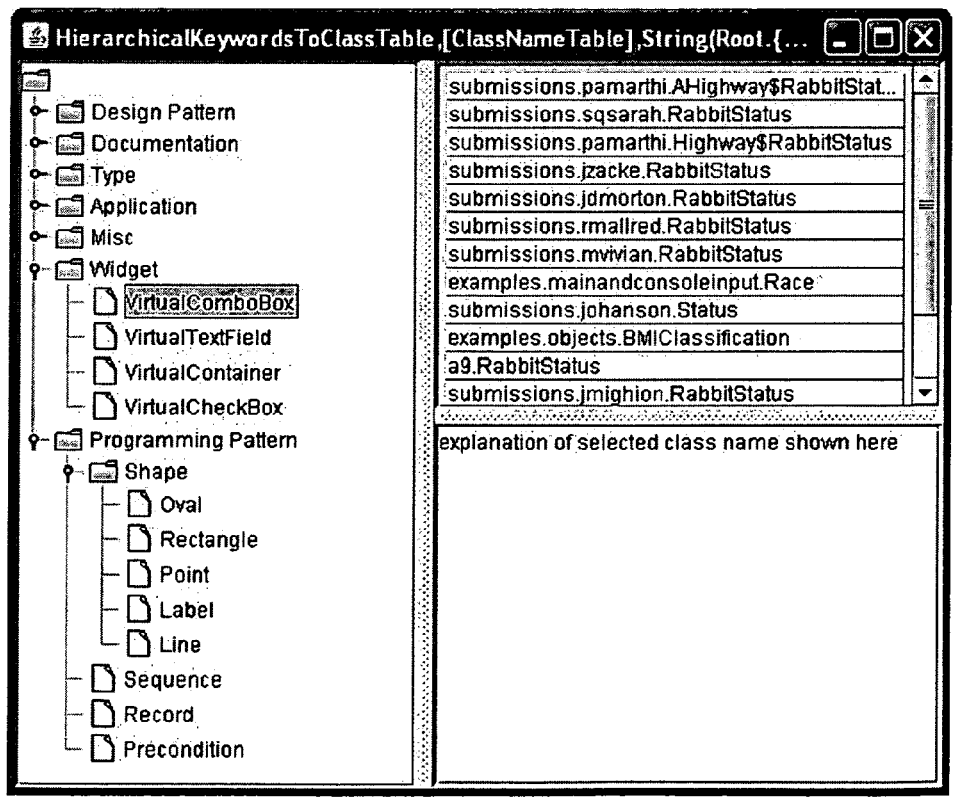

According to another aspect of the subject matter described herein, an automatically generated help index may include commands to display a keyword index. FIG. 7(e) illustrates the help index where the index classes selected. When the user selects the indeed classes menu items, the keyword index illustrated in FIG. 7(f) is displayed. In FIG. 7(f), the index contains both programmer-defined keywords and system defined keywords, such as types of widgets and programming patterns. Selecting a keyword in the list shows the associated classes.

Figure 7G:
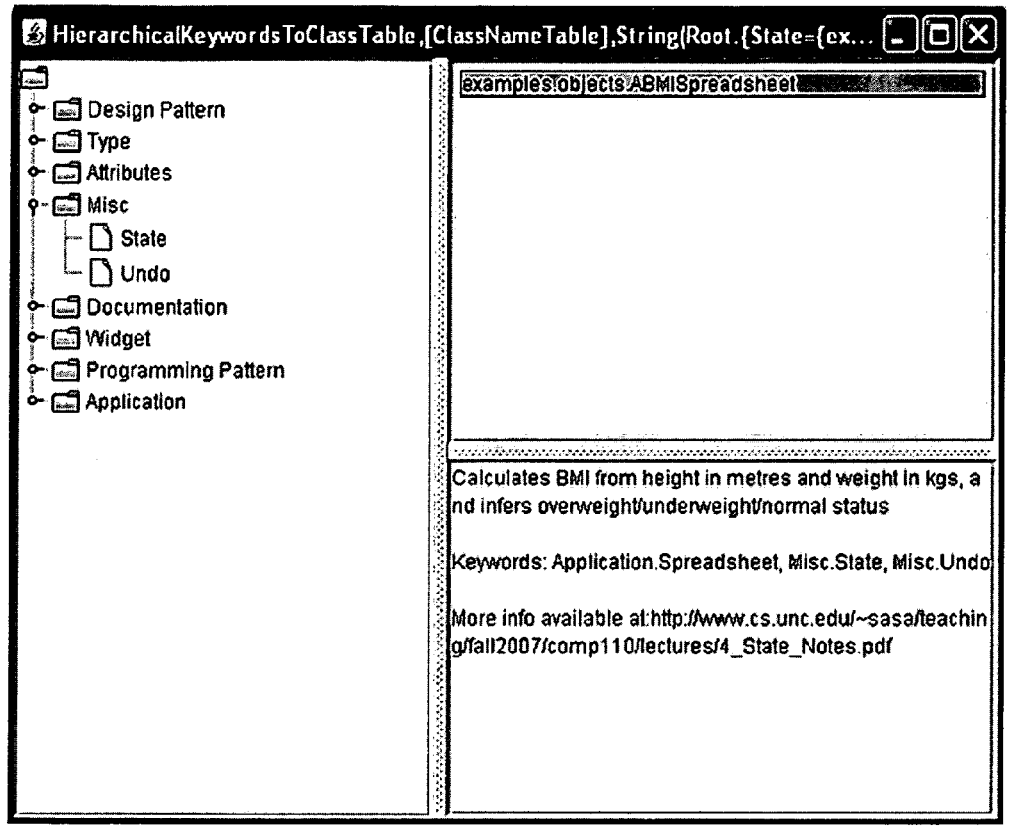

According to another aspect of the subject matter described herein, in the keyword index, selecting a class name will display the associated annotations in the class, which may be derived from the comments and source code for the class. FIG. 7(g) illustrates this aspect. In FIG. 7(g), the AMBI spreadsheet class is selected and the corresponding annotations are shown in the lower right pane.

Figure 7H:
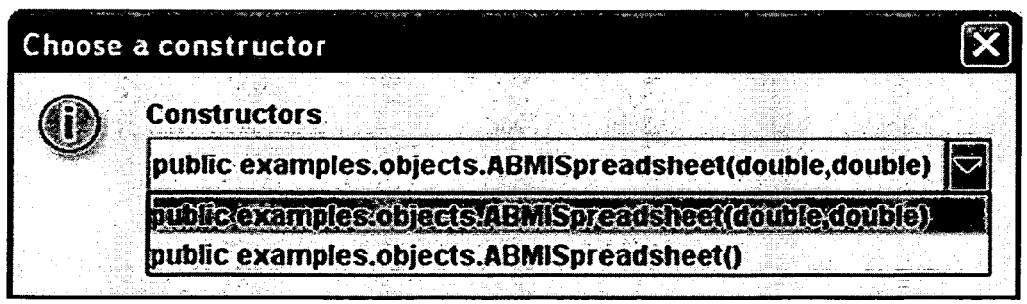
Figure 7I:
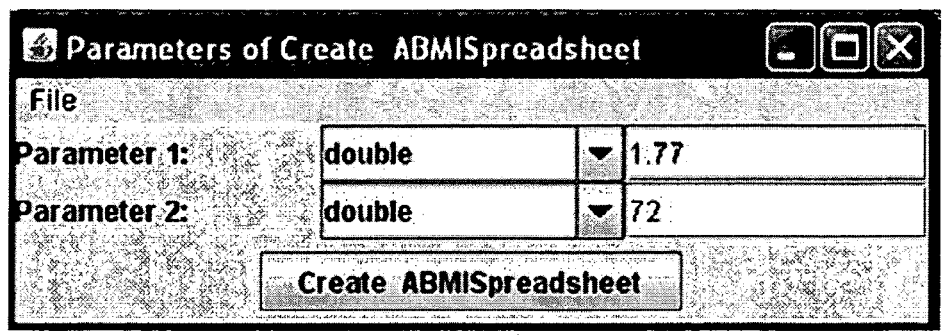
Figure 7J:
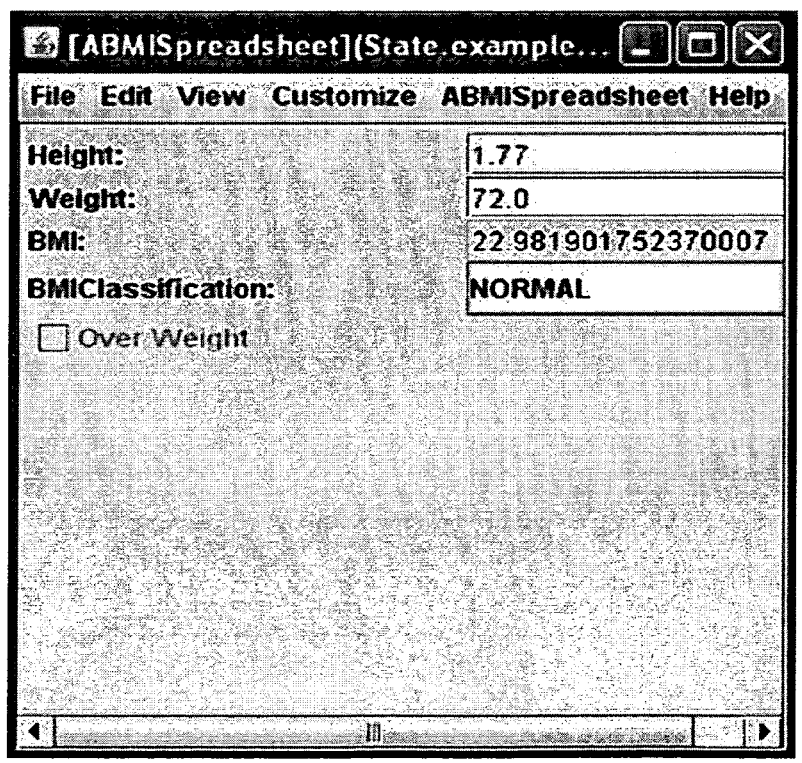

According to another aspect of the subject matter described herein, selecting a class name brings up a list of constructors for the class. FIG. 7(h) illustrates this aspect of the present subject matter. In FIG. 7(h), constructors for the AMBIspreadsheet class are displayed. FIG. 7(i) illustrates an automatically generated user interface for filling the parameters of the constructor for the AMBIspreadsheet class. Once the constructor is invoked, a user interface is automatically generated for the instance created by the constructor. FIG. 7(j) illustrates this aspect of the present subject matter, where the user interface for the AMBI spreadsheet is automatically created.

Event Generation and Flow in Extended MVC

Figure 8:
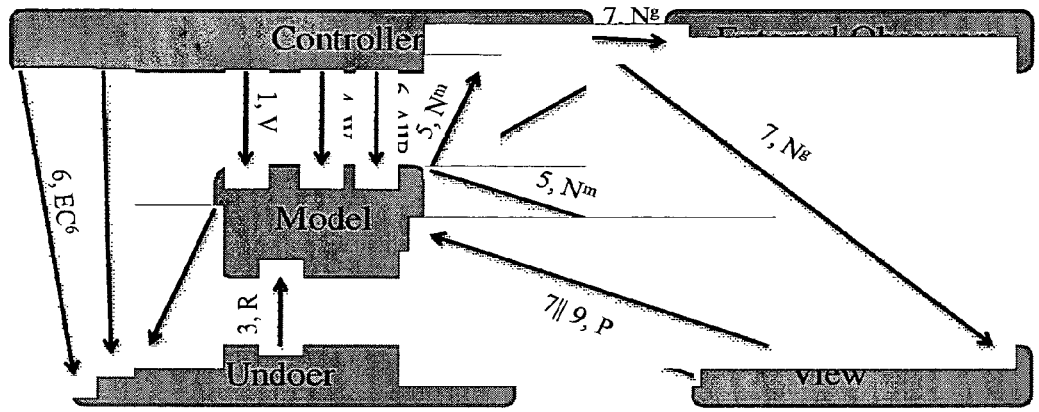
FIG. 8 is a block diagram illustrating exemplary interactions between a model, a view, a controller, an undoer element automatically generated through pattern analysis according to an embodiment of the subject matter described herein and external observers.

The MVC framework on which our approach is based requires a model to send notifications to view objects, which can be tedious and error-prone. For example, every Bean setter method must keep track of and announce the name the property it changes, and the old and new values of the property. If the name of the method is changed, the notification code must be changed. Another problem is that MVC does not account for undo, validation and program-controlled input. Based on the patterns discussed above, additional extensions to the MVC model are created to address these issues. As these extensions are independent of the extensions illustrated in FIG. 3, the extensions are shown independently in FIG. 8. In FIG. 8, the model object represents a combination of the model and pattern objects of FIG. 3.

This architecture includes an undo module that accepts command objects representing executed commands (EC) and unexecuted commands (UEC). Moreover, the behavior of the model and controller is modified. The model can be lighter weight than the MVC model by not sending notifications, and heavier weight by providing undo notifications. The controller uses the various patterns to generate several events for undo, validation, and dynamic enabling/disabling.

FIG. 8 shows the event flow among the various components of architecture. As in MVC, when the user executes an input command, the controller executes a write method in the model. However, before the method is executed, several actions occur. First, the controller invokes the validation method of the write method, if such a method exists, to check if further processing should occur (1, V). It then uses the undo patterns (in the manner described earlier) to send a command object, representing an unexecuted command, to the undo module (2, UEC). The undo module responds to this event by asking the command object to call a read method to store the value to be changed by the write method called next (4, W). As in MVC, the write method can send manually implemented notifications to both the view and other observers (5, N$^m$). In our architecture, the controller also registers itself as an observer of the model. If it does not receive manual notifications in response to the method, it generates notifications on behalf of the model (7, N$^g$) and sends them to the view and external observers who have registered with it. The notifications are generated by reading the entire state of the model (6, A||R) and doing a diff between the cached and current state of the model. Thus, a view is guaranteed to receive either a manual or generated notification in phase 5 or 7 of the interaction, to which it can respond, as in MVC, by invoking appropriate read methods, in phase 6 or 8 (6||8, R). Next it calls the enabling methods defined by the model in phase 7 or 9 (7||9, P) to determine which model components should be displayed and enabled for viewing/editing.

The approach of reading the entire state of an object to generate notifications has the disadvantage of being inefficient. Moreover, it works only if the model object is changed by the controller rather than some external object. That is why manual notifications are supported in our model. The approach of sending an unexecuted command to the undo module in phase 2 (2, UEC) may also not always succeed, for two reasons. First, the write method may be called by an external object. Second, the write method may not match the syntactic and semantic constraints of any undo pattern. To address these two problems, a model can manually announce a command object that can undo and redo the change (5, EC$^m$), which replaces the command object automatically created by the controller. The MVC framework did not include such notifications because it was developed for custom views and controllers, which were expected to know how to undo the model for which they were designed. The command object announced by the model is like a traditional command object [13][14] except that it represents an executed rather than a to-be executed command. Each (executed/unexecuted) command object provides a facility to locally undo/redo a method, while the undo module combines them into a command history to provide global undo/redo. A single user command may trigger the execution of several object methods. The undo module combines all command objects announced by these methods into a single composite command object, and undoes and redoes them atomically—consistent with, for instance, using a single undo to reverse all changes made by a global replacement command. A method such as "mail" may not be undoable. In this case, the application programmer can set a method parameter that prevents the controller from automatically creating a command object for it.

The above architecture, developed for a user-interface tool, also applies to custom interactive applications that allow third-party software to be embedded in them. Consider the The above architecture, developed for a user-interface tool, also applies to custom interactive applications that allow third-party software to be embedded in them. Consider the embedding of the bibliography package, EndNote, into Word. If EndNote is used to format the bibliography, it is not possible to use the Word undo command to reverse this operation, even though EndNote provides an operation to unformat the bibliography. Worse, Word clears its undo history because the last command it can undo is not the last change to the document. This problem would not occur if EndNote announced an appropriate executed-command object and Word implemented the above architecture.

Implementation

The approach described above to incorporate patterns in a user-interface tool is independent of the programming language and the underlying user-interface tool, though examples from Java and Swing to concretely illustrate the present approach. The present implementation of the approach described above, on the other hand, is based on these two technologies. Pattern-based modules have been implemented as layers above Swing in a system called ObjectEditor. Pattern-classes have been created for 2-D shapes and (potentially dynamic) records, sequences, tables, enums and subranges. Some of these generalize index, iterator, and key-based access of several Java classes/interfaces. The present implementation supports (a) sequence patterns based on Vector, List, TreeModel, and TableModel, (b) hashtable patterns based on Hashtable and HashMap, and (c) a dynamic enum pattern based on ComboBoxModel. As shown in FIG. 9(a), these classes can be used to map an encapsulated model to a variety of concrete types, and previous work can be used to map the concrete types to a variety of widgets such as trees and tables. Pattern-aware versions of these widgets have been implemented using the architecture of FIG. 3, to extend pattern-unaware Swing widgets. The result is a Swing extension that can bind predefined models such as int and String, and programmer-defined encapsulated models to a variety of widgets including checkboxes, textboxes, forms, radio buttons, sliders, trees; tables, tabbed windows, and drawing-editors. FIGS. 9(b) and 9(c) show a small subset of these widgets. Additional screen shots are not presented herein, as all of the supported widgets are standard. The present implementation provides calls to create pattern-based widgets from model-aware and model-unaware Swing widgets and bind them to models. For example, the following call creates a pattern-aware tree widget from the Swing tree widget and binds it to a turtle model:

ObjectEditor.treeEdit (new ATurtle( ) new JTree( ));

The return value of such a call can be used to access the pattern-aware widget, if necessary. Programmers can customize both a pattern-aware and Swing widget to, for instance, specify the labels and position of its components. In addition, as in Swing, they can mix it with pattern-unaware widgets to create arbitrary Swing user-interfaces. The discussion herein does not consider how the widgets are customized as this issue has been addressed by previous work and, more important, is independent of the pattern-based approach. Our implementation also supports the BeanInfo abstraction defined by the Java Beans framework, which determines the methods of an object that are subject to pattern analysis.

Discussion

The approach presented here for using patterns increases the abstraction flexibility of a user-interface tool without reducing its user-interface flexibility or automation. In fact, it increases the user-interface flexibility as it supports undo, 2-D graphics, notification generation, and undo, while allowing the use of existing user-interface features implemented by the underlying tool. Moreover, it makes the use of existing user-interface features in the tool easier. The reason is that pattern-analysis can automatically derive certain model properties that must be manually implemented in an interface-based solution—in particular, programmer-defined sequencing of user input and dynamic hiding/showing and enabling/disabling of interaction objects. These three benefits are concretely illustrated by considering the binding of a tree widget (FIG. 9(c), right window) to an instance of the Turtle object of FIG. 2. An implementation directly on top of Swing would not support undo and require complex code mapping the instance to Swing tree nodes. Worse, it would not ensure that users enter only legal values for the tree nodes because a generic widget-defined interface must allow arbitrary values. Finally, dynamically enabling/disabling the editing status of a tree item would require the use of low-level bookkeeping.

The present pattern-based approach is designed for those applications in which application semantics are encapsulated in MVC models. Yet the MVC architecture has been adapted, as described herein, to provide user-interface functionality missing in current model-aware widgets. However, all of the MVC adaptations—lack of notification methods, definition of precondition (validation and enabling) methods, and notification of executed commands—are optional and necessary only if the corresponding user-interface features are needed. Even without these adaptations, automatic undo and binding of widgets is possible. Automatic event generation makes two assumptions about models. First, write methods should be synchronous as otherwise the controller does not know how long to wait for manual events. If this assumption is not met, a parameter of a method can be set to suppress the generation of events when the method is invoked. Second, read methods should not have side effects observable by users of the object—they can cause unobservable side effects such as storing the returned value in an internal cache. This assumption is also implicitly made by MVC to allow multiple views to read the state of the model. This assumption held true for the objects in the Java util library (which includes a variety of models such as Vector, ArrayList Hashtable, Date, Calendar, and Stack) and the applications developed using our implementation. Finally, unlike MVC, it is assumed herein that models follow programming patterns. Requiring programmers to follow well-defined conventions should not be considered a limitation as it makes the code more maintainable. Moreover, precondition patterns have encouraged our student to put assertions in their code in the manner shown above for the ABMI spreadsheet. Our approach provides a mechanism for enforcing conventions without dictating specific patterns.

To determine how effective the assumptions made by the undo patterns were, the patterns were tested them on all the model objects of applications (many of which were created before the undo scheme was devised), and those provided by the Java util library. Of interest were those cases where methods of an object could be undone by using other methods provided by the object but ObjectEditor was unable to use an appropriate pattern to correctly undo them. Thus, the present implementation is not concerned with methods such as the rotate method of FIG. 2 that cannot be undone without adding additional methods to the interface. Some cases were identified where the undo patterns alone were insufficient. However, in all of these cases, the undo mechanism was able to use the type patterns described herein to undo the methods. For example, in Java's Vector class, the method to remove an element does not return the removed element. However, based on the sequence pattern, the undo mechanism can call <element>At( ) to determine which element is removed. Of course, in new applications, it is possible to explicitly code the object to follow predefined patterns.

Pattern-based (model-aware) widgets offer higher automation and abstraction and user-interface flexibility than interface-based widgets only if appropriate pattern-objects have been defined. This is not currently a concern in the present Swing-based implementation as the predefined pattern-objects subsume the interfaces supported by the model-aware widgets provided by Swing. However, as new kinds of model-aware widgets are developed, the cost of creating pattern-classes for them can become an issue. This cost has been found to be significant but not high. For example, the pattern-classes for the Vector-based and List-based sequence patterns (which support both index-based and iterator-based access) required 386 and 212 lines of code, respectively. Pattern-classes for other concrete types such as subrange, enum and hashtable were simpler as they have fewer operations. Additional pattern-classes for a concrete type can reuse code from previous pattern-classes for the type, and do not require changes to existing widgets, as the widgets are based on the interface rather than class of a pattern-object. For instance, supporting the Java 1.2 Collection classes required only new pattern-classes for them, which were relatively simple subclasses of previous pattern-classes. The set of supported concrete types has been found to be fairly stable. The initial (and final) set of such types supported by our implementation has been sufficient to create the complete user-interface of each of our applications except the UNC nanoManipulator, which provides scientists with a virtual environment to examine and manipulate material at the nano-scale. The types were sufficient to describe the text and control windows of the application but not its 3-D window. This stability is not surprising as except for the graphics types, all supported concrete-types are based on time-tested conventional programming languages. Finally, given the goals of maintainable abstract data types in application code, it is likely that numerous models would follow conventions defined by a pattern-class, thus amortizing the cost of implementing it among these objects.

Programmers can make mistakes in following the intended pattern. However, these mistakes are concretely reflected in the user-interface and thus easily detected. Nonetheless, automatic detection of these mistakes based on an optional annotation to a class/interface indicating which patterns it follows is being considered. It would also be useful to explore pattern-aware speech and 3-D widgets, and to gain more experience with the present implementation to uncover additional limitations.

Automatic Generation of Device User Interfaces

In the examples described above the present subject matter automatically generates user interfaces for computer programs. Although not specified explicitly above, the computer programs can be computer programs that control the operation of devices, such as appliances, consumer electronics devices, or any other device controlled by computer program. In other words, the methodology described for automatically generating a user interface based on programming patterns can be applied to generate device user interfaces. The subsections described below illustrate examples of how the subject matter described herein can be used to generate device user interfaces.
1. Introduction One domain currently receiving a significant amount of research attention is networking arbitrary devices such as TVs, refrigerators, and sensors. It is attractive to create software user-interfaces on mobile computers to interact with such appliances, for several reasons:

Truly universal: Some traditional remote controls can interact with multiple devices such as TVs, VCRs, cable set-top boxes, and CD players. They are in fact called 'universal' remote controls, but have two important restrictions. First, a traditional universal control can interact with a fixed number of device instances. The amount of physical buttons and other controls on the remote determines this number. Mobile computers, on the other hand, can control arbitrary numbers of device instances. For example, mobile computers could allow security guards to control the lights in all current and future buildings in which they work. Second, a traditional universal control must provide buttons for the union of the operations among device types it can control, which can clutter it if the devices types share few operations. Therefore, universal controls typically support similar types of devices, that is, devices such as CD players, DVD players, and VCRs that share a large number of operations. Dissimilar devices such as fans and robotic vacuum cleaners require separate controls. A survey shows that 44% of households in USA have up to six remote controls [15]. A mobile computer can serve as a single control for arbitrarily different kinds of devices.

Automatic binding: Traditional universal remote controls require users to manually enter specific codes for the device instances they wish to use. For instance, universal remotes for controlling home entertainment devices require users to look up the manufacturer codes of their devices (TVs, VCRs, etc) and enter these codes on the remote. This design does not create a serious problem when the number of devices is small, but would have a significant drawback in a world with ubiquitous computing. Since mobile computers are intelligent, they can automatically bind themselves to arbitrary device instances through a discovery process [16-21].

Truly remote: Since IR signals cannot pass through walls, some traditional "remote" controls only allow users to control devices in the vicinity of a user. X10 remote controls are based on radio signals, so they are not limited by walls. However, these signals can only travel a few feet. A mobile computer can interact with a networked device over the Internet. Thus, it can be used to control a device from an arbitrary location. For example, a mobile computer can allow a person on vacation to deactivate a security system at home so that a neighbor can freely enter the house to feed fish in an aquarium. If the security system ever needs could use a mobile computer to possibly fix the device without having to visit the owner's home.

Beyond physical user-interfaces: Perhaps a more fascinating reason for using mobile computers to interact with networked devices is that it is possible to create software user-interfaces for them that are more sophisticated than the conventional physical user-interfaces offered by traditional appliances and their controls [22]. Unlike conventional user-interfaces, they can group related controls into overlapping tabs [22, 23], display state [22, 23], allow offline editing, provide consistency [24], and be customized to the habits of their users [23].

Not surprising then, several systems today offer software-based user-interfaces, which include: Palm/Pocket-PC IR programs [15, 25], HP's Cooltown [26], IBM's Moca [16], and Websplitter [27], Microsoft's UPnP [19, 28], Sun's Jini [20, 29], CMU's PUC [22] and UNIFORM [24], Cornell's Cougar [30], Swedish Institute's Universal Interactor [31], Media Lab's UI on the Fly [32], Berkeley's TinyDB [33], [34], and DAMASK [35], Stanford's ICrafter [36], U. of Washington's SUPPLE [23], and PARC/Georgia Tech's Speakeasy/Obje [37]. In most of these systems, the user-interfaces are manually implemented. A few systems [22, 23, 31, 32, 34, 36], on the other hand, explore the intriguing idea of automatically generating these user-interfaces. While this idea is new in the domain of mobile/device computing, it has been explored for over three decades in the realm of desktop computing [2, 6, 38, 39]. The lessons from desktop computing tell us that automatic generation is not flexible enough to support a significant number of useful interfaces but requires substantially less coding effort for the interfaces it can create. One question attempted to be answered here is: do these lessons also apply to the area of mobile/device computing? Naturally, the answer depends on the kind of device user-interfaces and generation algorithm we address. The discussion herein considers software user interfaces of individual devices and does not address interfaces for dynamic compositions of devices [23, 36, 40, 41]. However, the subject matter described herein could be used to generate UIs for dynamic compositions of devices. Generation algorithms can be classified into those using heuristics to meet high-level goals such as uniformity [24] and low usage of screen real estate [23], and those that are based on user-provided specifications. Specification-based generation is addressed herein. Thus, our initial answer to the question above ignores heuristics-based automatic generation and dynamic-device composition.

Intuitively, there are several reasons why the manual/automatic question must be re-examined in the context of device user-interfaces. Given a networked device, its user-interface must be implemented on each of the large number of the continuously evolving mobile computers that may be used to interact with it. Previous papers have hypothesized that this effort would be high, and have used this hypothesis as the motivation for (specification-based) generation in this domain. In addition, these interfaces seem to be simpler and have less variety than desktop user-interfaces, consisting mainly of rectangular arrangements of buttons and simple widgets. Thus the inherent lack of flexibility of generation could become less of an issue. On the other hand, because they are simpler, the automation provided by generation may become less of an advantage. Devices and mobile computers are much less powerful than desktop PCs—thus, space and time costs must be considered. Some of these metrics should depend on whether the interfaces consist only of commands or includes both commands and state, as the latter are more complex. Complicating the issue is the fact that mobile devices have limited screen space and may be used by users whose hands are occupied on some other task, making speech user-interfaces (SUIs) a practical alternative to GUIs [35-37, 42-44]. Thus the manual/automatic question must be answered also for SUIs. As the devices are networked, the impact of communication delays on the choice of the approach needs to be explored.

At first glance, it seems that usability should also be considered. However, this is a quality of individual user-interfaces and not the framework used to implement them—both the manual and generation approaches may be used to create interfaces that are both easy and hard to use. System, rather than usability issues, are considered herein, as the discussion herein addresses frameworks rather than individual applications. In the experiments described herein, the only two device interfaces known to us that have been shown (by others) to be easy to use [23, 42] are considered. The other interfaces considered herein are based on a systematic way of converting commercial physical interfaces to software user-interfaces. Another important metric ignored in the present description is the interoperability effort required to port a user-interface for one mobile computer to another kind of mobile computer [35]. The impact of the approach on energy costs is also left as future work.

The subject matter described in the following subsections is a substantial update and extension of the subject matter described in [45]. More details on this issue can be found in [46]. The subject matter below includes models of the generation and manual frameworks and examples of user interfaces generated for various devices.

2. Model of Manual/Automatic Generation

Figure 10:
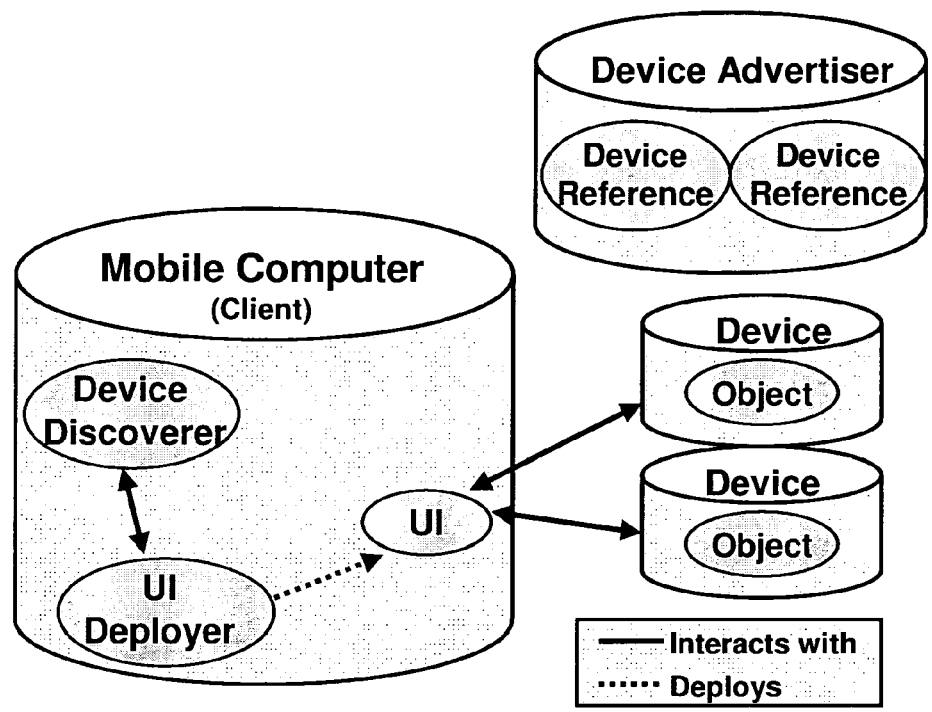
FIG. 10 is a block diagram illustrating an exemplary architecture for deploying device user interfaces according to an embodiment of the subject matter described herein.

FIG. 10 shows a general architecture that abstracts existing systems for deploying device user-interfaces on mobile computers that applies to both the automatic and manual approaches. Device objects encapsulate the functionality of actual physical devices. They contain methods for invoking commands on devices and viewing device state. Device advertisers publish information about devices and references to them within a given network or physical space. They are accessed by device discoverers on mobile computers. Device advertisers may run on the same host as that of the device objects or on a separate machine. User-interface deployers on mobile computers, using device references, deploy the actual user-interfaces for interacting with device objects. Here we consider only the issue of whether the deployed user-interface is created manually or automatically. Thus, we do not consider other problems such as secure device discovery and assume state-of-the-art solutions to them.

In many manual approaches such as Nevo [47] and OmniRemote [25], a predefined implementation of the user-interface resides on the mobile computer. Others such as [16, 19, 26, 29], offer an alternative approach in which the code resides on a remote computer. Thus, the manual approach has two variations, local and remote, distinguished by where the predefined user-interface is located. Both variations are considered herein. Both manual implementations and generator specifications can be created interactively or programmatically. Both can be created programmatically.

(Specification-based) generators create default user-interfaces for devices, which can be overridden by high-level specifications. There is no well-defined model of such generators, in the desktop or device-mobile computing domain. Therefore, here, such a model for the device-mobile computing domain is identified. It includes: (a) features of generators in this domain published in previous papers, and (b) features identified by us to completely generate published interfaces produced by these generators. Details are presented so that the reader can understand the programming-cost numbers and specify the user-interfaces shown here.

The present user interface generator is given a description of the state properties and operations of a device. This description may be automatically derived from the object coding the device, or it may be created manually using an external, language-independent, description—the present analysis does not distinguish between these two approaches as it does not measure the cost of creating an external description. Operation parameters are restricted to simple types, as complex types do not appear in device user-interfaces, but allow properties to be of predefined and user-defined types as device objects can be hierarchical. Moreover, properties and operations can be collected into hierarchical user-defined view groups [42] to allow the view and dialogue structure to be independent of the device structure. We allow view groups to overlap, thereby allowing the use of alternative GUI-views and SUI-dialogues to invoke an operation or modify a property. Let us first consider GUI generation.

Figure 11:
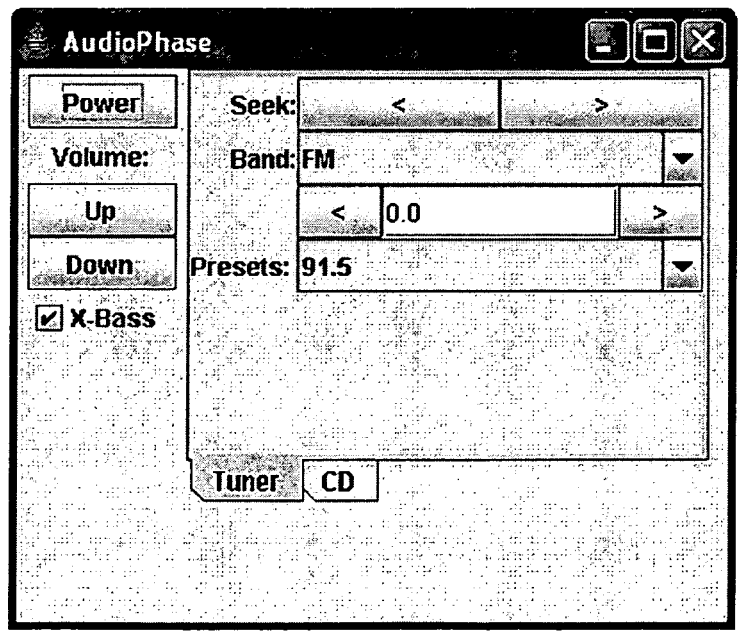
FIG. 11 is a computer screen shot of an exemplary automatically generated user interface for a stereo according to an embodiment of the subject matter described herein.
Figure 12:
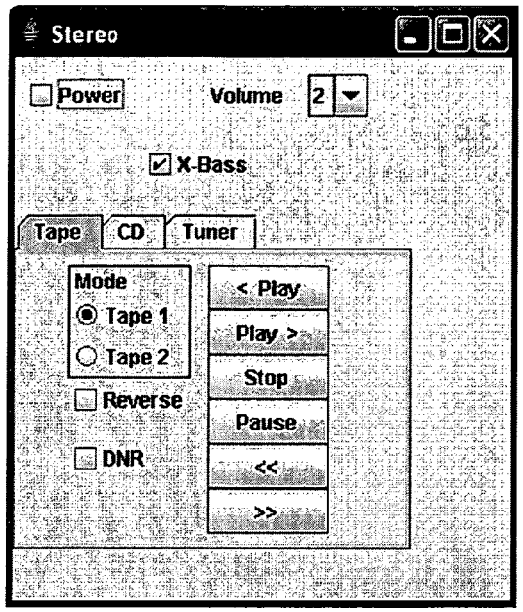
FIG. 12 is a computer screen shot of another automatically generated user interface for a stereo according to an embodiment of the subject matter described herein.

We saw earlier the general idea of binding methods and logical components to appropriate widgets. This idea can be used to create the device interfaces. In our implementation of the device generator, the following mappings are used. An operation is mapped to a button. Any parameters of the operation are collected using a dialogue box. A property of a predefined type is mapped to one of a set of widgets associated with the type. Each predefined value can be mapped to a text box displaying the textual representation of the value. In addition, a Boolean value can be mapped to a checkbox, an integer value to a slider, and an enumeration to a combo-box (FIG. 11, Band property) or radio button (FIG. 12, Mode property). Finally a property associated with increment and decrement operations can be mapped to an IncDec widget that consists of a text-widget to display the property value and buttons to invoke the two operations (FIG. 11, widget displaying current station). A user-defined type or view group is mapped to a panel containing the display of its properties and operations. These panels can be arranged in tabs (FIGS. 11 and 12)

We also mentioned earlier the idea of allowing users and programmers to customize the generation process. In our device generator the following customization attributes are provided: A user-specified attribute of the property/view group selects from the alternate widgets and containers defined for it. In addition, we assume attributes that determine the label and position of a property and operation, and whether a label is displayed. The positions of properties and operations are used when they are linearly arranged, as in different tabs.

To accommodate the two-dimensional displays of devices, a special layout is defined that extends the grid layouts of toolkits in the following ways: (a) the placement of components (operations/properties) is based on user-specified row and column attributes rather than the sequence in which they are added to the parent container; (b) a component may be associated with (text or iconic) labels displayed above, below, left and right of it, (c) for positions in the grid not associated with a component or label, a filler label is displayed whose content (text/icon) is specified by an attribute, (e) and, depending on another attribute, the rows in a grid may have their preferred sizes or be made equal size by stretching rows smaller than the largest row.

Figure 13:
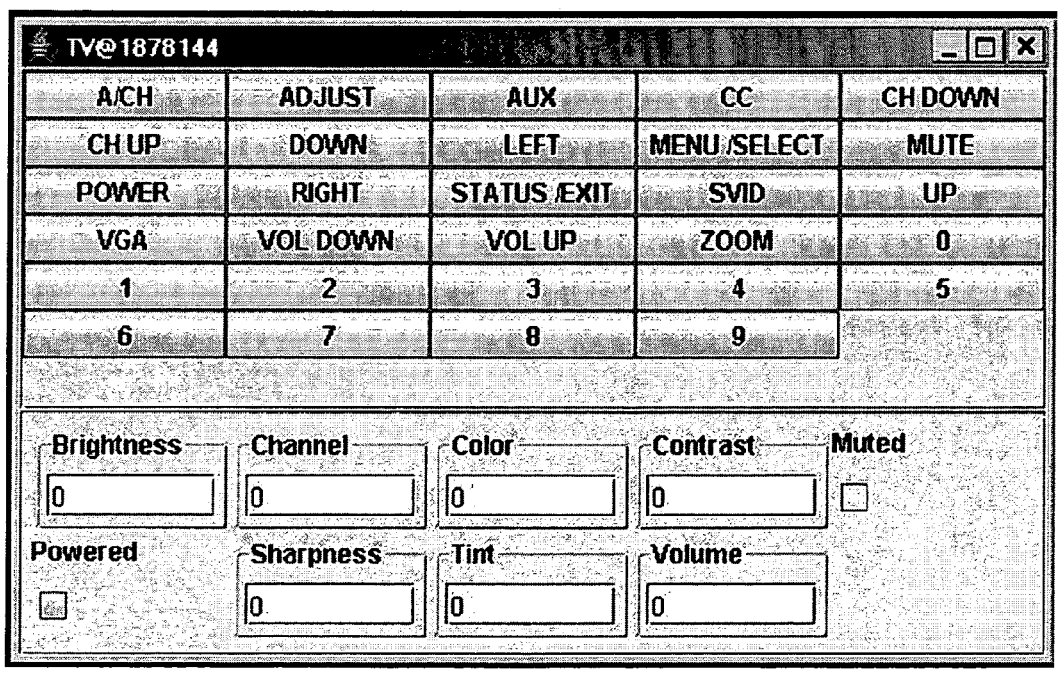
FIG. 13 is a computer screen shot of an automatically generated user interface for a television according to an embodiment of the subject matter described herein.

By default, it is assumed that the generator (a) creates checkboxes and combo-boxes for Boolean and enumeration values and textboxes for other primitive values, (b) creates non-tabbed sub-panels for composite properties and view groups, (c) arranges operations and properties in separate grids ordered by their names, (d) uses the name of a component in the programming interface as a label, and (e) uses a single space character for the filler label. FIG. 13 shows a default display created when no attributes are specified. These defaults are necessary to interpret the numbers we give for the lines of code required to specify various user-interfaces.

It is possible to override defaults globally or for an individual property and operation. For example, in FIG. 13, a global specification says that rows are not of equal size. As a result, operations, properties and view groups such as "Power", "Volume" "X-Bass", and "Tuner" that do not override this default have their preferred sizes. On the other hand, the column containing "<Play," "Play >" and other operations has rows of equal sizes. This is because the view group containing them overrides the value of this attribute.

Figure 14A:
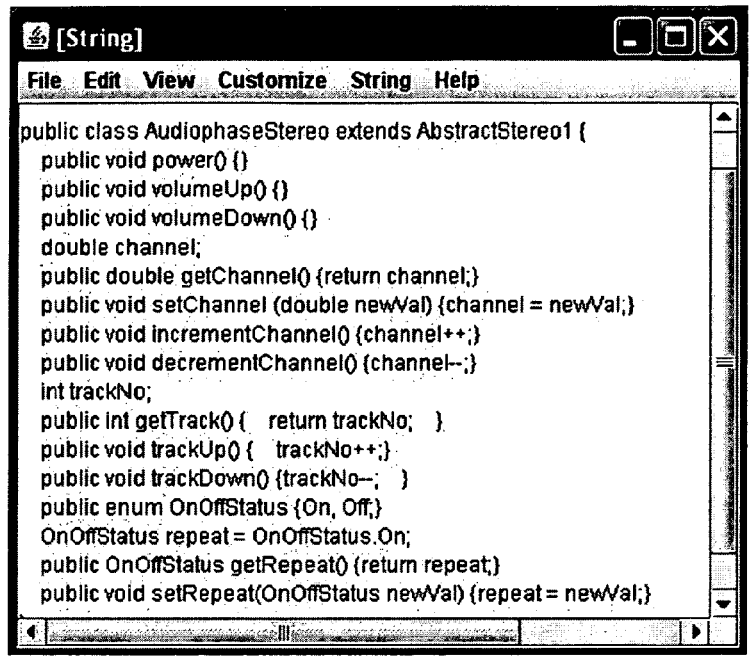
FIGS. 14(a)-14(d) are computer screen shots illustrating examples of programmer customization of automatically generated device interfaces to an embodiment of the subject matter described herein.
Figure 14B:
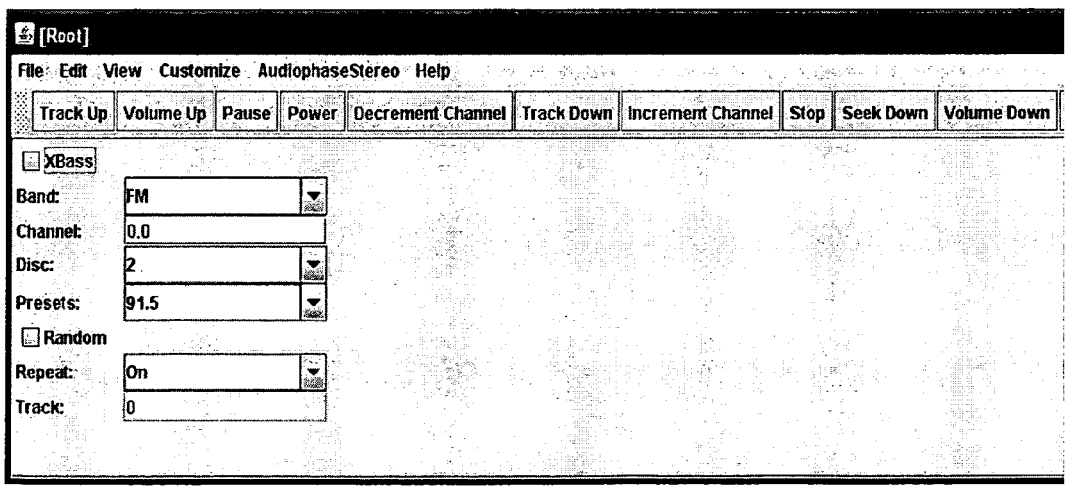
Figure 14C:
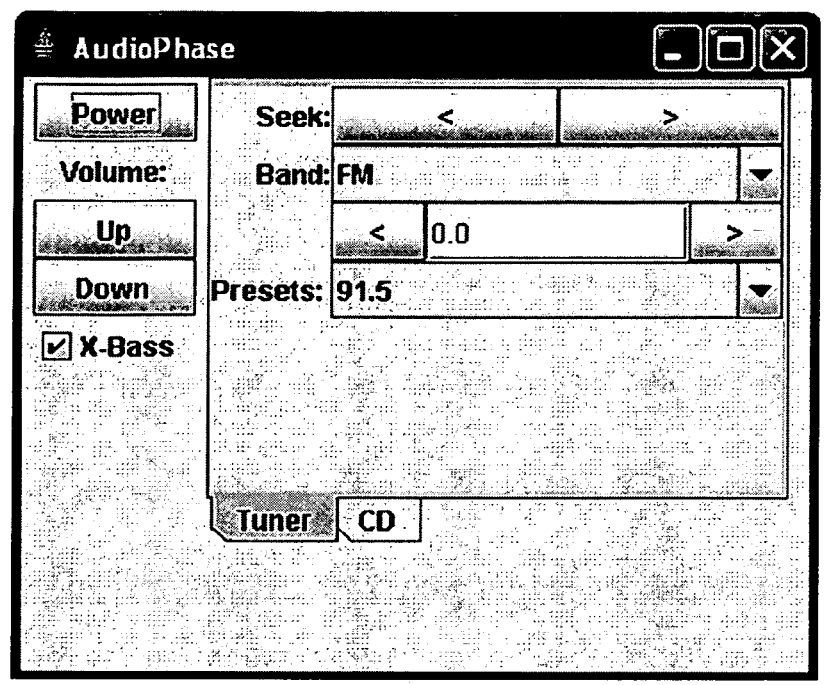
Figure 14D:
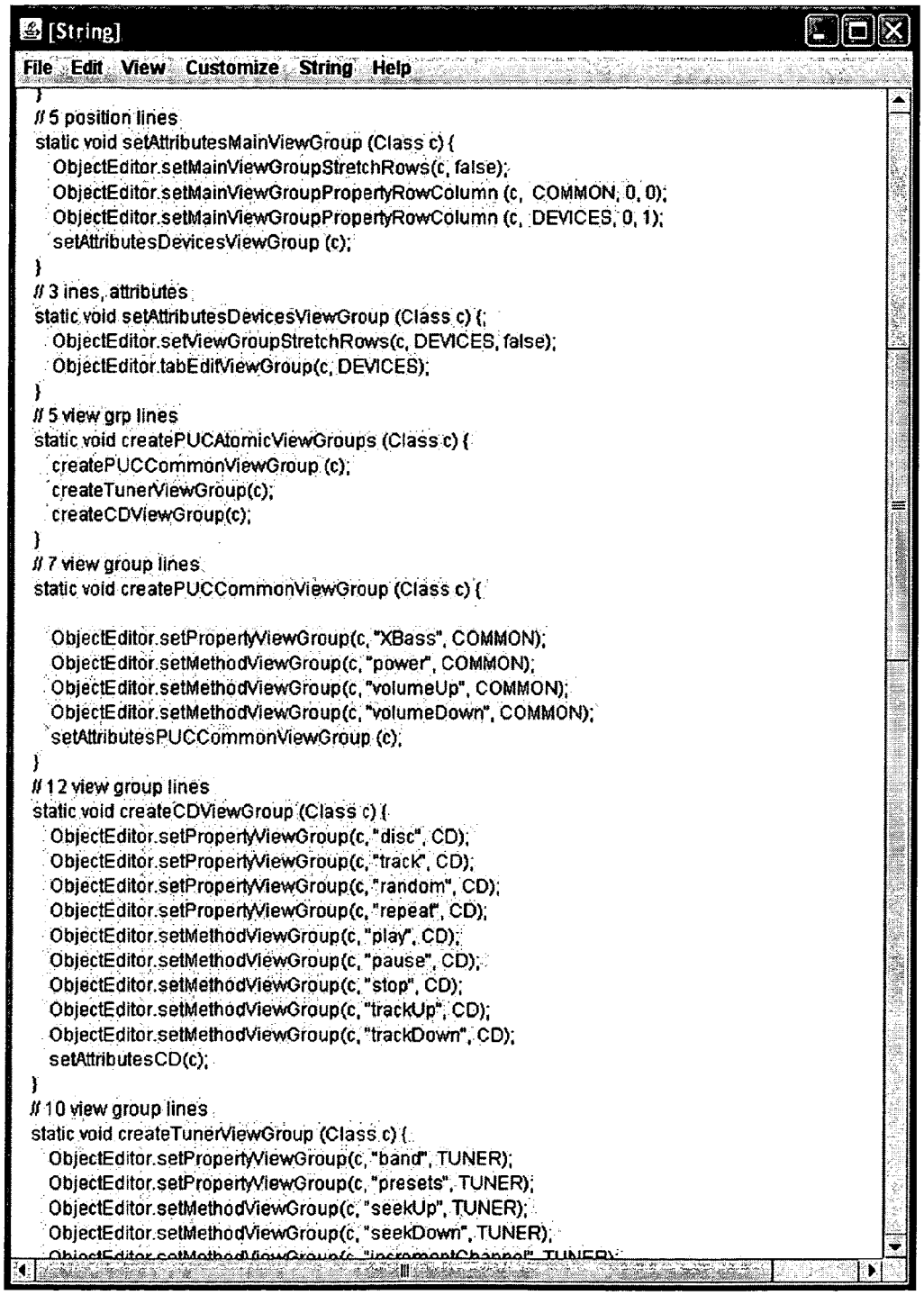

FIGS. 14(a)-14(d) are further illustrations of customization. FIG. 14(a) shows some of the code implemented by the AudioPhase object. FIG. 14(b) shows the default user interface created for the object without any customization. In particular, it shows that all properties are shown in one panel and no button is shown in the panel to invoke methods of the object. FIG. 14(c) shows a customized interface in which method and properties of the object are put in programmer-defined groups. FIG. 14(d) shows some of the customization code. For instance it shows that the disc, track, random, and repeat logical components and the play, pause, stop, trackup and trackdown methods should be put in the group, CD, and the band and presets properties and the seekUp, seekDown and incrementChannel methods should be put in the tuner group.

According to yet another aspect of the subject matter herein, speech user interface tools may be generated by identifying programming patterns and mapping the programming patterns to speech user interface tools. One exemplary model of a speech UI generator also combines and extends existing techniques for mapping objects to dialogues. Each (parameterized) operation is associated with a (parameterized) command and each composite property/view group with a sub-dialogue. Commands are also provided to set and get simple properties. An attribute determines the spoken name of the operation/property, which by default is the same as the identifier used to name the component in the programming interface. In the system-initiative mode, the system prompts users for the alternative choices, in order of the values of their position attributes. In the user-initiative mode, the user simply gives the complete command. As view groups can overlap, all operations and properties with distinct names are put in a top-level view group so experienced users do not have to navigate through submenus in the user-initiative mode. (As mentioned in [42], in this domain, duplication of names does not occur.) Elements of the top view group that are also in some other child group are not presented as options in the system-initiative mode to keep menus short.

It is assumed herein that the GUI and SUI generator models are built on top of GUI and SUI toolkits, which themselves provide customization features such as determining the alignment of labels and the width of text- and combo-boxes. It is assumed herein that these generators allow toolkit customization features to be used by the developers. Exercising toolkit customization features has the same cost in both the manual and generation approaches, so the discussion and implementations described herein ignore customization features provided by existing GUI and SUI toolkits.

Figure 15:
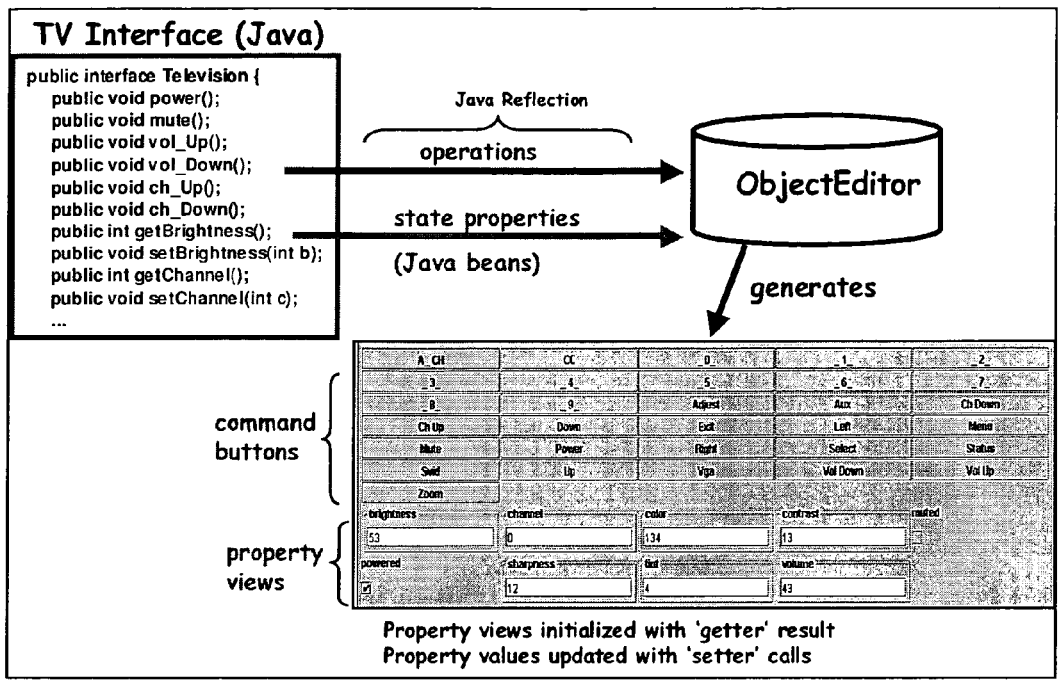
FIG. 15 is a diagram illustrating source code for a television object, automatic generation of a user interface for the television object by ObjectEditor( ) according to an embodiment of the subject matter described herein, and the corresponding user interface.

FIG. 15 is a block diagram illustrating an exemplary interface object for a television and the corresponding user interface that may be generated by the subject matter described herein, illustrated in FIG. 15 as ObjectEditor. In order to generate the user interface illustrated in FIG. 15 ObjectEditor first identifies programming patterns from the public television interface illustrated in FIG. 15. These programming patterns include get and set methods for brightness and channel controls. Additional get and set patterns may be included for color, brightness, tint, and volume. These get and set patterns are mapped by ObjectEditor into text boxes in the exemplary user interface. The power( ). ch_Up( ), ch_Down( ), vol_Up( ), and vol_Down( )methods are mapped to corresponding buttons in the illustrated user interface.

Universal Toolkit Model for Structures

Figure 16A:
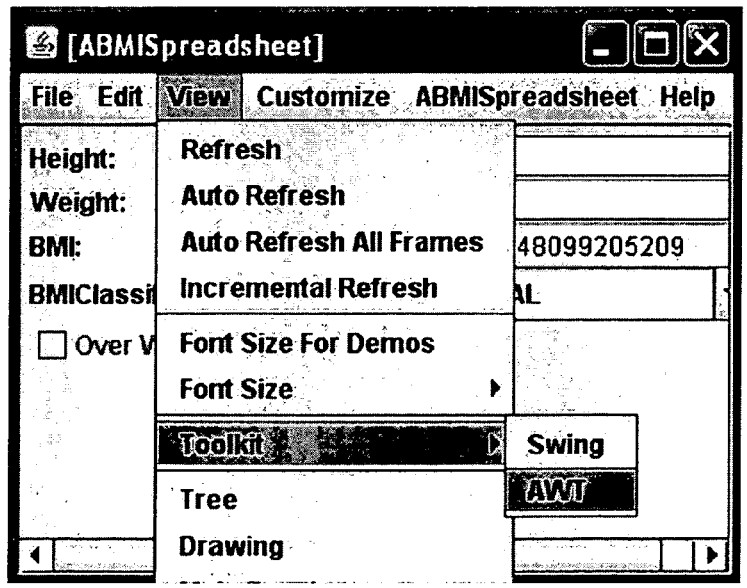
FIGS. 16(a) and 16(b) are computer screen shots illustrating user interface generated using different toolkits according to embodiments of the subject matter described herein.
Figure 16B:
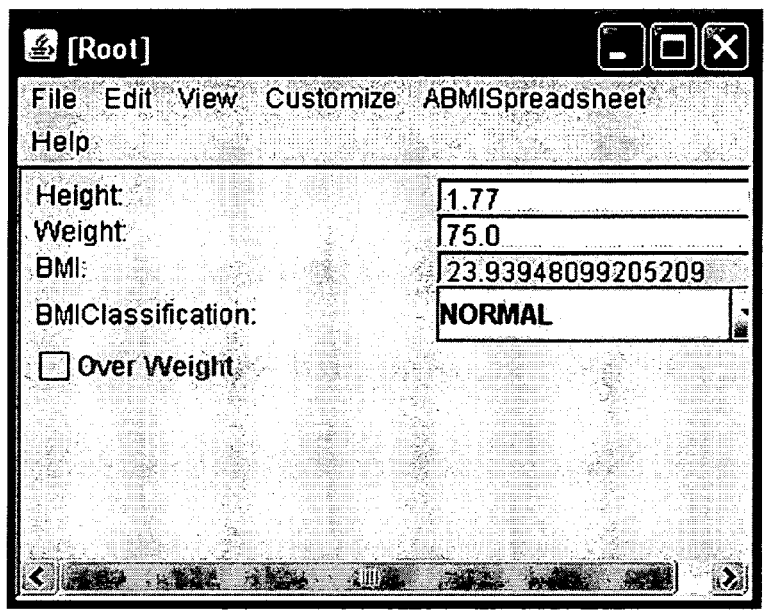

In the examples described above, the application objects according to embodiments of the subject matter described herein are mapped to pattern objects for various constructors such as records and sequences and the pattern objects are mapped to user interface widgets. As described above, for every toolkit, the mapping from pattern objects would have to be redone. In an alternate implementation of the subject matter described herein, the pattern objects implementing the constructors would be mapped to a single universal toolkit model and the toolkit model would be mapped to the toolkit widgets. Thus, to port the tool to a different toolkit would require changing the mapping only between the universal model and the widgets and not between each pattern object and the widgets. The use of different toolkits is illustrated in FIGS. 16(a) and 16(b). In FIG. 16(a), the BMI application is displayed using the Java Swing toolkit. The user asks for the toolkit to be changed to Java AWT. FIG. 16(b) shows the new user interface. This implementation can be extended to support, for instance, IBM's SWT toolkit and Google's GWT toolkit.

The subsections below illustrate a method for using a universal toolkit as part of the automatic user interface generation process according to an embodiment of the subject matter described herein. As the sections show, the universal model is useful even when creating custom rather than generated user interfaces as it supports widget substitutability. It is particularly useful in user-interface generated from programming patterns.

1 Introduction

User-interface toolkits strongly influence the nature of a user-interface and its implementation. Programmers tend to incorporate components into a user-interface that are easy to implement. For example, programmers use the buttons directly supported by a toolkit rather than define their own buttons using the underlying graphics and windows package. Moreover, the implementation of the user-interface typically follows the architecture directly supported by the toolkit. For example, in the early versions of the Java AWT toolkit, programmers attached semantics to widgets by creating subclasses of these widgets that trapped appropriate events such as button presses. As the newer version of AWT supports delegation, programmers now associate callbacks with these widgets.

One of the major recent advances in toolkits is support for model-aware widgets, that is, widgets that understand the interface of the semantic or model object being manipulated by them. Model-aware widgets have the potential for (i) increasing automation and (ii) making it easy to substitute a user-interface with another one. Current toolkits, however, have focused only on the automation benefit as they do not allow different kinds of widgets to share a common model. For example, in Java's Swing toolkit, the JTable and JTree model-aware widgets understand different kinds of models. As a result, it is not possible to display the model of a JTable widget as a tree, and vice versa.

Therefore a data structure that serves as a universal model for different widgets is an attractive idea. It is not possible to develop such a model for all possible widgets as some widget models assume fundamentally different semantics. For example, the model of a slider must be a numeric value and not, for example, a string or a list. In the subsections below, it is shown that is possible, however, to develop a universal model for all existing structured model-unaware widgets and several new structured components such as browsers for which no appropriate model interface has been defined so far. Thus, such a universal structured model increases both the automation and substitutability of the toolkit. It increases automation as it directly supports user-interface components such as browsers that have to be manually composed today. It increases substitutability as it allows the model to be displayed using any of the existing and new model-aware structured-widgets.

The remaining subsections below expand on this idea. First, the relationship between the MVC (Model-View-Controller) architecture [1] and model-aware widgets is demonstrated. Once this relationship is understood, then the substitutability limitation of current toolkits becomes apparent. The present requirements of a universal structured-model are then presented. A top-down approach to identifying such a model based on the work done in programming languages, operating systems and database systems that support a single data structure is next described, followed by a bottom-up analysis of this model by exploring how it could be attached to existing and new structured user-interface components, extending it as necessary. Conclusions and directions for future work are then presented.

2 MVC and Toolkit Widgets

The MVC framework, as presented in [1], requires the semantics of a user-interface to be encapsulated in a model, the input processing to be performed by one or more controllers, and the display to be defined by one or more views. In response to an input command, a controller executes a method to write the state of the model, which sends notifications to the views, which, in turn, read appropriate model state, and update the display.

One issue not explicitly addressed by MVC, or any other paper known to the inventors of the subject matter described herein, is: what is the relationship between MVC and toolkits? The architecture could be implemented (i) from scratch, without using a toolkit, (ii) using model-unaware widgets, or (iii) using model-aware widgets. As (i) does not inform toolkit design—the focus of the present subject matter—this approach will be ignored herein. To contrast (ii) and (iii), model-aware and model-unaware widgets must be precisely distinguished from each other.

A model-unaware widget talks to its client in a syntax-centric language. It defines calls allowing the widget client to set its state in display-specific terms, and sends notifications to the client informing it about changes to the state, again in display-specific terms. For example, a model-unaware text-box displaying a Boolean value talks to its client in terms of the text it displays. It defines calls that allow the client to set the text and sends notifications informing the client about changes to the text. A model-aware widget, on the other hand, talks to its clients in a semantics-centric language. It receives notifications regarding changes to the client state in model-based terms, and converts these changes to appropriate changes to the display. When the display changes, the widget calls methods in the client to directly update its state. For example, a model-aware text-box displaying a Boolean value would talk to its client in terms of the Boolean it displays. When the user edits the string, it directly updates the Boolean, and conversely, it responds to a notification by automatically converting the Boolean to a string.

Figure 17A:
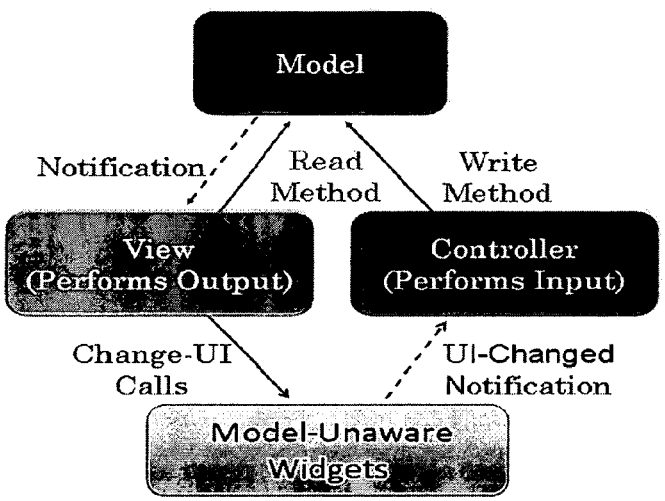
FIGS. 17(a) and 17(b) are block diagrams illustrating model unaware widgets with and without the model-view-controller architecture.
Figure 17B:
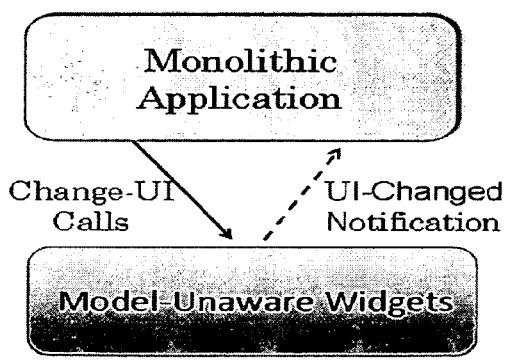

Given model-unaware widgets, FIG. 17(a) shows how the user-interface should be implemented and FIG. 17(b) shows how it can be implemented. In FIG. 17(a), the view translates a model notification into an operation on the widget; and the controller translates a widget notification to a call in the model. In FIG. 17(b), the widget client is a monolithic application that performs semantics, input and output tasks. Often, programmers follow the architecture directly supported by a toolkit, which in this case means that the architecture shown in FIG. 17(b) is used, resulting in a spaghetti of callbacks [48] mixed with semantics.

Figure 18A:
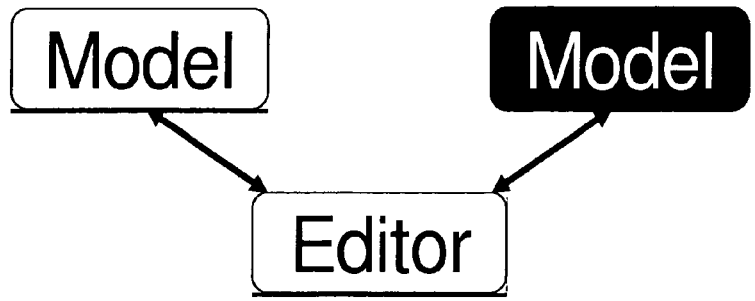
FIG. 18(a)-18(c) are block diagrams illustrating three forms of model aware widgets according to an embodiment of the subject matter described herein.

This problem does not, of course, occur with model-aware widgets. These widgets do not directly support the MVC architecture. Instead, they support a model-editor architecture (called subject-view in [49]), in which the editor combines the functionality of a view and controller, receiving notifications from the model and calling both read and write methods in the model. A model-aware widget is essentially an editor automatically implemented by the toolkit that is based on some model interface. As it is based on an interface rather than a class, it can be reused for any model class that implements the interface, as shown in FIG. 18(a). It is this model substitutability that increases the automation of the toolkit for all models displayed using the widget, no UI code needs to be written.

Figure 18B:
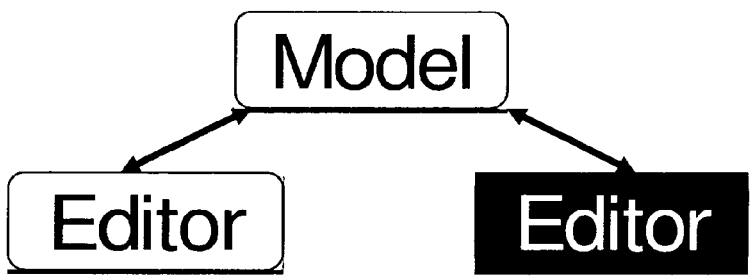

Model substitutability was not an advertised advantage of the original MVC framework, which, as mentioned earlier, did not address toolkits or automation. This substitutability is the dual of the UI/editor substitutability for which the MVC architecture was actually created, which is shown in FIG. 18(b). Given a model, it is possible to attach multiple editors to it, concurrently or at different times. Attaching a new editor to a model does not require changes to the model or other editors—the only requirement is that the editor understand the model interface. Thus, given a model displayed as a bar-chart, adding an editor that displays it as a pie-chart does not require changes to the model or the existing editor.

While toolkits have made an important advance to the MVC architecture by using it for automation, as designed currently, they have done so by sacrificing the original advantage of the architecture. The reason is that different editors supported by a toolkit assume different model interfaces. For example, the tree and table widgets in Swing assume different models. As a result, it is not possible to display the same model as a tree and/or a table. It is possible to display a tree or table model using a programmer-defined user-interface, but that involves sacrificing automation. The Windows/Forms toolkit has a similar problem. As the present implementation is based on Java, the description herein focuses on the Java Swing toolkit.

Figure 18C:
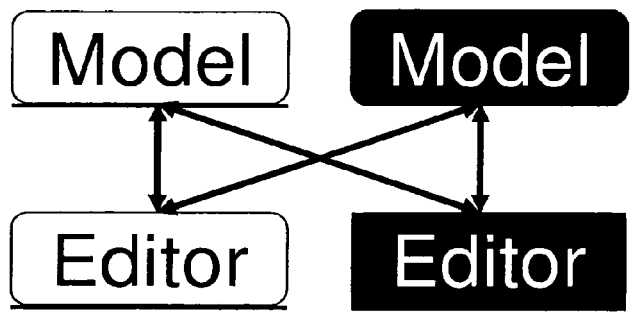

What is needed, then, is a technique that combines both kinds of substitutabilities, which is shown in FIG. 18(c). Here, a toolkit-provided editor can be attached to instances of multiple model classes. In addition, a model can be attached to instances of multiple editor classes. In the next section, a toolkit-provided editor that can be attached to multiple instances of model classes and a model that can be attached to instances of multiple editor classes will be explained in detail.

3 Requirements

To remove the limitations of previous work mentioned above, a new toolkit design that meets the following requirements is needed:

1. Reduced model set: The current set of models should be replaced with a smaller set of models.
2. Same or increased model-aware widget sets: The set of model-aware widgets automatically supported by the toolkit should not be reduced.
3. Same or decreased programming effort: It should not be harder to create models and bind them to existing editors.
4. Model purity: The models must have only semantic state.

It is important to meet all of these requirements. It is easy to meet the first requirement by, for instance, simply eliminating the table model from Swing. However, this approach does not meet the second requirement, as the set of model-aware widgets is also reduced. It is easy to meet both requirements by requiring a model to implement the interfaces of multiple existing model-aware widgets. For instance, combining the model interfaces defined by the tree and table widgets reduces the set of model interfaces, but requires programmers using the interface to implement both sets of methods, instead of only one of the sets, which does not meet the third requirement. Existing "models" in toolkits sometimes have user-interface information. For example, the JTable model indicates the label to be used as a column name. Therefore, the fourth requirement is set forth to ensure the purity of models. It is possible to meet the first three requirements to different degrees depending on the extent to which the (1) model set is reduced, (2) set of model-aware widgets is increased, and (3) programming effort is changed. In the following sections, an approach that meets these requirements is presented and evaluated based on the above metrics.

4 Top-Down Identification of a Universal Structured Model

The ideal approach to meeting the above requirements is to define a universal model for all widgets. However, as mentioned before, it is not possible to develop such a model as there are widget models with fundamentally different semantics. Thus, we must set our sights lower and aim simply for a reduced model set rather than a single model.

There are well known techniques for reducing the model set in existing toolkits. Previous work has shown how a model can be mapped to multiple unstructured-widgets [50, 51], that is, widgets displaying a single editable atomic value. In particular, a discrete number can be mapped to a slider or textbox, an enumeration can be mapped to combobox or textbox, and a Boolean can be mapped to a textbox, combobox, or checkbox. These techniques are gradually being implemented in existing toolkits. However, there has been no work for mapping a model to multiple structured-widgets such as tables and trees, which display composite (non-atomic) values. Therefore, the description below focuses on mapping models to structured widgets.

Can a single universal model be defined for all model-aware structured-widgets supported so far? If so, can it also be bound to other user-interface components that are not automatically supported by existing toolkits? These are the two questions addressed below. While they have not been addressed before in the user-interface arena, analogous questions have been posed in other fields such as database management systems, operating systems, programming languages, and integrated systems.

Research in database management systems has tried to determine if a single data structure can be used to store all data that must be searched. A practical answer has been the relational model [52]. Similarly, research in operating systems has tried to determine if a single data structure can be used to store all persistent data, and a practical answer has been the Unix "file", which models devices, sockets, text files, binary files, and directories. Research in programming language has tried to answer an even more complex question: can a single structured object be used for all computation? The answer in Lisp (and later functional languages such as ML) is an ordered list, and in Snobol (and later string processing languages such as Python) a hashtable. Designers of EZ [53] have proposed using a nested hashtable as the only structured object in a programming language that is integrated with the underlying operating system. For example, a directory is simply a persistent table, and changing to sub directory, sd, corresponds to looking up the table value associated with key sd.

Of course, the reduced abstraction set is not without limitations. Therefore, object-oriented database management systems have been proposed as alternatives to traditional relational systems; IBM has supported structured files in its operating system (an idea that was supposed to be extended by the Longhorn Microsoft operating system); and object-oriented languages are preferred today to Lisp and Snobol. It is for this reason that the other three requirements in addition to the requirement of a reduced model set are added. If all four requirements are met, the state of the art is improved without introducing any limitations.

The research in other fields will now be described to motivate a top-down search for a universal structured model that is based on data structures that have been found to be sufficient for defining a variety of semantic state, which is the kind of state managed by a model. The alternative is a bottom-up approach in which it is attempted to generalize models of existing structured-widgets. As the nature of the models should be independent of the nature of user-interfaces, the result of the top-down approach seems more likely to last in the long-run. In particular, as it is not based on specific user-interfaces, it should make it possible to automatically support new kinds of structured-widgets. On the other hand, this approach does not distinguish between displayed and internal semantic state. The second approach can identify aspects of displayed semantic state not captured by existing display-agnostic data models.

For these reasons, in the subject matter herein takes an approach in which: (1) the top-down approach of creating an interface that models the universal semantics structures proposed in other fields is first used; (2) and then take the bottom-up approach of generalizing this interface to connect it to existing model-aware widgets is used.

The first step above requires an interface that combines elements of relations, nested hash tables, and lists. A relation is simply a set of tuples, where each tuple is a record. Thus, the above goal can be reduced to supporting records, un-ordered sets, ordered lists, and nested hash tables.

As a Java-based tool is being developed in the examples described herein, an example of such development can start with an interface containing a subset of the methods implemented by the Java Hashtable class:

```
public interface UniversalTable <KeyType, ElementType>{
    public Object put(KeyType key, ElementType value);
    public Object get(KeyType key);
    public Object remove(KeyType key);
    public Enumeration elements( );
    public Enumeration keys( );
}
```

This interface completely models a hashtable because it has methods to (a) associate an element with a key, (b) determine the element associated with a key, and (c) remove a key along with the associated element. The interface is parameterized by the types of the keys and elements. As the element types can themselves be tables, this interface also models nested hashtables of the kind supported by EZ. The last two methods in the interface seem to have been added by Java for purely convenience reasons—they make it possible to treat a hashtable as a pair of collections accessed using CLU-like iterators [54]. However, as will be shown below, they also allow the interface to model records, ordered lists, and sets.

A record is simply a table with a fixed number of keys. Thus, a record implementation of this interface simply initializes the table with the fixed number of keys and does not let keys to be added or deleted. This is illustrated in the following class, which defines a subset of the contents of an email message-header:

```
//simulating a record whose fields are not ordered
public class AMessage implements UniversalTable<String, String> {
    Hashtable<String, String> contents = new Hashtable( );
    public final static String SUBJECT = "Subject";
    public final static String SENDER = "Sender";
    public final static String DATE = "Date";
    public AMessage (String theSubject, String theSender, String theDate){
        put(SENDER, theSender);
        put(SUBJECT, theSubject);
        put(DATE, theDate);}
    public Enumeration keys( ) {return contents.keys( );}
    public Enumeration elements( ) {return contents.elements( );}
    public String get (String key) {return contents.get(key);}
    public Object put(String key, String val) {
        if (contents.get(key) != null)return contents.put(key, val);
        else return null; // record keys are fixed
    }
    public String remove (String key) {return null;}
}
```

The above class defines a record consisting of three fields named "Subject", "Sender" and "Date", and defines a constructor that initializes the value of these fields.

The two iterator-based methods can be used to model an ordered list. The return type, Enumeration, of these methods, is given below:

```
public interface Enumeration{
    public boolean hasMoreElements( );
    public Object nextElement( );
}
```

As can be seen above, this type defines an order on the elements to which it provides access. Thus, the keys( ) and elements( )methods of our universal table can be used to define an order on the keys and elements, respectively, in the table. The class, AMessageList, given on the next page, illustrates this concept. Like the previous example, this class stores the mapping between keys and elements in an instance of the Java Hashtable class. However, unlike the previous class, it does not return these values in the order returned by the underlying Hashtable. Instead, it uses two vectors, one for keys and another for elements, to keep track of the order in which these values are added to the table, and returns them in this order. If a key is associated with a new element, then the new element takes the position of the old element associated with the key. When a key is removed, the key and the associated element are removed from the vectors storing them. As this code is somewhat complicated, it has been incorporated in a generic list class that is parameterized by the key and element type and implements UniversalTable. As a client may wish to insert rather than append components, we add another put method to the universal table interface that takes the position of the key and element pair as an additional argument:

public Object put(KeyType key, ElementType value, int pos);

A set can be more simply modeled by overriding the put method to not replace the value associated with a key. Thus, a single interface can be used to simulate four important structures: nested hashtables, records, ordered lists, and sets. Interestingly, the simulation is accomplished by using a subset of the methods of an existing class—the Java Hashtable.

```
// simulating an ordered list
public class AMessageList
    implements UniversalTable<String, AMessage>{
    Hashtable<String, AMessage> contents = new Hashtable( );
    Vector<String> orderedKeys = new Vector( );
    Vector orderedElements = new Vector( );
    public Enumeration keys( ) {
        return orderedKeys.elements( );
    }
    public Enumeration elements( ) {
        return orderedElements.elements( );
    }
    public AMessage get (String key) {
        return contents.get(key);
    }
    public AMessage put (String key, AMessage value) {
        AMessage oldElement = contents.get(key);
        AMessage retVal = contents.put(key, value);
        if (oldElement == null) {
            orderedKeys.addElement(key);
            orderedElements.addElement(value);
        } else {
            int keyIndex = orderedKeys.indexOf(key);
            orderedElements.setElementAt(value, keyIndex);
        }
        return retVal;
    }
}
```

```
        public AMessage remove (String key) {
            int keyIndex = orderedKeys.indexOf(key);
            if (keyIndex != -1) {
                orderedKeys.remove(keyIndex);
                orderedElements.remove(keyIndex);
            }
            return contents.remove(key);
        }
    }
```

Finally, to make the universal table a model that can notify editors/views and other observers, the following methods are added to UniversalTable:

```
    public void addUniversalTableListener(UniversalTableListener I);
    public void removeUniversalTableListener(UniversalListener I);
```

A listener of the table is informed about keys being put and removed:

```
    public interface UniversalTableListener {
        public void keyPut(Object key, Object value);
        public void keyRemoved(Object key);
    }
```

5 Binding Universal Model to Structured-Widgets

The bottom-up approach of determining if instances of the universal table can serve as models of two existing Swing structured model-aware widgets: JTree and JTable will now be described.

Let us first consider JTree, which has several requirements:

1. Its model must be decomposable into a tree,
2. Both the internal and leaf nodes should have data items associated with them.
3. The node data items should be editable, that is, it should be possible to add and remove children of composite tree nodes, and modify the data items of all nodes.

Figure 19C:
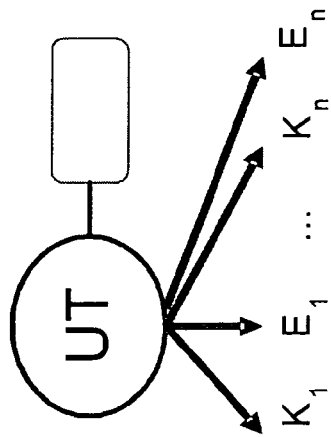
FIGS. 19(a)-19(c) are a block diagrams illustrating three alternative approaches to decomposing a universal table according to an embodiment of the subject matter described herein.
Figure 19B:
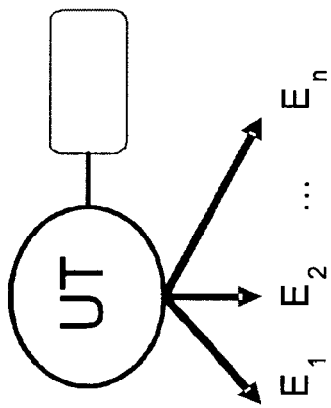
Figure 19A:
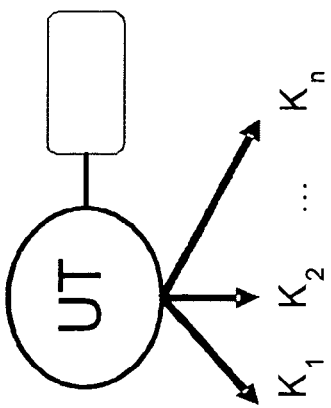

To meet requirement 1, an instance of a universal table must be decomposable into component objects. The instance can be decomposed into its (a) key objects, (b) element objects, and (c) key and element objects (FIG. 19).

The present subject matter provides a special call that can be used by the programmer to make this choice for a specific application class, as shown below:

```
ObjectEditor.setChildren(AMessageList.class, ELEMENTS_ONLY);
ObjectEditor.setChildren(AMessageList.class, KEYS_ONLY);
ObjectEditor.setChildren(AMessageList.class,
KEYS_AND_ELEMENTS);
```

Figure 20A:
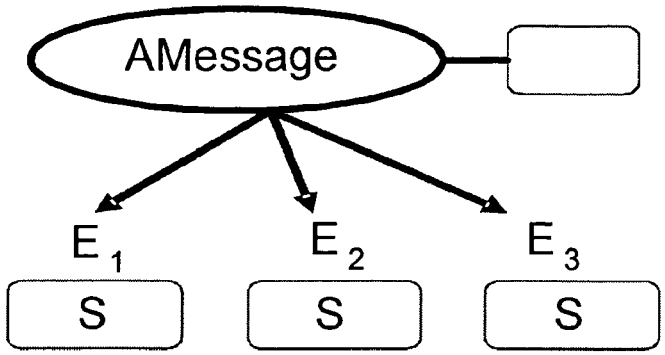
FIGS. 20(a)-20(c) are block diagrams illustrating decomposition of three universal tables into components according to embodiments of the subject matter described herein.
Figure 20B:
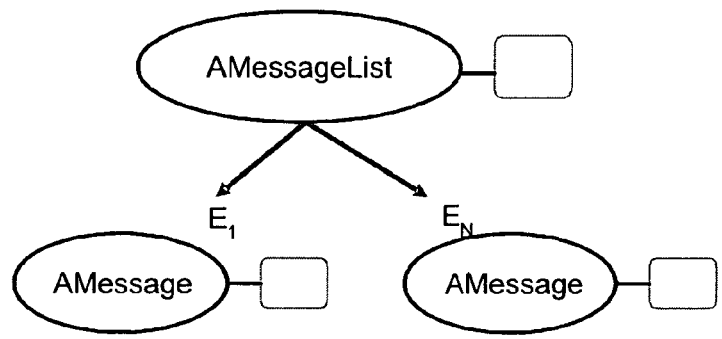
Figure 20C:
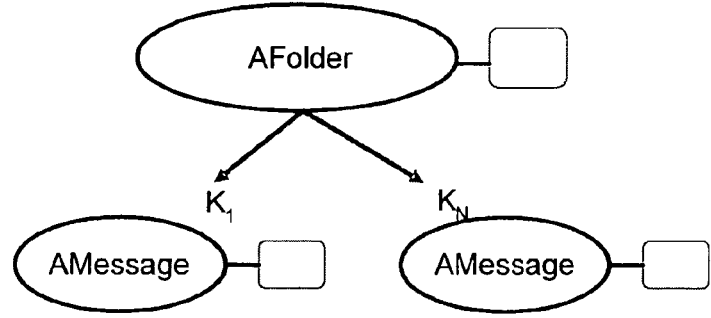

These calls tell the toolkit to decompose instances of AMessageList into its elements, keys, or keys and elements. If a key or element is also a universal table, then it too can be decomposed in any of the three ways. In the case of AMessageList, each element is an instance of AMessage, which implements UniversalTable. Therefore, it too can be decomposed into sub-objects. FIG. 20 shows the decompositions defined by the following calls:

```
ObjectEditor.setChildren(AMessageList.class, ELEMENTS_ONLY);
ObjectEditor.setChildren(AMessage.class, ELEMENTS_ONLY);
ObjectEditor.setChildren(AFolder.class, KEYS_ONLY);
```

Here, AFolder is a universal table with keys of type AMessage and elements of type String, mapping message-headers to the corresponding message texts:
public class Folder implements UniversalTable<AMessage, String>

Thus, AFolder and AMessageList are duals of each other in that the key type of one is the element type of the other. In FIG. 20, an empty box is attached to an internal node to denote its data item, and a box with label S is used to denote a leaf node of type String.

By default, a table is decomposed into its elements. A programmer can define the default decomposition for all universal tables by using the following call:
ObjectEditor.setDefaultHashtableChildren(KEYS_ONLY);

Let us now consider the second requirement of associating the tree nodes with data items. We could simply use the approach used by JTree of assuming that the toString( )method of a tree node defines the value. However, to support form user-interfaces, we use a more complex approach described by the following routines:

```
Object getTreeDataItem(node) {
    if (getLabel( ) != "")
        if (node is leaf)
            return getLabel(node) + ":" + node.toString( )
        else // node is element
            return getLabel(node)
    else // label = ""
        return node
String getLabel (node) {
    if node is labeled and label is defined
        return label
    else if (node is labeled and node is element) // label not defined
    for element
        return getTreeDataItem( key associated with element).toString( )
    else // label not defined for key
        return ""
```

This algorithm is motivated and illustrated by the tree displays of AMessage, AMessageList, and AFolder shown in FIG. 21.

Figure 21A:
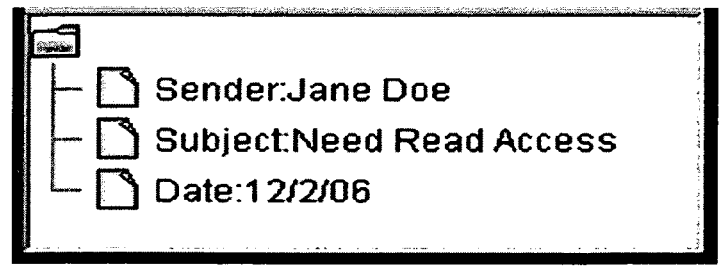
FIGS. 21(a)-21(c) are diagrams illustrating the association of model items with tree nodes according to an embodiment of the subject matter described herein.
Figure 21B:
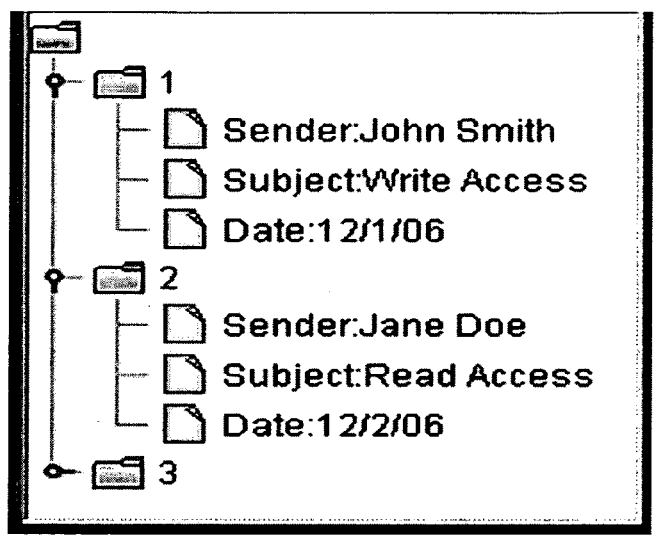
Figure 21C:
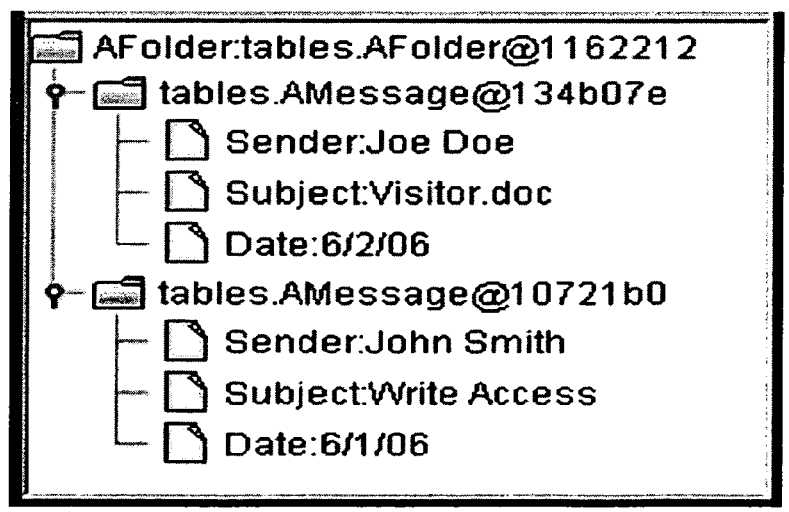

In FIG. 21(c), none of the classes has overridden the toString( ) method, while in FIGS. 21(a) and 21(b), AMessage and AMessageList have overridden this method to return the null string. In all cases, the labeled attribute is true and the default label is the null string. In FIG. 21(b), the data items associated with the AMessage elements are their keys: "1", "2" and "3". In FIG. 21(c), the data items associated with the AMessage keys are the values returned by their toString( )methods. ObjectEditor provides routines to set the values of the labeled and label attributes. For example, the following call says that, by default, the value of the labeled attribute is false:
ObjectEditor.setDefaultLabelled(false);
Similarly, the following call says that the value of the labeled attribute for instances of type AMessage is true:
ObjectEditor.setLabelled(AMessage, true);

The exact algorithm for determining the data item of a node can be expected to evolve—what is important here is that it depends on a programmer-specified label and takes into account whether the node is a key, element, leaf, or composite node.

Now consider the requirement of allowing nodes to be editable. Inspired by Java's MutableTreeNode class, we add the following method to UniversalTable to allow its data items to be changed:
    public void setUserObject(Object newVal);
The following code shows what happens when a node's data item is changed:

```
Object edit(node, newValue) {
    if node is composite
        node.setUserObject(newValue)
    else if node is key // leaf key
        parent_of_node.put (newValue, parent_of_node.get(old key));
        parent_of_node.remove (oldKey);
    else // leaf element
        parent_of_node.put (key_of_node, newValue);
```

Editing the data item of a composite node results in the setUserObject( ) method to be called on the node with the new value. Editing the data item of a leaf element results in the key associated with the element to be bound to the new value. Thus, in FIG. 21(a), changing "Jane Doe" to "Jane M. Doe" results in the "Sender" key to be associated with "Jane M. Doe". Editing the data item of a leaf key results in the element associated with the old key to be associated with the new key. Thus, in FIG. 21(b), changing the key "1" to "One" associates the first message with "One" instead of "1".

The following code shows what happens when a new node is inserted into a composite node at position index:

```
insert (parent, child, index)
    if (keysOnly(parent))
        parent.put (child, node.defaultElement(child), index);
    else if (elementsOnly(parent))
        parent.put (node.defaultKey(child), child, index);
    else if (keysAndElements(parent))
        if (isKey(parent, child, index) or index == size ) //
        inserting before key or at
        end
            parent.put (child, node.defaultElement(child), index/2);
        else // inserting before element
            parent.put (node.defaultKey(child), child, (index –
            1)/2);
```

Based on the position of the inserted element and how the parent of the inserted element has been decomposed, the code determines if a key or element is to be inserted, and calls methods in the parent to determine the default key or element to serve as the new child. The is Key( )method determines if the new node is a key based on the insertion position. The code assumes two new methods in the universal table interface:

```
    public KeyType defaultKey(ElementType element);
    public ElementType defaultValue(KeyType key);
```

These two methods are needed only because the universal table constrains the types of its key and elements. If it were to accept any object as a key or element, the toolkit could simply create a new object as a default key or object:
    new Object( )
The operation to remove a node is simpler.
    remove (parent, child)
    if is Key (child) parent.remove (child) else parent.remove (key of child)

Finally, ObjectEditor provides a way to specify that a universal table should be displayed as a tree:
    edit (UniversalTable model, JTree treeWidget);
This operation displays the model in treeWidget. Here, the programmer explicitly creates the tree widget, setting its parameters such as preferred size as desired. We also provide the operation:
    treeEdit (UniversalTable model)
which creates the tree widget with default parameters. Sometimes a whole class of objects must be displayed using a particular kind of widget, so the following operation is also provided:
    setWidget (Class universalTableClass, Class widgetClass)
This call tells the toolkit to always display an instance of universalTableClass using an instance of widgetClass.

Thus, we have met all of the requirements imposed on us by the Swing tree widget. Let us consider now the Swing table widget. This widget needs the following information: (1) a two dimensional array of elements to be displayed; (2) the most specific class of the elements of each column; (3) the names of the columns; and (4) whether an element is editable.

The first requirement can be met by a non-nested or nested universal table. A one-level universal table (that is a universal table whose children are leaf elements) is considered a table with a single row or column based on whether its alignment is horizontal or vertical, respectively. A two-level universal table (that is a table whose children are one-level tables) decomposed as keys only (elements only) is straightforwardly mapped to a table in which a row is created for each key (element) of the table consisting of the components of the key (element). A universal table decomposed as keys and elements whose keys are leaf values and elements are 1-level universal tables is decomposed into a table in which a row is created for each key of the object consisting of the key and children of the corresponding element. Currently, we do not map other universal tables to table widgets. The second requirement above is met by returning the class of the default element/key depending on how the table has been decomposed into children. As column names can sometimes be automatically derived from the semantics of the model, but should not be defined explicitly by the model, we use the following algorithm for determining them:

```
    getColumnName(root, columnNum)
        if numRows (root) > 0 return
    firstRow(root).column(columnNum).getLabel( );
        else return "";
```

If the matrix is not empty, it then uses the getLabel( ) operation defined earlier to return the label of a particular column in the first row. Recall that the operation returns a value based on the key of an element and the label attribute of the element. To meet the last requirement of JTable, we provide the following methods inspired by the Swing JTableModel class:

```
    public boolean isEditableKey(KeyType key);
    public boolean isEditableElement(ElementType element);
    public boolean isEditableUserObject( );
```

FIG. 21(a) illustrates our schemes for meeting the requirements above using an instance of a AMessageList. Here, AMessageList is decomposed into keys and elements, AMessage is decomposed into elements, the keys of AMessageList are not labeled, and the elements of AMessage are labeled but have no explicit label set by the programmer. As a result, each row consists of the atomic String key, and the atomic elements of AMessage; and the keys of the elements of AMessage are used as column names but not displayed in each row. As in the tree widget case, we provide routines to bind a table widget to a model.

The fact that a universal table models a record implies that we can also support forms, as these have been previously created automatically from database records [55]. However, database records (tuples) are flat. As universal tables are nested, we can create hierarchical forms. In fact, we can embed tables and trees in forms. FIG. 22 shows a table embedded in a form. Here, we assume AFolder is decomposed into its keys, and AMessage is decomposed into keys. The algorithm for creating a form is:

```
displayForm (node) {
    panel = new Panel
    setLabel (panel, getLabel(node)) // can put label in the border, add a label
widget, ....
    for each child of node
        childPanel = display (child)
        add (panel, childPanel)
    return panel
```

The operation display(node) returns a component based on the widget associated with the type of node. For a universal table, the widget is a form, tree, tabbed pane, or table. For an atomic type, it is an atomic widget such as a slider, combobox, text-box or checkbox. The algorithm leaves the layout of children in a parent panel as implementation defined. In [56], we define a parameterized scheme for arranging form items in a grid.

Tabbed panes are similarly implemented:

```
        displayTabbedPane (node) {
            tabbedPane = new tabbed pane;
            for each child of node
                childPanel = display (child)
                add(tabbedPane, childPanel, getLabel(child))
            return panel
```

FIG. 23(b) shows the tabbed display for folder displayed in 23(a).

Figure 24:
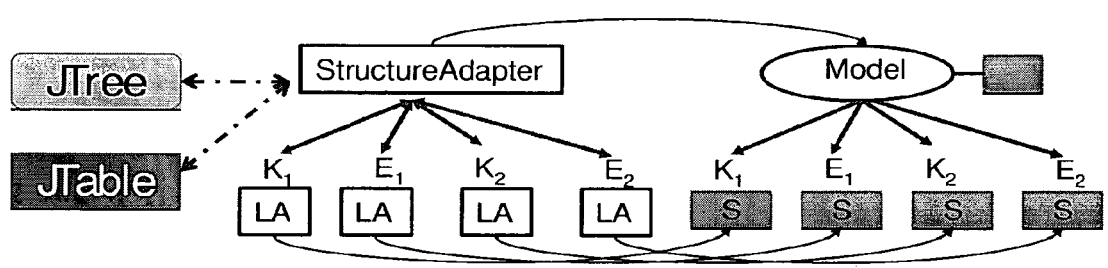
FIG. 24 is a block diagram illustrating an exemplary implementation architecture for automatic user interface generation using a universal toolkit model according to an embodiment of the subject matter described herein.

Universal tables are ideal for creating browsers, which are commonplace, but have not been automatically supported by any user-interface tool. To create a browser, the ObjectEditor provides the following call:
    edit (UniversalTable model, Container[ ] containers);
If the array, containers, is of size n, this call creates an n-level browser. A browser always decomposes a universal table into its keys. The top-level model is displayed in container [0]. When a key is selected in container[i], it displays the associated element in container[i+1], where 0<=i<n. FIG. 24 illustrates this scheme. Here, a three-level browser has been requested, and the top-level model is an instance of the class AnAccount, whose keys are strings and elements are of type AFolder:
    public class AnAccount implements UniversalTable <String, AFolder>
AnAccount has been bound to a tree widget, and AFolder to a table widget. The container array passed to the edit routine above consists of the left, top-right, and bottom-right windows, in that order. The toolkit shows the two String keys of the top-level model in the first container. Selecting the first String key in this container results in the associated folder element being displayed in the second container. Selecting one of the AMessage keys of this folder results in the associated String element to be displayed in the third container.

Like tables and trees, tabs, forms and browsers are structured model-aware widgets in that they are composed of components that are bound to children of the model. However, in the former, the nature of the automatically generated child components is fixed by the designer of the widget, while this is not the case in the latter. For example, a browser pane can consist of a table, tree, form, textbox or any other component to which a model is bound. The algorithms we have given above are independent of the exact widget bound to a model child. Support for such heterogeneous model-aware widget-structures is a fundamentally new direction for toolkits, but is consistent with the notion of supporting model-aware widgets. Some existing structured-widgets such as JTable do allow programmer-defined widgets to be embedded in a widget-structure, but the embedded widgets are not themselves model-aware widgets automatically supported by the toolkit. For example, a JTable or JTree cannot be automatically embedded in a JTable.

Figure 25:
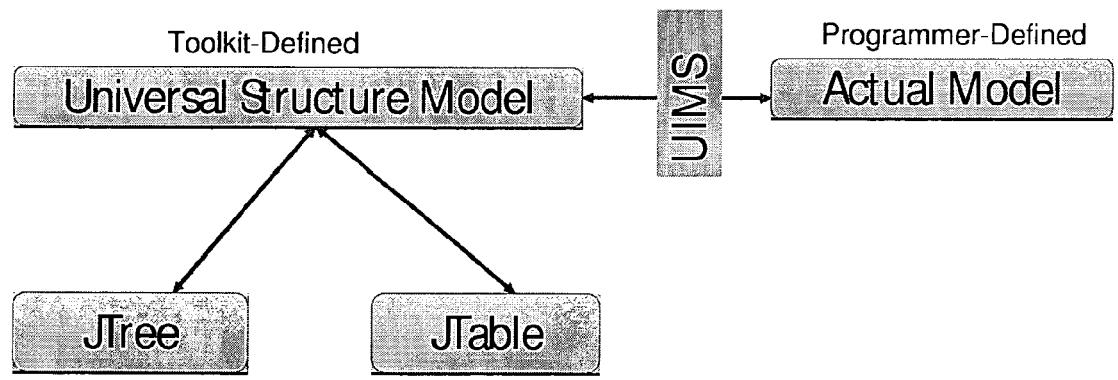
FIG. 25 is a block diagram illustrating interfacing with a UIMS to support programmer defined types according to an embodiment of the subject matter described herein.

Thus, an approach that allows a single model to be bound to both existing and new user-interface components is described above. There are many ways of implementing it. From a practical point of view, it should be possible to layer it on top of an existing toolkit without requiring re-implementation of existing model-aware widgets. This, in turn, requires adapters between the universal table models and the existing toolkit models. A separate adapter could be required for each existing toolkit model. For example, separate adapters could be defined for tree and table models. However, a more complicated and perhaps less modular approach is described in which a universal adapter that can support both existing and new widgets is defined. This adapter understands the universal table interface, and implements the interfaces of the models of the Swing tree and table widget. This approach allows us to create a single adapter tree that can be dynamically bound to multiple widgets concurrently (FIG. 25). The following algorithm describes the nature of the model structure, and how it is created:

```
UniversalAdapter createUniversalAdapter (Object model)
    if (model is UniveralTable)
        UniversalAdapter modelAdapter = new
        StructureAdapter(model);
        for each key, element of model
            UniversalAdapter keyAdapter =
            createUniversalAdapter(key)
            UniversalAdapter      elementAdapter     =
createUniversalAdapter(element)
            keyAdapter.setParent(modelAdapter);
            elementAdapter.setParent(modelAdapter);
            modelAdapter.setKeyElement(keyAdapter,
            elementAdapter);
    else return new LeafAdapter(model);
```

Unlike the model structure, the adapter structure includes back links from children to parents, which are required by the model of the Swing tree widget. These links also allow us to find the key associated with an element, which is needed to label the latter. Programmers can determine the universal adapter bound to a model, and retrieve information kept by it such as the parent adapter, children, and currently bound widget. Thus, they don't have to manually keep such bookkeeping information.

Figure 26:
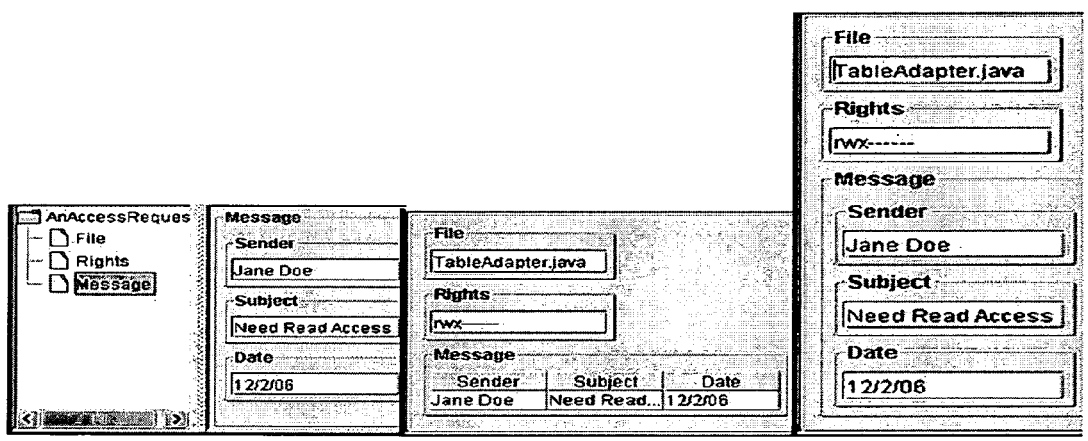
FIG. 26 is a computer screen shot illustrating automatically generated displays for a nested record according to an embodiment of the subject matter described herein.

FIG. 26 illustrates the use of universal adapters to simultaneously display a model using all structured-widgets supported by the toolkit. The model is an instance of AnAccessRequest with three fixed String keys, "File," "Rights," and "Message", which are associated with elements of type String, String, and AMessage, respectively.

6 Discussion

The interface of a model object and techniques for automatically binding it to both existing and new model-aware structured widgets are described. Thus, in comparison to existing user-interface toolkits, the present subject matter simultaneously supports a reduced model set and expanded model-aware widget set. Determining if the present subject matter meets the other two requirements presented in Section 3 requires more analysis.

The examples above include: (a) first, a top-down phase in which the interface of the universal table is derived from well-established display-agnostic semantic structures, and (b) then, a bottom-up phase in which additional methods are added to the interface needed by existing widgets. These methods do not increase the functionality of the model—their main purpose is to provide information the user-interface needs. For example, the user-interface needs to know the default key or element that should be added when the user executes the insert command. Similarly, it needs to know which keys and elements should be editable so that it can prevent the user from editing its visual representation.

Did the second phase compromise model purity? The answer, we argue, is no. The MVC architecture requires that the model be unaware of details of specific user-interfaces, so that these details can be changed without modifying the model. It is aware, however, that it will have one or more user interfaces—it allows views to be attached to it and sends notifications to them. The methods added to the MVC model play a similar role. The code in them also serves the same purpose as assertions. Assertions describe the behavior of an object to programmers, and prevent many mistakes. The additional methods we added in the bottom-up phase describe the behavior of an object to other objects—in particular the user-interface objects—and prevent mistakes. Consider the is Editable( ) methods. If a key or element is not editable, the model will not change it in the put method. However, an external object such as an editor would have to try to indirectly learn this behavior from repeated calls to the method. The is Editable( )methods make this behavior explicit. Similarly, the methods returning the default key/element make the most specific class of the key/element apparent, and prevent additions of components of the wrong type. Just as notifications are now also used by non user-interface objects, we can expect these additional methods to have more general uses in the future.

Consider now programming effort. Mostly, our model does not require programmers to expose any information that is not also required by models of Swing. One exception is the information about editability of table data and components. While the Swing table model requires this information, the tree model does not. As this information not only increases the user-interface functionality but, in the long term, can be expected to prevent mistakes, we can say it does not significantly increase the programming cost. On the other hand, Swing requires tree nodes to keep track of their parent, and indicate if they are leaf nodes. If programmers are not careful, a forward (child) link can easily become inconsistent with a back (parent) link, leading to significant debugging effort. Such links are kept by the present implementation but not the models. In addition, our approach uses keys as default labels of elements, which works in several user-interfaces such as the ones shown here. Thus, in some respects, our approach reduces the programming effort required to create models of even existing model-aware widgets. In summary, our approach meets the programming effort requirement.

This is not to say that the present design has created the best user-interface tool today. There is limited abstraction flexibility in that all models of a widget must implement the same toolkit-defined interface. In addition, programmers must manually determine the widget to be bound to a model, and set label and other user-interface attributes of these widgets. These are also limitations of existing toolkits. However, certain user-interface management systems (UIMS) such as [23, 24, 56, 57] provide higher abstraction and automation. For these tools, our approach provides a method for increasing portability and reducing programming cost. We described above a simple approach for converting between the universal tables and existing models. If such code is added for each toolkit, then by layering on top of the universal table, a UIMS becomes portable and does not have to worry about implementing the new model-aware user-interface components supported by the universal table. We are planning to use this approach in a UIMS we are implementing as part of the ObjectEditor software [56]. For example, the properties of an object defined through getters and setters will be mapped to record fields, and then, using the scheme described above, to keys and elements of a universal table, which acts a proxy between the object and the widget. The interface of such an object would be programmer-defined and, hence, not constrained to a universal table. Thus, this approach assumes that a structured widget is linked in a chain to two models: a toolkit-defined proxy-model and a client-defined real model. A UIMS can automatically translate between the events and operations of the two models, making the programmer oblivious of the toolkit-defined model. It is also possible to use this proxy-based approach in a manually created user-interface—but the programmer would have to be responsible for translating between the two models. By reducing the number of toolkit-defined models, our approach reduces the number of translators that have to be written in the proxy-based approach.

To conclude, at the most abstract level, one message present herein is that a toolkit should support both model and editor substitutability. At the next-level are the requirements of reduced model set, same or increased model-aware widget set, same or decreased programming effort, and model purity. The universal table interface and methods for mapping it to sequences, sets, records and nested tables and binding it to tables, trees, forms, tabbed panes, and browsers provide one approach to meeting these requirements. More work is required to extend and refine the requirements and approach, use and evaluate the approach, and incorporate it in higher-level tools.

Programmer and User Customization of Generated User Interfaces

Figure 27A:
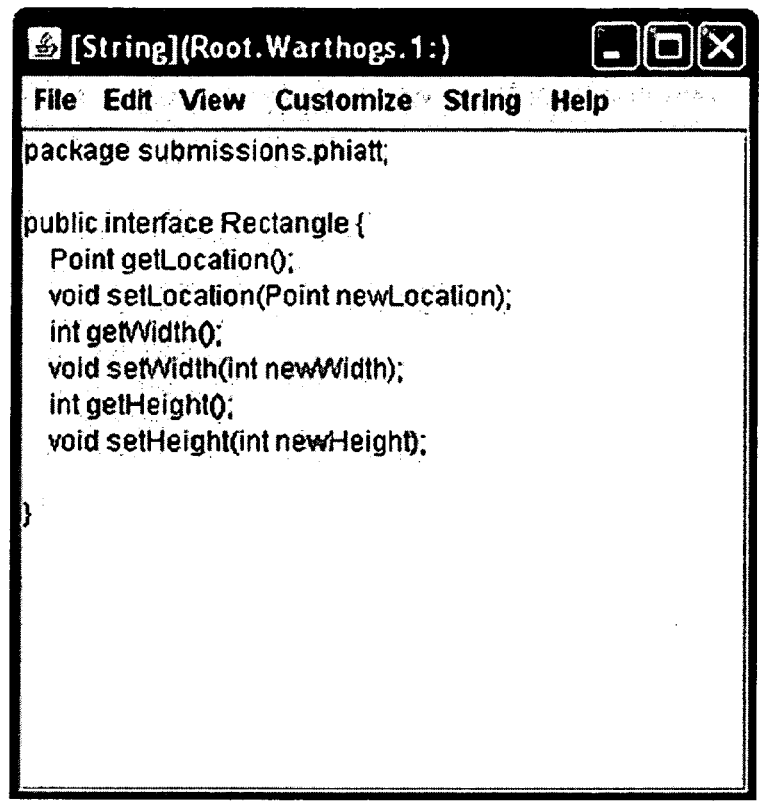
FIGS. 27(a)-27(e) are computer screen shots illustrating examples of user customization of an automatically generated user interface according to an embodiment of the subject matter described herein.
Figure 27B:
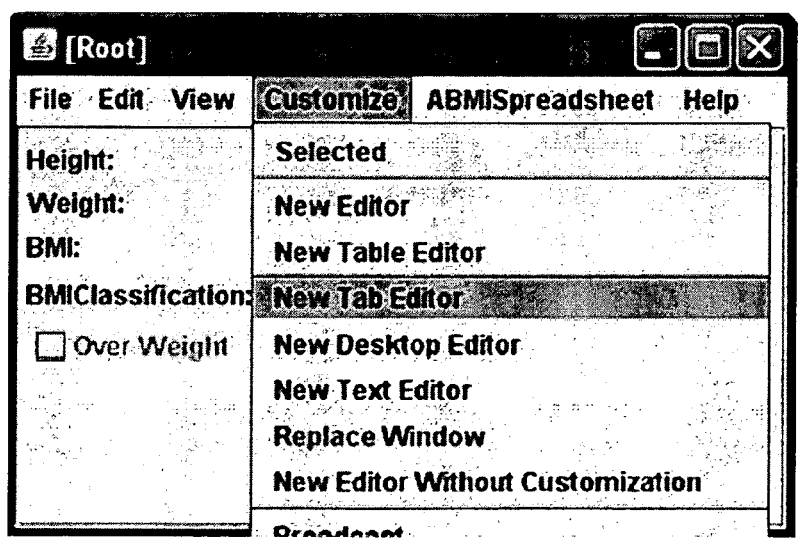
Figure 27C:
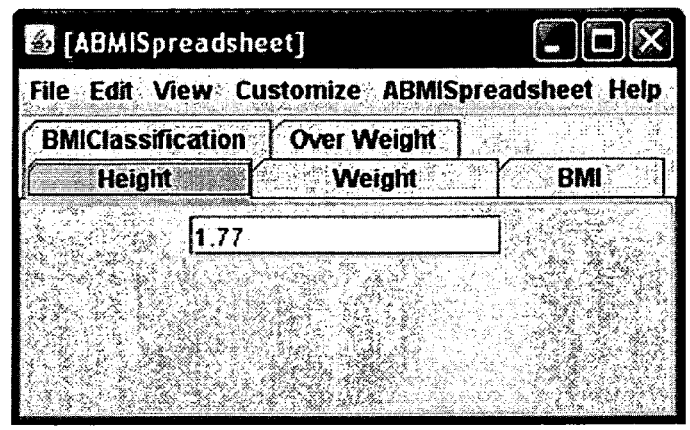
Figure 27D:
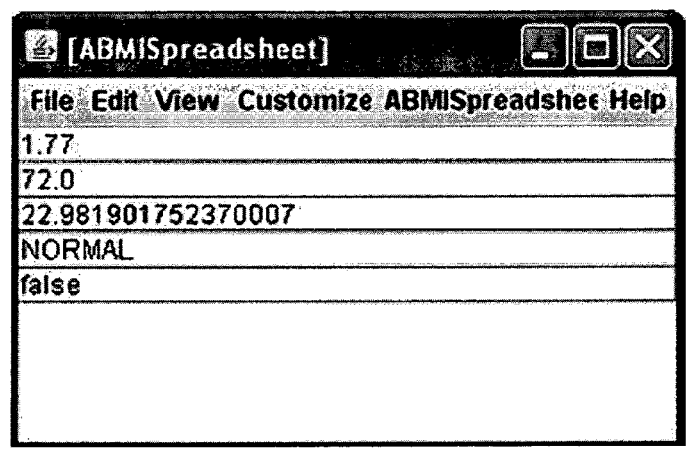
Figure 27E:
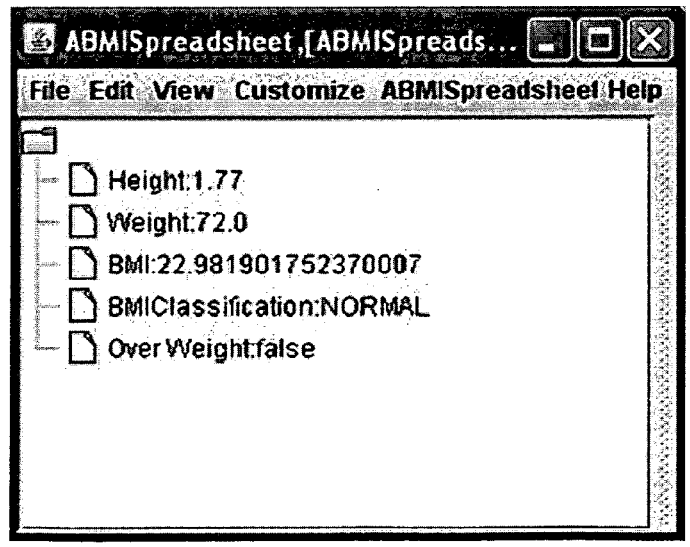

In the examples above, various patterns are identified and bound to corresponding user interface widgets. According another aspect of subject matter described herein, a user interface generator, such as ObjectEditor described above, may provide for the application programmer or the end user to customize programming patterns. As illustrated in some detail in the context of networked devices how programmers can customize the user interface. Users can also do so interactively and in fact the user actions can be translated automatically to code that is linked to the program. FIGS. 27(a)-(e) show some simple examples of user customization. In FIG. 27 (a) the default user-interface is shown in which the BMI application is bound to a form widget, In FIG. 27(a), the user asks for a new user interface (FIG. 27(b)) that binds the application to a tab user interface, in which each logical component is shown in a separate tab. FIGS. 27(c) and (d) show the application bound to a table and tree widget. FIG. 27(e) is a more complex mapping, wherein the same logical component, BMI, is simultaneously bound to a text widget, slider widget, and progress bar, simultaneously. All user interfaces are kept consistent with each other.

ObjectEditor Customization

The discussion in this section illustrates additional examples of customizing automatic user interface generation. One feature that distinguishes ObjectEditor from other user-interface tools is its completely automatic generation of the user interface of any Java object. In automatic user interface generated, the user interface that is generated by an automated system may not be the one you may desire. One could imagine using it as a prototyping tool that is replaced with a handcrafted user-interface in a production setting. As described above, the fact that the application code is completely oblivious to ObjectEditor (following the MVC pattern) makes this replacement relatively easy.

However, the replacement approach has the disadvantage that we must sacrifice all of the automation of ObjectEditor. Sometimes we agree some of the user-interface decisions taken by ObjectEditor and disagree with others. Ideally, we should be able to customize its generation process by overriding the ones with which we disagree while retaining the ones with which we agree.

As it turns out, it is very difficult to provide a customized generation process that is able to anticipate and implement all the decisions which users may wish to override while providing an easy to use mechanism for customization. Such a generation algorithm is a subject of the research of my group, and please let me know if you wish to contribute to it.

The present subject matter supports both interactive customizations, where you use a GUI to override the generation process, and programmed customizations, where you write Java customization code that gets added to the generator. This section describes some of the both kinds of customizations supported by ObjectEditor.

Instance-Specific Customization

FIG. 28 shows an example of ObjectEditor-based customization. In FIG. 28(a), the user selects the BMI property of an ABMISpreadsheet instance, pulls down the Customize menu, and chooses the "selected" menu item to indicate that the selected property must be customized. ObjectEditor responds by displaying some of the attributes of the property that determine how it is displayed (FIG. 28(b)). The user next edits the label attribute, pulls down the File menu, and chooses the "update" item to ask ObjectEditor to regenerate the user interface ((FIG. 28(c)). The label of the BMI property changes to reflect its new value (FIG. 28(d)). (ObjectEditor chooses the default display of a property or method name as follows. It breaks the property or method identifier into words based on_characters and transitions from lower to uppercase letters, and in the screen representation of the identifier, capitalizes the first letter, and uses a blank as a separator. Thus, the label of the method named "calculateBMI" becomes "Calculate BMI".)

Figures 29A, 29B:
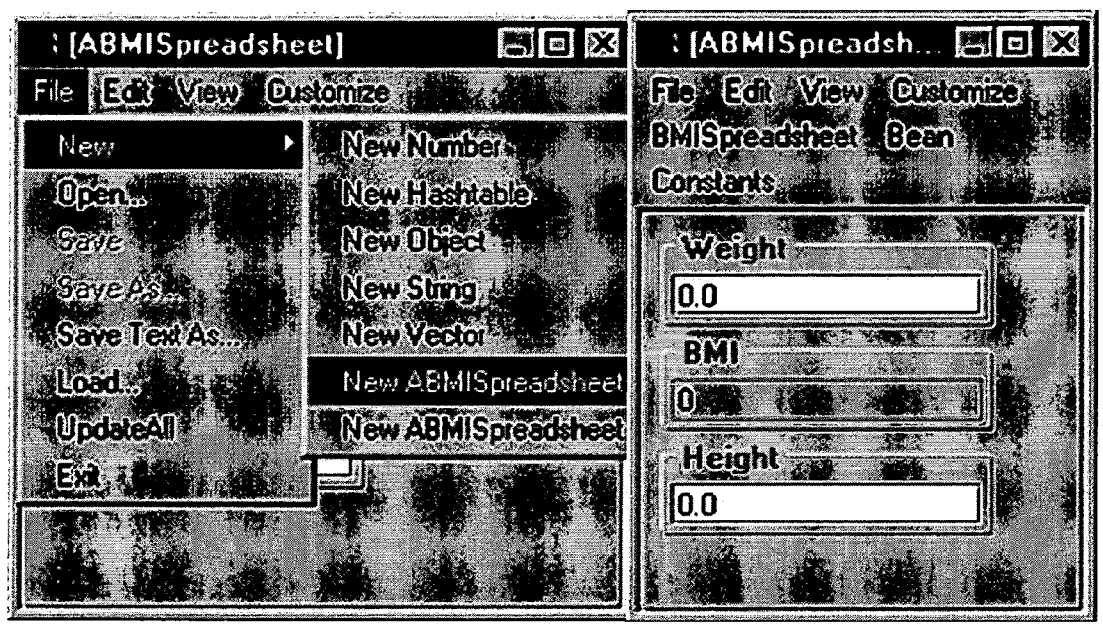
FIGS. 29(a) and 29(b) are computer screen shots illustrating further examples of instance-specific customization according to an embodiment of the subject matter described herein.

Let us create the user interface of another instance of ABMISpreadsheet by selecting File→new→New ABMISpreadsheet (FIG. 29(a)). The user interface shows the original (default) value of the label for the BMI property (FIG. 29(b)). The reason is that the customization we did for the ABMISpreadsheet instance of FIG. 28 applied only to that instance—not to other instances of the same class.

Class-Based Customization

Figure 30A:
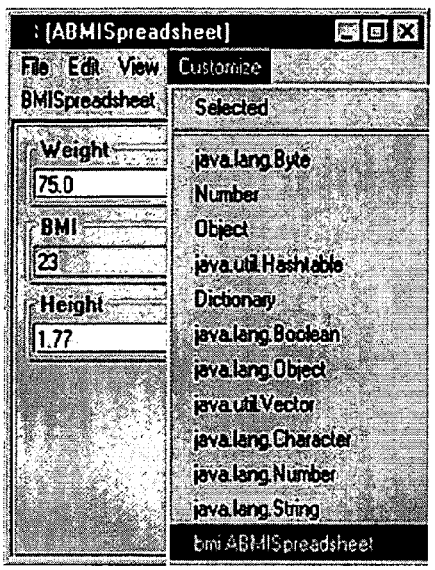
FIGS. 30(a)-30(d) are computer screen shots illustrating examples of class-based customization according to an embodiment of the subject matter described herein.
Figure 30B:
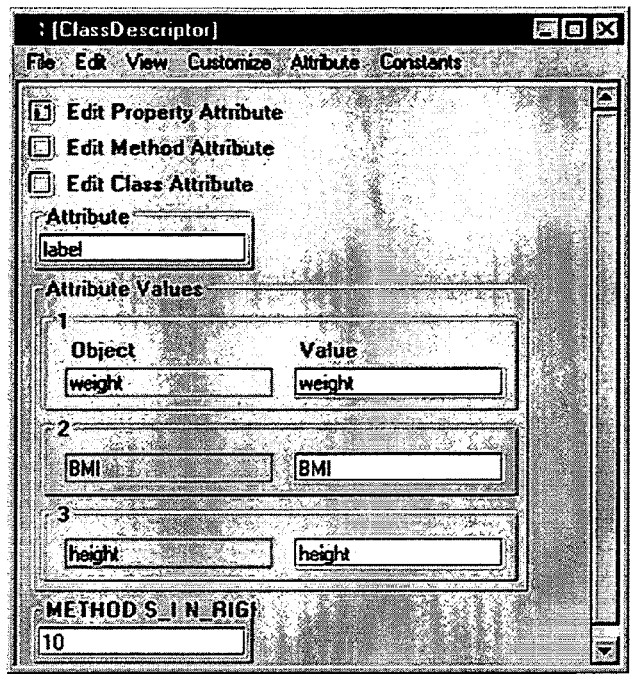
Figure 30C:
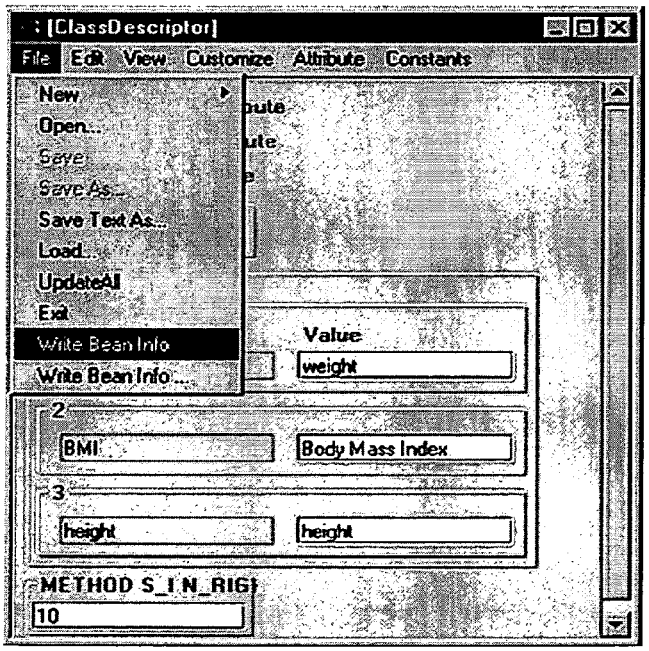
Figure 30D:
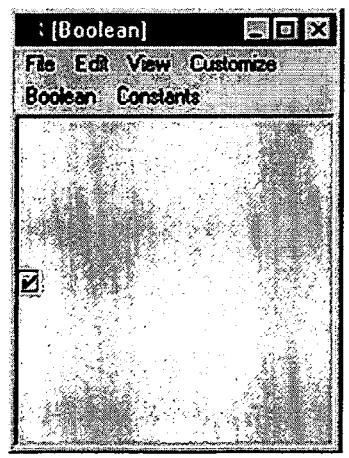

Changing a display attribute for all instances of a class requires a different (and more) elaborate process, illustrated below. As before, let us display an instance of ABMISpreadsheet and use the Customize menu. This time however, we do not need to select anything on the screen before pulling down the menu, as the menu item we choose is not "Selected" but the name of the class to which we wish to apply our customization (FIG. 30(a)). The customization window displayed (FIG. 30(b)) is very different from the one we saw earlier in FIG. 28(b). We will gradually look at the full functionality of the window. For now let us focus on changing the label of the BMI property of all instances of ABMISpreadsheet. The labels of all three properties are shown in the Attribute Values table. We can enter the new value of the BMI label, hit Enter, and execute the File→WriteBeanInfo command (FIG. 30(c)). If this command is successfully executed, a checked box is displayed (FIG. 30(d)), otherwise an unchecked box is displayed.

Figures 31A, 31B:
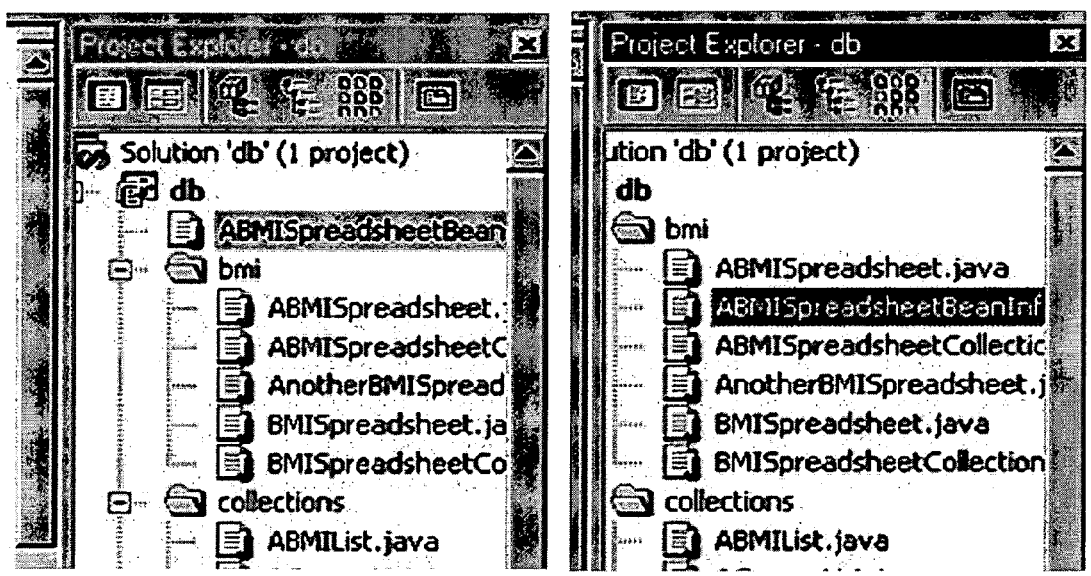
FIGS. 31(a) and 31(b) are computer screen shots illustrating further examples of class-based customization according to an embodiment of the subject matter described herein.

A successful execution of this command generates a new Java class, named ABMISpreaedsheetBeanInfo, that stores the values of the attributes we changed for ABMISpreadsheet. It is an example of the general notion of a BeanInfo class supported by the Java Bean framework to customize classes. In general, if the customized class is named C, then the customized class is named CBeanInfo. Both classes must be in the same package and hence directory. ObjectEditor does put the correct package declaration in the BeanInfo class it generates. In our example, since ABMISpreadsheet was in the package bmi, it puts the declaration:

package bmi;

as the first line in the definition of ABMISpreadsheetBeanInfo. However, as shown in FIG. 31(a), it does not put the file associated with the class in the directory associated with the package, storing it instead in the directory from which ObjectEditor was executed. Therefore, our next step is to move the file to the correct directory (FIG. 31(b)) (We would not need to this step if the customized class did not have a package declaration.)

Figure 32A:
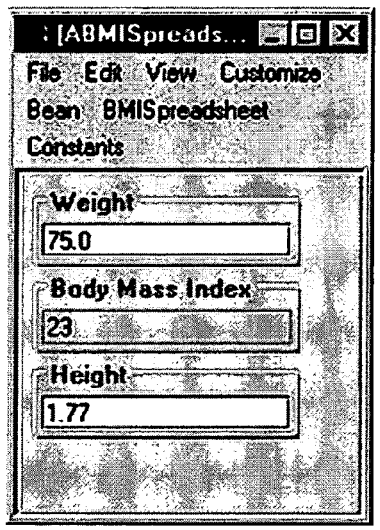
FIGS. 32(a)-32(d) are computer screen shots illustrating further class specific customization according to an embodiment of the subject matter described herein.
Figure 32B:
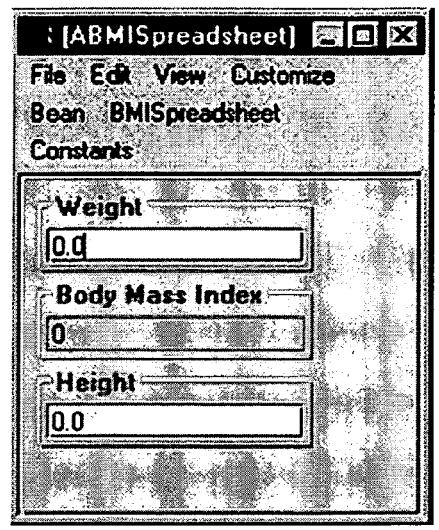
Figure 32C:
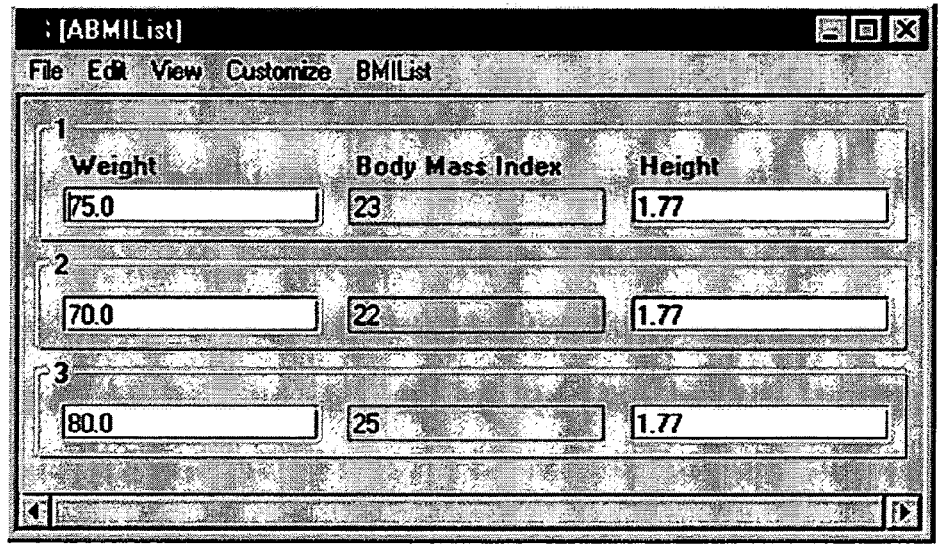
Figure 32D:
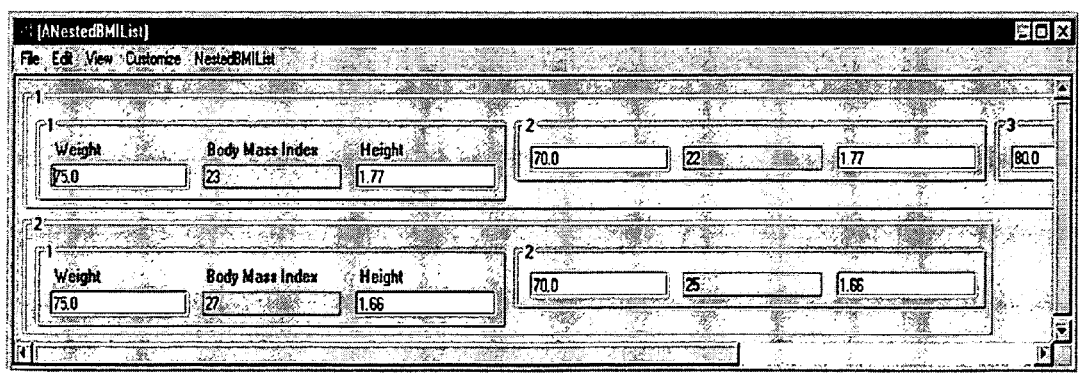

Finally, we need to compile the Beaninfo file. The next time we run ObjectEditor to display any instance of ABMISpreadsheet, we see the changed label. As we see in FIG. 32, the changed label applies not only to stand-alone instances that form root objects of ObjectEditor windows (FIGS. 32(a) and 32(b)) but also those instances that are assigned as values of properties of other objects. FIG. 32(c) shows the changed label in a display of an instance of a ABMIList, which is a list of instances of ABMISpreadsheet, while FIG. 32(d) shows its value is a display of ANestedB-MIList, which is a list of instances of ABMIList.

Instance-Specific Vs. Class-Specific Customization

Both instance-specific and class-specific customizations have their advantages and can be used together. While we will seldom wish to customize a specific instance, we can use the former to instantaneously test the effect of the customization on a specific instance before we use the latter to apply it to all instances. Currently these two approaches are not integrated—it is not possible, after testing customization on a specific instance to ask ObjectEditor to apply it to the whole class. We must redo the customization for the whole class as in FIG. 29.

Property Vs. Object Vs. Method Attribute

We have seen above how to customize attributes of properties. It is also possible to change attributes of methods of objects and the whole object itself, as will now be described.

Figure 33A:
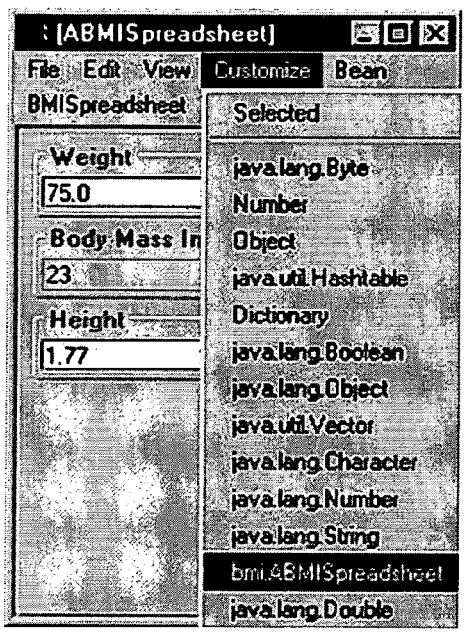
FIGS. 33(a)-33(d) are computer screen shots illustrating examples of customization of a method attribute according to an embodiment of the subject matter described herein.
Figure 33B:
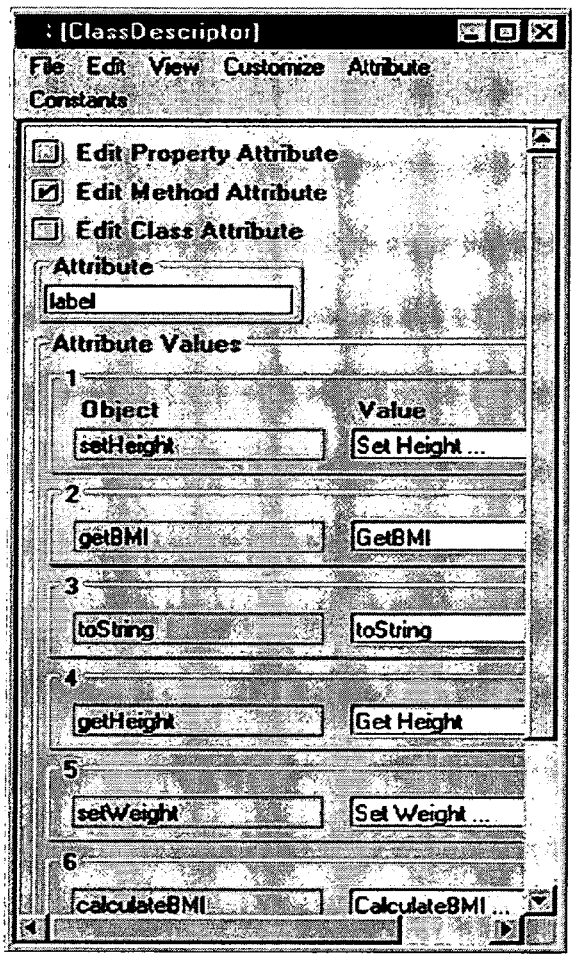
Figure 33C:
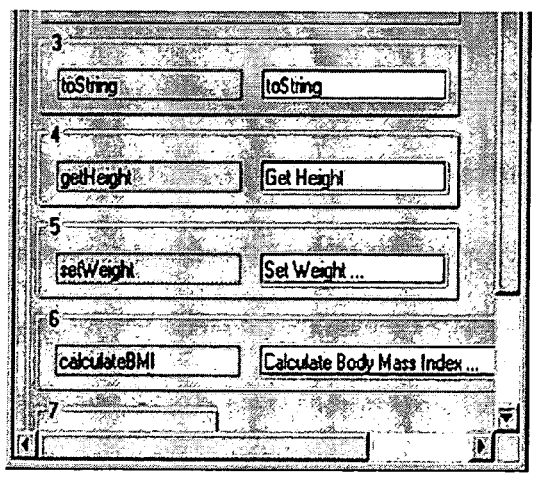
Figure 33D:
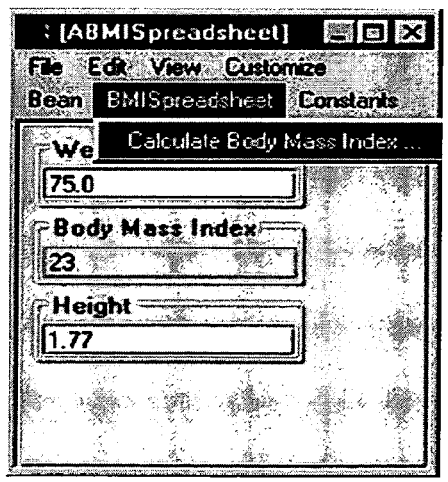

Let us again display an instance of ABMISpreadSheet and execute Customize→ABMISpreadsheet (FIG. 33(a)). Next we click on the "Edit Method Attribute" field to display the values of the label attributes of all public methods of ABMISpreadsheet (FIG. 33(b))). Let us next change the label of the method calculateBMI from "CalcluateBMI . . . " to "Calculate Body Mass Index . . . " (FIG. 33(c)). This has the effect of changing the name displayed in the user interface for the method (after hitting Enter, saving and compiling the Bean Info file, and running ObjectEditor), as shown in FIG. 33(d).

Figure 34A:
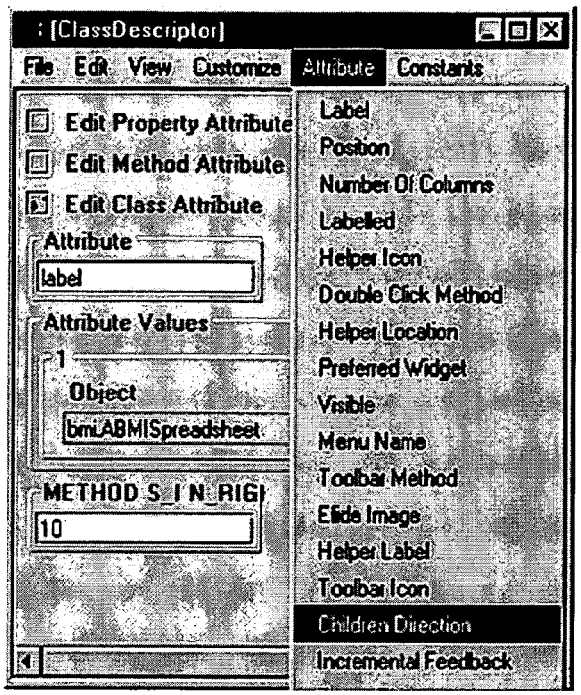
FIGS. 34(a)-34(f) are computer screen shots illustrating examples of customization of object attributes according to an embodiment of the subject matter described herein.
Figure 34B:
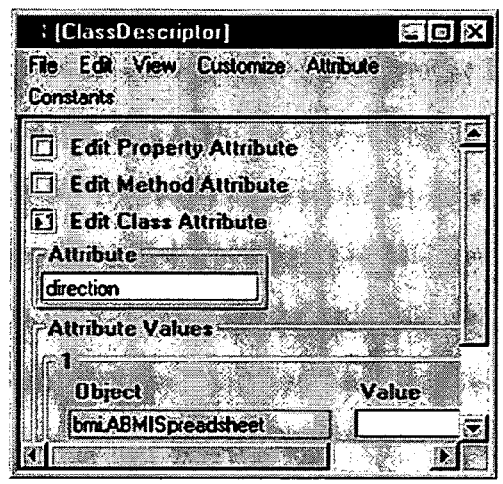

Similarly, we can click on the Class Attribute field to change an attribute of the complete object. Instead of the default label attribute, let us choose the "direction" attribute, which can be specified by executing Attributes→Children Direction (FIG. 34(a)). This attribute indicates the alignment of the properties of the object. So far, we have not specified any value for this attribute, as shown in FIG. 34(b). As a result, ObjectEditor is free to choose the alignment of the object based on its context. When the object appears as the top-level object in a window, it chooses the vertical alignment (FIGS. 32(a) and 32(b)). However, if it appears as a property of a containing object, it chooses the horizontal alignment to create tabular displays (FIGS. 32(c) and 32(d)).

Figure 34C:
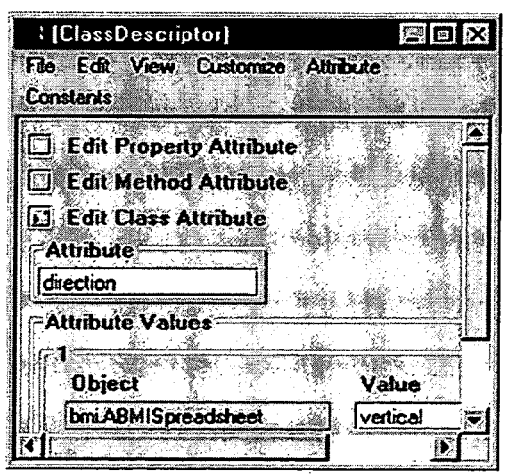
Figure 34D:
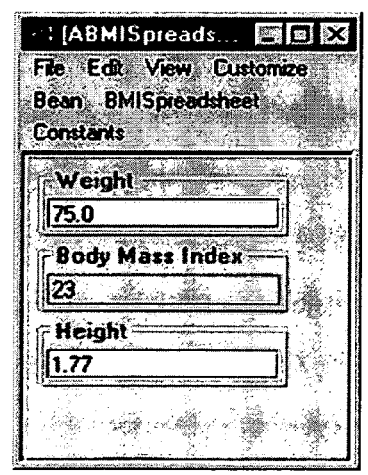
Figure 34E:
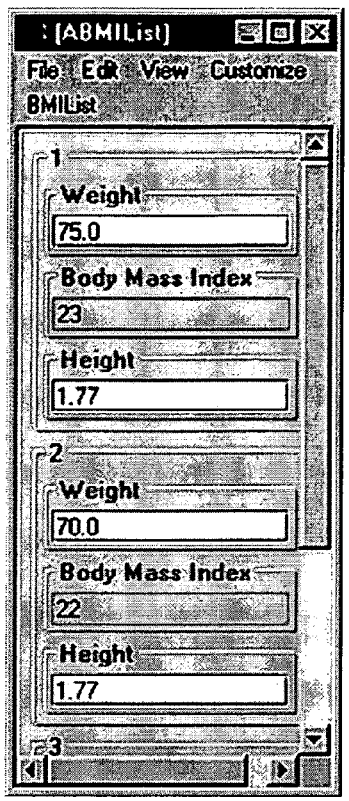
Figure 34F:
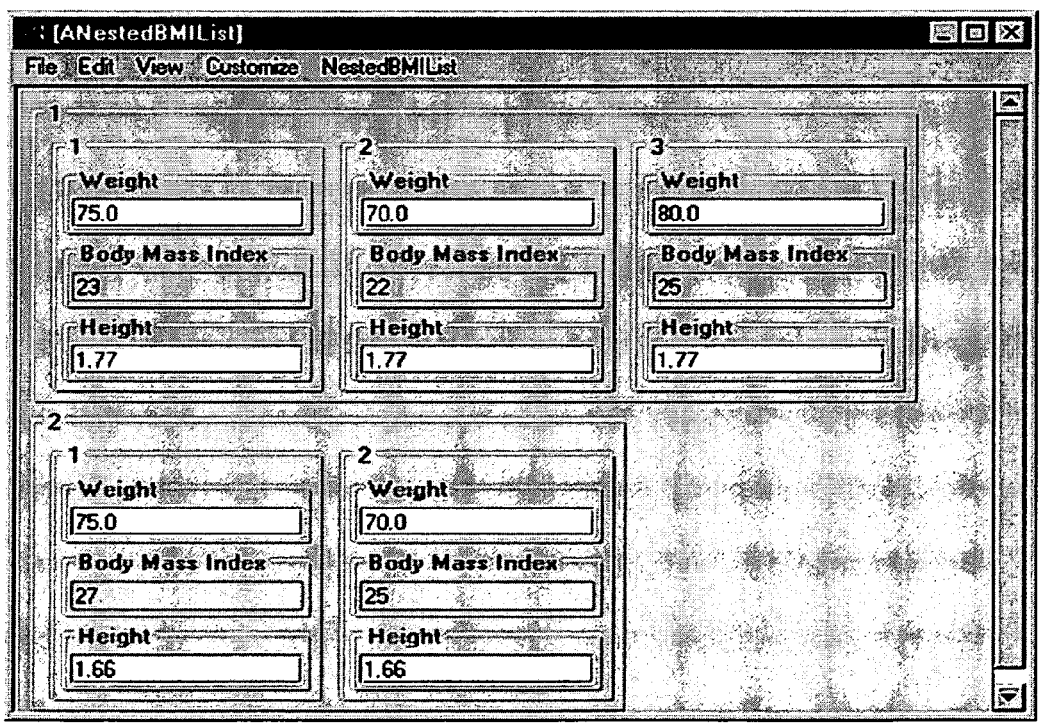

Let us set the value of the attribute to "vertical" to override ObjectEditor's choices for it (FIG. 34(b)). This has the effect of aligning the displays of the object, both stand-alone and embedded, to vertical (FIGS. 34(c), (d) and (f)).

Using Object Context to Override Attribute Values

The new display of ABMIList is worse than its previous one, as it is not a compact table. This happened because we manually set the attribute and thus cannot rely on ObjectEditor to use an appropriate value based on context. It is possible to overcome this problem by manually specifying an attribute value to be used in a certain context that overrides its context-independent value. In fact, we have already seen the mechanism for specifying context-specific attribute—when we specify a property, we indicate the value of the attribute for an object that is assigned to the property. This value overrides any context-independent value of the attribute of the object.

Figure 35A:
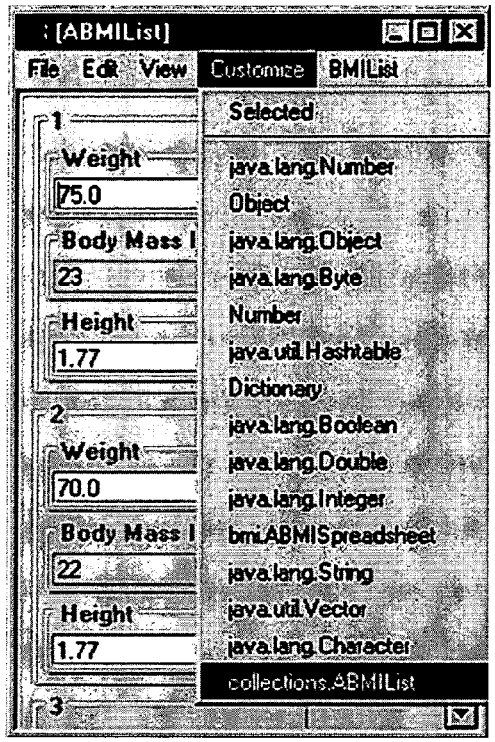

Let us illustrate this overriding by improving the display of ABMIList. This time we will display an instance of this class instead of ABMIspreadheet and then execute Customize→ABMIList (FIG. 35(a)). We keep the selected value of the Edit Property Attribute and use the Attribute menu to choose the direction attribute. In the Attribute Values table, a single property named "element" is displayed. This property represents all dynamic elements of ABMIList. Let us specify the "horizontal" value for the direction attribute of this property (FIG. 35(c)). The effect of this change is to align horizontally the children of those instances of ABMISpreadsheet that become elements of instances of ABMIList. As a result, the displays of instances of both ABMIList and ANestedBMIList revert to their old forms (FIGS. 35(d) and 35(e)) while a stand-alone display of ABMISpreadsheet stays vertical.

Figure 35B:
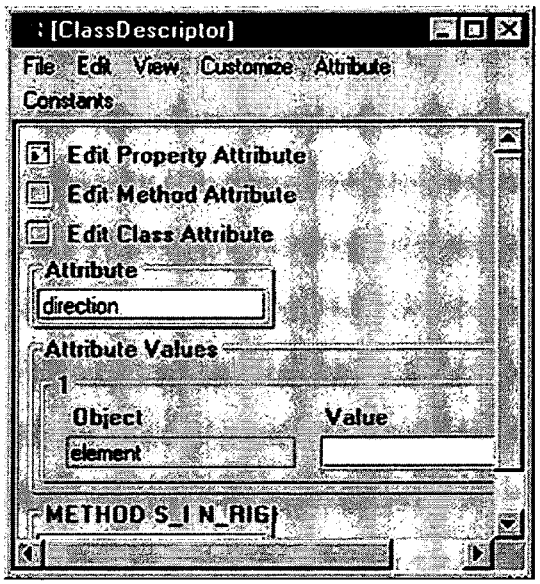
Figure 35C:
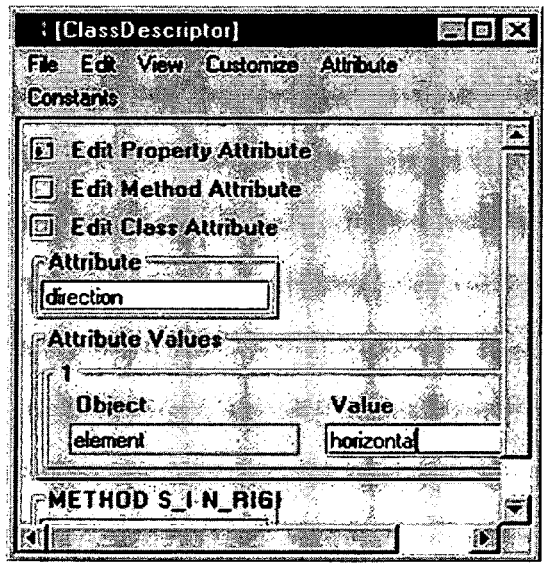

What we if we wanted the (children of) instances of ABMISpreadsheet shown in FIG. 35 (e) to be aligned vertically without changing the horizontal alignment of those displayed in FIG. 35 (d)? This would require supporting two-level contexts—we would need to special case those instances of ABMISpreadsheet that are elements of those instances of ABMIList that are elements of ANestedBMIList. In general there are an infinite number of possible contexts because of the possibility of recursive objects. Moreover, not all of them can be known to ObjectEditor because of polymorphism. For example, a property of type Object can be assigned instances of arbitrary classes with different properties. Furthermore, the more the levels in a context, the harder it is for the user to specify it. Therefore, ObjectEditor currently supports only one-level contexts defined by setting property attributes.

A simple rule of thumb we have found for avoiding any confusion is:

Specify attributes of those displayed values that are objects as object attributes.

Specify attributes those displayed values that are not objects as property attributes of objects containing them.

For example, specify the attribute of the BMI values, which are ints, as property attributes, but specify attributes of ABMISpreadsheet instances as object attributes. Use this rule until you get sophisticated enough to understand the overriding of attributes in a one-level context.

Attributes

We have seen above the conceptual framework behind setting user-interface attributes—in particular the entities on which these attributes are set and the attributes are inherited. We have also seen two specific attributes it useful to customize—the label and children alignment. By customizing the label, we do not have to play around with identifier names to get the right screen labels for them. (The label attributed does not currently seem to defined for methods.) By changing the direction, we have control over how (logical) children of structured types are displayed. The default screen display algorithm uses the logical structure of an object to determine how it is displayed. By fixing the alignment, we do not have to play with the logical structure to get the right screen structure.

As we have seen above, an attribute has two names—one such as "Children Direction" that appears in the Attribute menu and another such as "direction" that is appears as the value of the Attribute field. The former is meant to be the name used by end users while the latter is the value stored internally. (We should really unite these two naming schemes.) We will refer to an attribute by the name that appears in the Attribute menu rather than field.

Let us consider some other useful attributes supported by ObjectEditor.

Frame Title Object Attribute

The frame title attribute of an object determines the title of the frame created by ObjectEditor when it is the root object displayed in the frame. For example, if we change this attribute of ABMISpreadsheet instances to "BMI Tool" (FIG. 36 (a)) then this value is used as the title of an ObjectEditor frame in which such an instance is root object. This attribute does not determine the title of a frame in which these instances are subobjects (such as FIG. 36 (b)). The default value of this attribute is the name of the class of the object.

Position Property Attribute

One of the annoying aspects of the ObjectEditor layout is the arbitrary order in which the properties of an object are displayed. Changing the order in which the getters and setters of these properties does not make a difference to their display positions as ObjectEditor looks at the executable rather than source code (the order in which Java's reflection API returns the getters and setters determines the default positions of the positions.) The Position attributes of the properties can be explicitly set to fix the display order. In FIG. 37, the position attributes of the three properties of ABMISpreadsheet are set to create the display order shown in FIG. 37(b). The default value of this attribute is −1 which indicates an arbitrary ObjectEditor chosen position. It would be useful to devise a better default algorithm that displays readonly properties (such as BMI) after editable properties and displays each list of properties in alphabetical order. The rationale for this rule would be that readonly properties can be expected to be computed from the editable ones and users expect properties to be displayed after the ones from which they are computed.)

Number of Columns Property Attribute

Figure 38:
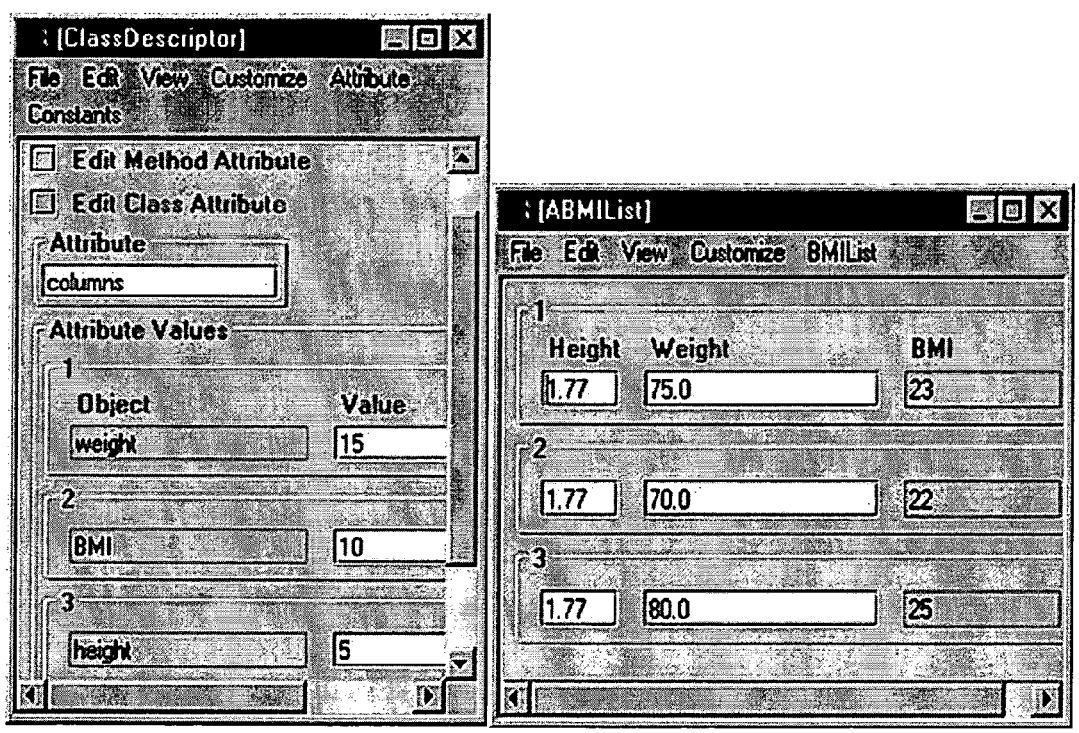
FIG. 38 includes computer screen shots illustrating examples of the setting of the number of columns attribute of the ABMIspreadsheet object according to an embodiment of the subject matter described herein.

The Number of Columns attribute of a property determines the size of a text widget used to display it. In FIG. 38, the three properties of ABMISpreadsheet objects are associated with different numbers of columns.

Visible Property Attribute

Figure 39A:
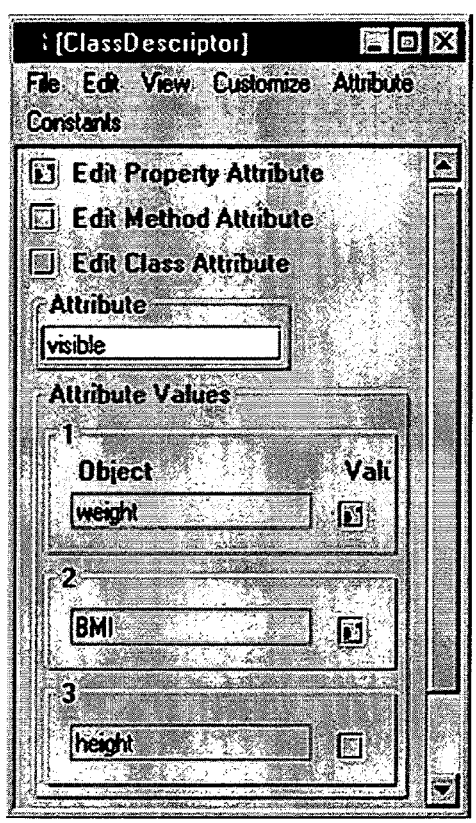
FIGS. 39(a) and 39(b) are computer screen shots illustrating examples of the setting of the visible attribute of the ABMIspreadsheet object according to an embodiment of the subject matter described herein.
Figure 39B:
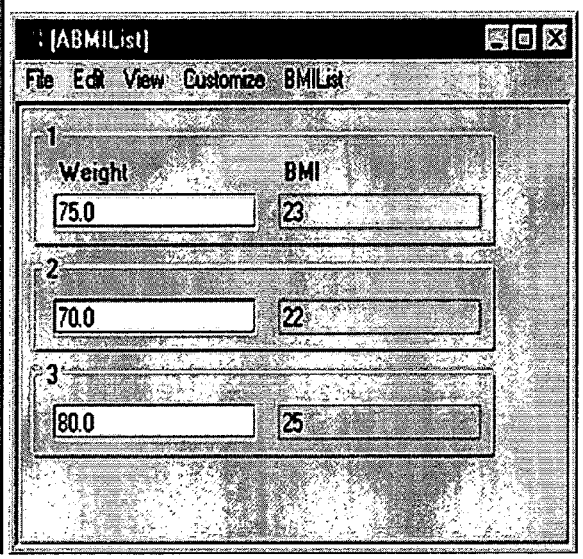
Figure 40:
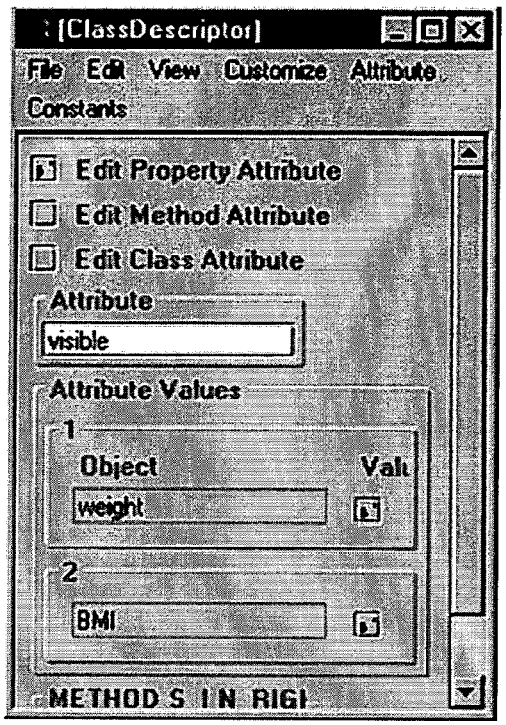
FIG. 40 is a computer screen shots illustrating that invisible properties of the ABMIspreadsheet object are not customizable according to an embodiment of the subject matter described herein.

ObjectEditor divides methods in getters/setters and ordinary methods. Getters/setters define properties displayed in the property window. This may lead to undesired display of the object state. For example, if we do not wish to display in the property window the height used to compute the BMI, we can rename the method that returns its value from getHeight( ) to height( ).he visible boolean attribute of a property allows us to remove it from the display without having to play around with the name of the method that returns its value. If this attribute is set to false, then this property is never included in the display of the containing object. In FIG. 39 (*a*), we have set the visible of the height attribute of ABMISpreadsheet. FIG. 39(*b*) shows that the display of the height is excluded from the display of elements of an instance of ABMIList. FIG. 40 shows that invisible properties are not customizable.

Preferred Widget Property Attribute

Figure 41:
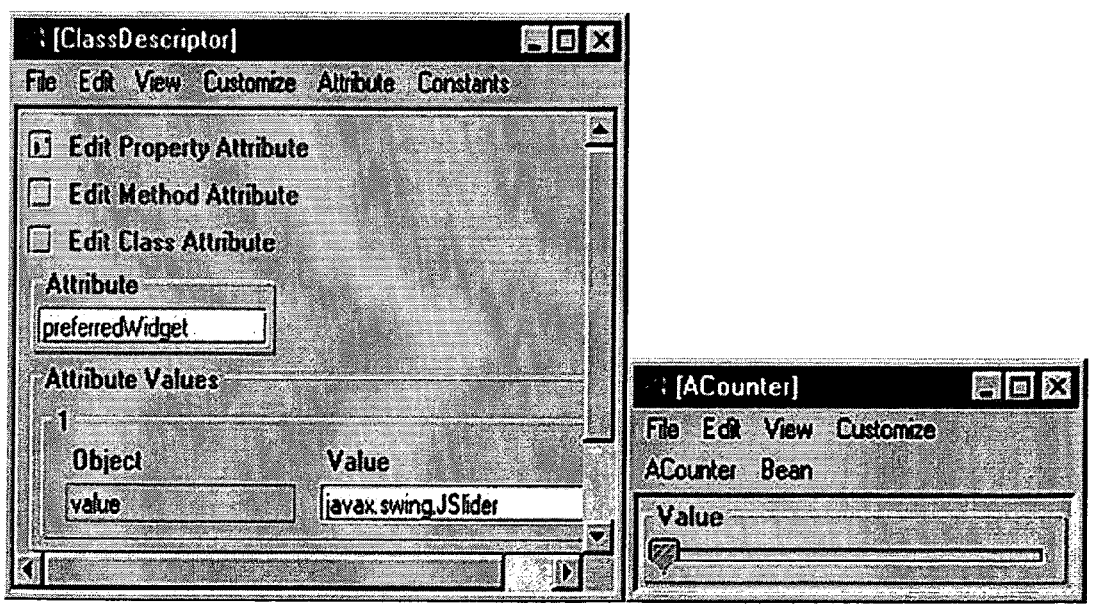
FIG. 41 includes computer screen shots illustrating examples of the setting of the preferred widget attribute of the value property of an Acounter object according to an embodiment of the subject matter described herein.

We may wish to control not only whether a property is displayed or not but also how it is displayed. Currently, the only choice ObjectEditor gives in this regard is to allow us to determine if a text or slider widget is used to display an integer value. By default, the text widget is used. The Preferred Widget attribute of a property can be used to choose the widget, as shown in FIG. 41. In FIG. 41(*a*) the attribute of a counter value is set to "javax.swing.JSlider" to ensure that the value is displayed as a slider (FIG. 41(*b*)).

Menu Name Method Attribute

Figure 42A:
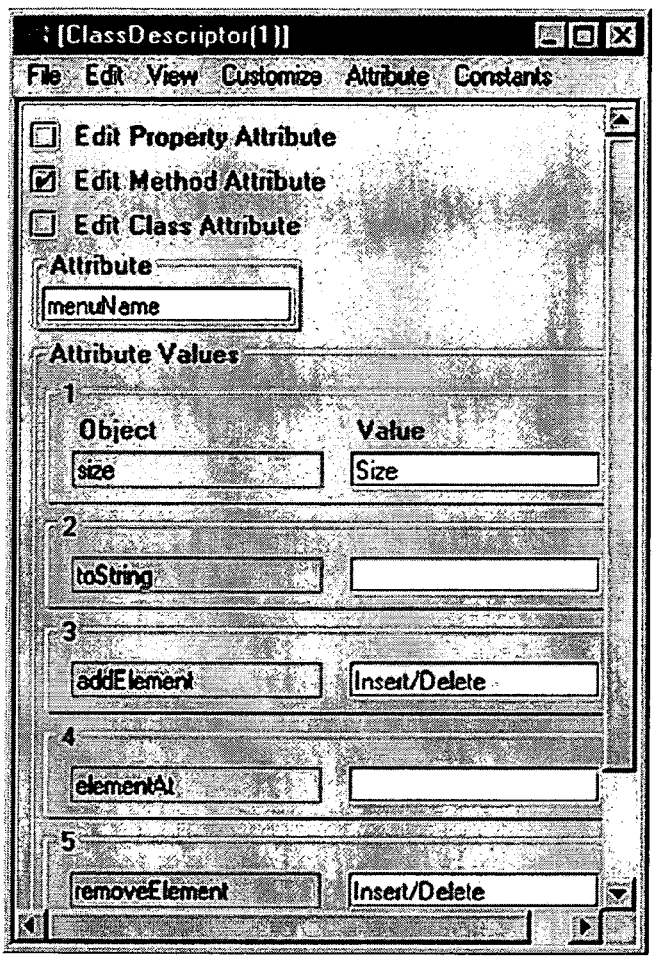
FIGS. 42(a) and 42(b) are computer screen shots illustrating examples of the setting of the menu name method attribute according to an embodiment of the subject matter described herein.
Figure 42B:
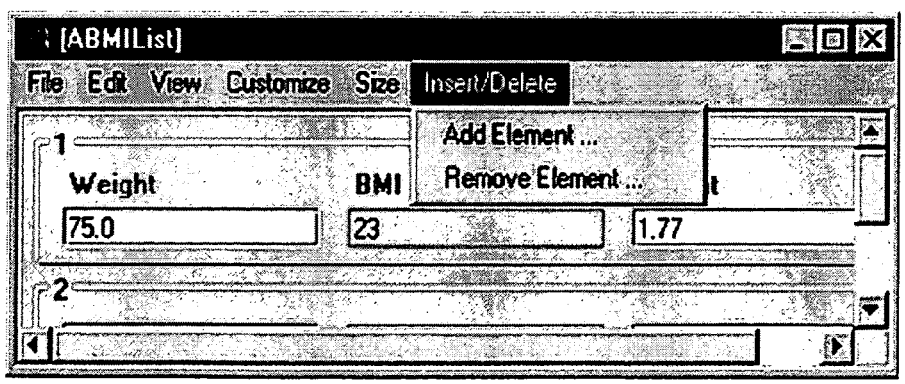

As we have seen before, it is possible to invoke methods directly (rather than indirectly by displaying and editing properties) by choosing them from menus. By default, all methods implemented in some class are put in a menu whose name is derived from the name of the class. For example, the methods declared in class ABMIList are put in a menu named BMIList. It is possible to put these methods in different menus with names defined by us by setting the Menu Name attribute of a method. In FIG. 42(*a*), the addElement( ) and removeElement( )methods are put in a menu called Insert/Delete, the size( ) method in a menu called Size, and the toString( ) and elementAt( )methods in no menu. As a result, the BMIList menu is replaced by Size and Insert/Delete menus with the appropriate methods (FIG. 42(*b*)).

Label Method Attribute

Figure 43A:
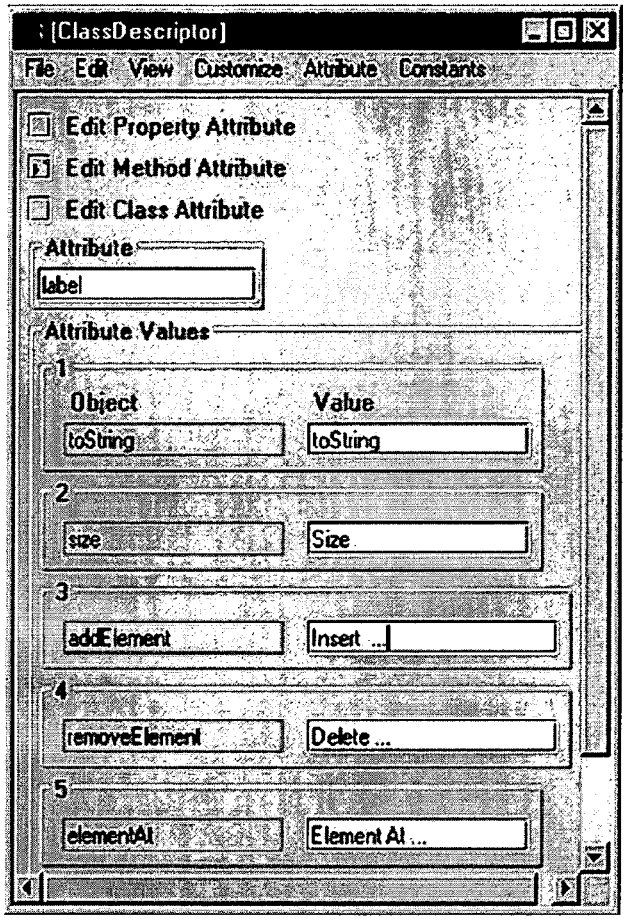
FIGS. 43(a) and 43(b) are computer screen shots illustrating examples of the setting of label attributes of methods of ABMIList according to an embodiment of the subject matter described herein.
Figure 43B:
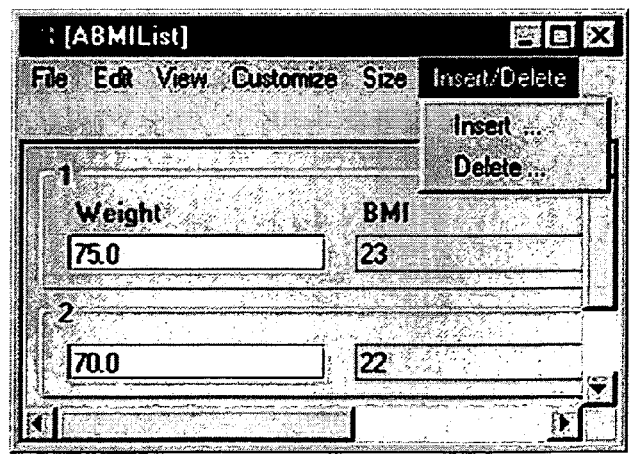

We can also choose the name used to display a method in a menu or toolbar by setting its label attribute as shown in FIG. 43. The labels of the addElement( ) and removeElement( ) method s are set to "Insert" and "Delete" respectively (FIG. 43(*a*)), which changes the names of the corresponding menu items.

Method Toolbar Icon Attribute

Figure 44A:
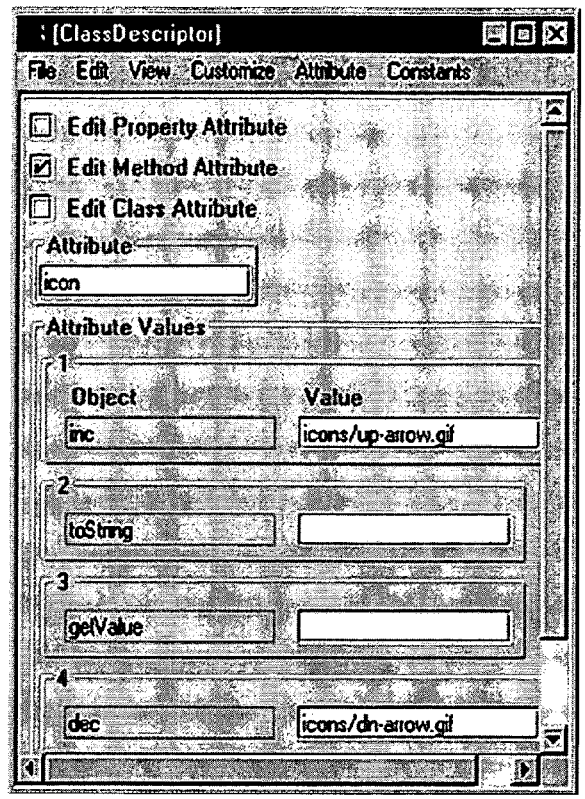
FIGS. 44(a) and 44(b) are computer screen shots illustrating examples of toolbar icon attributes of methods of Acounter according to an embodiment of the subject matter described herein.
Figure 44B:
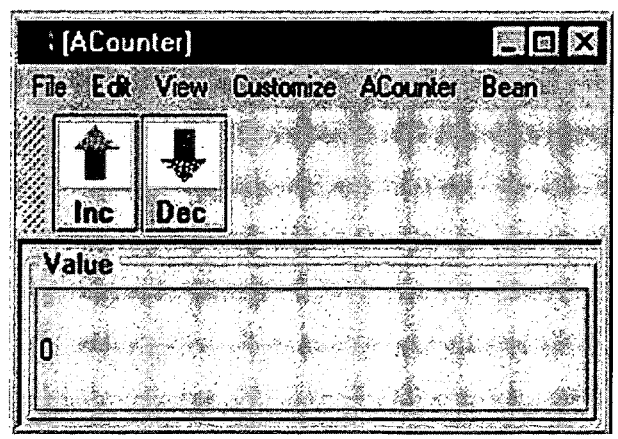

Methods can be invoked not only from menus but also toolbars. The View→Toolbar command shows/hides the toolbar. A toolbar can not only show the label of the associated method but also an icon (gif file) associated with it. The Toolbar Icon attribute of the method stores the name of the gif file describing its icon. In FIG. 44(*a*) the icon method attributes of the inc( ) and dec( )methods of a counter are set to gif files containing up and down arrows. FIG. 44(*b*) shows that the toolbar shows both the labels and icons of the two methods.

"Popup Method" Method Attribute

Figure 45A:
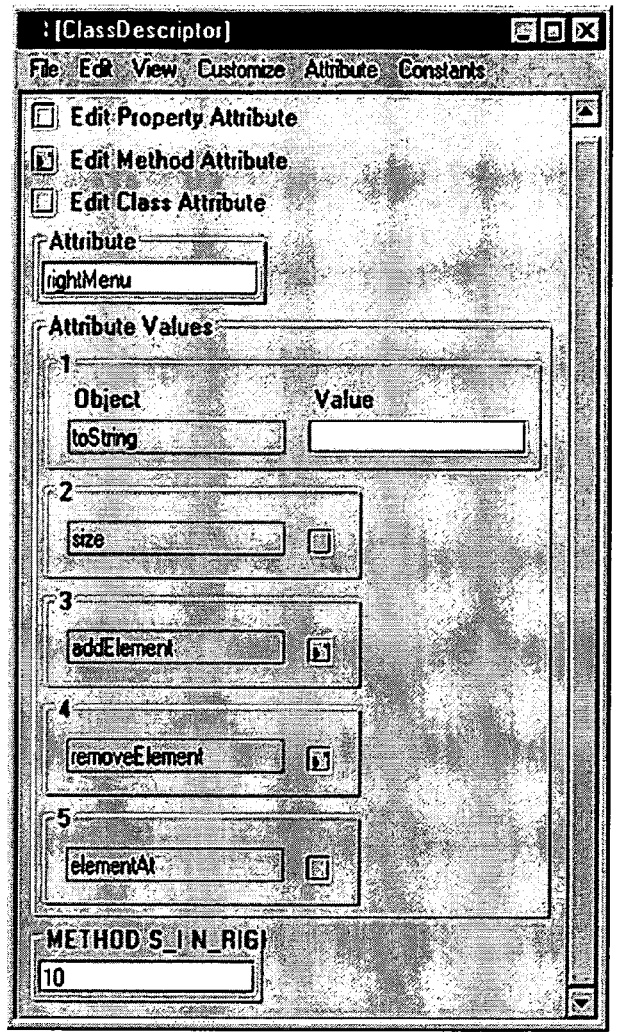
FIGS. 45(a) and 45(b) are computer screen shots illustrating examples of the determination of contents of popup menus of ABMIList according to an embodiment of the subject matter described herein.
Figure 45B:
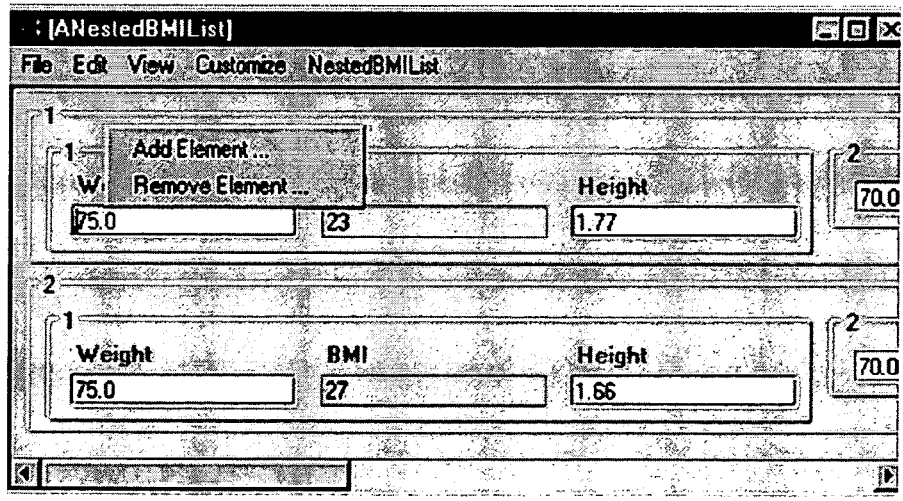

Toolbar and (pull down) menus provide ways to invoke methods of the top-level object of an ObjectEditor window but not its sub-objects. Popup menus solve this problem. Each object is addressed with a pop up menu that can be displayed by clicking the right mouse button in an area on the screen that displays the object but not any of its components. By default N methods of an object are put in this menu, where N is the value of the methods in the right menu attribute of the object. We can use the Popup Method attribute of a method to explicitly determine if a method label appears in the popup menu. In FIG. 45(*a*), two of the five methods of ABMIList are included in the pop menu associated with instances of the class. FIG. 45(*b*) shows that when the right mouse button is pressed in the first element of ANestedBMIList, whose class is ABMIList, the popup menu displayed contains only the two included methods.

Double Click Method Attribute

Yet another popular way to invoke operations is to click on an item. For example, double clicking on an file name in a folder opens the file. ObjectEditor generalizes this idea by defining the Boolean Double Click Method attribute. To illustrate, consider the class ABMITable, which defines, among other methods, the following method:

```
public void editBMISpreadsheet(String name) {
    ObjectEditor.edit(getBMISpreadsheet(name));
}
```

Figure 46A:
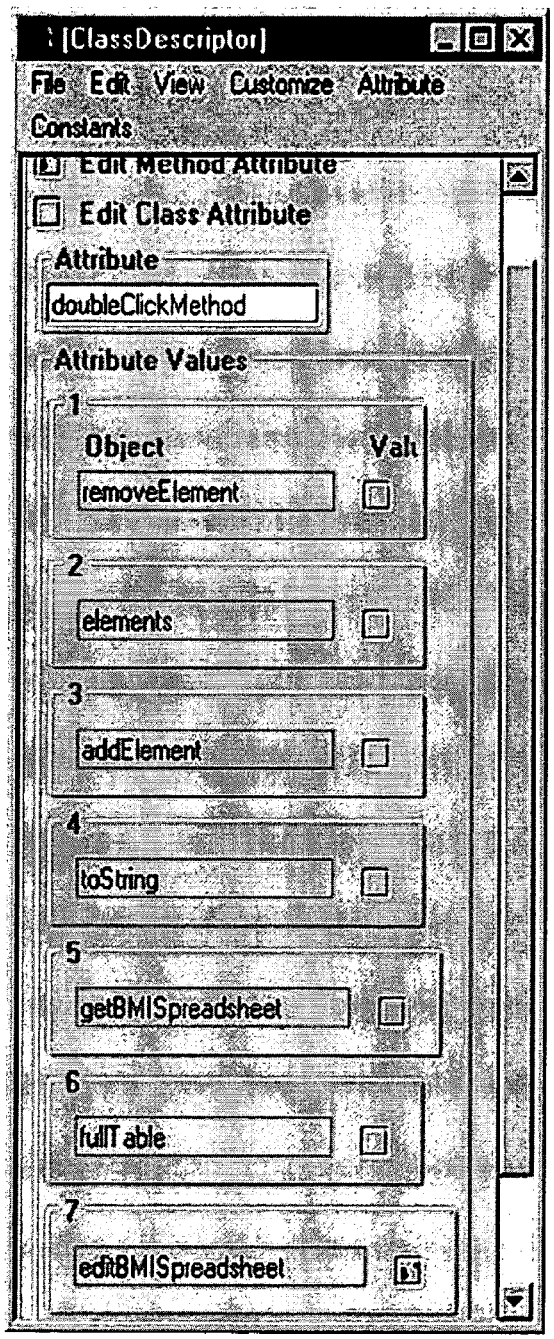
FIGS. 46(a)-46(c) are computer screen shots illustrating examples of the setting of the double click method attribute of the editBMISpreassheet method according to an embodiment of the subject matter described herein.
Figure 46B:
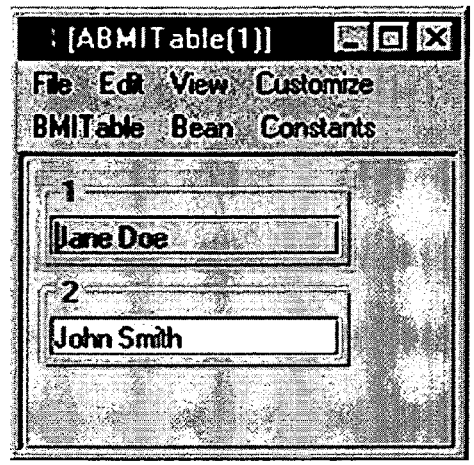
Figure 46C:
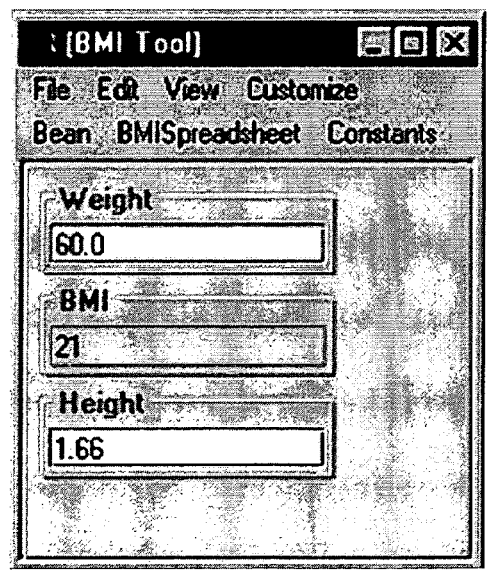

It takes as an argument the name of a person and asks ObjectEditor to display a BMISpreadSheet instance associated with the name. In FIG. 46(*a*), we set the Double Click Method attribute of this method to true. In FIG. 46(*b*), we double click on the string "Jane Doe". ObjectEditor calls editBMISpreadsheet( ) with the value of the string double clicked, that is, calls editBMISpreadsheet("Jane Doe"). The result is the display of the BMISpreadsheet associated with the name (FIG. 46(*c*)).

In general, given a method taking a parameter of type T whose Double Click Method attribute is true, whenever a property of T is double clicked, the method is called with the value of the property. Ambiguity arises if two single-parameter methods take the same type of parameter and are both defined as double click methods. Currently, ObjectEditor allows only one double click method per object. Also currently, the double click method is responsible for explicitly calling ObjectEditor to display a value. It would be better if ObjectEditor is automatically called on the value returned by the method. This would allow us to make getBMISpreadsheet( ) directly the double click method rather than have to create the special editBMiSpteadsheet( )method.

Here we have used double click methods to browse information. In general, they may be used to preform arbitrary computations. For example, double clicking on the name of an executable file can execute it, and double clicking on a counter can increment it.

In-Built Browsing Capabilities

Figure 47:
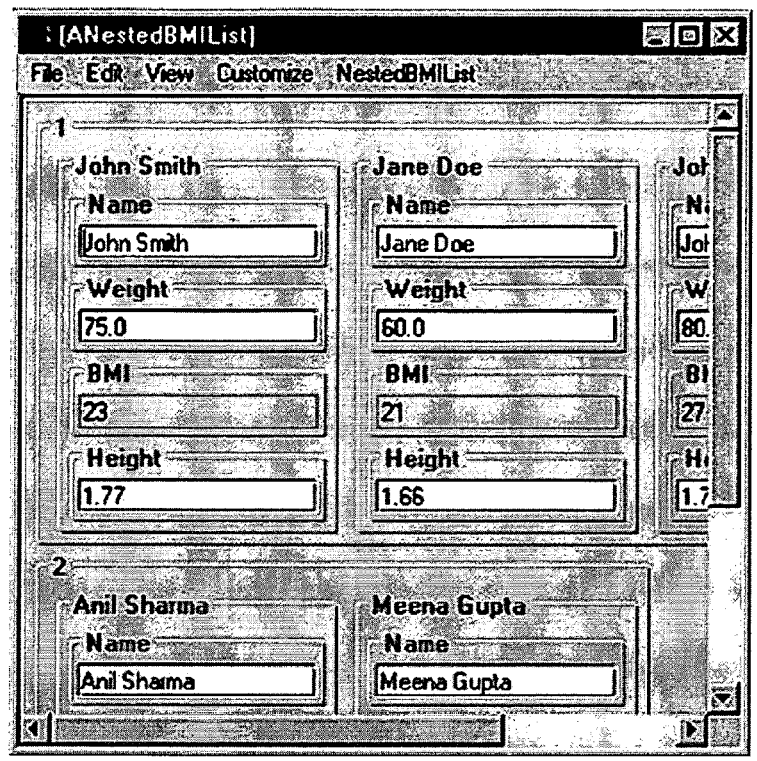
FIG. 47 is a computer screen shots illustrating an example of a nested list of named BMI spreadsheets according to an embodiment of the subject matter described herein.

ObjectEditor also provides a large variety of browsing capabilities based on the logical (property-based) structure of an object. Consider a variation of the BMI example, in which the ABMISpreadsheet is extended to store the name of the person whose BMI is being computed. FIG. 47 shows a nested list of such objects.

As we see in FIG. 47, a property called "Name" is treated in a special way by ObjectEditor—it's value is used to label the display of the containing object.

The nested structure is too large to fit in the window. We can of course increase the size of the window or scroll it. In addition, we can use three different ways to browse it.

Elide/Expand

Figure 48:
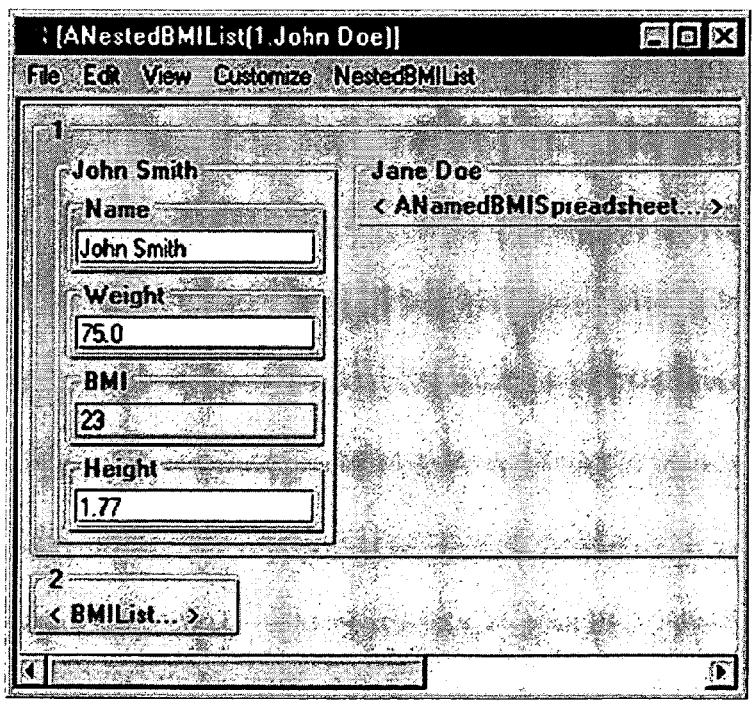
FIG. 48 is a computer screen shot illustrating an example of eliding nodes at different levels in a nested list of named BMI spreadsheets according to an embodiment of the subject matter described herein.

The display of an object can be collapsed or elided to a single string, called the elide string, or a single (GIF) picture, called the elide icon, by selecting it and executing the View→Expand/Collapse command. By default it is elided to a string showing the label and type of the object, as shown in FIG. 48.

The Elide/Expand command toggles the elided/expanded status of an object and thus can be used to expand an elided image. This command works on the selected object. The View→Expand N command can be executed to expand/elide all nodes whose level<=N in the tree of objects displayed by ObjectEditor. The root node is considered to be at level 0.

Figure 49A:
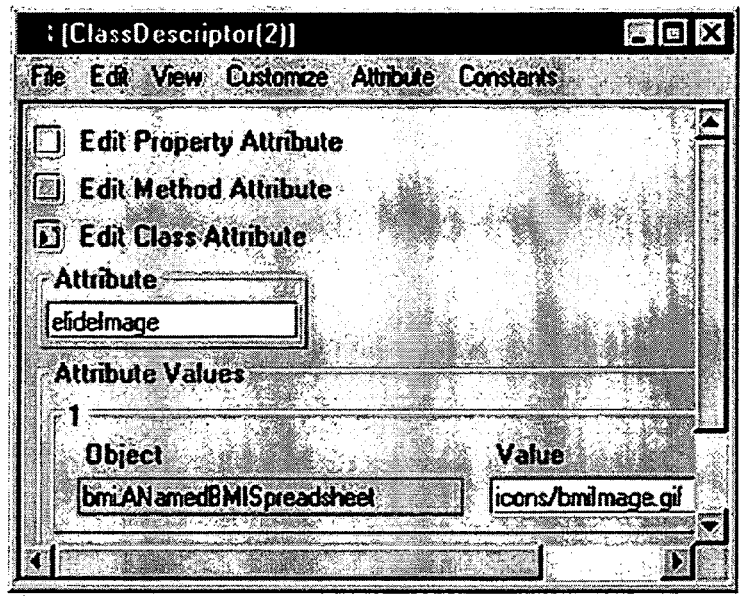
FIGS. 49(a) and 49(b) are computer screen shots illustrating examples of the setting of the elide image attribute to icon file and the corresponding elided image according to an embodiment of the subject matter described herein.
Figure 49B:
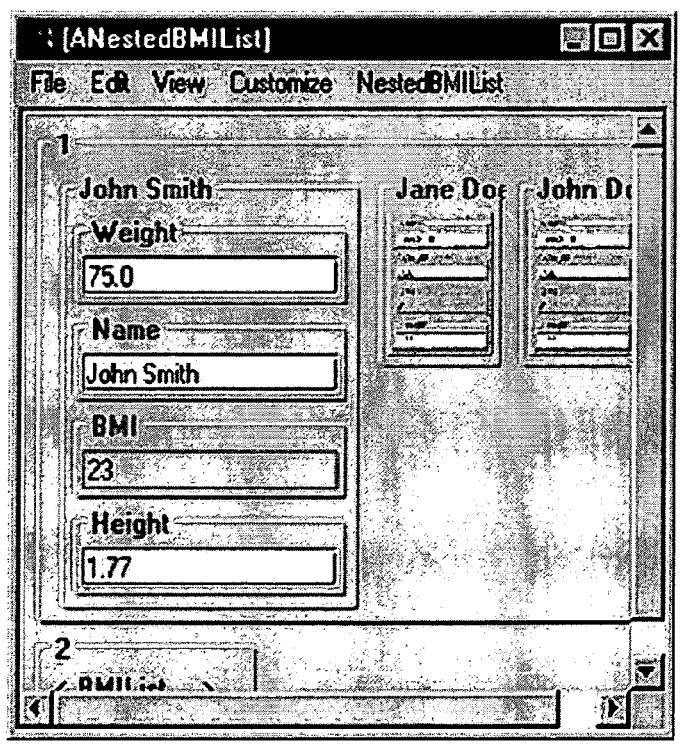

The default elide image of an object can be changed by customizing the Elide Image object attribute, which can take the name of a GIF file. In FIG. 49 this attribute of ANamedBMISpreadsheet is changed to the file icons/bmiImage.gif. Eliding the object displays this image instead of the default elide representation.

It is similarly possible to customize the Elide String attribute. Eithet the Elide String or the Elide Image should be customized—otherwise it is ambiguous which one of these should be used.

It would be useful to dynamically compute the elide image by essentially condensing the image ObjectEdigtor would have generated. Similarly it would be useful to dynamically compute the elide string as the value of specified property or one of the read only property such as BMI in the example above.)

Open and Forward/Back

Instead of expanding an elided image in its containing window, it is possible to "open" it in a new window that replaces the previous window, much as a Web browser opens a URL in a window that replaces the previous window or the Windows folder browser opens a sub directory in window that replaces the window showing the parent directory. Selecting an object and executing the View→Replace Window command opens it. Like the Web browser and Folder Browser, ObjectEditor provides commands to visit previous and next objects in the sequence of opened objects sharing the physical window.

Figure 50A:
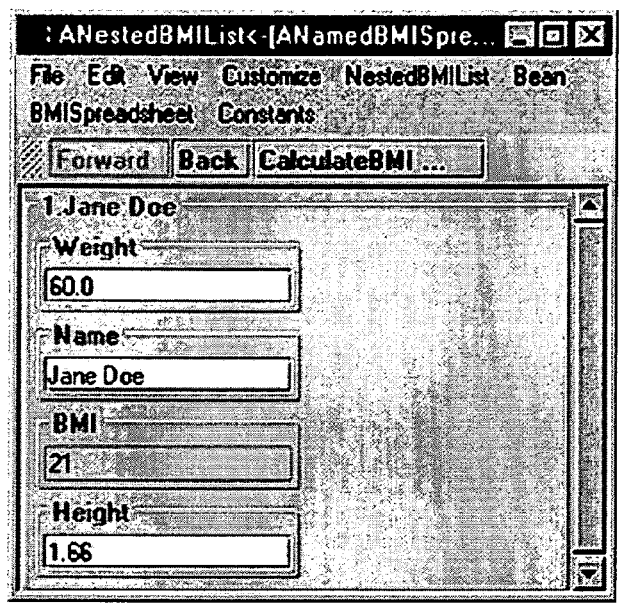
FIGS. 50(a) and 50(b) are computer screen shots illustrating examples of opening a sub object and going back to a parent object according to an embodiment of the subject matter described herein.
Figure 50B:
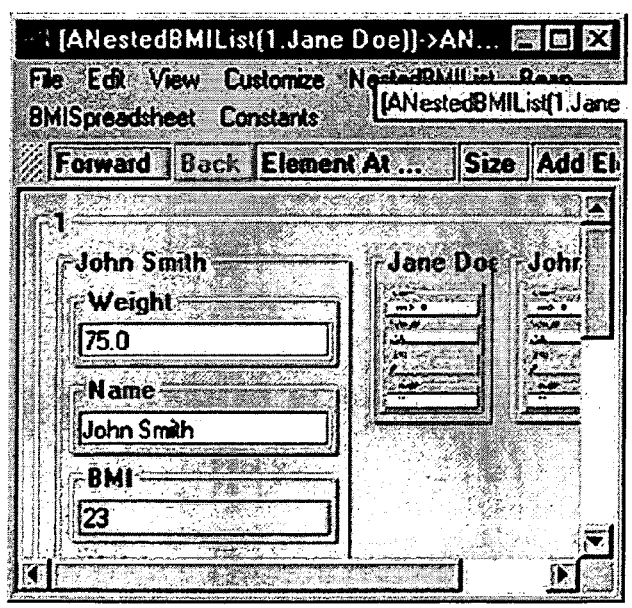

FIG. 50(*a*) shows the effect of opening the Jane Doe BMI Spreadsheet of FIG. 48. The toolbar is automatically displayed as a side effect of this command. It contains the back and forward command, which can be executed to travel back and forward along the path of opened objects. The forward command is currently disabled as the current object is the last object in the path of root objects visited. The path is displayed in the title of the ObjectEditor frame.

Note that the CalculateBMI method is also displayed in the toolbar. In general, the toolbar shows the methods of the root object displayed in the window. Since ANamedBMISpreadsheet is now the root object, it is the (non getter/setter) methods defined in this class that are shown in the toolbar. Executing the back command will restore both the previous root object and its toolbar methods (FIG. 50(*b*)).

Opening Object in New Window

Figure 51:
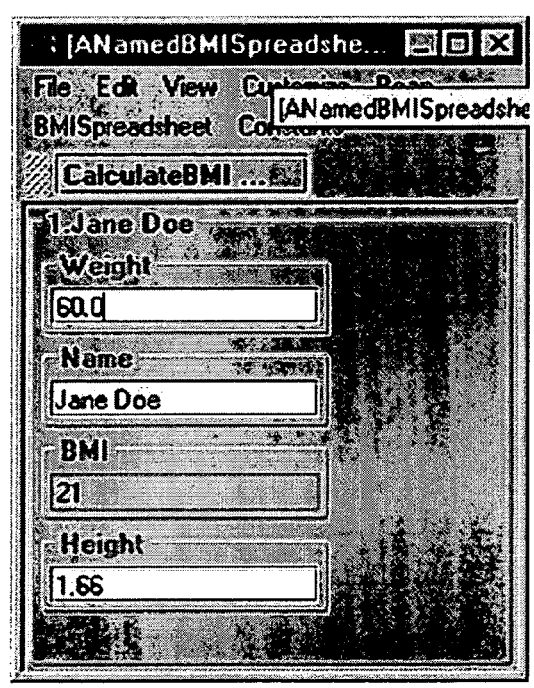
FIG. 51 is a computer screen shots illustrating an example of the opening of an object in s separate physical window according to an embodiment of the subject matter described herein.

Like a folder or web browser, ObjectEditor allows a sub object to be displayed in a separate physical frame. We can select the sub-object and execute the View→New Editor command. FIG. 51 shows the result of executing this command on the Jane Doe item. As we see in FIG. 51, the item is the root object of its frame. Its automatically set label indicates that was opened from a root object in some other frame—the label shows the path from the original root object to this object.

Opening Object in Sibling Window

Figure 52:
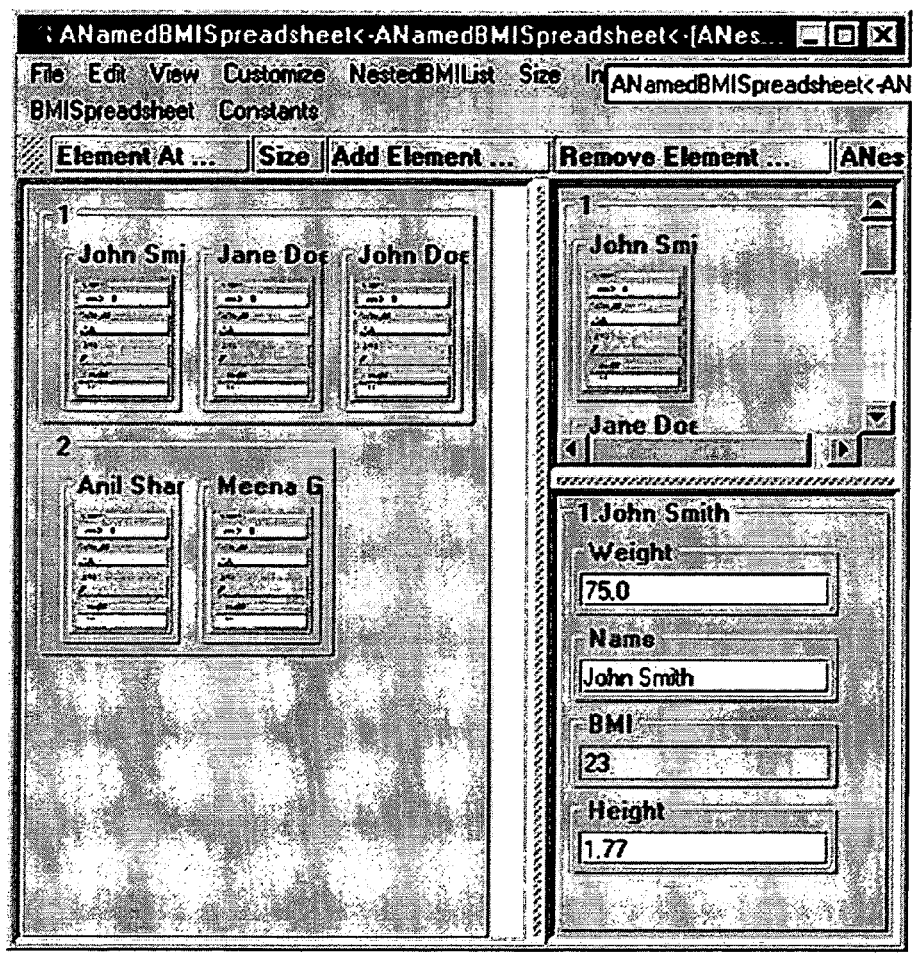
FIG. 52 is a computer screen shot illustrating an example of the creation of new object windows within an original object frame according to an embodiment of the subject matter described herein.

Like the Windows Folder Explore, ObjectEditor also allows a sub object to be opened in a new window that is part of the frame of the original window. The new window can be on the right or bottom of the original window. We must select the object and execute the View→New Window Right or View→New Window Bottom commands. FIG. 52 shows the effect of (a) first executing View→New Window Right on the first list of the nested BMI list object and, (b) then executing View→New Window Right on the first item of this list.

Double Clicking Semantics

The semantics of double clicking on an object displayed in window W depends on whether the New Window Right (Bottom) command has been executed on the window. If not, it is equivalent to executing the Replace Window command on the sub object. If yes, then it is equivalent to executing the Replace Window on the right (bottom) window.

Figure 53:
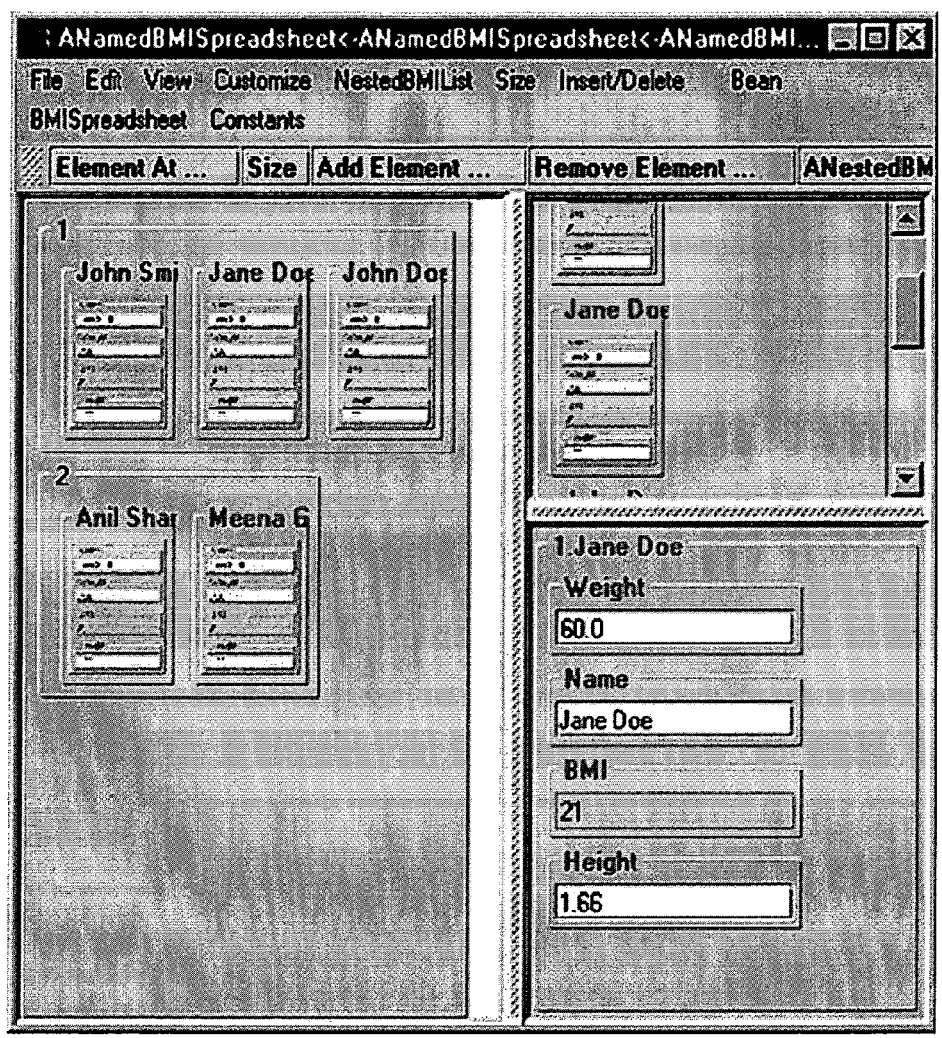
FIG. 53 is a computer screen shot illustrating an example of the expansion of an item by double clicking on the item according to an embodiment of the subject matter described herein.

Thus, double clicking on the Jane Doe BMI spreadsheet in the right window of FIG. 49(*b*) yields the result of FIG. 50(*a*) while double clicking on it in FIG. 52 yields the result of FIG. 53.

These semantics are consistent with the Windows Explorer semantics.

Dynamically Hiding/Showing Windows

It is possible to dynamically create and hide other windows.

Toolbar Window

Figure 54:
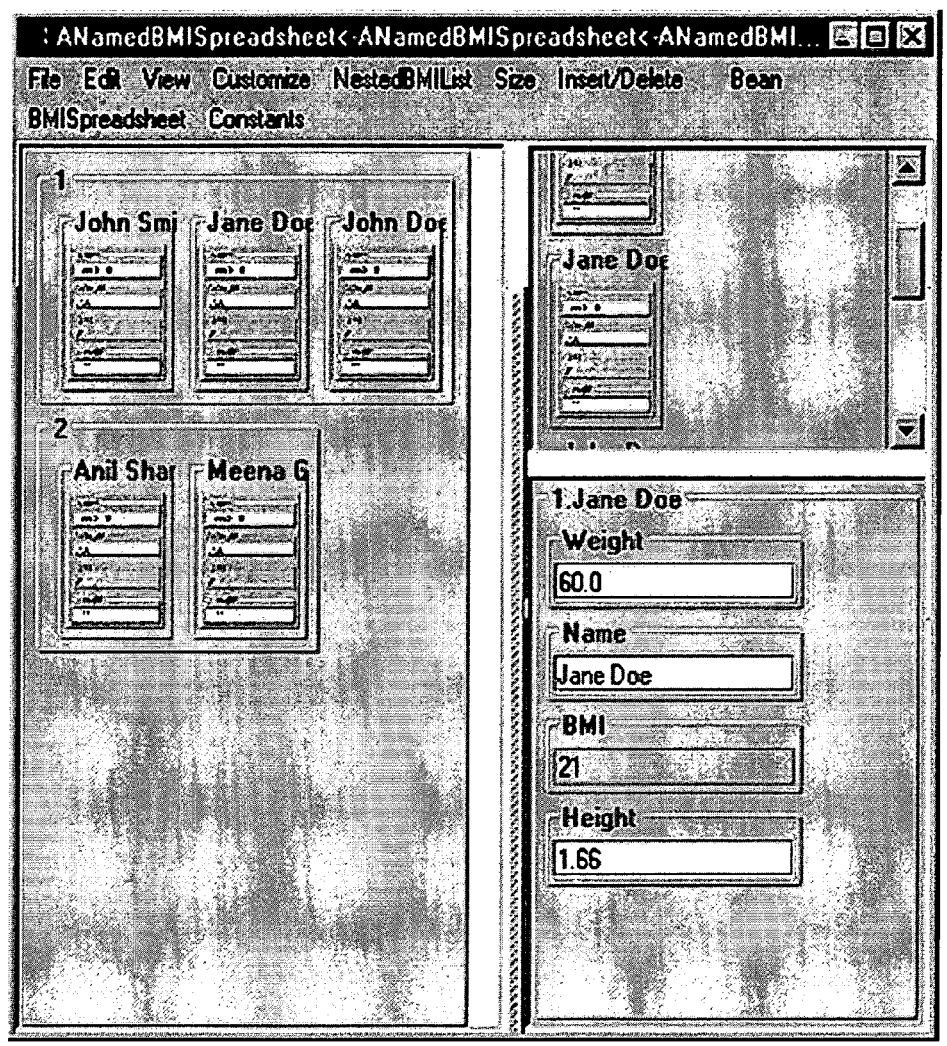
FIG. 54 is a computer screen shot illustrating an example of the hiding of the toolbar according to an embodiment of the subject matter described herein.

As mentioned the toolbar window can be made to appear/disappear by executing the View→Toolbar command. FIG. 54 shows that executing this command on the window state of FIG. 53 removes the toolbar.

Tree Window

Figure 55:
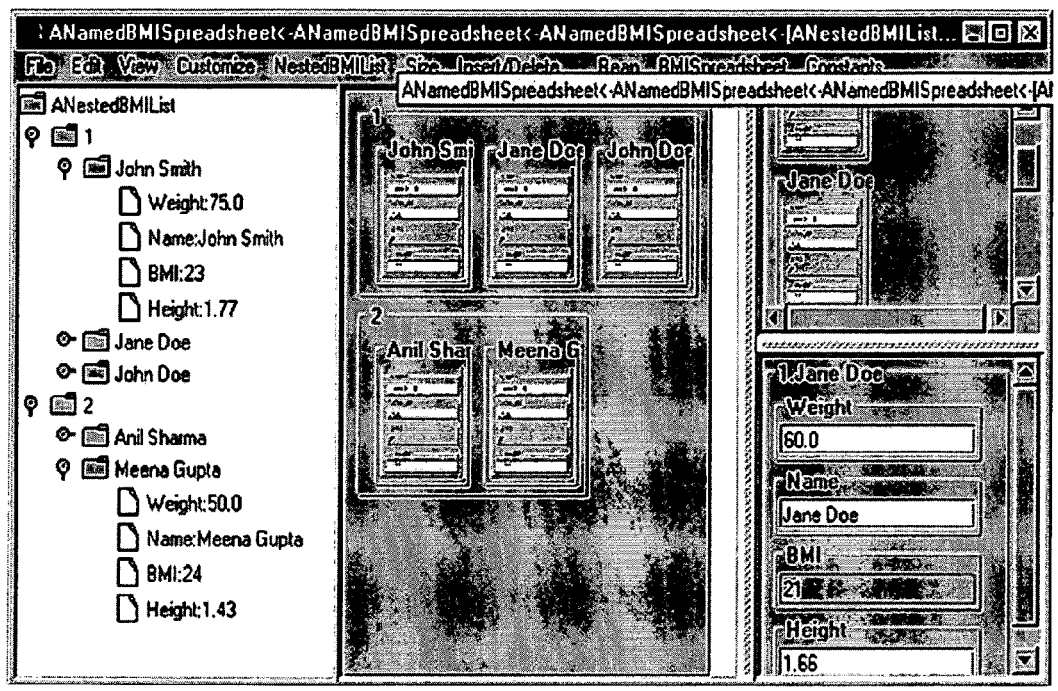
FIG. 55 is a computer screen shots illustrating a tree panel according to an embodiment of the subject matter described herein.

It is also possible to show/hide a tree display of the logical structure of an object by executing the View→Tree command. This display uses the Java Swing tree widget. FIG. 55 shows the result of executing this command on the window state of FIG. 54. Currently, ObjectEditor automatically shows the tree panel if the logical structure of the root object has more than a certain number of levels. It is possible to use this command to hide the tree.

The tree cannot be currently edited. Double clicking on an object displayed in the tree panel displays it in the main window on its right, which is editable.

Main Window

Figure 56:
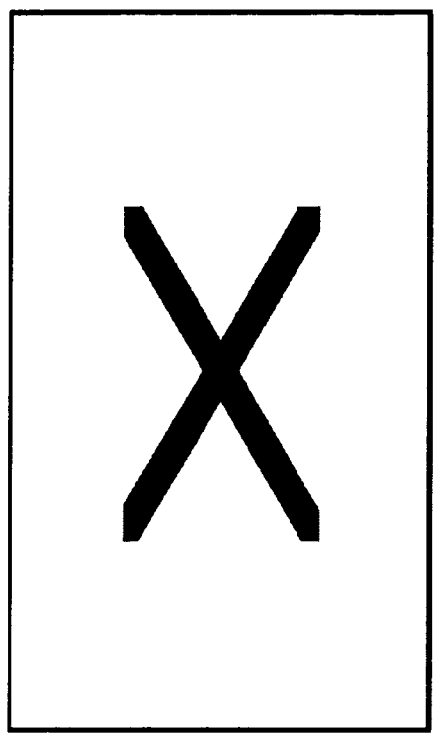
FIG. 56 is a computer screen shot illustrating an example of the hiding of the main panel according to an embodiment of the subject matter described herein.

As we see in FIG. 27, the properties of an object are displayed both in the tree panel and the regular "main" windows" we have seen so far. It is possible to hide/show these windows by executing the View→Main Panel command. FIG. 56 shows the result of executing this commands on the window state of FIG. 55.

Drawing Window

ObjectEditor also creates a drawing window for displaying objects graphically. The Views→Drawing command dynamically hides and shows this window.

Window Configuration API

It is possible to configure the windows programmatically. The ObjectEditor.edit( ) operation returns an object that provides methods for changing the configuration, as shown by the sample code below:

```
...
bus.uigen.uiFrame frame = ObjectEditor.edit(nestedBMIList);
    frame.toolBar( );
    frame.treePanel( );
    frame.mainPanel( );
```

Generalizing Typical Commands

ObjectEditor provides a host of other commands that are inspired by commands you see in typical applications. These commands essentially abstract out what is common in these applications to an extent allowing them to be implemented in an object independent fashion.

New

Figure 57:
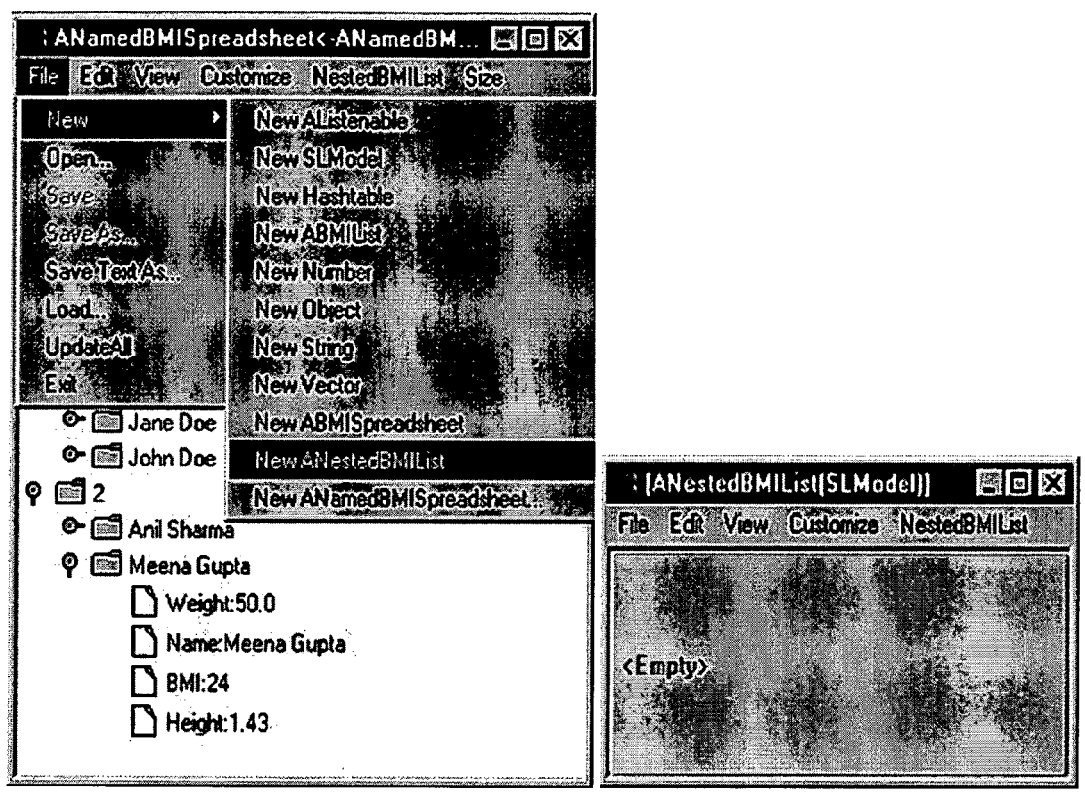
FIG. 57 is a computer screen shot illustrating the creating and displaying of a new instance of ANestedBMIList according to an embodiment of the subject matter described herein.

Most tools provide a File→New command that creates a new object. The kind of object depends on the tool. In the case of Word, it is a Word document and in case of PowerPoint it is a PowerPoint document. ObjectEditor generalizes this behavior by allowing the user to create and edit a new instance of the class of the object displayed in the window from which the command was invoked. It allows creation of other classes it knows about—some popular Java classes and classes it encountered while displaying the root object. For example, when we execute the New command in an ObjectEditor window showing an instance of ANestedBMIList, we are given the choice to create a new instance of not only standard classes and ANestedBMIList, but also ABMIList and ABMISpreadsheet, which are classes of descendents of the root object. FIG. 57 illustrates the creating and displaying of a new instance of ANestedBMIList.

Save as, Load, Open & Save Text as

Figure 58A:
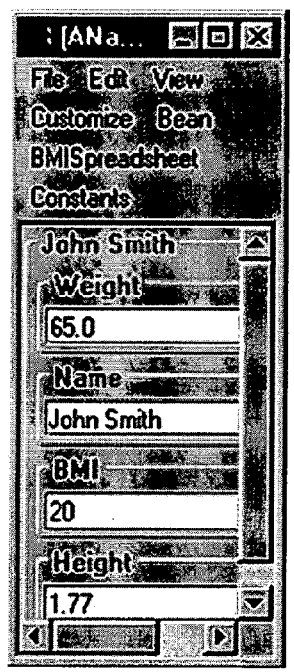
FIGS. 58(a)-58(c) are computer screen shots illustrating examples of the saving and loading of object state, where
Figure 58B:
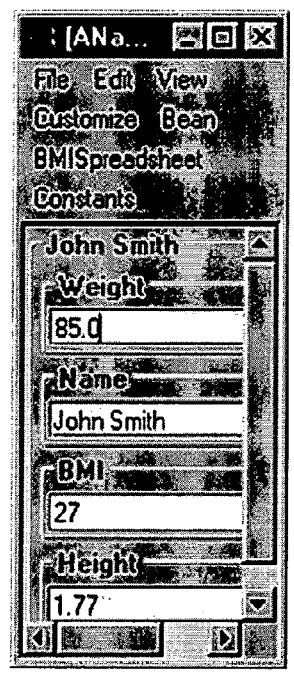
Figure 58C:
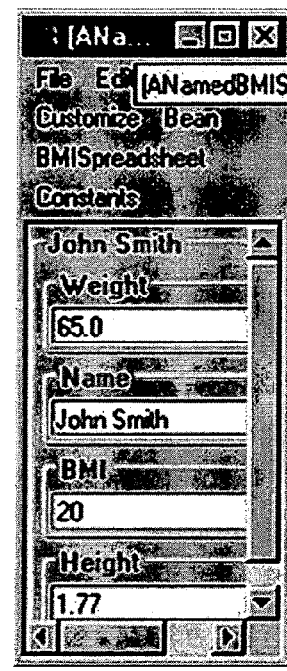
Figures 59A, 59B:
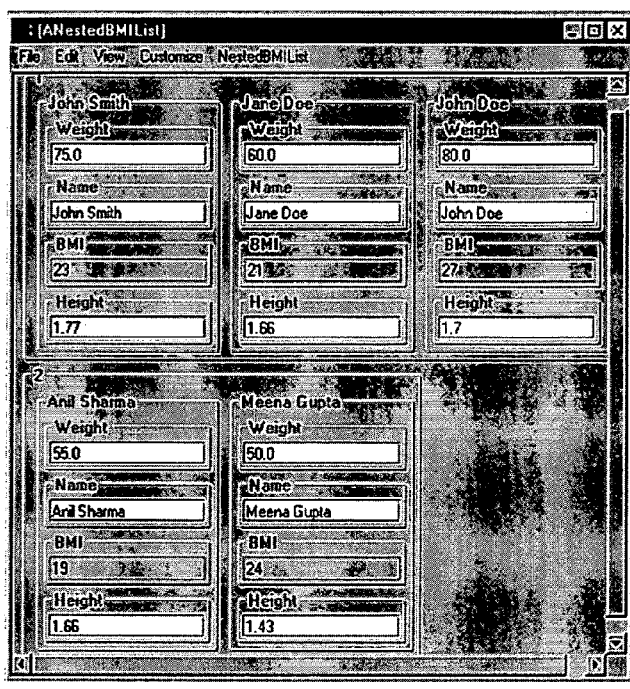
FIGS. 59(a) and 59(b) are computer screen shots illustrating examples of the saving of the text representation of an object and loading into a text based tool according to an embodiment of the subject matter described herein.

ObjectEditor also provides commands to save the state of the edited object to a file and later to load into an existing user interface. FIG. 59 illustrates these commands using the example of an instance of ANamedBMISpreadsheet. We first save the current state of the object using the Save As command, giving the name the file in which the state should be saved (FIG. 58(*a*). ObjectEditor automatically puts the extension .doc to the specified file name. Next we edit the object, changing the weight field. Next we decide to restore the saved state by executing the Load command, specifying the file containing the saved state. (If we type the file name, the .doc extension must be specified.) The object displayed by ObjectEditor does not change, the values of its properties do. ObjectEditor replaces the current values of the properties of the object with those saved.

Instead of loading the saved state into an existing object and window, we can restore it into a new (object displayed by a new) ObjectEditor window by executing the open command.

Not all objects can be saved, only those that are serializable. An object is serializable if (a) the values of all of its properties are serializable and (b) its class and all of its superclasses are serializable. If a class is declared to implement the java.io.Serializable interface, then the class and all of its subclasses become serializable. If an object is not serializable, then the Save As command is greyed out by ObjectEditor. All primitive values are serializable.

In the above example, if we declare ANamedBMISpreadsheet as serializable:

```
public class ANamedBMISpreadsheet extends ABMISpreadsheet
implements java.io.Serializable{...}
``` but do not declare ABMISpreadsheet as serializable:

public class ABMISpreadsheet implements BMISpreadsheet { . . . } then the Save As command will be greyed out as the superclass of the object, BMISpreadsheet, is not serializable. On the other hand, if we did the converse, not declaring ANamedBMISpreadsheet as serializable:

public class ANamedBMISpreadsheet extends ABMISpreadsheet { . . . } but declared the superclass as serializable:

```
public class ABMISpreadsheet implements BMISpreadsheet,
java.io.Serializable { ... }
then the Save As command will work.
```

The save command stores the state of the object in an internal "binary" form that is not accessible to text processing tools. The File→Save Text As command can be used to store a textual representation of the object based on the values of its properties and their labels. FIG. 59(*b*) shows the textual representation of the object shown in FIG. 59(*a*). The Save Text As command can be executed on non-serializable objects as Java's built in capabilities for reading and writing is not used—instead, ObjectEditor's capabilities to create a screen of representation are used. The Save Text As command provides a way of exporting the state of an object to text based tools. It would be nice if the saved text could be converted back into an object, but currently the text representation does not have enough information to do so. This would be a nice extension for future work.

Update Commands

When we edit the textual representation of a property, the setter method to update the property is not called immediately. It is only when we press Enter that the property is updated. This ensures that we don't call the methods with intermediate values, which can slow down our editing and can perform side effects such as mailing the value to interested parties.

It is possible to edit a set of properties, without updating them, as shown in FIG. 60(*a*), where the weight field of each of the displayed BMI spreadsheets has been edited but not updated. One might edit multiple values without editing because they are related to each other and we don't want to commit any of them until we have entered a consistent set of values. (For example we might be assigning letter grades to students.) The File→UpdateAll command can be used to update all of these values with one action, as shown in FIG. 60(*b*). ObjectEditor chooses the order in which the setter methods of the updated properties are called—therefore this command should be called if the order does not matter. This may not be the case if the methods have side effects.

It is also possible execute the Edit→Update command to update a selected property. This is not very useful when editing a text field, as the hitting the Enter command is much more familiar and efficient way of doing so. ObjectEditor also creates TextArea widgets. We can use the preferred widget attribute to explicitly ask ObjectEditor to use this widget for a property. Such a widget is also created by ObjectEditor based on context. In particular, if a string property is the only displayed value in an ObjectEditor window, then it creates a TextArea rather than a TextField widget, as the assumption that assigning a whole window to the string must mean that a long string, such as an essay, is to be written FIG. 61 illustrates this.

In FIG. 61(a), we double click on the Name field to replace the current spreadsheet object with the string object holding the name property. ObjectEditor creates a text area widget for the sole string object displayed in the window. We now insert a new line into the displayed string (FIG. 61(b)). Next we update the underlying property by selecting the string and executing Edit→Update (FIG. 61(c). A more convenient alternative is to execute UpdateAll, which does not require explicit selection. This command is automatically put in the toolbar whenever a text area widget is created. Executing the Back command restores results is the property now being displayed in a text field widget, which does show the new line character correctly.

Copy/Paste

Like save and open, these are commands most applications offer, each one, however, providing its own implementation of them for the set of objects it displays. For example, a spreadsheet and a document editor provide their own implementations of them working one spreadsheet abstractions (such as cells and rows) and document abstractions (such as paragraphs and sections), respectively. ObjectEditor provides a single implementation of arbitrary objects.

Figure 62A:
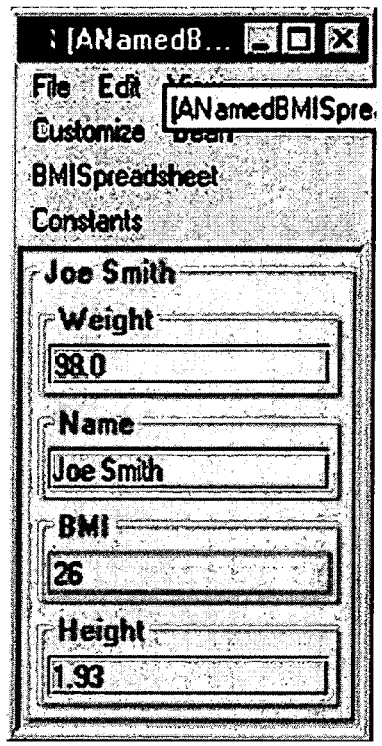
FIGS. 62(a)-62(c) are computer screen shots illustrating examples of the operation of copy and paste tools according to an embodiment of the subject matter described herein.
Figure 62B:
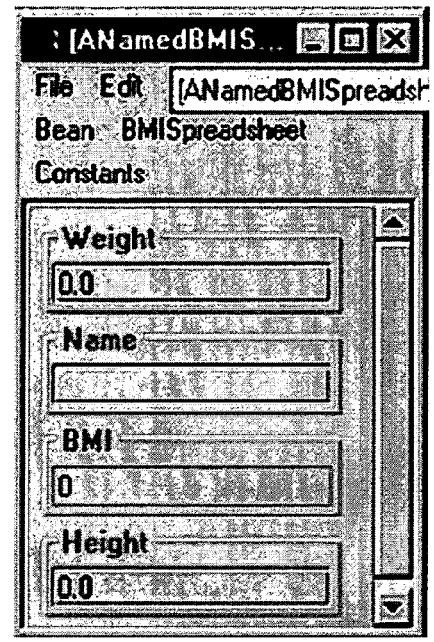
Figure 62C:
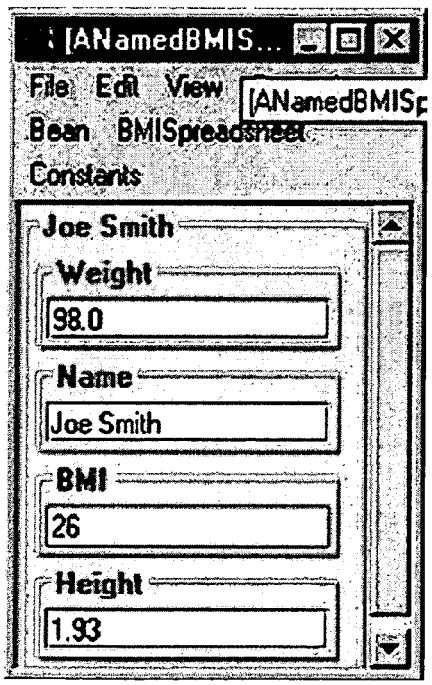

FIG. 62 illustrates copy and paste in ObjectEditor. In FIG. 62(a) the selected spreadsheet is selected and Edit→Copy executed. In FIG. 62(b) another spreadsheet is selected. In FIG. 62(b), the Edit→Paste command is executed on the second spreadsheet. As FIG. 62 shows, the paste command replaces the second second spreadsheet the first one The Copy command is not a true copy command. It stores a reference rather than a serialized copy of the object. The Paste command simply assigns this reference to the new object. Thus, if the pasted object is changed (FIG. 63(a)), then the copied object is also changed.

A separate command to create a serialized copy of the object should probably be provided. Another limitation is that it is not possible to cut or paste a dynamic property as this involves invoking methods in the containing object, such as removeElementAt( ) and insertElementAt( ) in the case of a Vector, that delete and insert the element. Currently, ObjectEditor is not bound these methods, that is, makes no assumptions about the signatures of these methods, and thus does not know what methods to call for these commands.

Auto Refresh

Figure 63A:
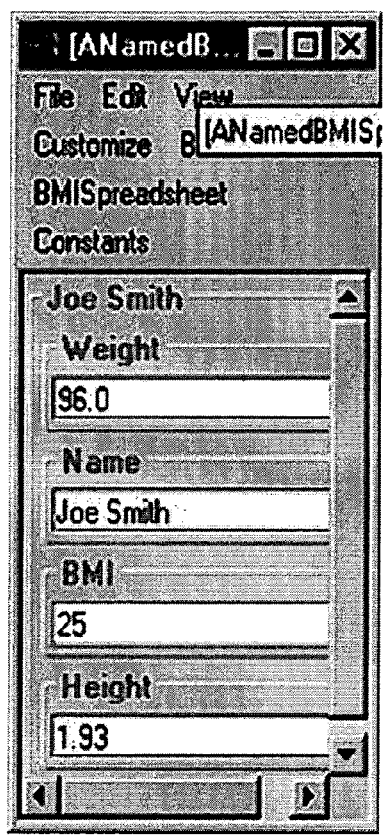
FIGS. 63(a) and 63(b) are computer screen shots illustrating examples of pasted and copied objects according to an embodiment of the subject matter described herein.
Figure 63B:
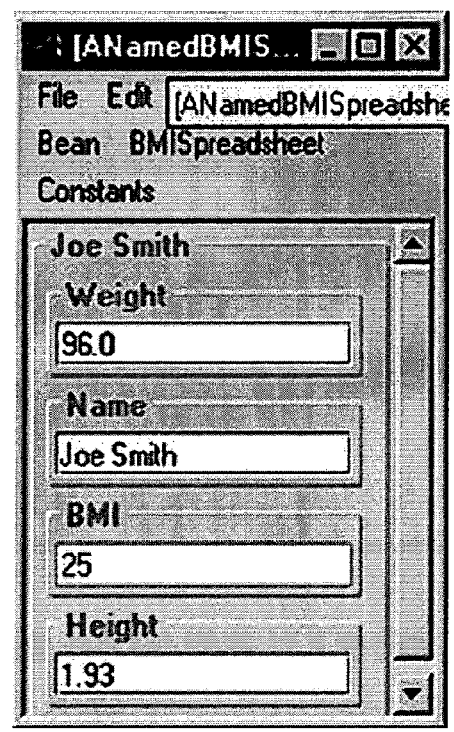

Changes made to the window of FIG. 63(a) do not automatically cause the window of FIG. 63(b) to be automatically updated. By default, we must execute the View→Refresh command in a window to get the latest value of an object display in the window that is updated by a command in some other window. We can override this default by executing the View→AutoRefreshAll command in one mor more windows. When a property is changed in such a window, ObjectEditor calls the getter methods of objects displayed in all of the windows in the system. Thus, if we had executed this command in the window of FIG. 63(a), then changing the weight field would cause the window of FIG. 63(b) to be automatically updated. AutoRefreshAll is a toggle that disables the option if it is already on. Turning this option on is really expensive if a large number of object are displayed as the getter methods of all of these objects are called each time a property is changed in the window.

Even if this option is off, when a property of an object is edited, the getter methods of all properties of that object are called. This is the reason that the BMI property is automatically updated when we update the weight or height property.

Figure 64A:
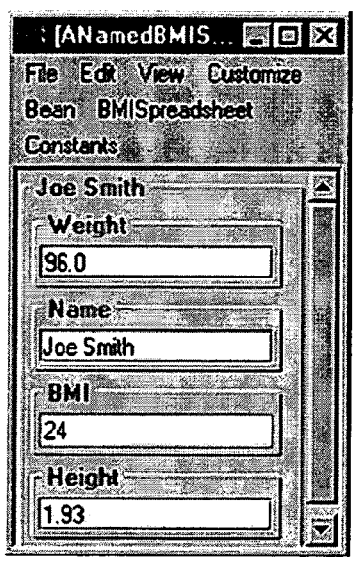
FIGS. 64(a)-64(c) are computer screen shots illustrating examples of manual refreshing of a BMI property when the weight property changes according to an embodiment of the subject matter described herein.
Figure 64B:
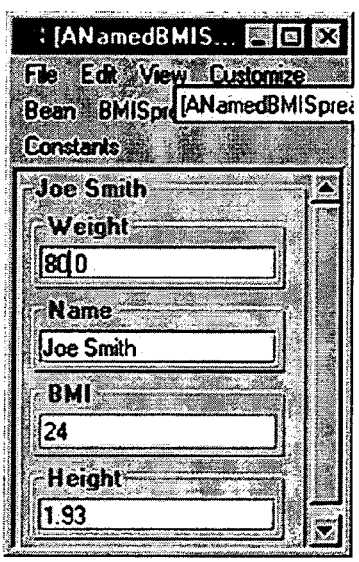
Figure 64C:
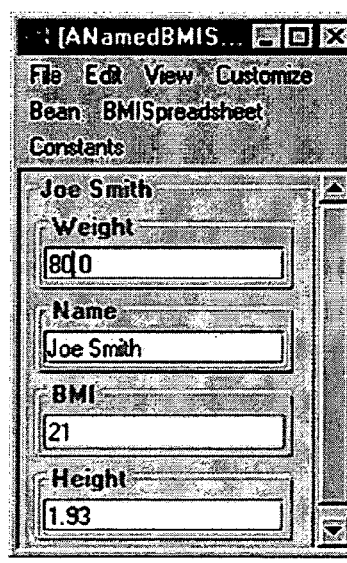

We can turn off (or on) this behavior by executing the View→Auto Refresh command. FIG. 64 illustrates the semantics of turning this option off. The weight value shown in FIG. 64(a) is updated in FIG. 64(b). The BMI value, however, remains the same. We manually call the Refresh command in FIG. 64(c) to display its value.

Even AutoRefresh is not particularly efficient as all properties of an object are refreshed whenever any property is edited, not just the once that depend on the edited property. In absence of the dependency information from the object, this is the best ObjectEditor can do. It is possible to provide ObjectEditor with this information to ensure that the minimum number of properties are refreshed on each change. However, this involves writing code. In particularly, it requires that the edited object implement the observable pattern using the Java Beans framework. The following extension of ANamedBMISpreadsheet illustrates how this is done:

```
package bmi;
import java.beans.PropertyChangeSupport;
import java.beans.PropertyChangeListener;
public class ANamedBMISpreadsheet extends ABMISpreadsheet
implements
NamedBMISpreadsheet{
    PropertyChangeSupport propertyChange = new PropertyChangeSupport(this);
        String name = "";
        public ANamedBMISpreadsheet (String initName, double initHeight, double initWeight) {
            super (initHeight, initWeight);
            name = initName;
        }
        public ANamedBMISpreadsheet ( ) {
        }
        public String getName( ) {
            return name;
        }
        public void setName(String newVal) {
            name = newVal;
            propertyChange.firePropertyChange("name", null, name);
        }
        public void setHeight(double newVal) {
            super.setHeight(newVal);
            propertyChange.firePropertyChange("height", null, new Double(getHeight( )));
            propertyChange.firePropertyChange("BMI", null, new Integer(getBMI( )));
        }
        public void setWeight(double newVal) {
            super.setWeight(newVal);
            propertyChange.firePropertyChange("weight", null, new Double(getWeight( )));
            propertyChange.firePropertyChange("BMI", null, new Integer(getBMI( )));
        }
        public void addPropertyChangeListener(PropertyChangeListener I) {
            propertyChange.addPropertyChangeListener(I);
        }
}
```

Originally, this class simply extended ABMISpreadsheet with the Name property. Now it also ensures that each setter method notifies its observers about the set of properties changes by it. It uses the JavaBean class, PropertyChangeSupport to do so. This class keeps a list of observers to which it adds a new member whenever the addPropertyChangeListener( )method is called on it. It notifies these observers each time the firePropertyChange( ) method is called on it.

Let us take the example of FIGS. 63 and 64 to illustrate how ANamedBMISpreadsheet, PropertyChangeSupport, and ObjectEditor all work together to refresh the display without relying on AutoRefresh and AutoRefreshAll. We assume this time that that the above version of ANamedBMISpreadsheet is used. The ObjectEditors of both the original and pasted object reference (FIGS. 63(*a*) and (*c*)) discover the addPropertyChangeListener(PropertyChangeListener) method in the class. As they have components that implement the PropertyChangeListener interface, both call this method to add these components as listeners of the instance of ANamedBMISpreadsheet they display. The method, in turn, calls the corresponding method of PropertyChangeSupport, which adds the argument to a list it keeps.

Now consider what happens when the weight field of the second ObjectEditor (FIG. 6(*b*)) is changed from 98 to 96. The method setWeight( ) if called, which calls the setWeight( ) of the superclass, and then calls one firePropertyChangeSupport with the new weight converted from a double to a Double and another with the new BMI converted from an int to an Integer. The second argument of the method is expected to hold the old value of the property. The null value is being passed as ObjectEditor ignores this value. Each of these calls, in turn, invokes appropriate methods in the listeners, which in turn refresh the value of the fired property. As a result, the weight and BMI fields are refreshed in both ObjectEditors (FIGS. 63(*a*) and (*b*)).

Thus, in general, an object that does not wish to rely on AutoRefresh or AutoRefreshAll should:
 implement the method:
  public void addPropertyChangeListener(PropertyChangeListener I); using PropertyChangeSupport.

In each setter method, for each property changed by the method, call the firePropertyChange( ) method of PropertyChangeSupport with the name of the property and its old and new values. Both values must be objects. The values of primitive properties must therefore be converted to corresponding wrapper objects. The old value can be null as it is ignored by ObjectEditor. Be careful with the case used in names of properties. The first uppercase letter in a property name is converted to lower case unless it is followed by another uppercase letter.

Due to a current limitation of ObjectEditor, it does not register itself as a listener of an object that is edited using the call:
 ObjectEditor.edit(object);
Instead you must use the following two calls:

```
uiFrame editor = uiGenerator.generateUIFrame(object)
editor.setVisible(true);
```

Writing Your Own Editor Classes

The customization features we have seen so far allow us to tweak the behavior of ObjectEditor in relatively minor changes—we can also change the set of windows shown and can change the labels, alignment and other attributes of the editing classes, that is, the classes used to display objects. They do not allow us, however, to write our own editor classes. We now study how this can be done.

Mandatory Steps

Figure 65:
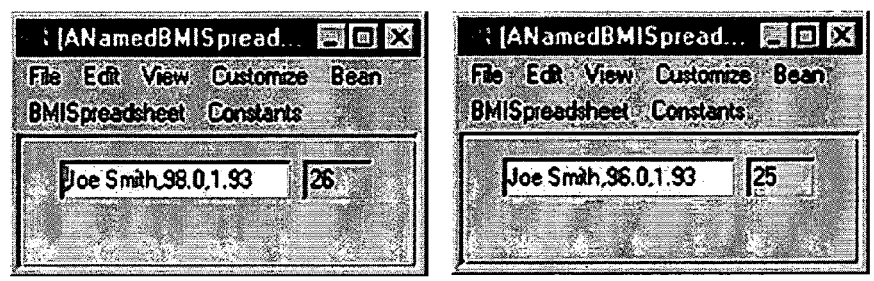
FIG. 65 is a computer screen shot illustrating an example of a custom editor class for the ABMISpreadssheet according to an embodiment of the subject matter described herein.

FIG. 65 illustrates the use of a specialized editor class for ANamedBMISpreadsheet. It creates a Panel for each time an instance of ANamedBMISpreadsheet is displayed. The panel contains two text fields, an editable input text field and a readonly output text field. The input text field shows the three editable properties of the object, name, weight and height, which are separated by commas. The output text field displays the readonly computed property, BMI. The input text field can be changed any of the three editable properties, which causes the output field to be updated. For example, if the weight is changed from 98 (FIG. 65) to 96, the output field changes from 26 to 25. The process of converting between property values and their display representations is done by our editor class and not ObjectEditor.

Figure 66:
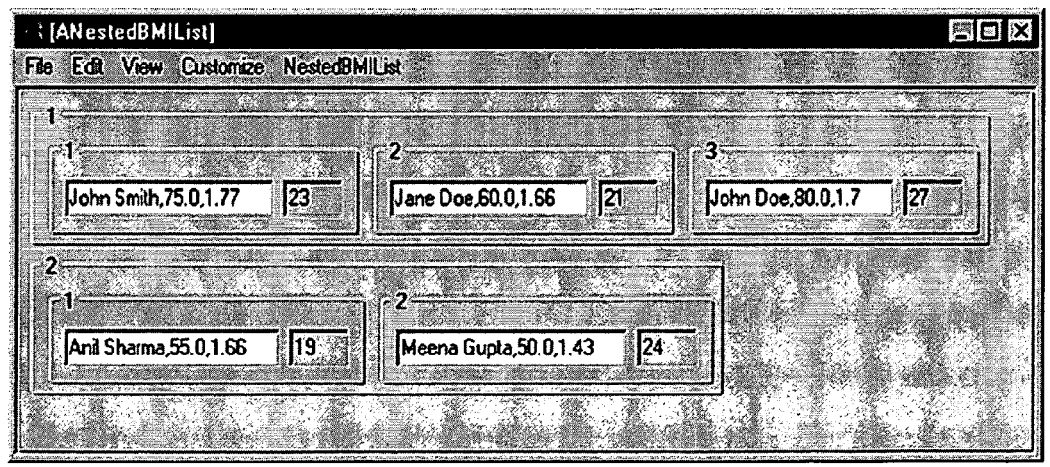
FIG. 66 is a computer screen shot illustrating an example of the mixing of the ObjectEditor class with a Custom class according to an embodiment of the subject matter described herein.

If we are going to write our own editor classes, why do we need ObjectEditor? We may wish to use all of the menus of ObjectEditor providing useful commands such as copy and paste. As shown in FIG. 66, these menus are still available even though a custom editor class is used.

More important, we may write editor classes for some kinds of objects while relying on ObjectEditor's editor classes for other kinds of objects, which may use our editor classes. Here, we are using ObjectEditor's editor classes for ANestedBMIList and ABMIList, which, as the display in FIG. 66 shows, use the custom editor class to display the elements of ABMIList.

The following code implements the custom editor class:

```
package bmi;
import bus.uigen.uiWidgetAdapter;
import java.awt.TextField;
import java.awt.Panel;
import java.awt.Component;
import java.awt.event.ActionEvent;
import java.awt.event.ActionListener;
public class ANamedBMISpreadsheetEditor extends uiWidgetAdapter
          implements ActionListener {
Panel panel;
       TextField inputTextField;
       TextField outputTextField ;
       public Component instantiateComponent(Class widgetClass) {
           panel = new Panel( );
           inputTextField = new TextField( );
           outputTextField = new TextField( );
           outputTextField.setEditable(false);
           panel.add(inputTextField);
           panel.add(outputTextField);
           return panel;
       }
       public void linkUIComponentToMe(Component component) {
           inputTextField.addActionListener(this);
       }
       public void actionPerformed(ActionEvent e) {
           parseInputTextField( );
           uiComponentValueChanged( );
```

```
        }
public void setUIComponentEditable( ) {
            inputTextField.setEditable(true);
        }
        public void setUIComponentUneditable( ) {
            inputTextField.setEditable(false);
        }
        NamedBMISpreadsheet namedBMISpreadsheet;
        public void setUIComponentTypedValue(Object object) {
            namedBMISpreadsheet = (NamedBMISpreadsheet) object;
            inputTextField.setText(namedBMISpreadsheet.getName( ) + "," +
namedBMISpreadsheet.getWeight( ) + "," +
namedBMISpreadsheet.getHeight( ));
            outputTextField.setText("" + namedBMISpreadsheet.getBMI( ));
        }
        public Object getUIComponentValue( ) {
            parseInputTextField( );
            return namedBMISpreadsheet;
        }
        void parseInputTextField( ) {
            String input = inputTextField.getText( );
            int nameEnd = input.indexOf(',');
            int weightEnd = input.indexOf(',', nameEnd + 1);
            String nameString = input.substring(0, nameEnd);
            String weightString = input.substring(nameEnd + 1, weightEnd);
            String heightString = input.substring(weightEnd + 1);
            namedBMISpreadsheet.setName(nameString);
    namedBMISpreadsheet.setWeight(Double.valueOf(weightString).double
Value( ));
    namedBMISpreadsheet.setHeight(Double.valueOf(heightString).doubleV
alue( ));
        }
}
```

Let us use this class to illustrate the general process. An editor class is always written for editing instances of a particular class of objects, which we will call the model class. In this example, the editor class, ANamedBMISpreadsheetEditor has been written for editing instances of the model class, ANamedBMISpreadsheet. It is also associated with a widget class, which is the class of the top-level widget of the widget hierarchy created to display instances of the model class. In this example, the widget class is java.awt.Panel. Currently, a widget class must be a subclass of java.awt.Container. (This is actually a bug, the intention was for the widget class to be a subclass of java.awt.Component.) The editor class itself must be a subclass of the ObjectEditor class bus.uigen.uiWidgetAdaptor and implement the following abstract methods defined in the superclass.

The method public Component instantiateComponent (Class widgetClass), which is called with the widget class. The argument can be ignored. (It is provided to allow an editor to be bound to multiple widget classes, which is useful for writing ObjectEditor editor classes.) The method should return an instance of the widget class. Before doing so, it should create the widget hierarchy rotted by the instance. In this example, it creates the panel, creates the input and output textfields, sets the latter to not editable, and returns the panel.

The method, public void linkUIComponentToMe (Component component), which is called when it is time to link to the widget hierarchy by soliciting input events from the widgets in the hierarchy. In this example, the editor listens to the action events from the input text field, which is the event of hitting Enter in the text field. To add itself as a listener of this event, the editor class must implement the java.awt.event.ActionListener interface, which defines the method, public void actionPerformed(ActionEvent e).

The methods, public void setUIComponentEditable( ) and public void setUIComponentUneditable( ) which are called when the model must be made editable and non-editable, respectively. The methods must ensure that editable widgets in the hierarchy are made editable/non editable, respectively. In this example, they turn on and off, respectively, the ability to edit the input text field.

The method, public void setUIComponentTypedValue (Object object), which takes as argument the model. Each time the display of the model is to be refreshed, this method is called. The method must display the current value of the model in the widget hierarchy. In this example, it displays the three editable properties in the input text field and the computed readonly property in the output text field.

The method, public Object getUIComponentValue( ) which is the converse of the above method, returning an instance of the model based on the contents of the widget hierarchy.

The editor responds to input events by updating the model and calling the predefined inherited method, uiComponentValueChanged( ) to inform the rest of the system that the model has been changed. (This method should call getUIComponentValue( ) but does not seem to do so currently for programmer-defined editor classes.)

Before asking ObjectEditor to display an instance of the model class, we must associate our editor class with the model and widget classes, as illustrated below:

```
try {
bus.uigen.editors.EditorRegistry.registerWidget("bmi.ANamedBMISpreadsheet"
```

```
,
"java.awt.Panel", "bmi.ANamedBMISpreadsheetEditor");
} catch (ClassNotFoundException e) {
    System.out.println("Editor registration " + e);
}
ObjectEditor.edit(new ANamedBMISpreadsheet( ));
```

It is easy to make mistakes in entering strings for classes (we should really be passing Class rather than String arguments), therefore the registration has been done within a try block.

We have described above the mandatory steps that must be taken to implement an editor class. Below we mention optional steps, which override non abstract methods of uiWidgetAdapter. All ObjectEditor classes mentioned below are in the package bus.uigen.

Customizable Customized Editor Classes

The default ObjectEditor classes allow the end users to customize aspects of the editor. In particular, they process attributes entered by the user. It is possible to write custom editor classes that offer end-users the ability to customize their behavior by overriding the public boolean processAttribute(Attribute attrib) method. This method is called for each attribute set by the user. The method can thus process each of these attributes as appropriate. In the example below, it processes the number of columns attribute by setting the number of columns of the input text field to it value:

```
public boolean processAttribute(Attribute attrib) {
        if (attrib.getName( ).equals(AttributeNames.NUM_COLUMNS)) {
            Integer numColumns = (Integer) attrib.getValue( );
            inputTextField.setColumns(numColumns.intValue( ));
            return true;
        }
        else return super.processAttribute(attrib);
    }
```

Figure 67A:
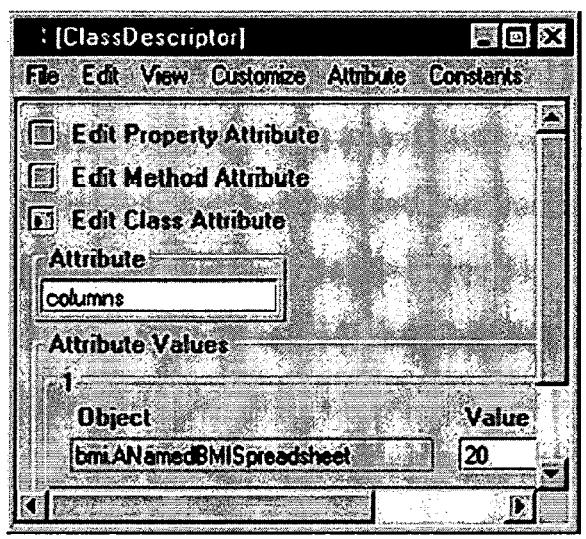
FIGS. 67(a) and 67(b) are computer screen shots illustrating examples of the customizing of the number of columns attribute for the custom class according to an embodiment of the subject matter described herein.

In FIG. 67(a), the end user sets the value of this attribute to 20 for instances of ANamedBMISpreadsheet.

Figure 67B:
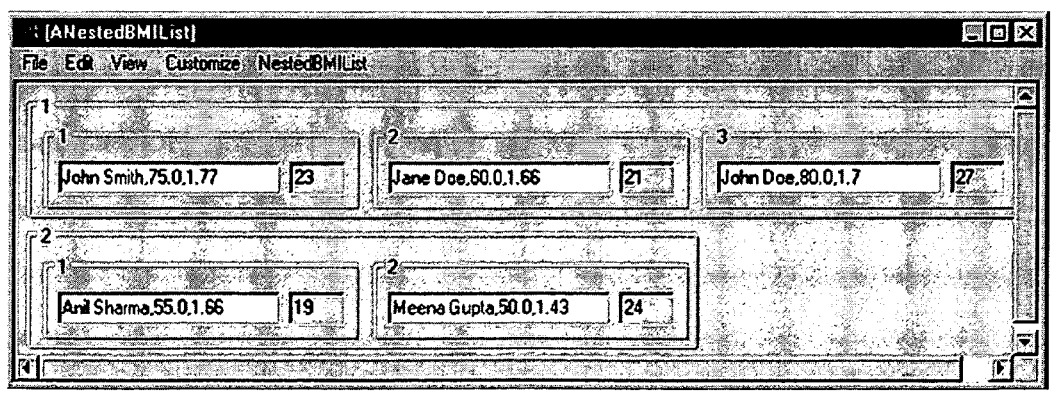

This causes the editors created for these instances to use 20 columns for their input text field (FIG. 67(b)), as opposed to the variable columns created by default (FIG. 66).

Customizing the MenuBar

Figure 68:
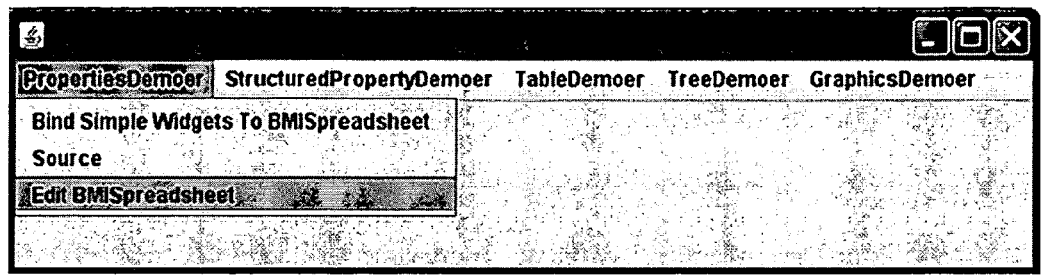
FIG. 68 is a computer screen shots illustrating an example of a customized menu bar with no editable state according to an embodiment of the subject matter described herein.

ObjectEditor can also be used to create customized menubars and menus. This is shown in FIG. 68. The underlying source code is shown below:

```
PropertiesDemoer bmiSpreadsheetDemoer = new PropertiesDemoer( );
    StructuredPropertyDemoer structuredPropertyDemoer = new
StructuredPropertyDemoer( );
    TableDemoer tableDemoer = new TableDemoer( );
    TreeDemoer treeDemoer = new TreeDemoer( );
    GraphicsDemoer graphicsDemoer = new GraphicsDemoer( );
    Object[ ]  menuObjects  =  {bmiSpreadsheetDemoer,
structuredPropertyDemoer, tableDemoer, treeDemoer, graphicsDemoer};
    ObjectEditor.addMenuObjects(menuObjects);
```

Rather than calling the edit method of ObjectEditor, the addMenuObjects( ) method of it is called. This method takes as arguments a list of model objects and crates a pull-down menu for each object in the order defined by the list. Each public visible method of the model is associated with a non nested menu item in the menu created for the object.

Figure 69:
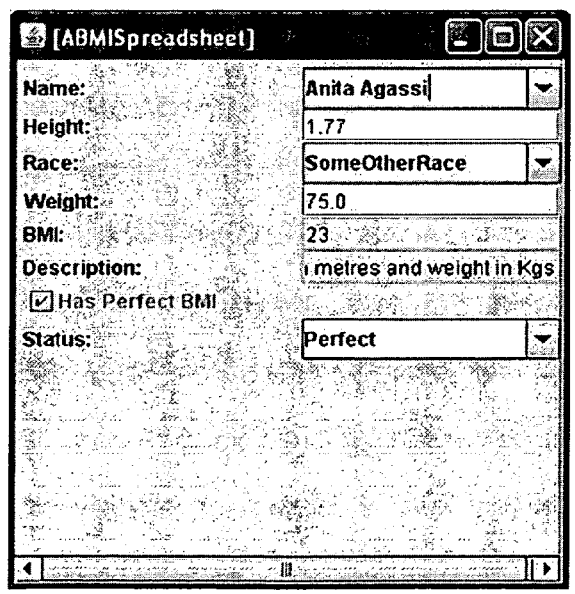
FIG. 69 is a computer screen shot illustrating an example of an editable widget with no menu bar, where, instead of calling ObjectEditor.edit(bmiSpreadsheet), the ObjectEditor.edit(bmiSpreadsheet, false) call was made, where the second argument indicates if a menu bar should be created according to an embodiment of the subject matter described herein.

In FIG. 68, the user-interface has a menubar but no editable state. It is also possible to create editable state with no menu bar, as shown in FIG. 69.

It is also possible to create nested menus.

Figure 70:
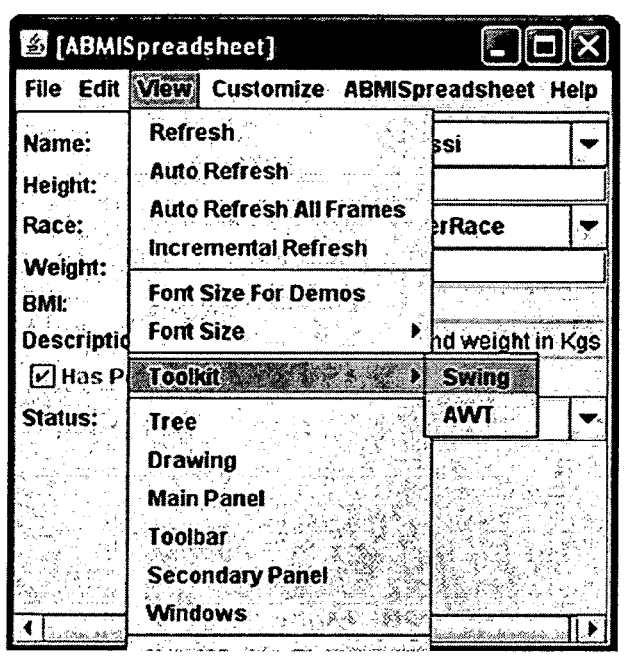
FIG. 70 is a computer screen shot illustrating an example of nested menus according to an embodiment of the subject matter described herein.

This is illustrated by the predefined menu items shown in FIG. 70 for changing toolkits.

The predefined menus are defined by menu objects added like programmer-defined objects to the menubar. The two operations provided by the toolkit model are given below:

```
public class AToolkitSelectionModel {
    public void AWT( ) {
        VirtualToolkit.selectAWT( );
    }
    public void swing( ) {
        VirtualToolkit.selectSwing( );
```

-continued

```
    }
}
```

The following call maps them both of them to the "Toolkit" submenu of the "View" menu:

```
ObjectEditor.setLabel(AToolkitSelectionModel.class,
uiFrame.VIEW_MENU_NAME +
uiFrame.MENU_NESTING_DELIMITER +
uiFrame.TOOLKIT_SELECTION_MENU_NAME);
```

The label of the class indicates the position of the class menus in a nested menu. The nesting delimiter defined by ObjectEditor is '.'. All visible public methods of the class are put in that menu.

It is also possible to place each method of an object independently in a menu. This is shown by the following call:

```
ObjectEditor.setMethodAttribute(AFontSizeModel.class, "demoFontSize",
AttributeNames.MENU_NAME, uiFrame.VIEW_MENU_NAME);
```

Figure 71:
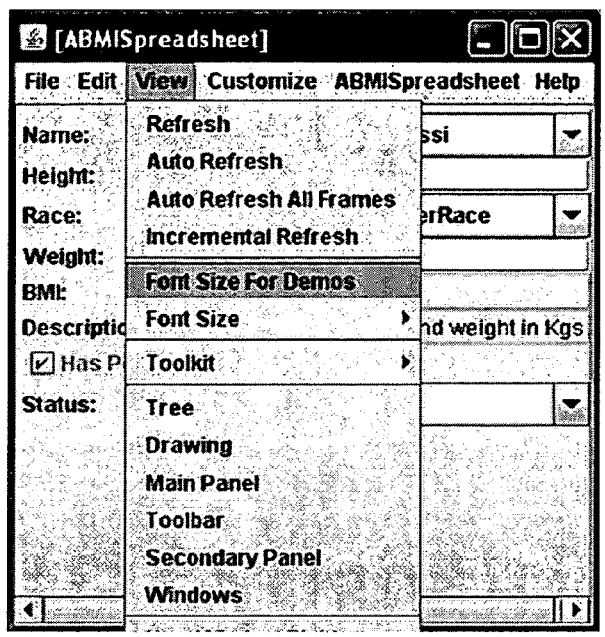
FIG. 71 is a computer screen shot illustrating an example of the binding of demoFontSize to a View menu according to an embodiment of the subject matter described herein.

The hierarchical MENU_NAME of a method indicates its explicit menu position in the nested menus created by Object- Editor. As a result, the demoFontSize methos is placed in the menu hierarchy as shown in FIG. 71.

The name and position of a menu item created for a method are determined by the label and position attributes of the method, as shown by the following call:

```
ObjectEditor.setMethodAttribute(AFontSizeModel.class, "demoFontSize", AttributeNames.LABEL, uiFrame.DEMO_FONT_SIZE);
```

Directly Mapping Widgets to Object Components

In all of the user interfaces shown above, ObjectEditor instantiates the widgets and editors. These include both control widgets such as buttons and menus and editable widgets such as text boxes and sliders. It is possible for the application programmer to do the instantiation, and hence layout, of these widgets. ObjectEditor provides calls to bind methods to buttons and menu items directly instantiated by the application programmer, and properties to editable widgets directly instantiated by the programmer. As a result, the user can fully customize the layout and components of the user interface, and use ObjectEditor only to automatically translate between the user actions and object state.

Figure 72:
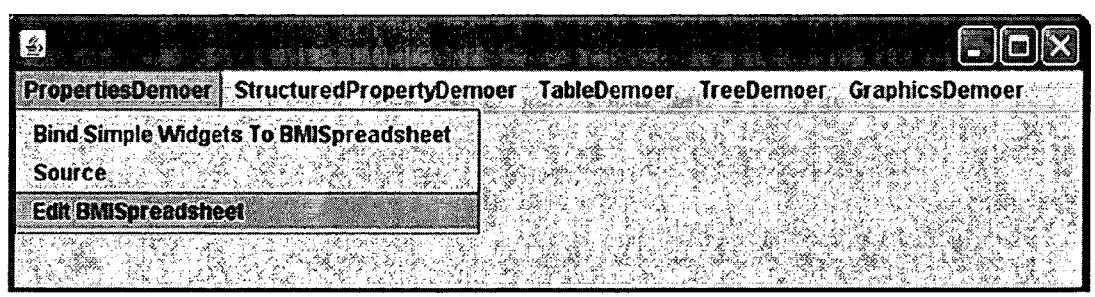
FIG. 72 is a computer screen shot illustrating an example of the creation of a fully automatic layout illustrating the difference between fully generated and customized user interfaces according to an embodiment of the subject matter described herein.
Figure 73:
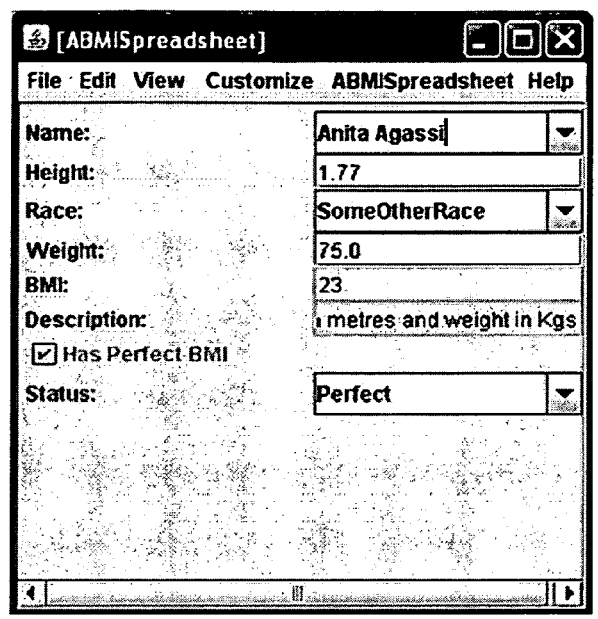
FIG. 73 is a computer screen shot illustrating an example of a fully generated user interface wither the various widgets and their layout was chosen by ObjectEditor according to an embodiment of the subject matter described herein.

FIG. 72 illustrates the creating of a fully automatic layout: This is a tool illustrating the difference between fully generated and customized user interfaces. FIG. 73 illustrates a fully generated user interface: the various widgets and their layout was chosen by ObjectEditor.

Figure 74:
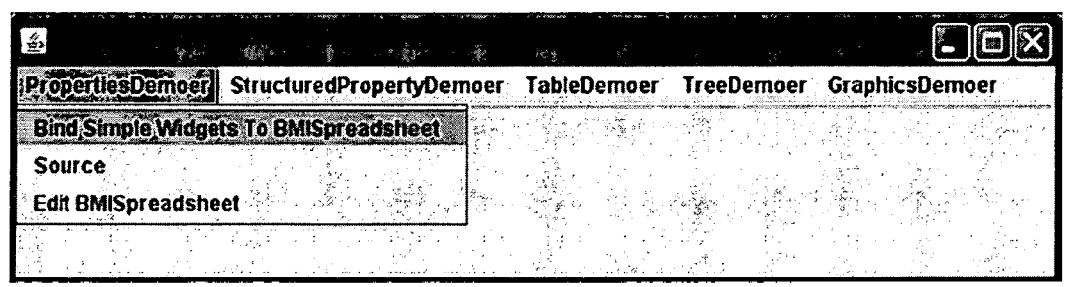
FIG. 74 is a computer screen shot illustrating an example of the creation of a fully customized user interface according to an embodiment of the subject matter described herein.

FIG. 74 illustrates a fully customized user interface.

Figure 75:
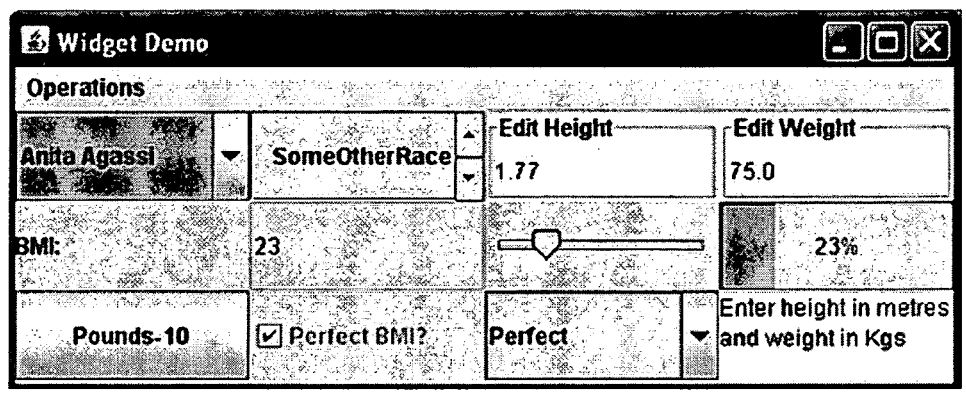
FIG. 75 is a computer screen shots illustrating an example of a fully customized user interface where the widgets were instantiated and composed in a frame by the application programmer and then bound to the application methods according to an embodiment of the subject matter described herein.

FIG. 75 illustrates a fully customized user interface where the widgets were instantiated and composed in a frame by the application programmer and then bound to application methods and properties. The same property may be bound to multiple widgets. For instance, the bmi property was bound to a formatted text field, a slider and a progress bar. Some widgets may not be bound to any property or method. For instance the BMI label is not bound to any property.

Figure 76:
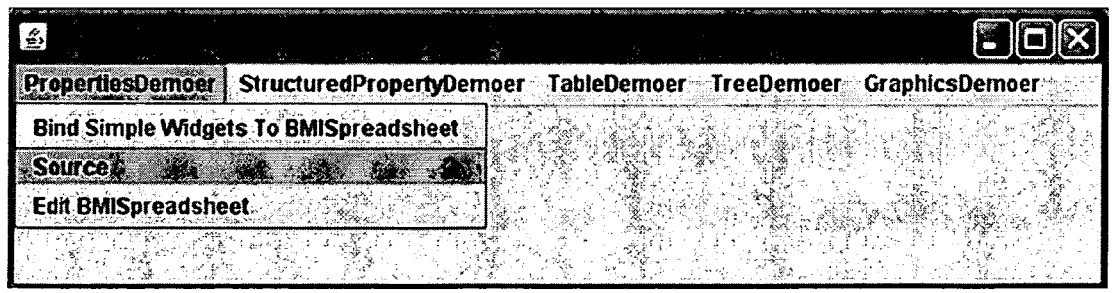
FIG. 76 is a computer screen shot illustrating an example of an automatically generated user interface tool for viewing relevant source code according to an embodiment of the subject matter described herein.

FIG. 76 illustrates a tool for accessing relevant source code.

Figure 77:
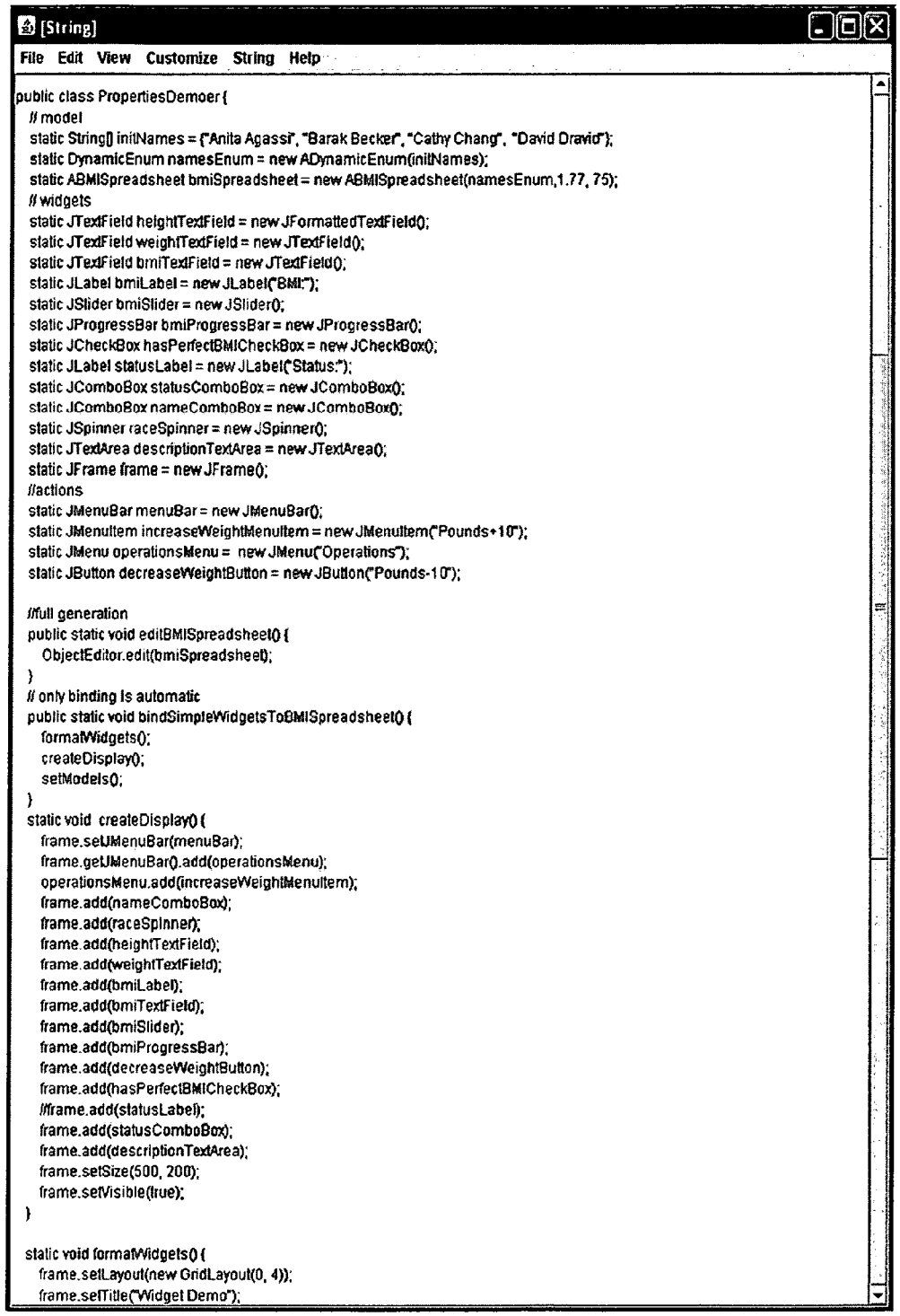
FIG. 77 is a computer screen shot of source code that may be accessed using the tool in FIG. 76 according to an embodiment of the subject matter described herein.

FIG. 77 illustrates code illustrating manual creation of widgets and some of the public methods of PropertyDemoer. No ObjectEditor function is used here.

FIG. 78 illustrates relevant code illustrating the binding: There code not shown creates a frame and various widgets such as nameComboBox, raceSpinner, heightTextField and so on. It also instantiates the model to create a BMISpreadsheet object. The visible code shows how methods and properties of an object are bound to instantiated widgets. The call, setModels( ) takes three arguments. The first argument, is the object whose properties are to be bound, the second one is an array of properties of the object, and the third an array of instantiated components. It binds property, to component. A simpler version of the call, setModel, takes a single property and component as arguments. The calls bindMeuItemToMethod( ) and bindButtonToMethod, take the object as the first argument, the method name as the second one, and the menu item or button as the third argument.

Figure 79:
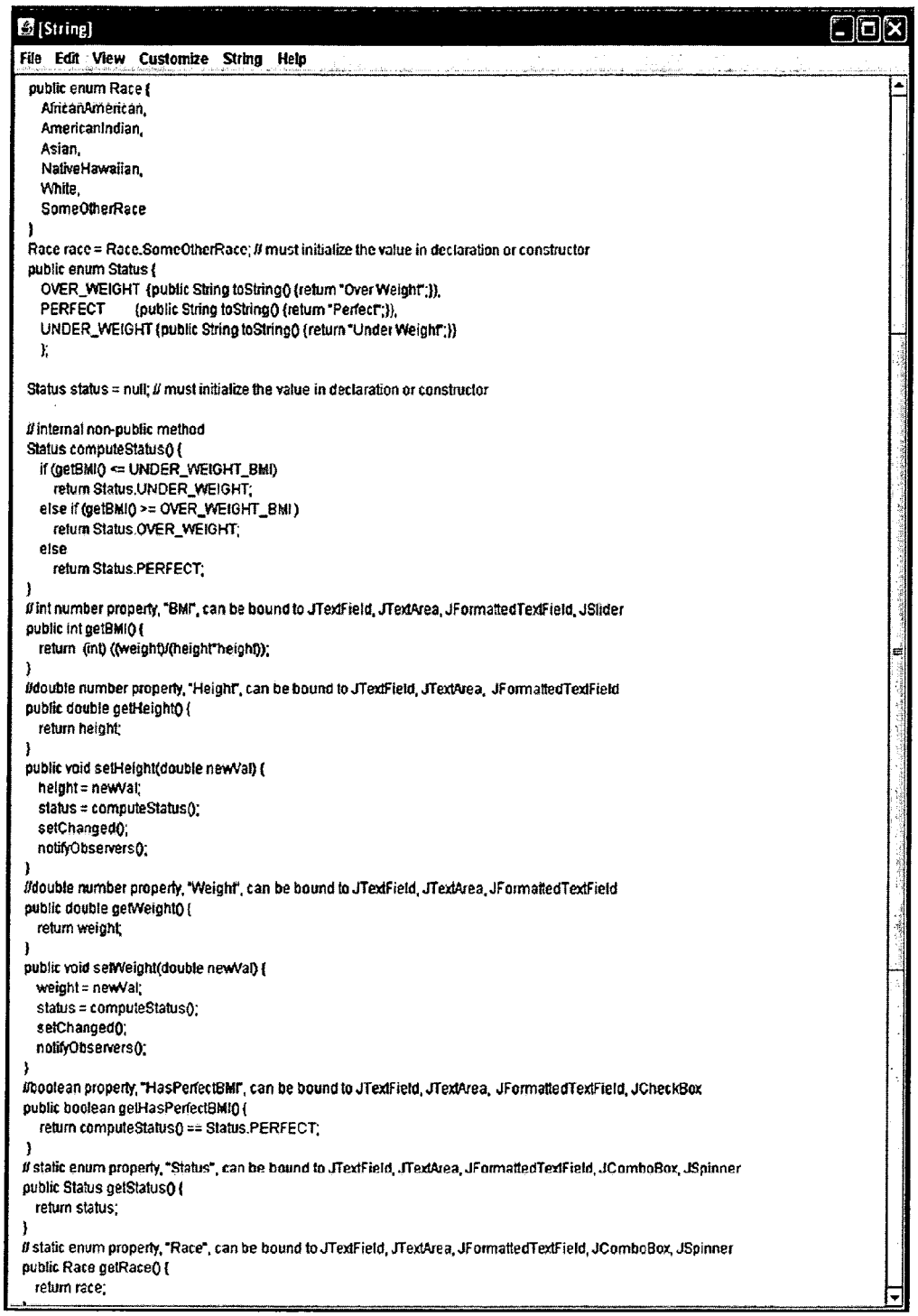
FIG. 79 is a computer screen shot illustrating some of the customization code for a user interface according to an embodiment of the subject matter described herein.
Figure 80A:
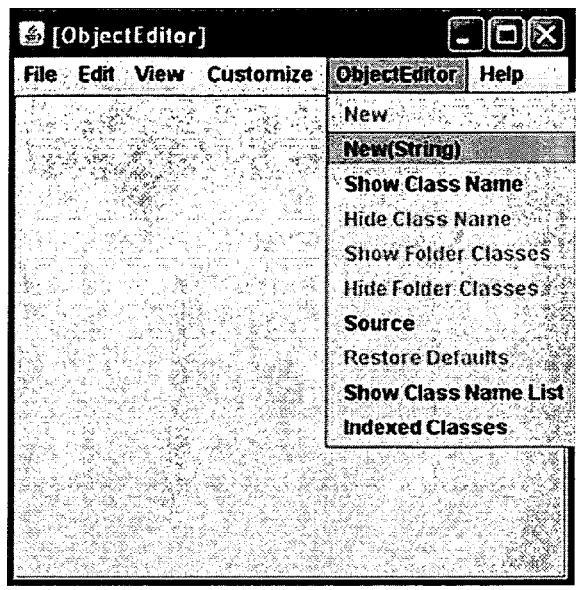
FIGS. 80(a)-80(j) are computer screen shots illustrating examples of the user of an automatic user interface generation tool for teaching purposes according to an embodiment of the subject matter described herein. In particular.
Figure 80B:
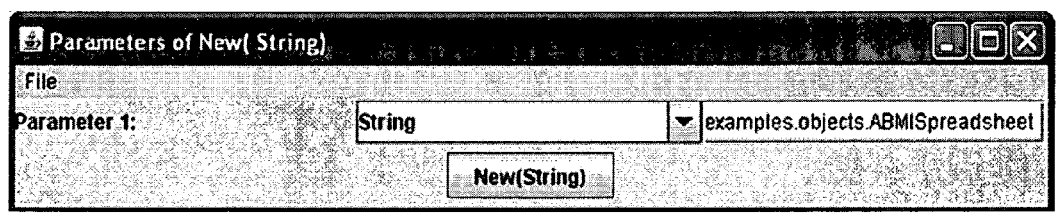
Figure 80C:
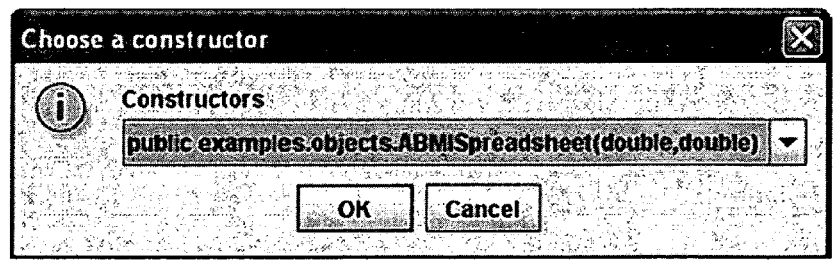
Figure 80D:
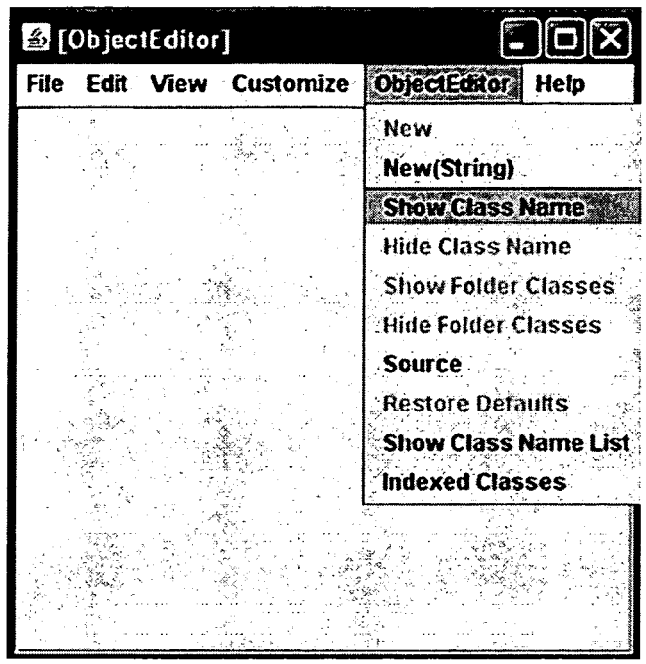
Figure 80E:
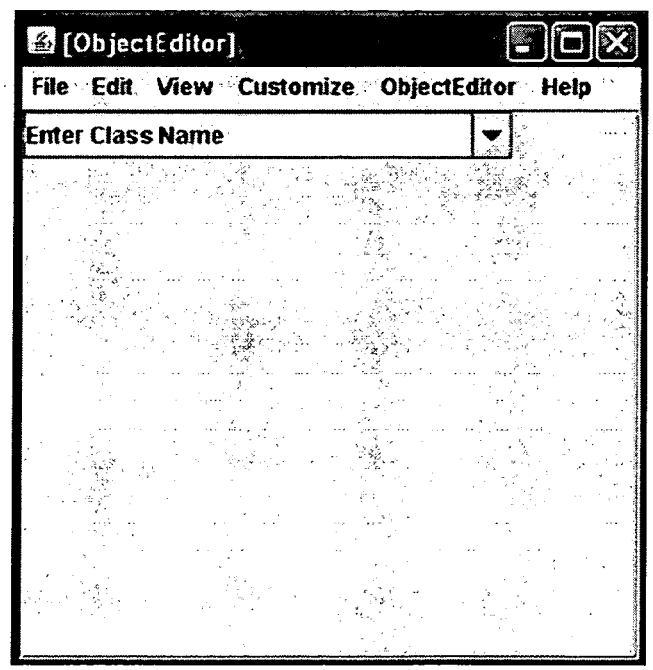
Figure 80F:
Figure 80G:
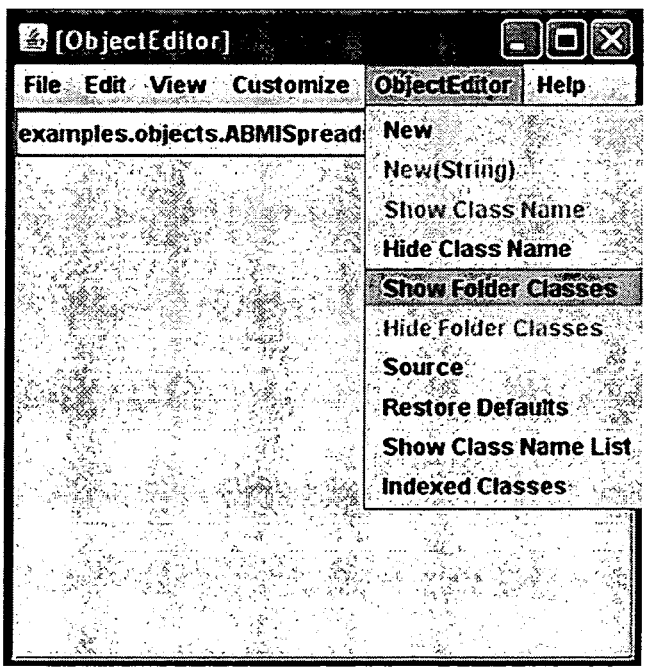
Figure 80H:
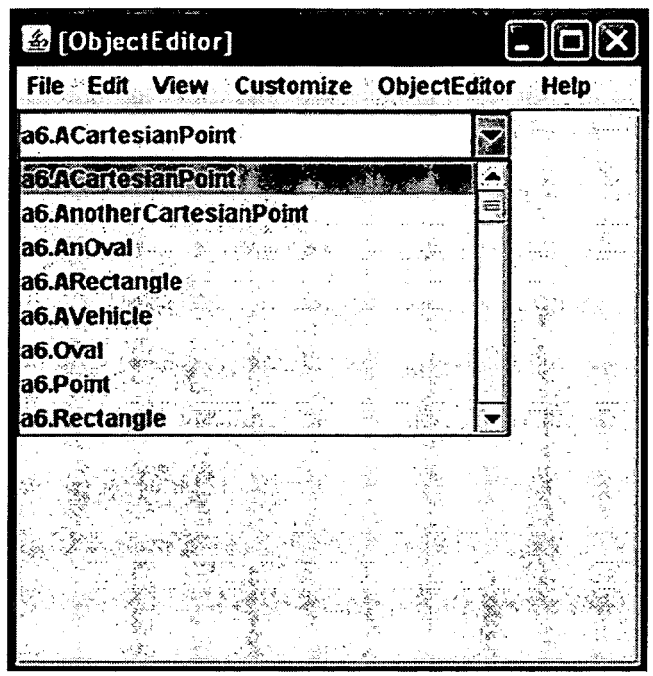
Figure 80I:
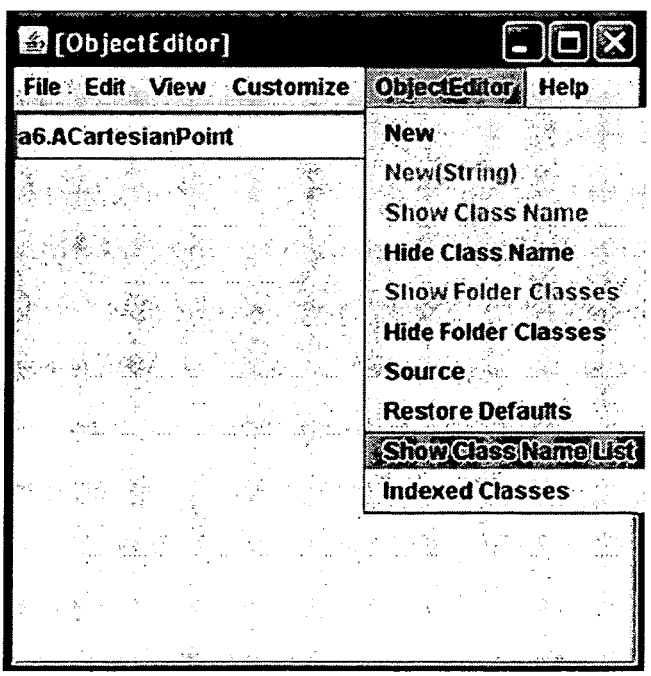
Figure 80J:
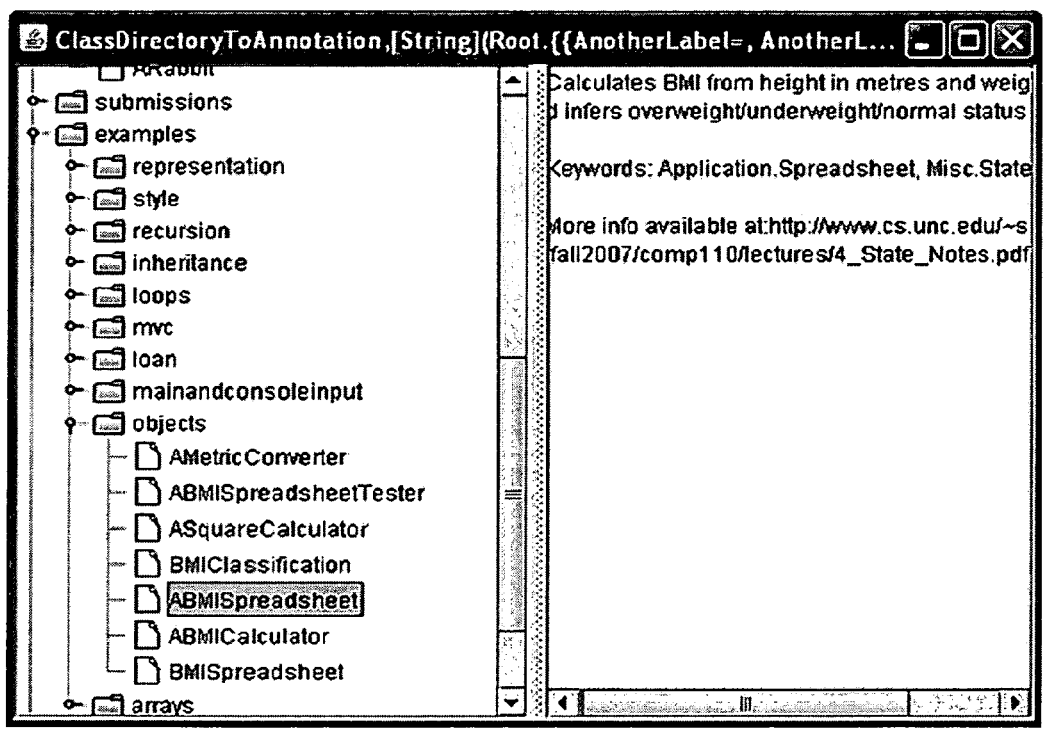

FIG. 79 illustrates source code of ABMISpreadsheet: This code illustrates the version of BMI spreadsheet used in this example. It has different types of properties including enum, double and Boolean. The comments indicate kinds of widgets to which a property may be bound.

Use of Automatic User Interface Generation for Teaching

As described above, the methods, systems, and computer readable media for automatic user interface generation described herein may be used to teach compute programming to students. By separating application development from user interface development, students can focus on application development, rather than user interface development. Moreover, because the user interface methods, systems and computer readable media described herein use programming conventions to generate the user interfaces, the student is encouraged to user these programming conventions to ensure that the desired user interface will be generated.

FIGS. 80(*a*)-(*j*) illustrate the use of automatic user interface generation for teaching purposes. For example, FIGS. 81(*a*)-(*j*) illustrate a graphical new class instantiation tool provided by ObjectEditor to create a class and associate it with a user interface. In FIGS. 80(*a*) and 80(*b*) ObjectEditor allows the user to select a new name for a class. In FIG. 80(*c*), the user selects a constructor for the class from a menu of constructors. The constructor connects the class to a user interface. In FIGS. 80(*d*) and 80(*e*), the user edits the class name to instantiate the class. In FIG. 80(*f*), the New command is selected to instantiate the class and generated a user interface for the instance. In FIGS. 80(*g*) and 80(*h*), all visible classes are displayed in a combo-box, and the user can select one of them for the new command, which associates the selected class with a user interface. In FIG. 80(*i*), the user can select an option to view a list of instantiated class names. In FIG. 80(*j*), all visible classes of a tree user interface are shown and the programmer selects one of the objects from the tree interface on which the new command will be executed to bind it with a programmer selected user interface widget. In the interface illustrated in FIG. 80(*j*), explanation annotations for the selected class are shown.

Just as it may be desirable to use the same value of height as we try different values of weight in the BMI case, we typically want to instantiate the same class in succession. It is possible to transform the ObjectEditor user-interface into a state-full one, by executing the ObjectEditor>Show Class Name command (FIG. 80(*d*)), which shows a combobox to enter the class name (FIG. 80(*e*)). We can enter the name of the class we want to enter (FIG. 80(*i*)). ObjectEditor remembers this value, which is now shown as a combobox choice (FIG. 80(*h*))). To repeatedly instantiate the same class shown as the current combobox choice, we can simply execute the parameter-less ObjectEditor>New command (FIG. 80(*f*)), instead of the ObjectEditor→New . . . command we used earlier that took a class name as parameter.

After instantiating a class, if we wish to instantiate another one, there are two cases to consider. If we have previously instantiated it, we can simply use the combobox to change the current combobox choice. Otherwise, we can enter its name in the manner described above. Thus, once we have entered a class name, we don't have to enter it again as we wish to create different instances of it.

Sometimes we don't need to manually enter the name of the class even the first time we instantiate it. Often we execute ObjectEditor from the folder in which we have stored classes we wish to instantiate. The ObjectEditor>Show Folder Classes command reads the names of the classes in the folder and displays it in the combo box.

Mappings Between Methods and User Interface Elements

Figure 81A:
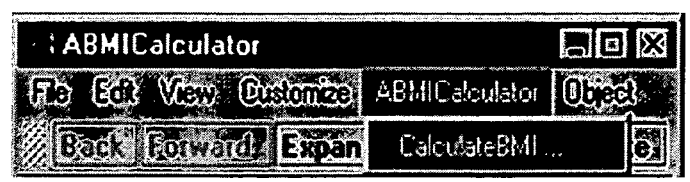
FIGS. 81(a)-81(e) are computer screen shots illustrating examples of the setting of the double click method attribute of mappings between methods and user interface elements according to an embodiment of the subject matter described herein.
Figure 81B:
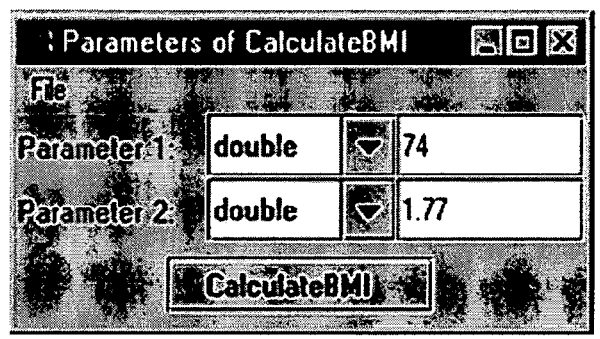
Figure 81C:
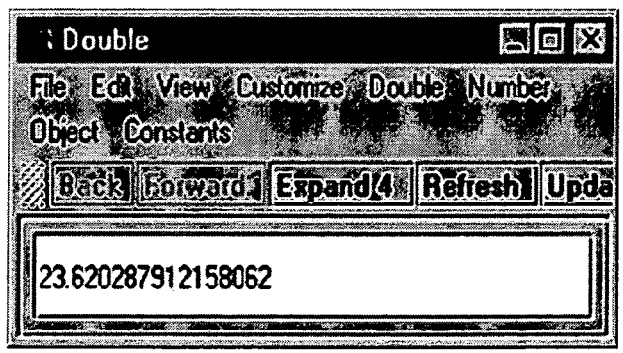
Figure 81D:
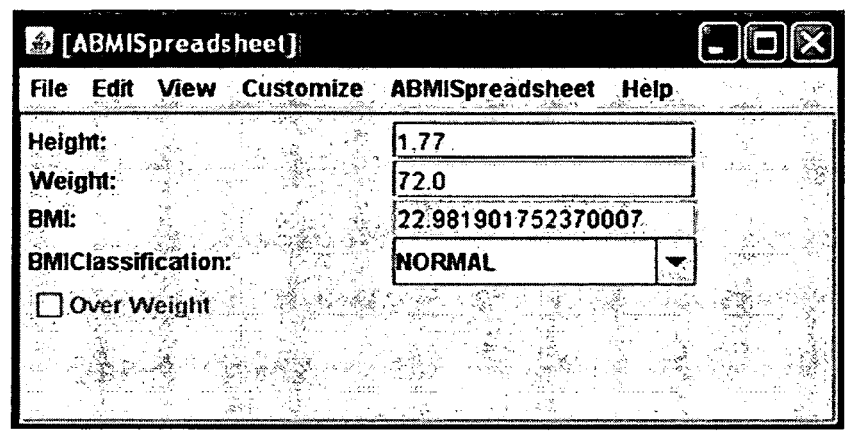
Figure 81E:
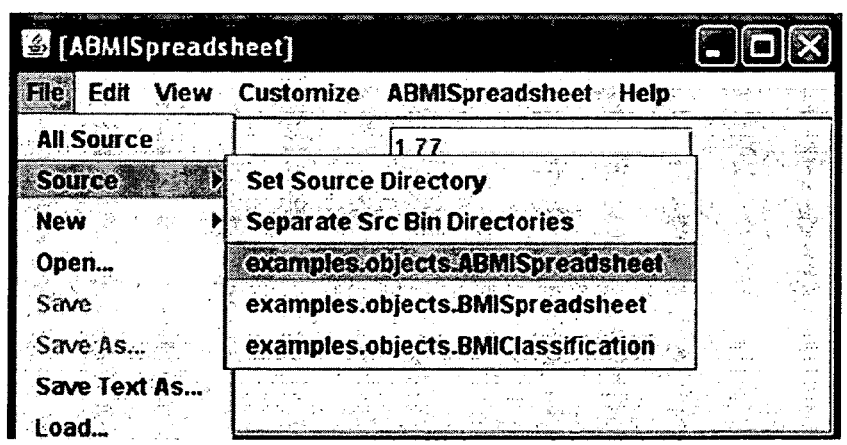

In the examples above programming patterns, which are relationships between methods, are mapped to user interface elements. Methods can also be mapped to user interface elements, such as control widgets. FIGS. 81(*a*)-(*e*) illustrate such mappings. In FIG. 81(*a*), the user selects a method, CalculateBMI, from a menu of methods in an object. When the user selects the method, ObjectEditor is invoked to display the parameters of the method, as illustrated in FIG. 81(b). FIG. 81(c) illustrates the results of the user invoking the method by selecting the CalculateBMI button in FIG. 81(b) to invoke the method for the illustrated parameters. In FIG. 81(d), the user interface shows logical components mapped to text fields, combo boxes, and check boxes. In FIG. 81(e), the user is presented with a menu item that allows the user to interactively view the source code of the selected application object. An example of such a source code display is illustrated in FIG. 6(a).

Mapping of Methods to Graphical Widgets

Figure 82A:
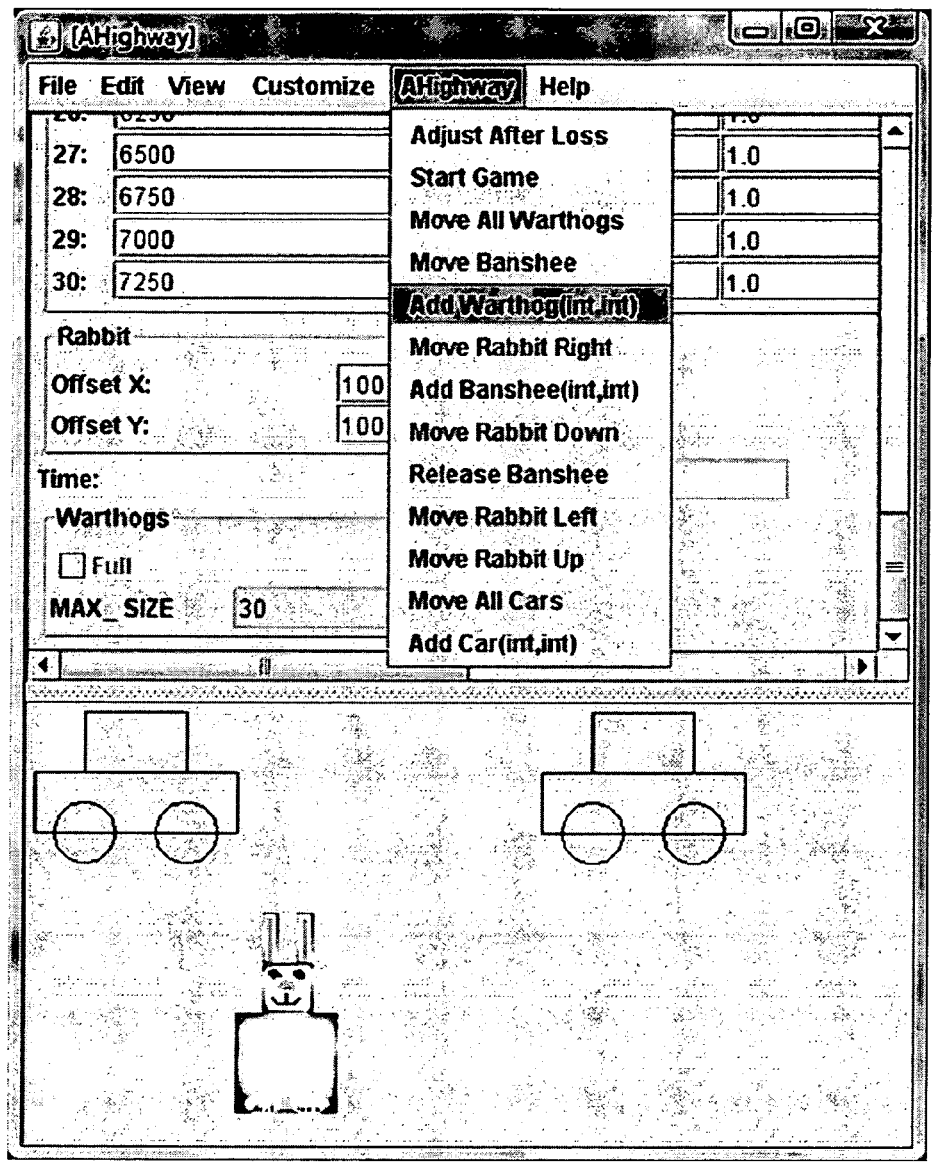
FIGS. 82(a)-82(f) illustrate the creation of graphical objects, the binding of graphical objects to user interface widgets, and dynamic updates to the user interface in response to a user command according to embodiments of the subject matter described herein.
Figure 82B:
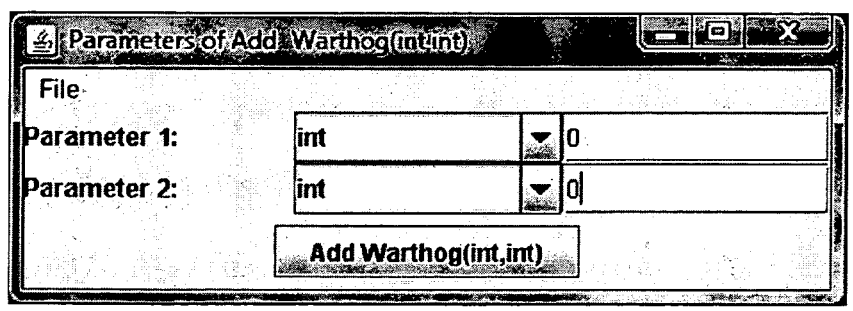
Figure 82C:
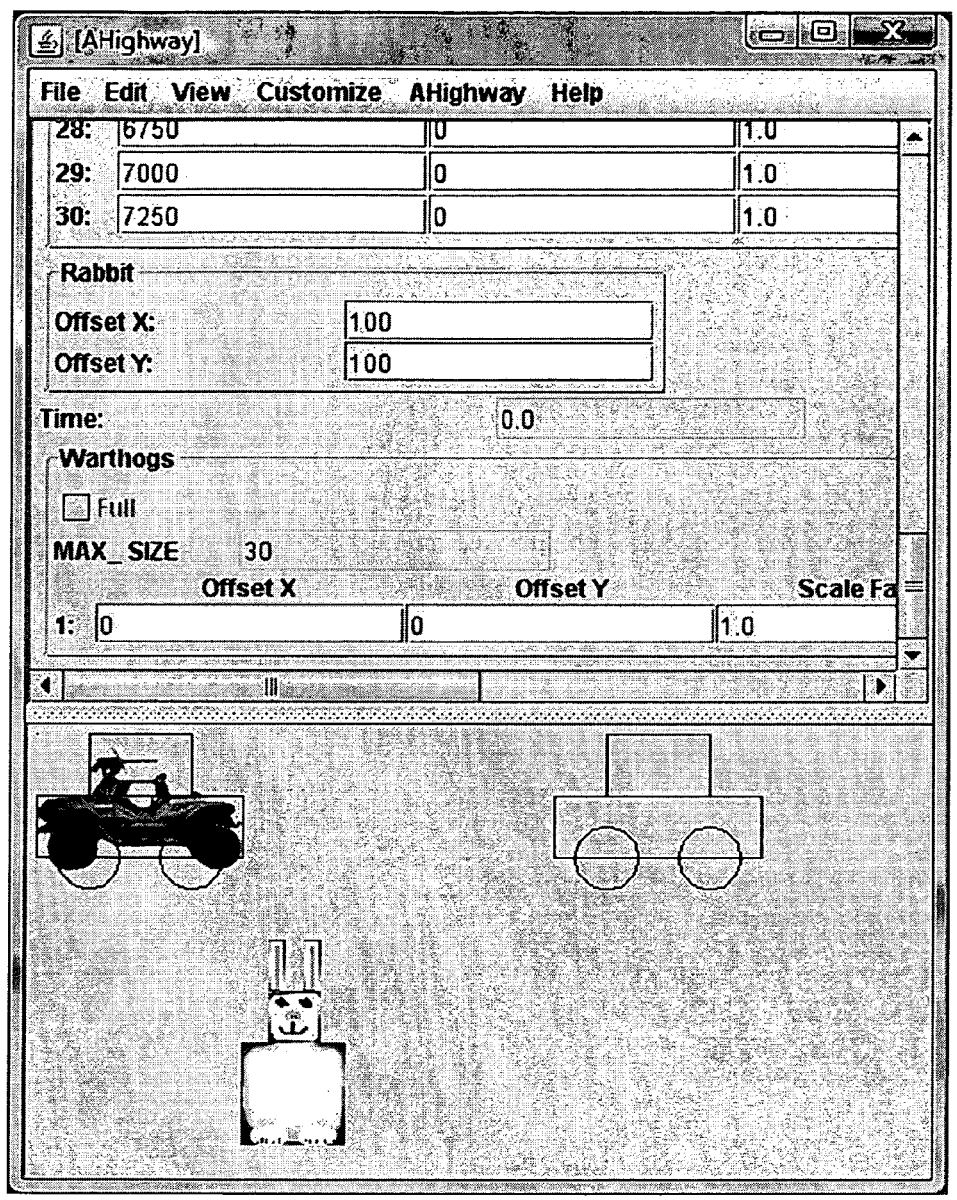
Figure 82D:
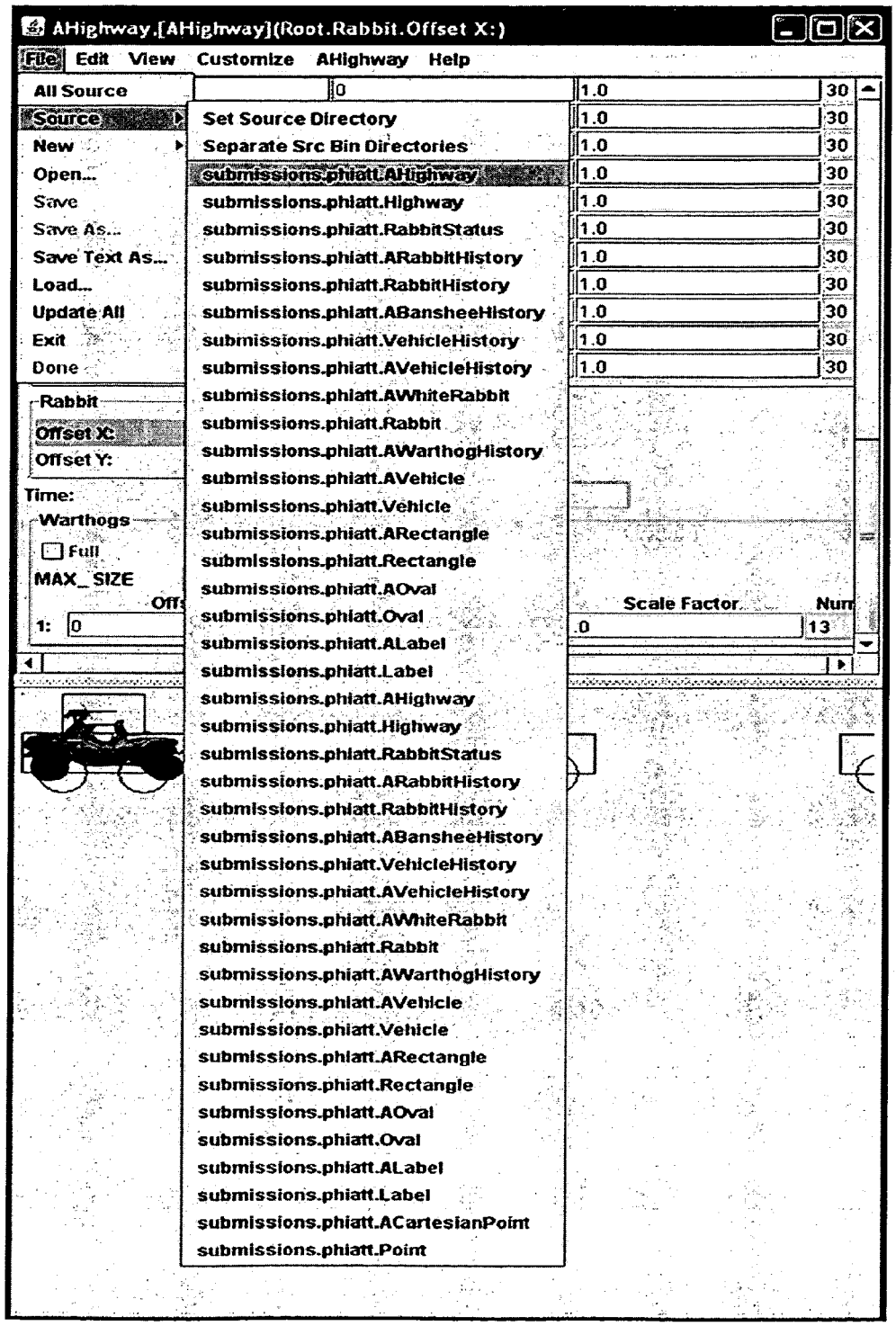
Figure 82E:
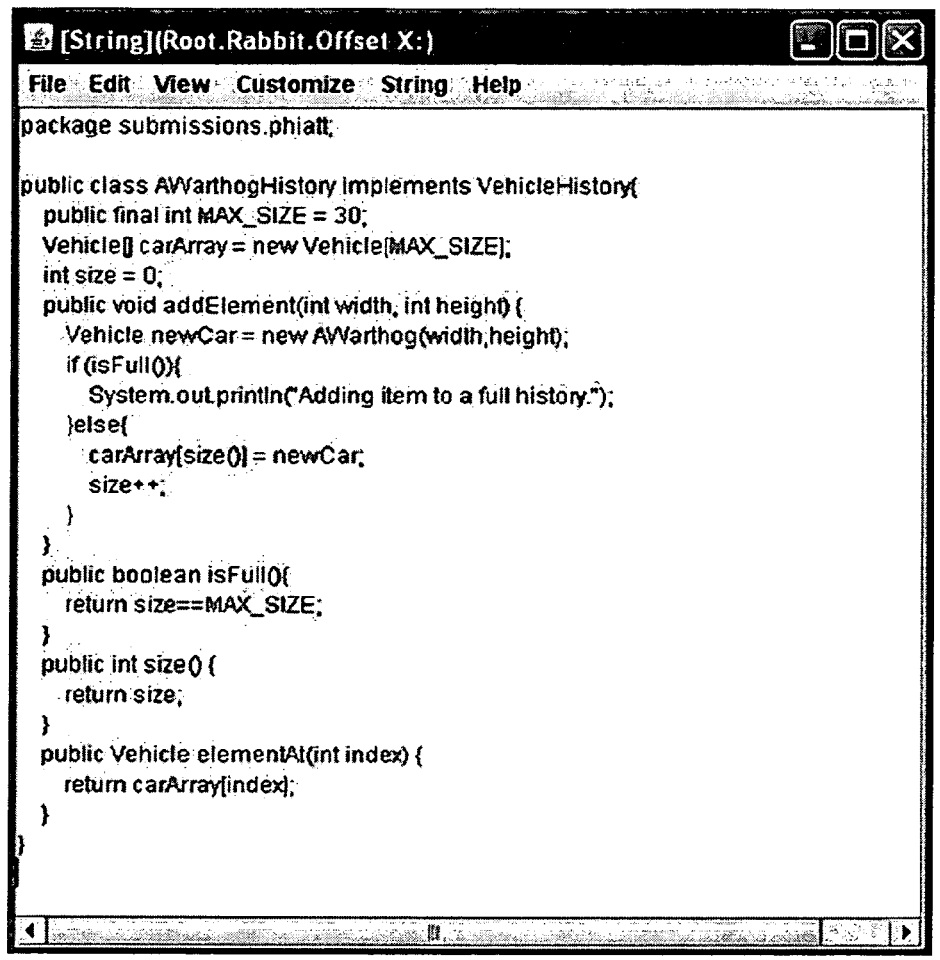
Figure 82F:

As described above with regard to the Turtle example, programming patterns and methods can be automatically mapped to graphical user interface widgets. FIGS. 82(a)-82(f) further illustrate this concept. In FIG. 82(a), a user-interface consisting of a text container (top of window) of text widgets, such as text-boxes and (bottom of window) a drawing widget showing graphical objects such as icons, squares and circles. The user decides to invoke the addWarthog(int, int) method, which adds a new object to a list of Warthog image objects. As the text container widget shows, this list is currently empty. In FIG. 82(b), the user enters the parameters of the warthog. In FIG. 82(c), the warthog object is added to the drawing widget of FIG. 82(a). A textual description of the warthog object is also added to the text container. FIG. 82(d) shows a list of warthog objects for which source code can be selected. FIG. 82(e) shows the class of the object describing the list of warthogs. A structure patterns determines that elementAt( ) and size( ) are read methods of a list component of the object yielding the logical components elementAt(0) . . . (elementAt(size( )−1). FIG. 82(f) shows source code for drawing the warthog illustrated in FIG. 82(c).

Exemplary Operating Environment and Method Flow

Figure 83:
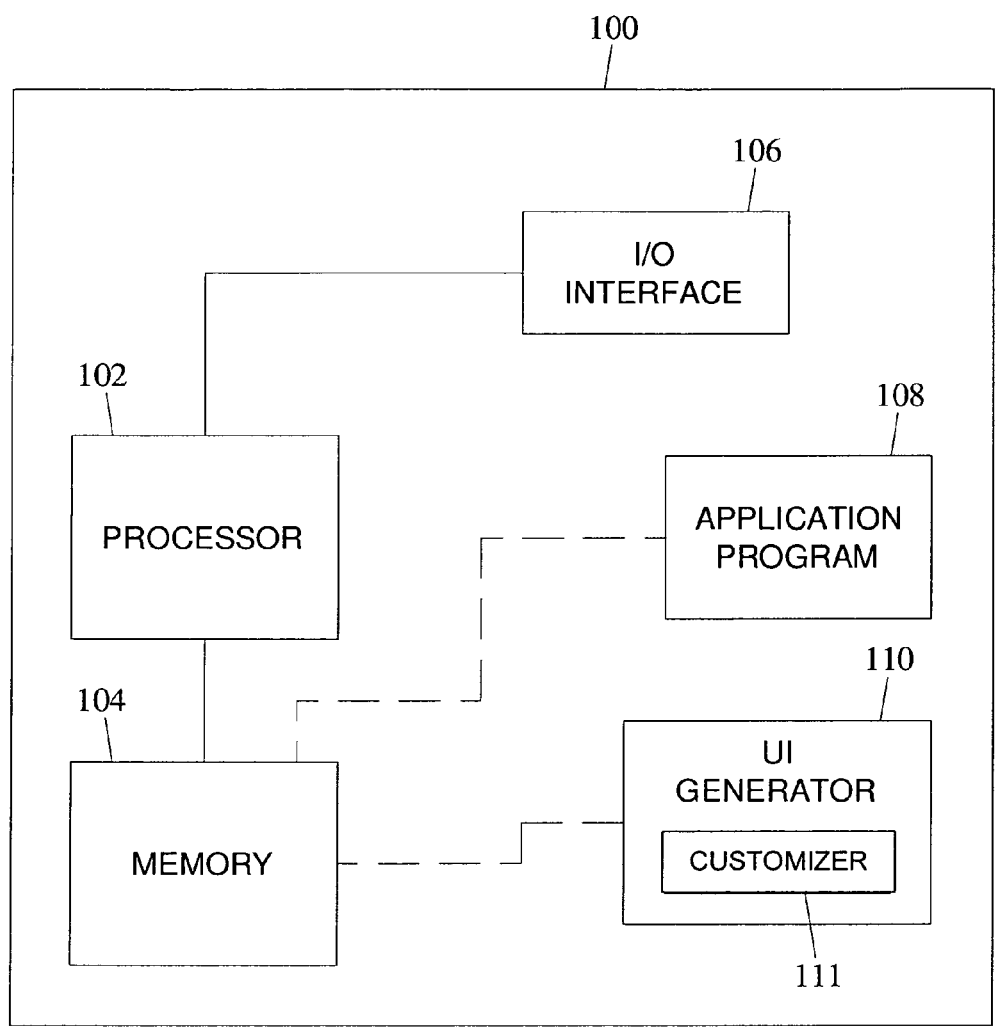
FIG. 83 is a block diagram of an exemplary system for automatically generating a user interface based on programming patterns according to an embodiment of the subject matter described herein.

As stated above, the subject matter described herein for automatically generating a customizable user interface using programming patterns may be implemented as a computer readable medium having stored thereon a computer program. FIG. 83 illustrates a general purpose computing platform programmed with software for automatically generating a customizable user interface using programming patterns according to an embodiment of the subject matter described herein. In FIG. 83, general purpose computing platform 100 may be a personal computer, server computer, or any other computing platform capable of executing programs. Computing platform 100 includes one or more processors 102, memory 104, and an I/O interface 106. Memory 104 may store programs to be executed by processor 106. In the illustrated example, these programs include application program 108 and user interface generator 110. Application program 108 is assumed to be written in an object oriented language, such a C++ or Java. Accordingly, application program 108 may include one or more classes containing one or more methods, where the methods include public interfaces, as described above. Rather than embedding code in application program 108 to generate a user interface for application program 108, application program 108 may include one or more calls to user interface generator 110. When application program 108 is executed, the calls to user interface generator 110 invoke user interface generator 110 to automatically generate a user interface for application program 108. The user interface may allow a user to interact with application program 108 via I/O interface 106. In addition, user interface generator 110 may be a stand alone application that includes a customizer 111 that allows a programmer or a user to interactively create a customized user interface for application program 108, using the methods described above. An example of a UI generator 110 is the Objecteditor described above.

Figure 84:
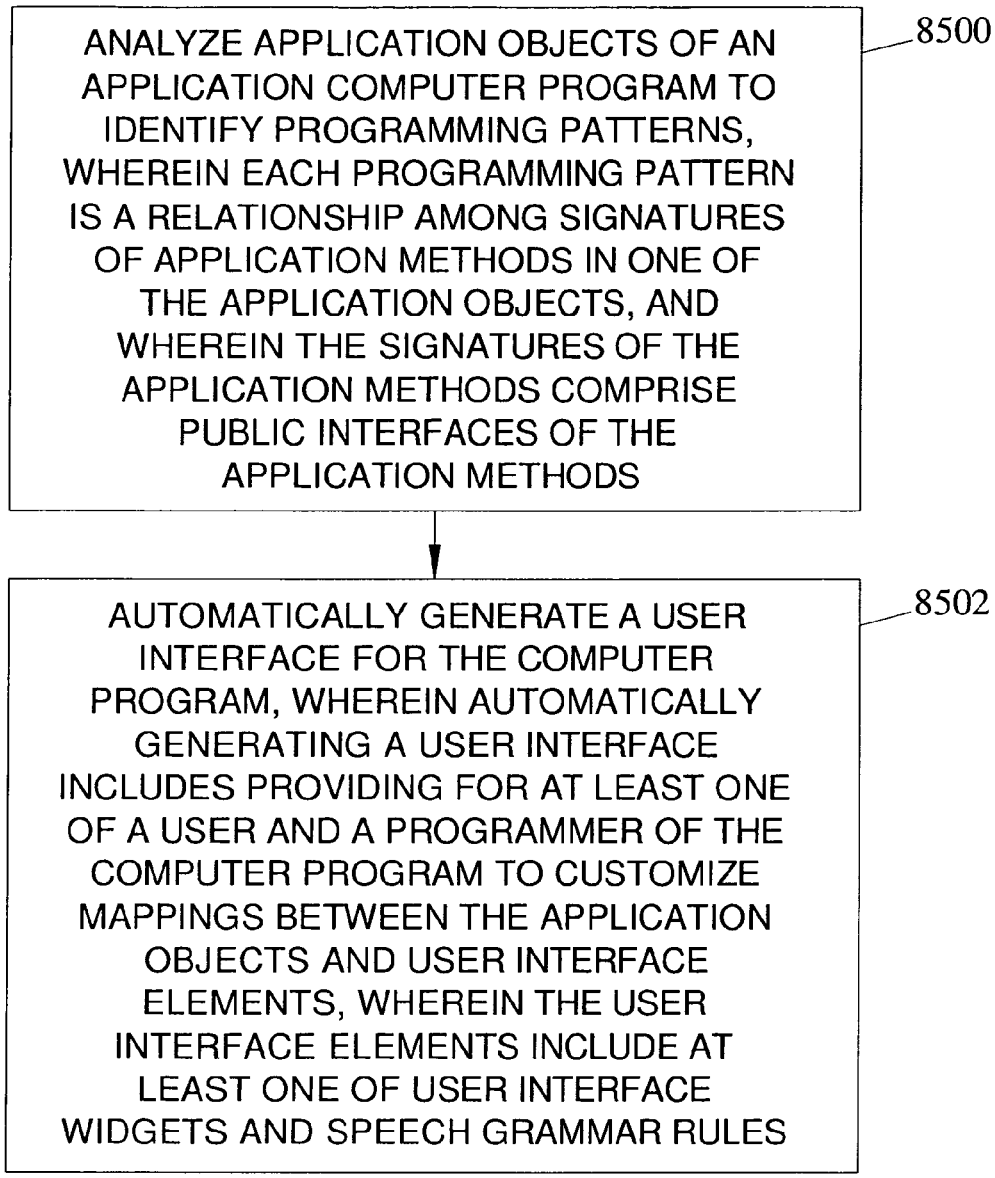
FIG. 84 is a flow chart of an exemplary method for automatically generating a customizable user interface using programming patterns according to an embodiment of the subject matter described herein.
Figure 85:
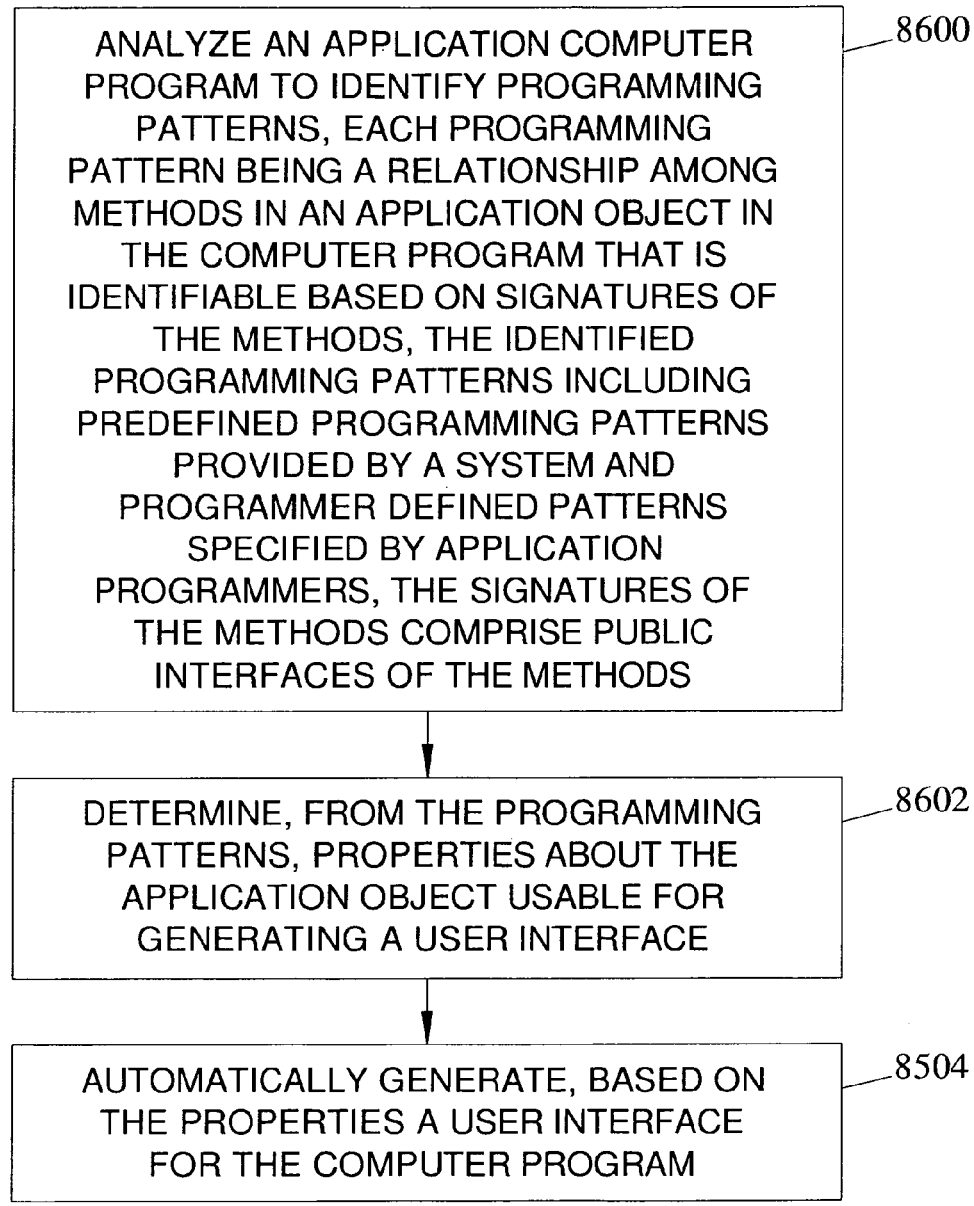
FIG. 85 is a flow chart of an exemplary method for automatically generating a user interface based on programmer defined and system defined programming patterns according to an embodiment of the subject matter described herein.

FIG. 84 is a flow chart illustrating an exemplary process for automatically generating a user interface using programming patterns according to an embodiment of the subject matter described herein. Referring to FIG. 85, in step 112, application objects of an application computer program are to identify programming patterns. Each programming pattern is a relationship among signatures of application methods in one of the application objects. The signatures of the application methods comprise public interfaces of the application methods. For example, when UI generator 110 is invoked, either by the application program, by a programmer creating an application program, or by a user of an application program, UI generator 110 analyzes the objects of application program for programming patterns. The analysis includes invoking pattern objects that map application objects to user interface elements.

In step 114, user interface generator 110 automatically generates a user interface for the computer program. Automatically generating a user interface includes providing for at least one of a user and a programmer of the computer program to customize mappings between the application objects and user interface elements. The user interface elements include at least one of user interface widgets and speech grammar rules. For example, user interface generator 110 may provide default mappings of application objects to user interface elements and allow the user or the programmer to customize the mappings, as in the default and customized stereo interfaces illustrated above.

In the example illustrated in FIG. 84, customization of the user interface is provided. However, the subject matter described herein also includes a method for automatically generating a user interface for a computer program that does not require customization. FIG. 85 illustrates such a method. Referring to FIG. 85, in step 116, a method for automatically generating a user interface for a computer program includes analyzing an application computer program to identify programming patterns. Each programming pattern is a relationship among methods in an application object in the computer program that is identifiable based on signatures of the methods. The identified programming patterns include predefined programming patterns provided by a system and programmer defined patterns specified by application programmers. The signatures of the methods comprise public interfaces of the methods. In step 118, the method includes determining, from the programming patterns, properties about the application object usable for generating a user interface. For example, in the ABMISpreadheet object set forth above, the getWeight and setWeight method signatures may be analyzed to identify a property, weight.

In step 120, the method includes automatically generating, based on the properties, a user interface for the computer program. For example, for the weigh property, the user interface that is generated may be a default text widget, such as a text box, for obtaining input from the user.

REFERENCES

The disclosure of each of the following references is incorporated herein by reference in its entirety.

[1] Krasner, G. E. and S. T. Pope, *A Cookbook for Using the Model-View-Controller User Interface Paradigm in Smalltalk-80*. Journal of Object-Oriented Programming, August/September 1988 1(3): p. 26-49.

[2] Szekely, P. *Retrospective and Challenges for Model-Based Interface Development*. in *2nd International Workshop on Computer-Aided Design of User Interfaces*. 1996.

[3] Sukaviriya, P., J. Foley, and T. Griffith. *A Second Generation User Interface Design Environment: The Model and Runtime Architecture*. INTERCHI '93. April 1993.

[4] Apple, I., *Cocoa*. 2006, http://developer.apple.com/documentation/Cocoa/.

[5] Olsen, D. R., *User Interface Management Systems: Models and Algorithms*. 1992, San Mateo, Calif.: Morgan Kaufmann.

[6] Dewan, P. and M. Solomon, *An Approach to Support Automatic Generation of User Interfaces*. ACM TOPLAS, October 1990. 12(4): p. 566-609.

[7] Dewan, P. *Towards a Universal Toolkit Model for Structures*: in *Proc. EHCI-HCSE-DSVIS '07*. 2007.

[8] Engelson, V., D. Fritzon, and P. Fritzon. *Automatic Generation of User Interfaces from Data Structure Specification and Object-Oriented Models*. in *ECOOP '96*.

[9] Nichols, J., B. A. Myers, and B. Rothrock. *UNIFORM: Automatically Generating Consistent Remote Control User Interfaces*. in *Proceedings of CHI '2006*.

[10] Gajos, K., D. et al. *Fast and Robust Interface Generation for Ubiquitous Applications*. in *UBICOMP '05*.

[11] Ponnekanti, S. R., B. Lee, A. Fox, P. Hanrahan, and T. Winograd. *ICrafter: A Service Framework for Ubiquitous Computing Environments*. in *Ubicomp* 2001.

[12] Myers, B., *User Interface Software Tools*. ACM TOCHI, March 1995. 2(1): p. 64-103.

[13] Berlage, T., *A Selective Undo Mechanism for Graphical User Interfaces*. ACM Transactions on Computer-Human Interaction, September 1994. 1(3): p. 269-294.

[14] Myers, B. A. and D. S. Kosbie, *Reusable hierarchical command objects* in *Proc. CHI '96*.

[15] *Remote Possibilities*, in *USA Today*. 2000.

[16] Beck, J., Geffault, A., and Islam, N. *MOCA: A Service Framework for Mobile Computing Devices*. in *International Workshop on Data Engineering for Wireless and Mobile Access*.

[17] Czerwinski, S., et al. *An Architecture for a Secure Service Discovery Service*. in *ACM MobiCom* 1999.

[18] Guttman, E. *Service Location Protocol: Automatic Discovery of IP Network Services*. in *IEEE Internet Computing*.

[19] Larsson, B. C. a. O., *Universal Plug and Play Connects Smart Devices*. WinHec 99 White Paper (http://www.axis.com/products/documentation/UPnP.doc).

[20] Sun Microsystems, I., *Jini technology architectural overview*: from http://www.jini.org, and Jini network technology http://www.sun.com/jini/).

[21] J. Beck, A. G., & N. Islam, *MOCA: A Service Framework for Mobile Computing Devices*. Proceedings of the International Workshop on Data Engineering for Wireless and Mobile Access.

[22] Nichols, J., et al. *Generating Remote Control Interfaces for Complex Appliances*. in *ACM Symposium on User Interface Software and Technology*. 02. Paris.

[23] Gajos, K. and D. S. Weld. *SUPPLE: Automatically Generating User Interfaces*. in *IUI*. 04.

[24] Nichols, J., B. A. Myers, and B. Rothrock. *UNIFORM: Automatically Generating Consistent Remote Control User Interfaces*. in *Proceedings of CHI '2006*. 2006.

[25] *OmniRemote*.

[26] Hewlett-Packard-Corporation, *Cooltown*.

[27] Han, R., V. Perret, and M. Naghshineh. *WebSplitter: A Unified XML Framework For Multi-Device Collaborative Web Browsing*. in *Proceedings of ACM Computer Supported Cooperative Work*. 2000.

[28] Schlimmer, J., *ChangeDisc: 1 Sample Service Template For Universal Plug and Play Version 1.0*.

[29] Community, J. *The ServiceUI Project: UI Factories*. in http://www.artima.com/jini/serviceui/UIFactories.html.

[30] Bonnet, P., Gehrke, J., Seshadri, P. *Querying the Physical World*. in *IEEE Personal Communications*. 2000.

[31] Stina Nylander and M. Bylund. *The Ubiquitous Interactor Universal Access to Mobile Services*. in *HCII*. 2003.

[32] Reitter, D., E. Panttaja, and F. Cummins. *UI on the fly: Generating a multimodal user interface*. in *HLT/NAACL*. 04.

[33] Madden, S. e. a. *The Design of an Acquisitional Query Processor for Sensor Networks*. in *SIGMOD*. 2003.

[34] Hodes, T. and R. Katz, *Composable Ad Hoc Location-Based Services For Heterogeneous Mobile Clients*. Wireless Networks, 1999. 5: p. 411-427.

[35] Lin, J. and J. A. Landay. *Damask: A Tool for Early-Stage Design and Prototyping of Multi-Device User Interfaces*. 2002.

[36] Ponnekanti, S. R., et al. *ICrafter: A Service Framework for Ubiquitous Computing Environments*. in *Ubicomp* 2001. 2001. Atlanta.

[37] Edwards; W., et al. *Recombinant Computing and the Speakeasy Approach*. in *Mobicom* 2002. 2002.

[38] Olsen, D. R. and E. P. Dempsey, *SYNGRAPH: A Graphical User Interface Generator*. Computer Graphics, July 1983. 17(3): p. 43-50.

[39] Sukaviriya, P., J. Foley, and T. Griffith. *A Second Generation User Interface Design Environment: The Model and Runtime Architecture*. in *Proceedings of Human Factor in Computing Systems: INTERCHI '93*. April 1993.

[40] Omojokun, O. and P. Dewan. *A High-level and Flexible Framework for Dynamically Composing Networked Devices*. in *Proceeding of 5th IEEE Workshop on Mobile Computing Systems and Applications*. 2003.

[41] Nichols, J., et al. *Huddle: Automatically Generating Interfaces for Systems of Multiple Connected Appliances*. in *Proc. UIST '06*. 2006.

[42] Jeffrey Nichols, B. M., Thomas K. Harris, and S. S. Roni Rosenfeld, Michael Higgins, Joseph Hughes. *Requirements for Automatically Generating Multi-Modal Interfaces for Complex Appliances*. in *Proc. ICMI*. 02.

[43] Lemon, O. and X. Liu. *DUDE: a Dialogue and Understanding Development Environment, mapping Business Process Models to Information State Update dialogue systems*. in *EACL* 2006.

[44] Larsson, S., R. Cooper, and S. Ericsson. *Menu2dialog*. in *IJCAI Workshop on Knowledge And Reasoning In Practical Dialogue Systems*, 2001.

[45] Omojokun, O. and P. Dewan. *Experiments with Mobile Computing Middleware for Deploying Appliance UIs*. in *In Proceedings of the 23rd International Conference on Distributed Computing Systems—Workshops*. 2003.

[46] Omojokun, O., *Interacting with Networked Devices*, in *Computer Sciences*. 2006, University of North Carolina.

[47] *Nevo for PDAs*.

[48] Myers, B. A. *Separating Application Code from Toolkits: Eliminating the Spaghetti of Call-Backs*. ACM *UIST '91*. Nov. 11-13, 1991.

[49] Linton, M. A., J. M. Vlissides, and P. R. Calder. *Composing User Interfaces with InterViews*. in *IEEE Computer*. February 1989.

[50] Dewan, P. *A Tour of the Suite User Interface Software.* in *Proceedings of the 3rd ACM UIST '90* October 1990.

[51] Olsen, D. R., *User Interface Management Systems: Models and Algorithms.* 1992, San Mateo, Calif.: Morgan Kaufmann.

[52] Codd, E., *A Relational Model for Large Shared Data Banks.* Comm. ACM, 1970 13(6).

[53] Fraser, C. W. and D. R. Hanson, *A High-Level Programming and Command Language.* Sigplan Notices: Proc. of the Sigplan '83 Symp. on Prog. Lang. Issues in Software Systems, June 1983. 18(6): p. 212-219.

[54] Liskov, B., *Abstraction Mechanisms in CLU.* CACM, August 1977. 20(8): p. 564-576.

[55] Rowe, L. A. and K. A. Shoens. *A Form Application Development System.* in *Proceedings of the ACM-SIGMOD International Conference on the Management of Data.* 1982.

[56] Omojokun, O. and P. Dewan. *Automatic Generation of Device User Interfaces?* in *IEEE Conference on Pervasive Computing and Communication (PerCom).* 2007.

[57] Paterno, F., C. Manicini, and S. Meniconi. *ConcurTaskTrees: A Diagrammatic Notation for Specifying Task Models.* in *INTERACT.* 1997. 1997.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for automatically generating a user interface for a computer program using programming patterns, the method comprising:

analyzing application objects of an application computer program to identify programming patterns, wherein each programming pattern is a relationship among signatures of application methods in one of the application objects, and wherein the signatures of the application methods comprise public interfaces of the application methods;

automatically generating a user interface for the computer program, wherein automatically generating a user interface includes providing for at least one of a user and a programmer of the computer program to customize mappings between the application objects and user interface elements, wherein the user interface elements include at least one of user interface widgets and speech grammar rules, wherein the identified programming patterns include at least one of an undo pattern, a structure pattern, a graphical pattern, a validation pattern, and a precondition pattern, and wherein the undo pattern identifies, for each application method a pattern-based executed-command-object that can undo/redo the method, wherein the pattern-based executed-command-object comprises an executed-command object that uses at least one of: (a) relationships among the signatures of the application methods in and (b) antonym dictionaries to implement the undo and redo operations, and wherein the executed-command object is an object that provides operations to undo and redo each application method.

2. The method of claim 1 wherein identifying the programming patterns includes invoking pattern objects that map the signatures of the methods to properties.

3. The method of claim 2 wherein providing for one of a user and a programmer to customize mappings between the application objects and the user interface elements includes providing a programmer interface for the programmer to define and select the pattern objects to be invoked for given application objects.

4. The method of claim 3 wherein providing the programmer interface includes providing customization mechanisms that allow the programmer to determine: (a) logical components and application methods of each application object are mapped to, (b) the set of user interface elements to which each mapped component and method is mapped, (c) the 2-d layout used to compose children user interface elements in containers, (d) a linear order in which speech choices are prompted in the system-initiative dialogues, (e) labels displayed in the user interface widgets and prompts used in speech dialogues, (f) whether an application method is undoable, and (g) how application methods are mapped to hierarchies of control widgets, including nested pull-down menus.

5. The method of claim 4 wherein providing customization mechanisms includes providing pattern customization mechanisms that allow programmers to specify how relationships among the method signatures should be used to identify (a) a precondition method, a validation method, and a pattern-based executed-command object, and (b) read, write, add and remove methods of a logical component.

6. The method of claim 2 wherein providing for one of a user and a programmer to customize mappings between the application objects and the user interface elements includes providing a tool as part of the user interface for a user to select the pattern objects to be involved for given application objects.

7. The method of claim 1 wherein the precondition pattern identifies a precondition method of one of the application methods, wherein the precondition method is a Boolean parameterless method that determines if the associated application method is currently enabled.

8. The method of claim 1 wherein the validation pattern identifies a validation method of one of the application methods, wherein the validation method is a Boolean method that takes the same parameters as the associated application method and determines if the application method can be safely invoked with a given set of parameters.

9. The method of claim 1 wherein the structure pattern identifies the logical components of an object, and the read, write, add and remove methods of each identified logical component.

10. The method of claim 1 wherein the graphical pattern identifies a kind of shape to be displayed by one of the application objects and a set of application methods of the application object for reading and changing attributes of the shape.

11. The method of claim 1 wherein automatically generating a user interface comprises automatically generating at least one of a graphical user interface and a speech user interface.

12. The method of claim 1 wherein automatically generating a user interface includes automatically generating one of a binder tool that binds an arbitrary set of application methods and logical components of the program to corresponding mappable user interface elements, an undo tool for implementing the undo and the redo operation, and a help tool for explaining the computer program.

13. The method of claim 12 wherein the mappable user interface elements include (a) standard state widgets provided by a user interface toolkit, the standard stated widgets including: text-fields, formatted-text-fields, text-areas, check-boxes, radio buttons, sliders, progress bars, spinners, combo-box menus, list widgets, table widgets, and tree widgets, (b) standard control widgets including: buttons, pop-up menus, and pull-down menus, (c) a drawing state widget including shapes of at least two dimensions representing graphical application objects, and (d) compositions of other widgets displayed in the standard containers: such as scroll-panes, tabbed panes, and desktop-panes.

14. The method of claim 12 wherein automatically generating a help tool includes creating help information for an application, including (a) for each method or logical component mapped to a widget, showing an explanation annotation associated with the method, (b) providing commands in the user interface to display documents specified by URL annotations associated with the class and methods of the application, and (c) creating a keyword index that shows a list of keywords, and for each keyword, a list of application classes associated with the keyword, and for each class, providing the user with facilities to display its annotations and create a user interface for an instance of the class.

15. The method of claim 14 wherein the keywords include programmer-defined keywords and predefined keywords.

16. The method of claim 15 wherein the programmer-defined keywords include keywords mentioned in keyword annotations.

17. The method of claim 15 wherein the predefined keywords identify different kinds of programming patterns, widgets, and customization mechanisms.

18. The method of claim 15 wherein:
a programmer-defined keyword is associated with all classes that are mentioned in keyword annotations associated with the classes;
a predefined programming pattern keyword is associated with applications that implement the pattern;
a widget type keyword is associated with applications whose user-interfaces include the widget; and
a customization mechanism is associated with classes that use the mechanism.

19. The method of claim 12 wherein the binder tool maps application methods and logical components to mappable user interface elements, updates the mappings in response to changes to application state, and updates application state in response to user-changes to editable widgets and spoken commands.

20. The method of claim 19 wherein updating the mappings in response to changes in application state includes: (a) when a precondition method of a mapped method returns false, removing or disabling the corresponding user interface element, (b) when a precondition method associated with a read method of a mapped logical component returns false, removing or disabling the user interface element to which it is mapped, and (c) updating an existing user interface element or adding a new user interface element when a logical component is added/removed from an object.

21. The method of claim 19 wherein updating a logical component in response to user changes to editable widgets and spoken commands includes (a) calling a validation method of a write method of the logical component to determine if the user input is valid, and (b) calling the write method if the validation method returns true.

22. The method of claim 12 wherein mapping an application method to a widget includes (a) selecting and creating a control widget so that activating the control widget results in invocation of the application method mapped to the control widget, (b) providing a dialogue box for collecting parameters of the application method, and (c) generating a user-interface to display an object returned by the application method.

23. The method of claim 12 wherein implementing an undo/redo operation includes one of (a) intercepting invocation of each application method bound to a control widget and each write method of a logical component bound to a state widget, (b) after execution of each of the write and application methods, waiting to receive an executed-command object from the write and application method as a notification or creating a pattern-based executed-command object if such a notification is not received, (c) associating the received/created executed-command object with the invoked method, (d) when the user requests the undo or redo of a method, invoking the undo or redo operation on the executed-command object associated with the invoked method.

24. The method of claim 1 wherein automatically generating the user interface includes mapping a logical component to a widget, wherein mapping a logical component to a widget includes selecting and creating a corresponding widget that can display the logical component and enabling the widget for editing if a write method of the logical component exists.

25. The method of claim 24 wherein mapping a logical component to a widget includes one of: if a logical component P is atomic, mapping P to a standard state widget, and, if P is non-atomic, creating a container including of children widgets to which logical components and methods of P are recursively mapped.

26. The method of claim 1 wherein automatically generating a user interface includes mapping one of the application methods to a grammar rule, wherein mapping the application method to a grammar rule involves defining a system-initiative and user-initiative sub-dialogue that allows the user to identify the name of the application method and its parameters.

27. The method of claim 1 wherein automatically generating a user interface includes mapping a logical component, P, to a speech grammar rule, wherein mapping a logical component, P, to a speech grammar rule includes defining a system-initiative and user-initiative sub-dialogue that allows the user to query or change (a) P, if the logical component is atomic, and (b) the logical components of P, if the logical component is non-atomic.

28. The method of claim 27 wherein a system-initiative dialogue prompts users for the alternative choices, in order of the values of their position attributes.

29. The method of claim 28 wherein a user-initiative dialogue allows the user to give the choice without any prompting.

30. The method of claim 1 wherein analyzing the computer program to identify an undo pattern includes identifying a signature for a method that sets a value for a variable and wherein generating the user interface tool for implementing the undo operation includes, prior to execution of the method that sets the value for the variable, executing a method that stores a current value of the variable and, after execution of the method, that sets the value for the variable, providing access, via the user interface tool, to the method that sets the value for the variable where the stored value for the variable is passed as the parameter used by the method to set the value for the variable.

31. The method of claim 1 wherein analyzing the computer program to identify an undo pattern includes analyzing method names to identify names that are antonyms of each other and wherein generating the user interface tool for implementing the undo operation includes, after execution of a method M with an antonym A, providing the ability, via the user interface tool, for the user to execute the antonym A.

32. The method of claim 31 wherein analyzing method names to identify methods that are antonyms of each other includes identifying prefixes or words that indicate that the names are antonyms.

33. The method of claim 1 wherein analyzing the computer program to identify an undo pattern includes identifying a method that adds an item to a collection of items and a method that removes and item from the collection of items and wherein automatically generating the tool for implementing the undo function includes after execution of the method that adds the item to the collection of items, providing access, via the tool, to the method that removes the item from the collection of items.

34. A method for automatically generating a user interface for a computer program, the method comprising:
analyzing an application computer program to identify programming patterns, each programming pattern being a relationship among methods in an application object in the computer program that is identifiable based on signatures of the methods, the identified programming patterns including predefined programming patterns provided by a system and programmer defined patterns specified by application programmers, the signatures of the methods comprise public interfaces of the methods;
determining, from the programming patterns, properties about the application object usable for generating a user interface; and
automatically generating, based on the properties a user interface for the computer program, wherein the identified programming patterns include at least one of an undo pattern, a structure pattern, a graphical pattern, a validation pattern, and a precondition pattern, and wherein the undo pattern identifies, for each application method a pattern-based executed-command-object that can undo/redo the method, wherein the pattern-based executed-command-object comprises an executed-command object that uses at least one of: (a) relationships among the signatures of the application methods in and (b) antonym dictionaries to implement the undo and redo operations, and wherein the executed-command object is an object that provides operations to undo and redo each application method.

35. A system for automatically generating a user interface for a computer program using programming patterns, the system comprising:
a processor;
a user interface generator implemented by the processor for analyzing application objects of an application computer program to identify programming patterns, wherein each programming pattern is a relationship among signatures of application methods in one of the application objects, and wherein the signatures of the application methods comprise public interfaces of the application methods and for automatically generating a user interface for the computer program; and
the user interface generator including a customizer for providing for at least one of a user and a programmer of the computer program to customize mappings between the application objects and user interface elements, wherein the user interface elements include at least one of user interface widgets and speech grammar rules, wherein the identified programming patterns include at least one of an undo pattern, a structure pattern, a graphical pattern, a validation pattern, and a precondition pattern, and wherein the undo pattern identifies, for each application method a pattern-based executed-command-object that can undo/redo the method, wherein the pattern-based executed-command-object comprises an executed-command object that uses at least one of: (a) relationships among the signatures of the application methods in and (b) antonym dictionaries to implement the undo and redo operations, and wherein the executed-command object is an object that provides operations to undo and redo each application method.

36. A non-transitory computer readable medium having stored thereon a computer program comprising computer-executable instructions that when executed by the processor of a computer perform steps comprising:
analyzing application objects of an application computer program to identify programming patterns, wherein each programming pattern is a relationship among signatures of application methods in one of the application objects, and wherein the signatures of the application methods comprise public interfaces of the application methods;
automatically generating a user interface for the computer program, wherein automatically generating a user interface includes providing for at least one of a user and a programmer of the computer program to customize mappings between the application objects and user interface elements, wherein the user interface elements include at least one of user interface widgets and speech grammar rules, wherein the identified programming patterns include at least one of an undo pattern, a structure pattern, a graphical pattern, a validation pattern, and a precondition pattern, and wherein the undo pattern identifies, for each application method a pattern-based executed-command-object that can undo/redo the method, wherein the pattern-based executed-command-object comprises an executed-command object that uses at least one of: (a) relationships among the signatures of the application methods in and (b) antonym dictionaries to implement the undo and redo operations, and wherein the executed-command object is an object that provides operations to undo and redo each application method.

* * * * *